Figure 1:
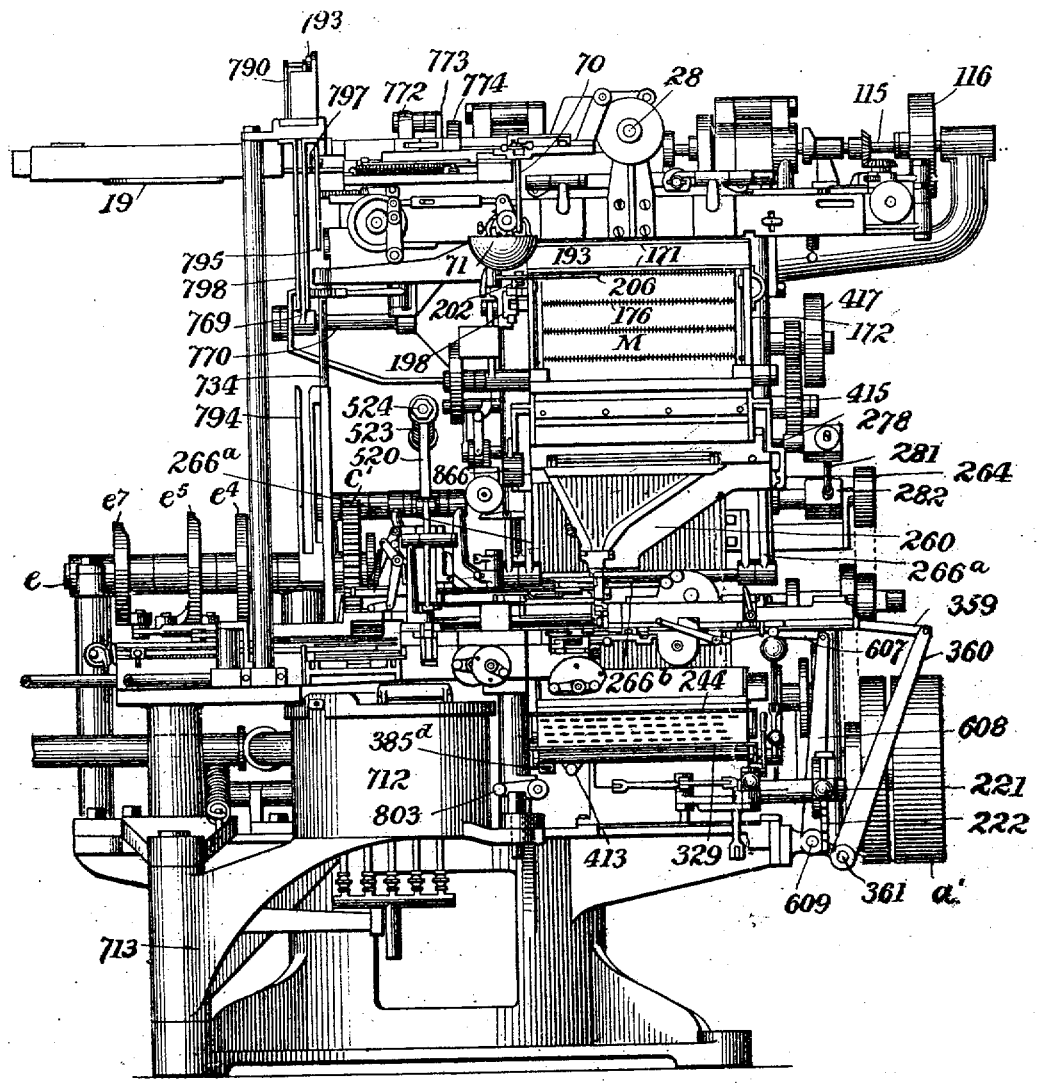

E. LAWRENZ.
TYPOGRAPHIC MACHINE.
APPLICATION FILED MAR. 28, 1906.

1,017,772.

Patented Feb. 20, 1912.
78 SHEETS—SHEET 1.

Witnesses
J. G. Stinkel
R. C. Rust

Inventor
Emil Lawrenz
by J. Watson
Attorney

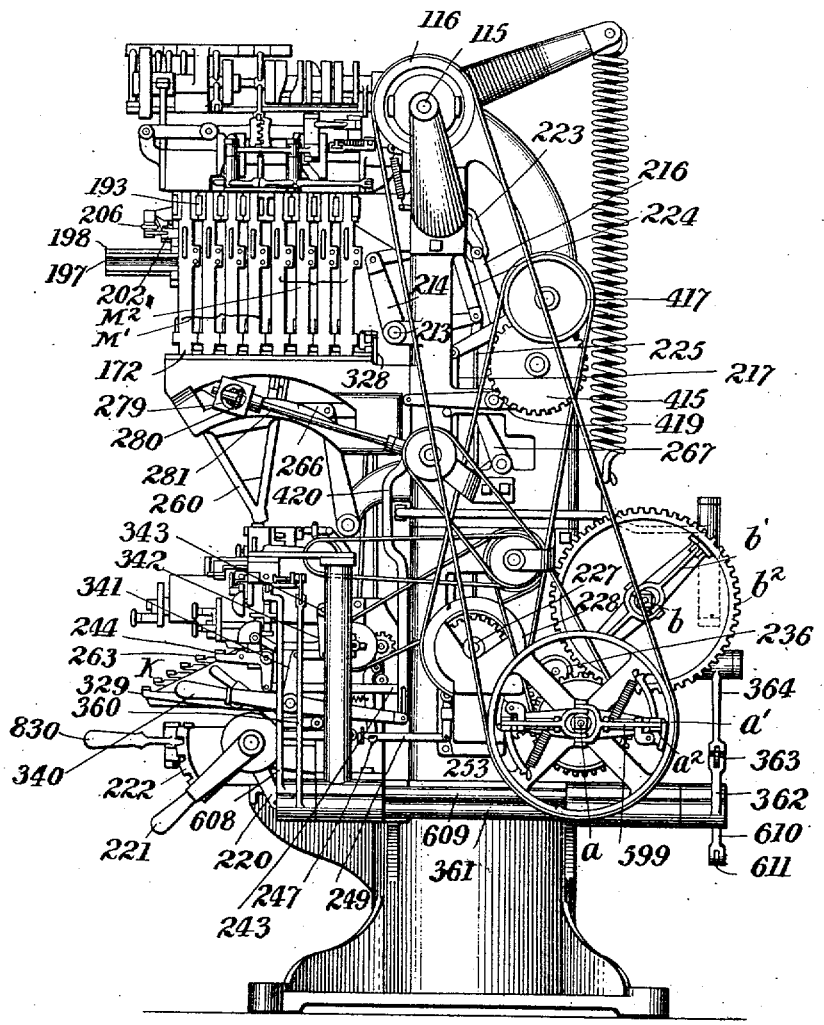

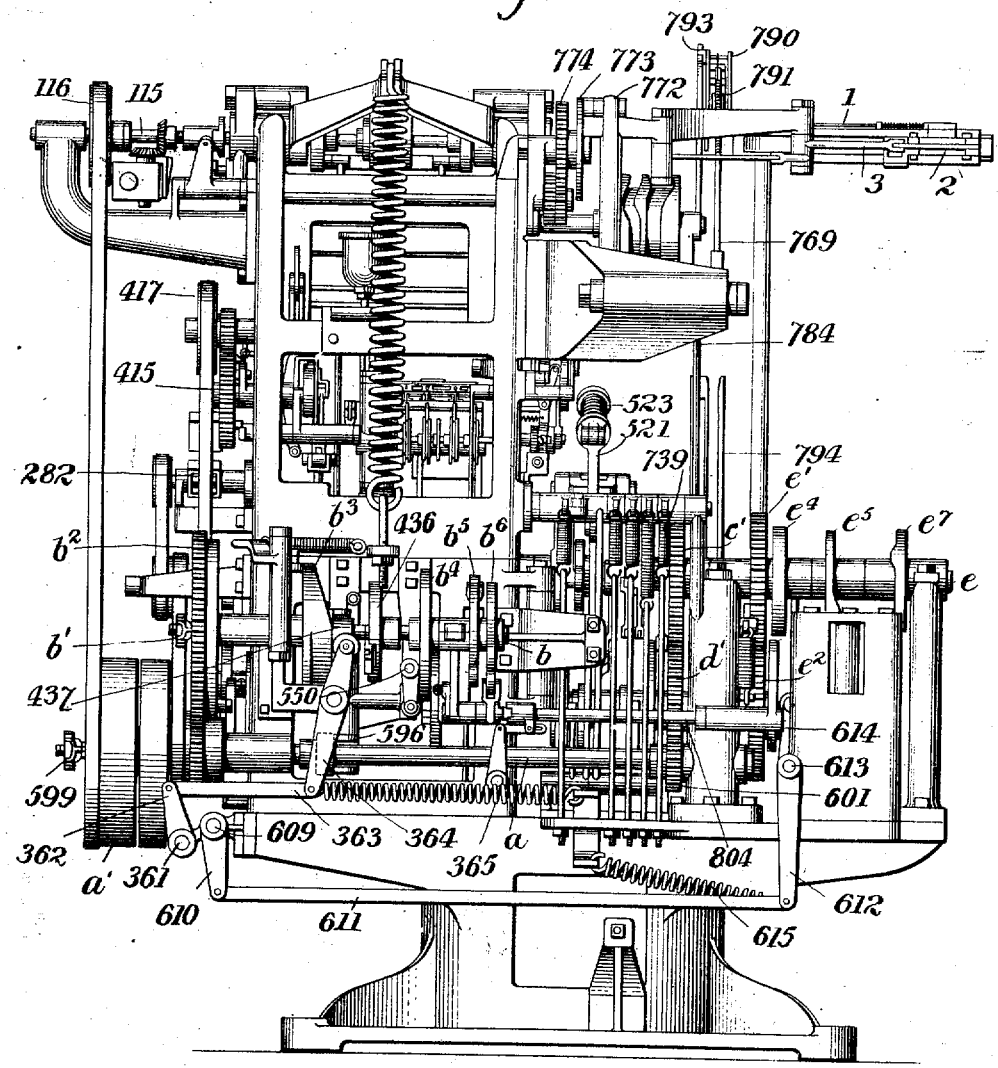

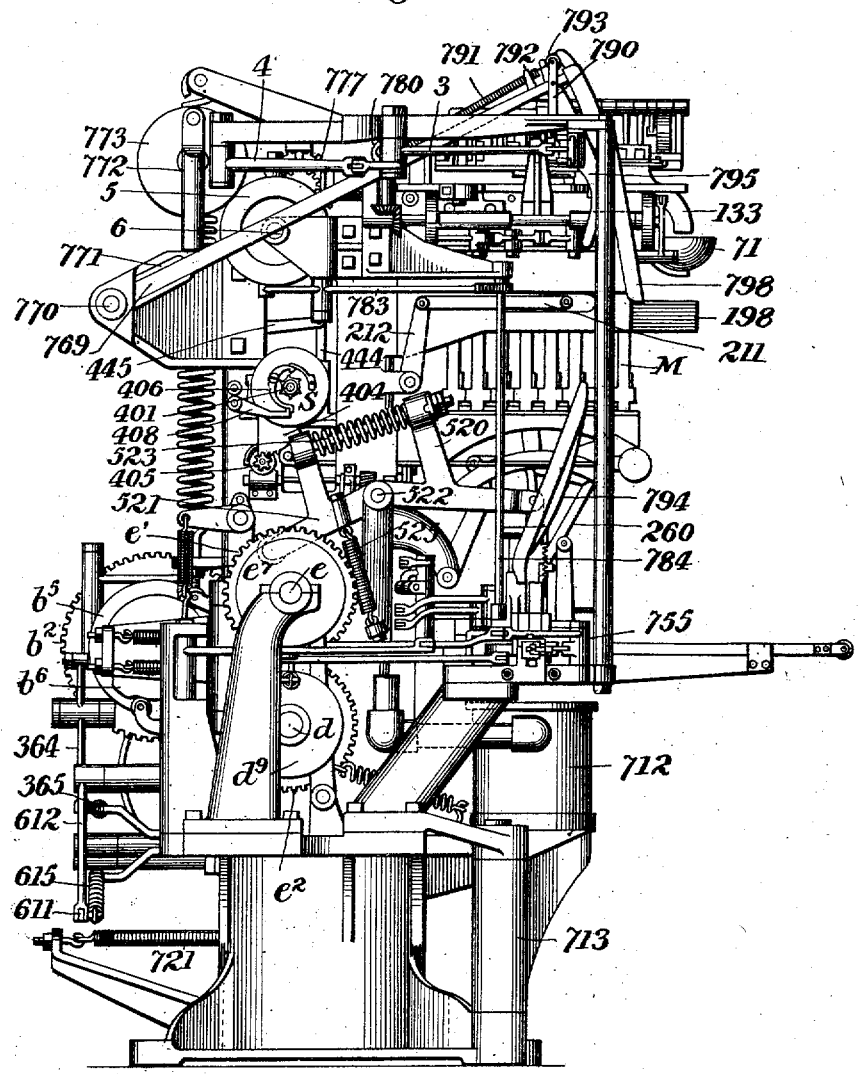

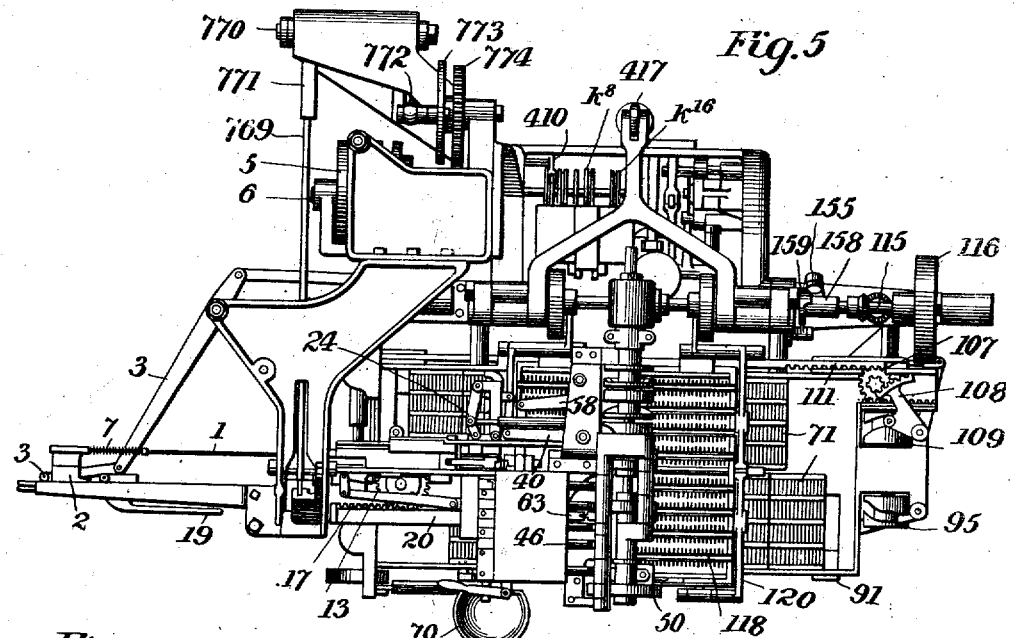
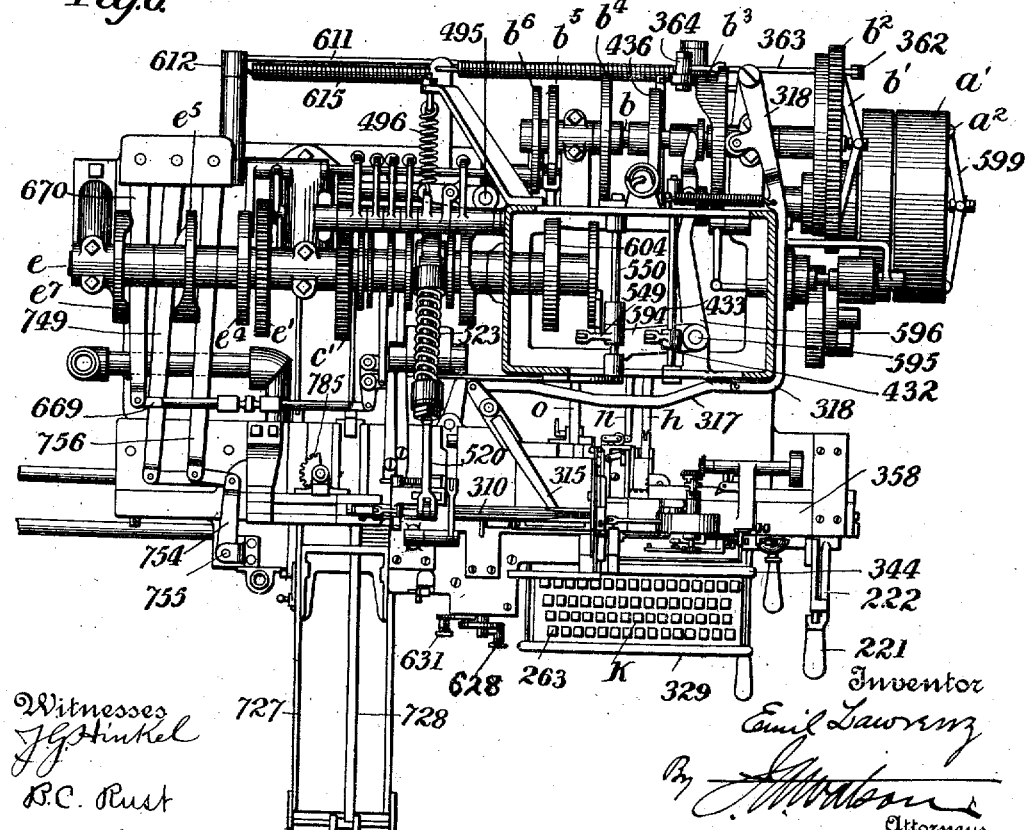

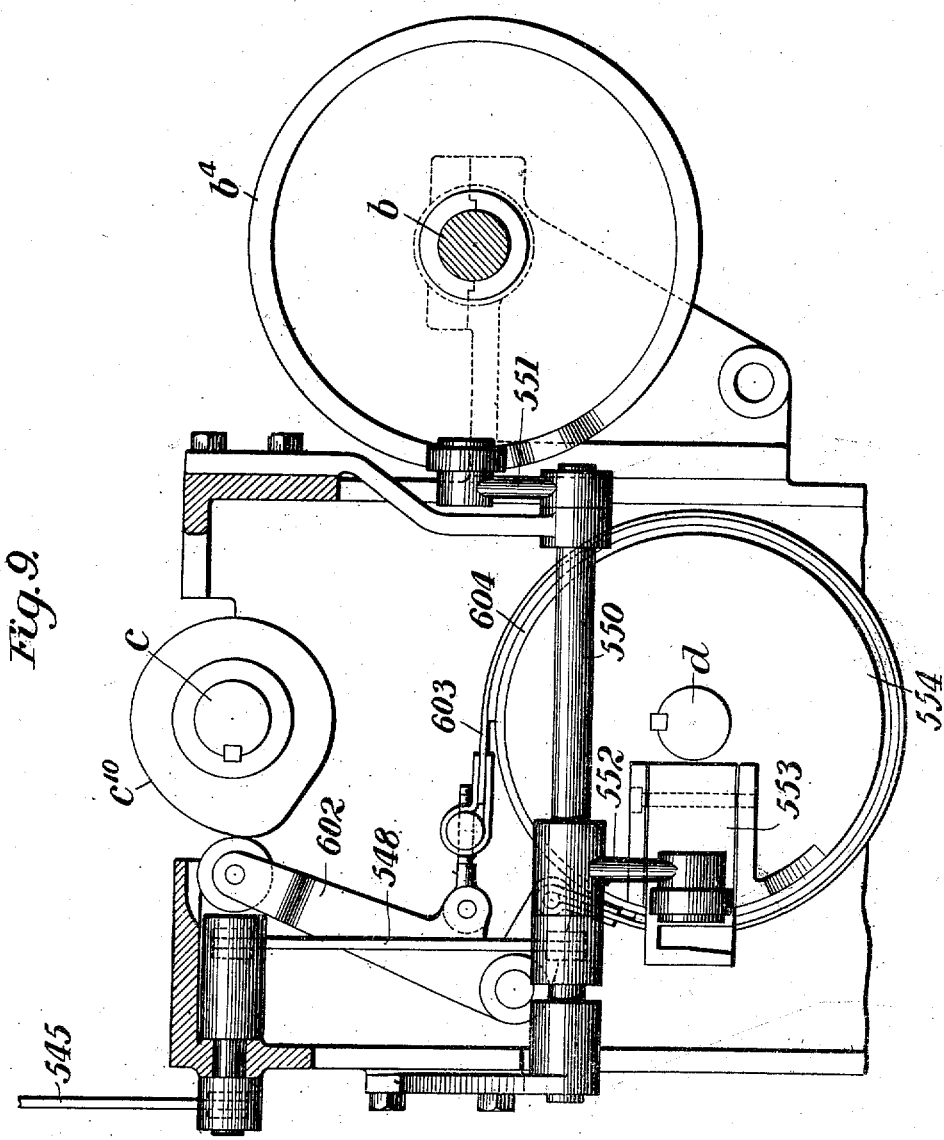

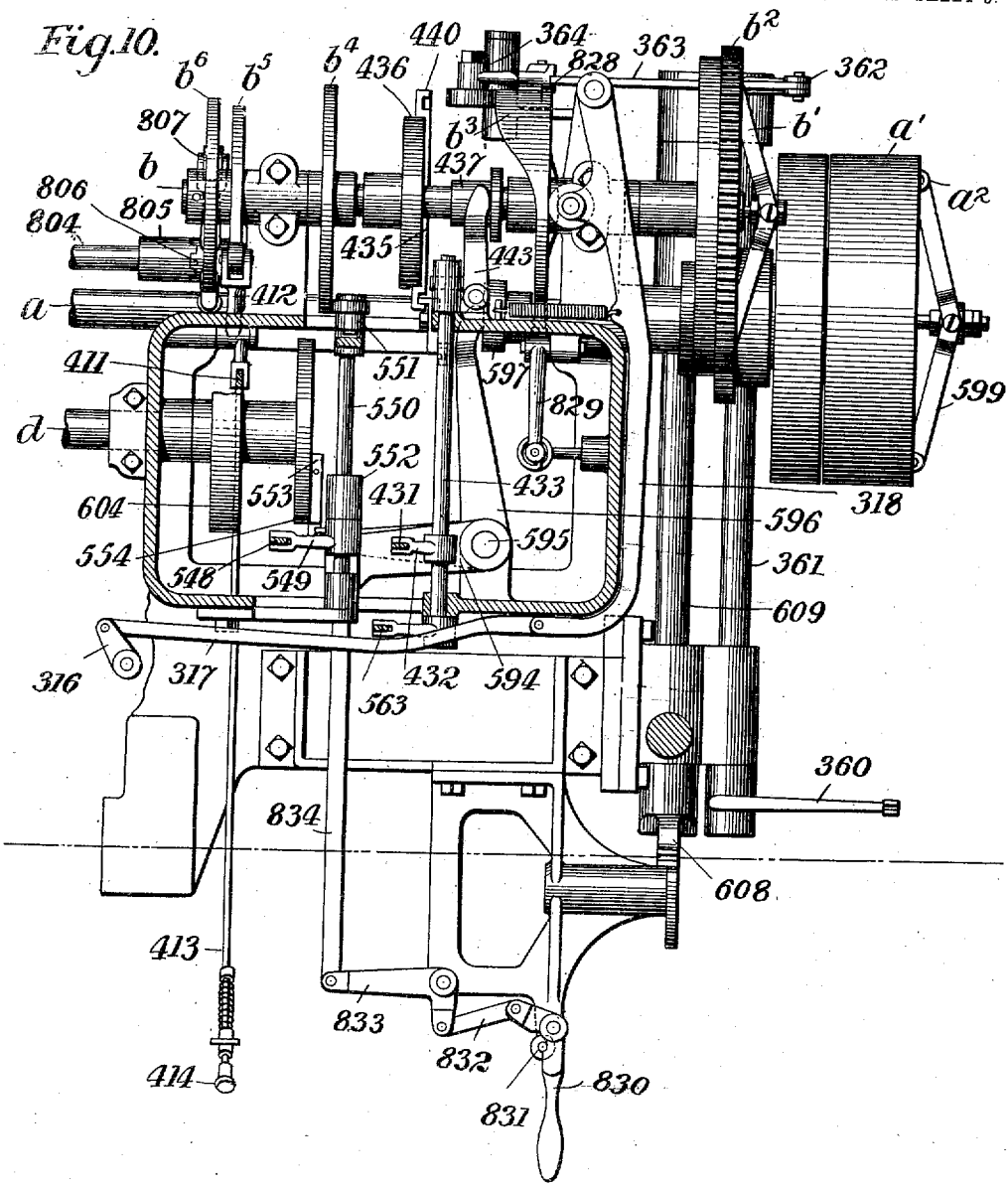

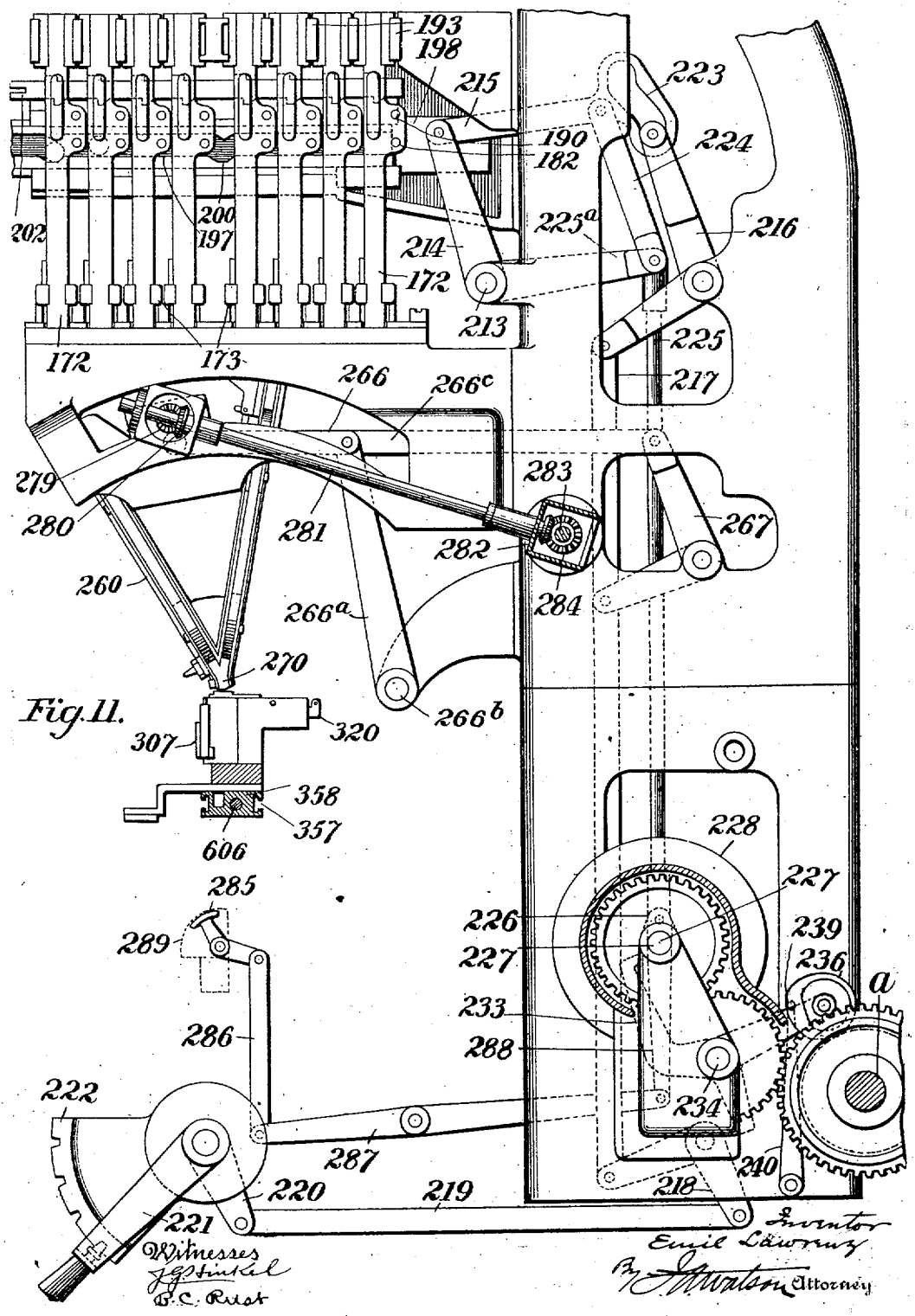

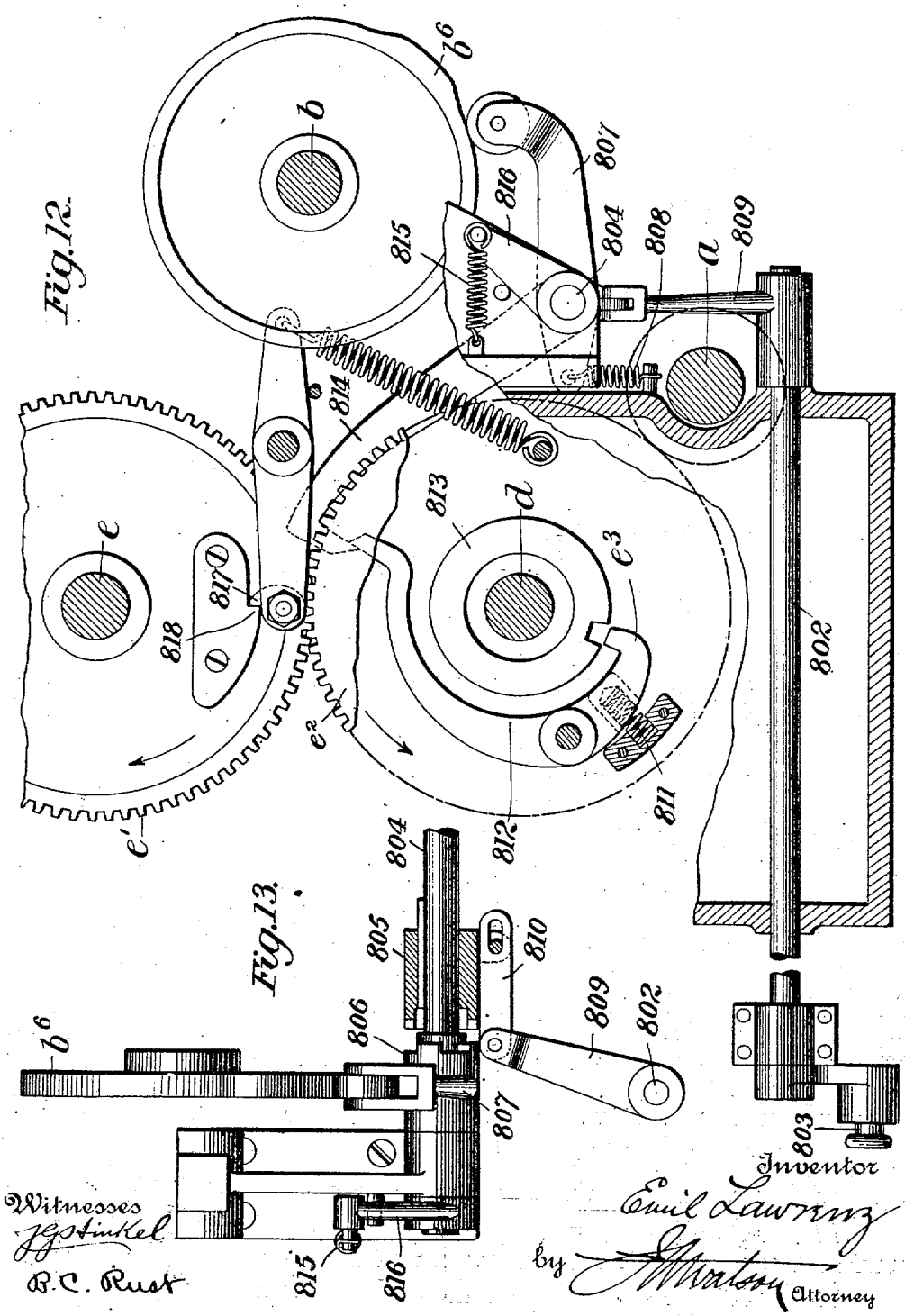

E. LAWRENZ.
TYPOGRAPHIC MACHINE.
APPLICATION FILED MAR. 28, 1906.

1,017,772.

Patented Feb. 20, 1912.
78 SHEETS—SHEET 11.

Witnesses
J. G. Stinkel
B. C. Rust

Inventor
Emil Lawrenz
by J. Watson
Attorney

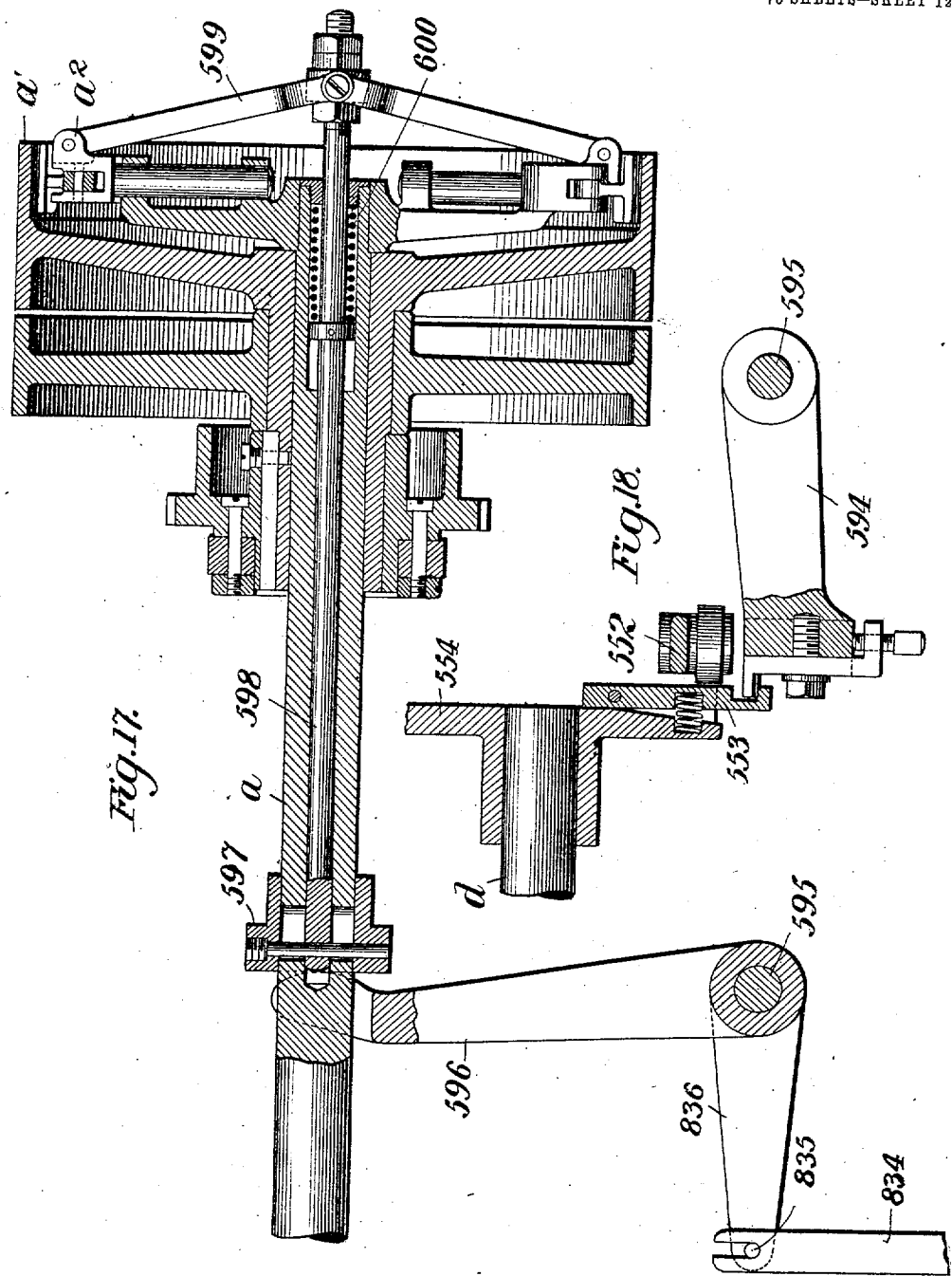

E. LAWRENZ.
TYPOGRAPHIC MACHINE.
APPLICATION FILED MAR. 28, 1906.

1,017,772.

Patented Feb. 20, 1912
78 SHEETS—SHEET 13

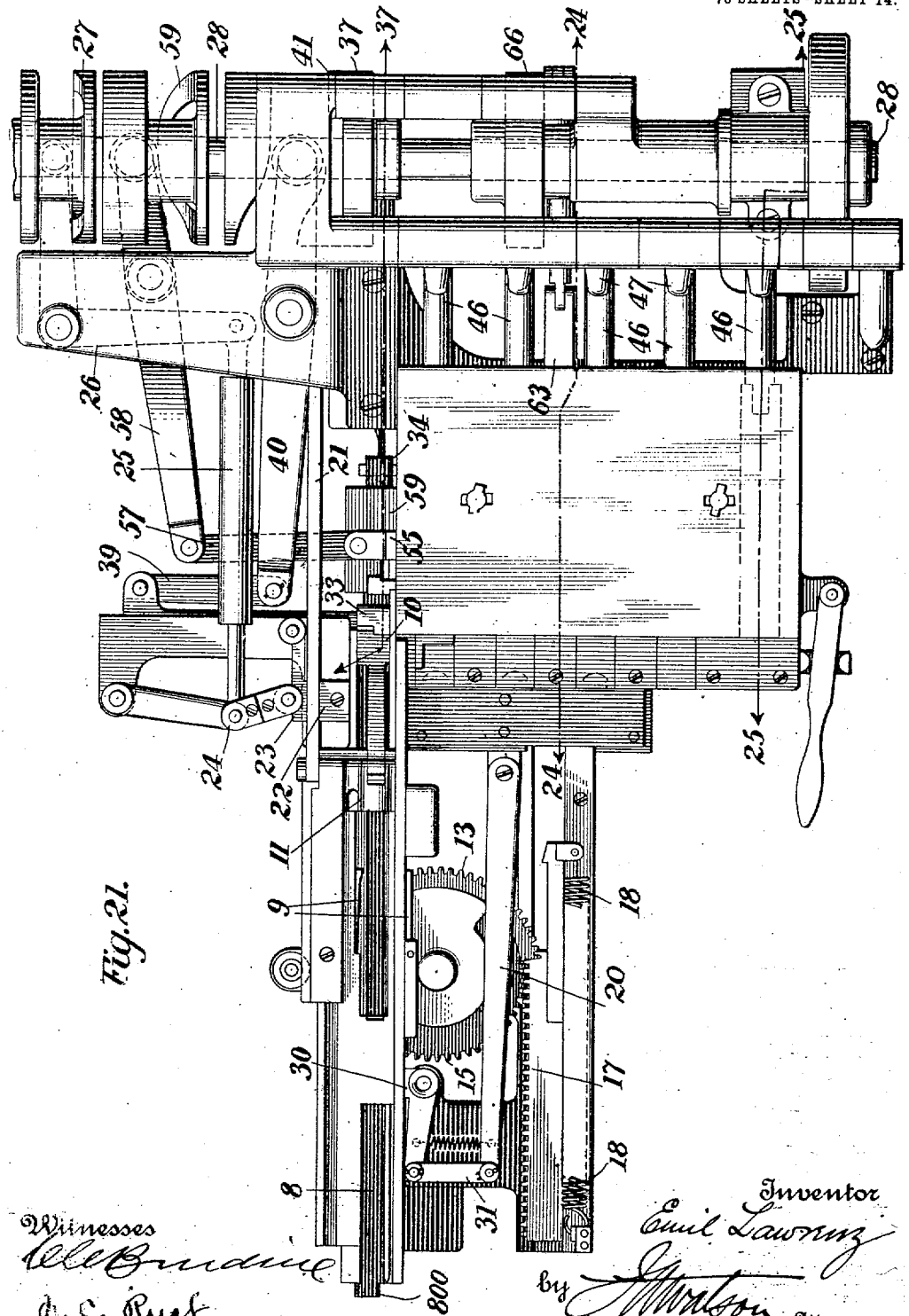

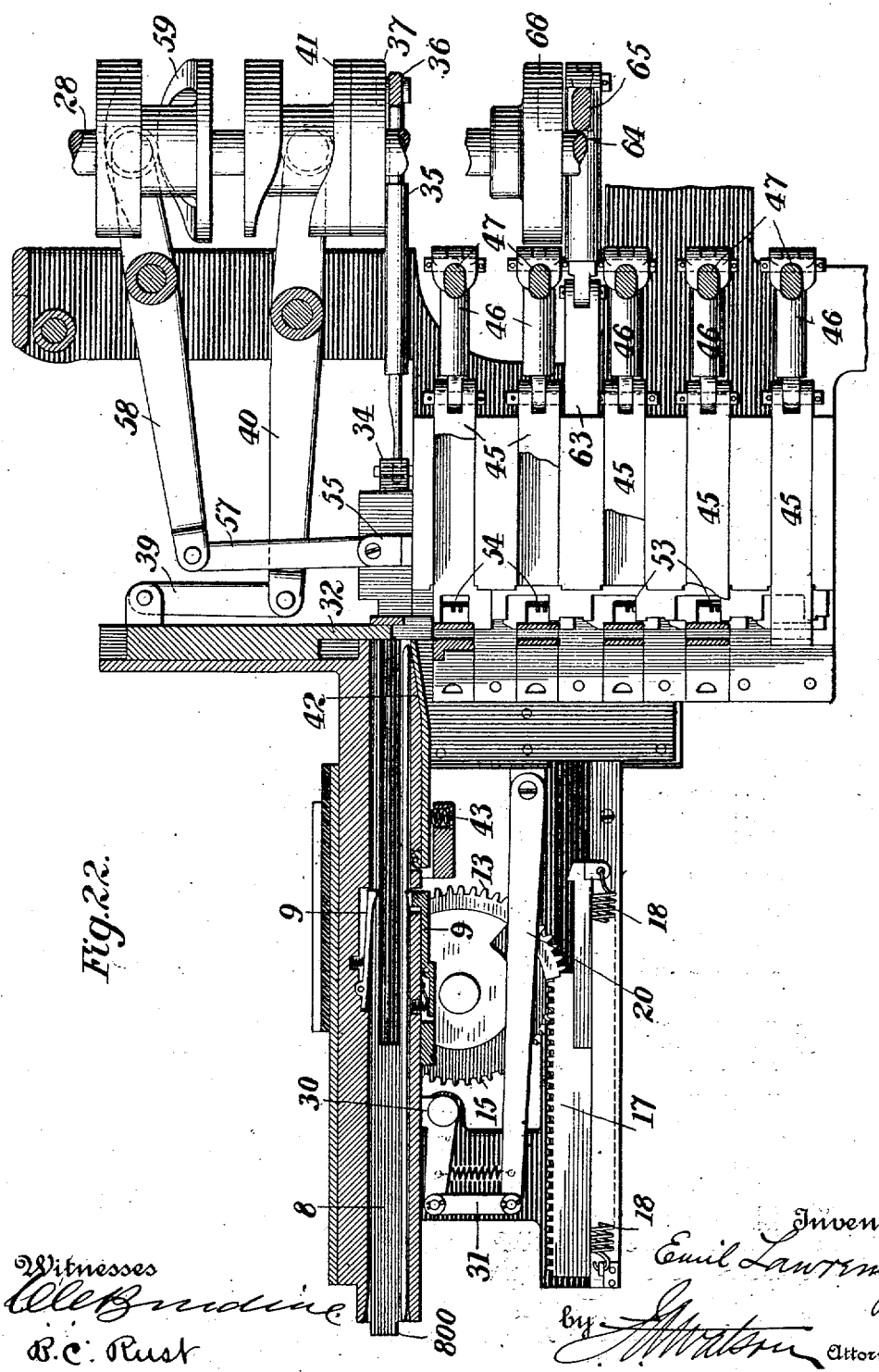

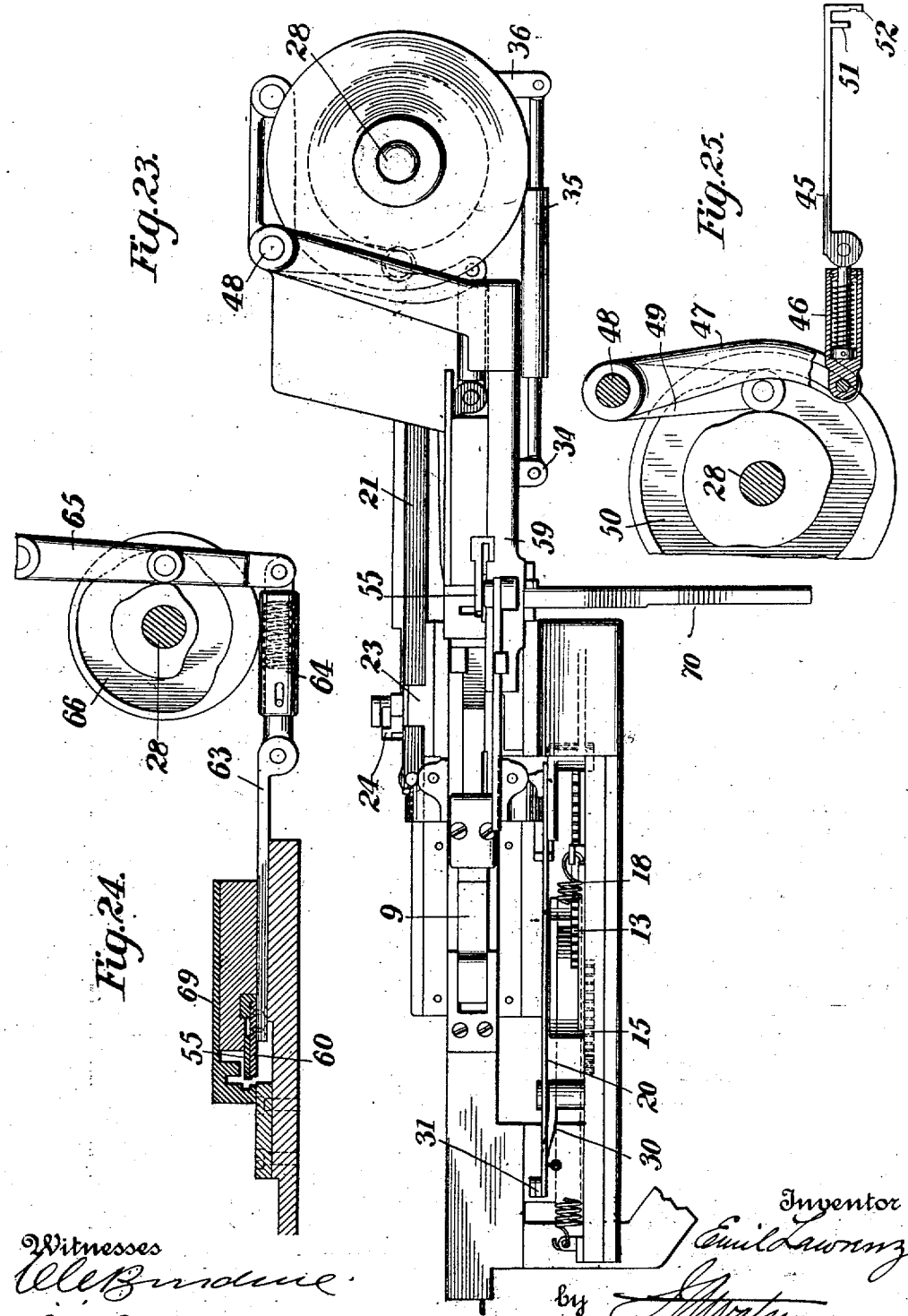

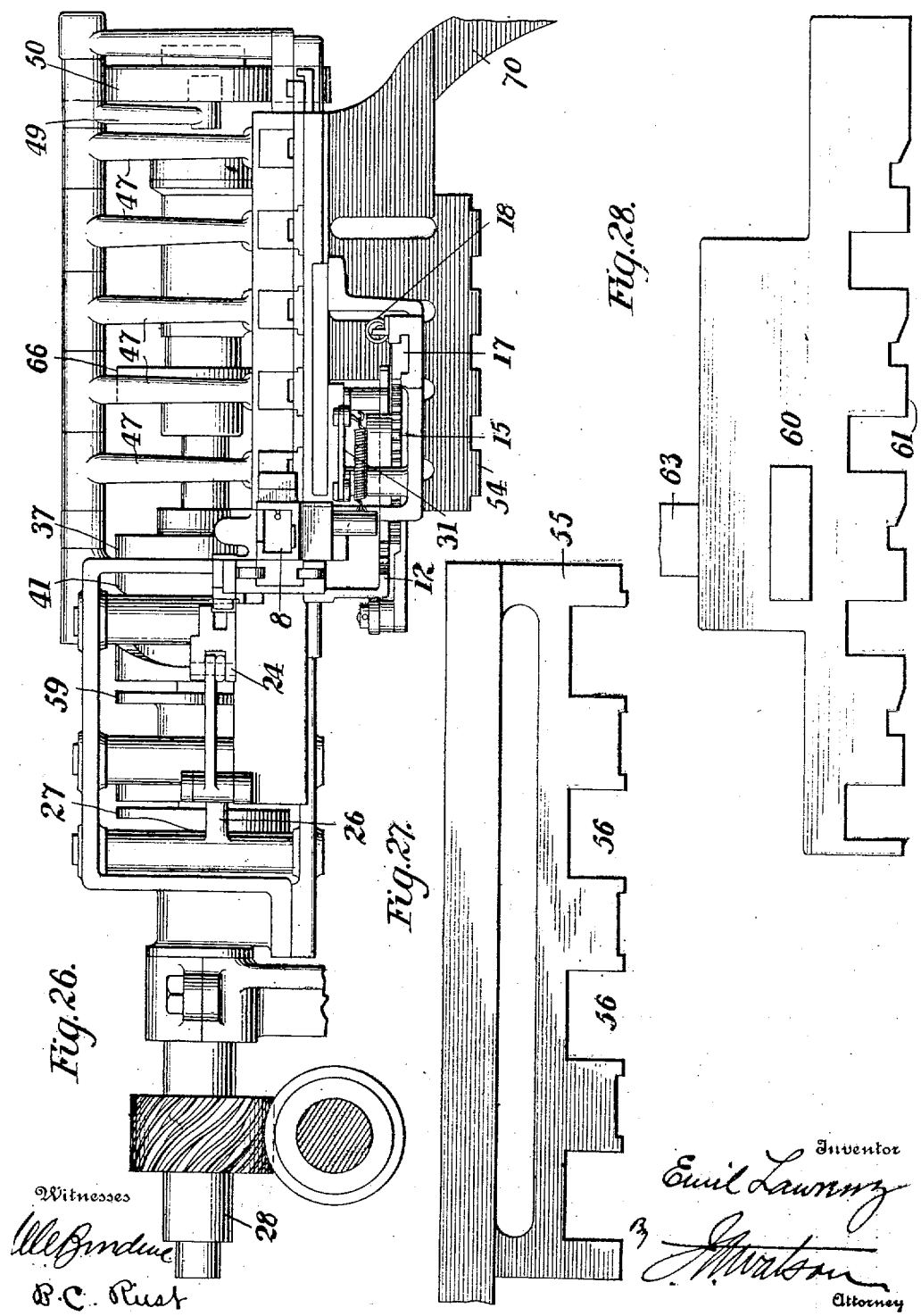

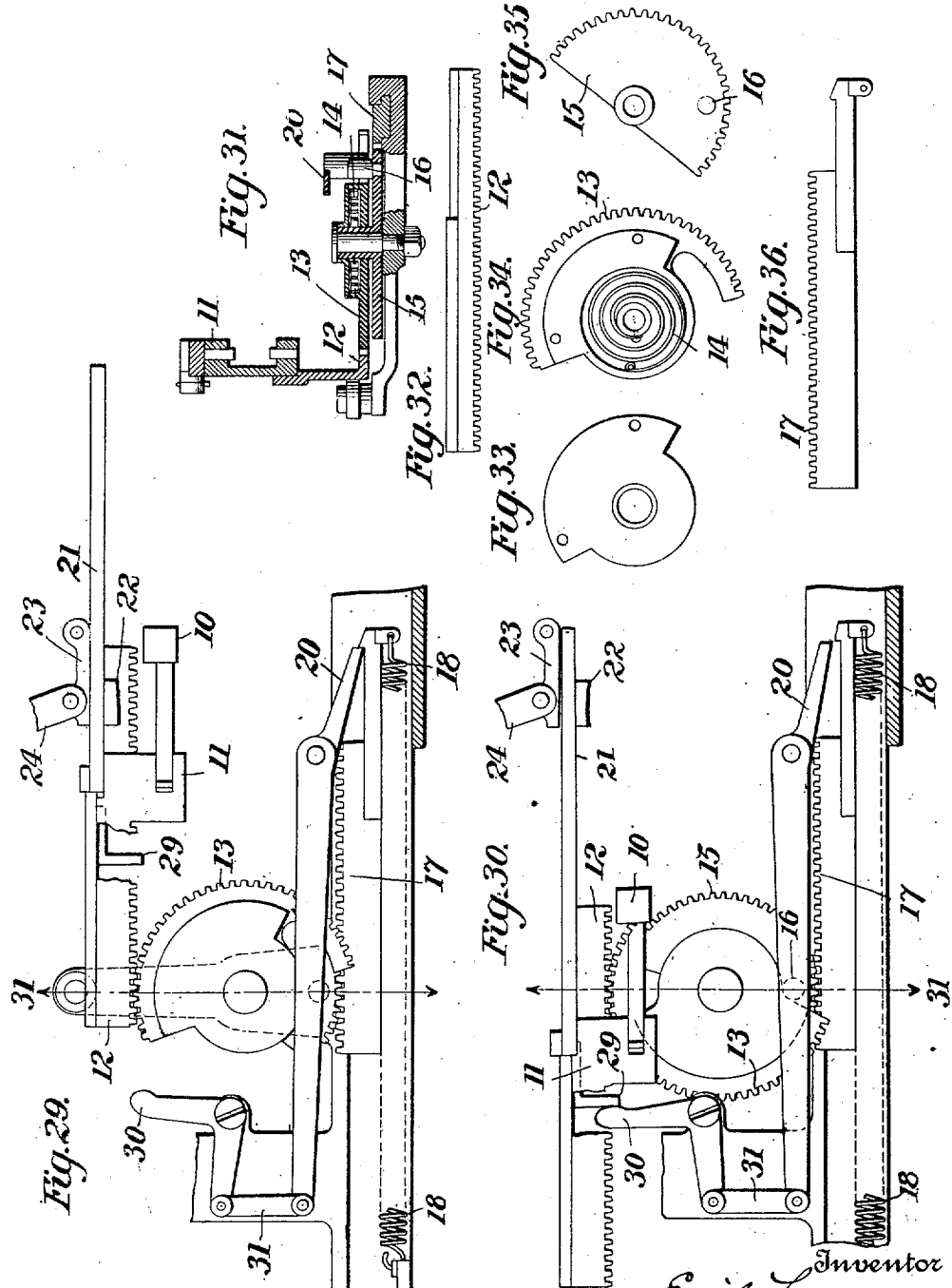

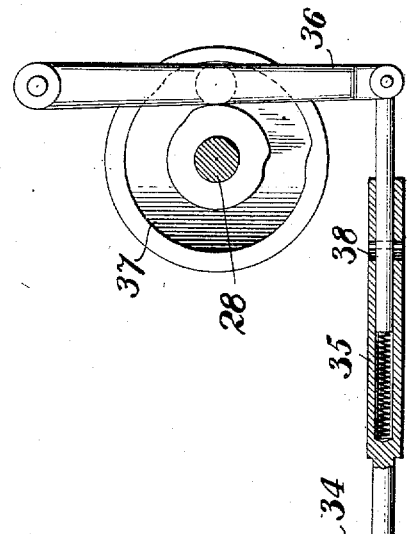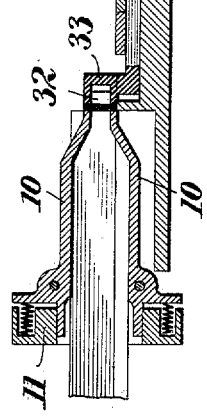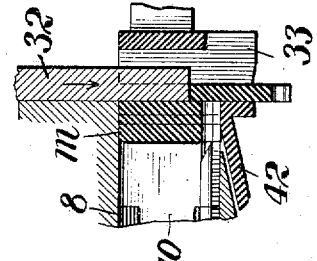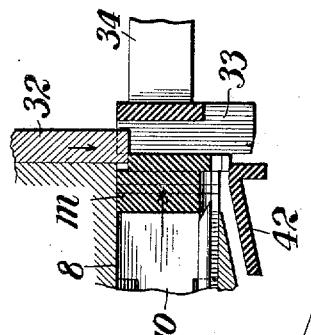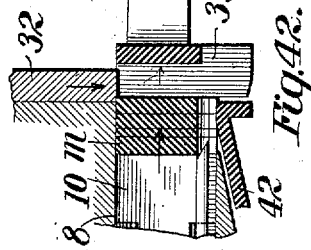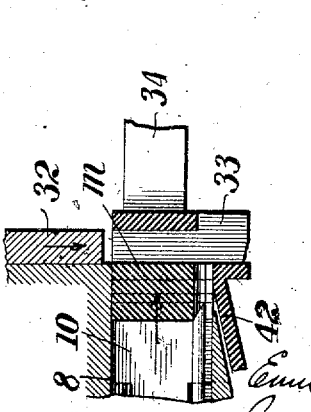

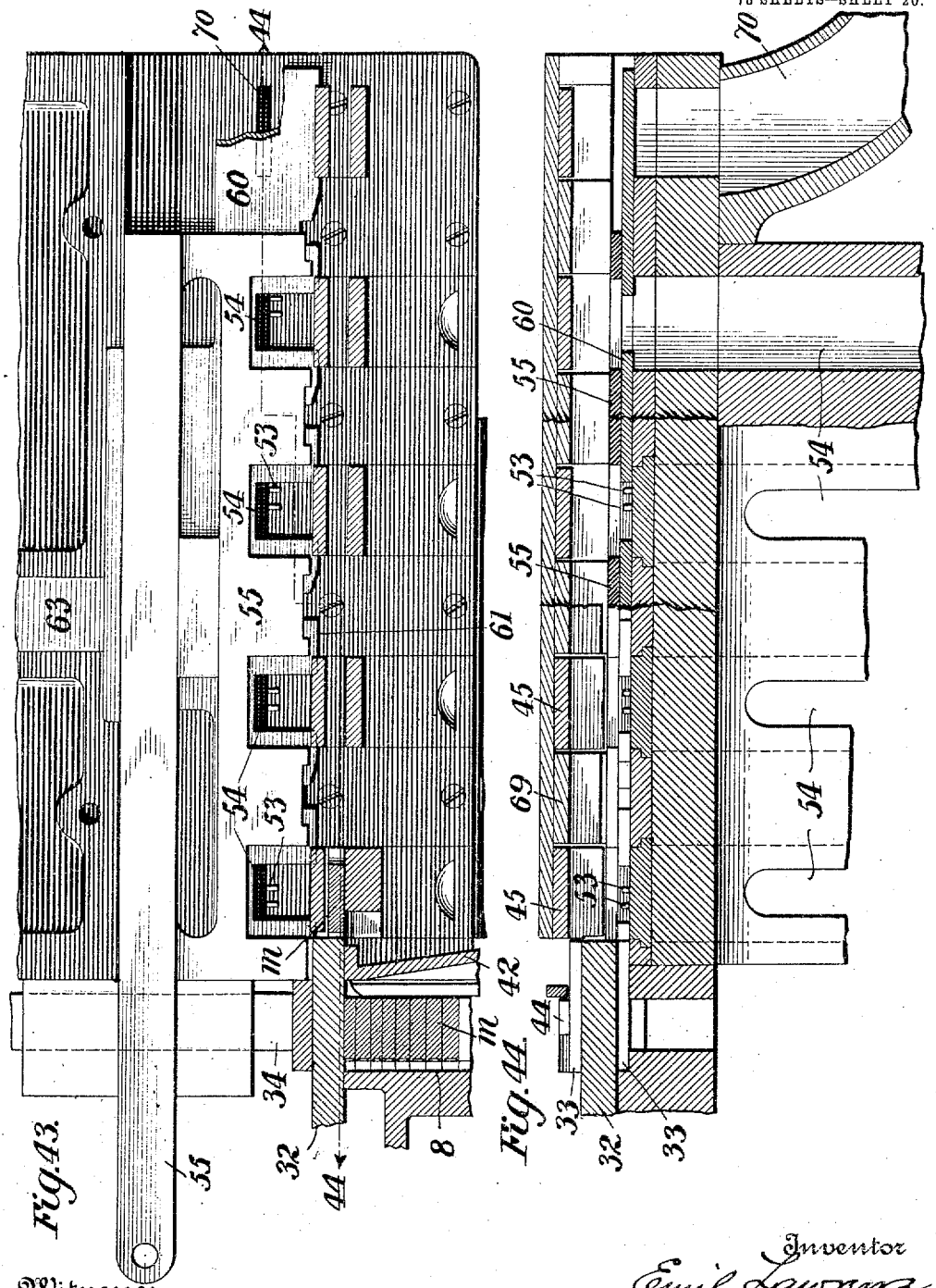

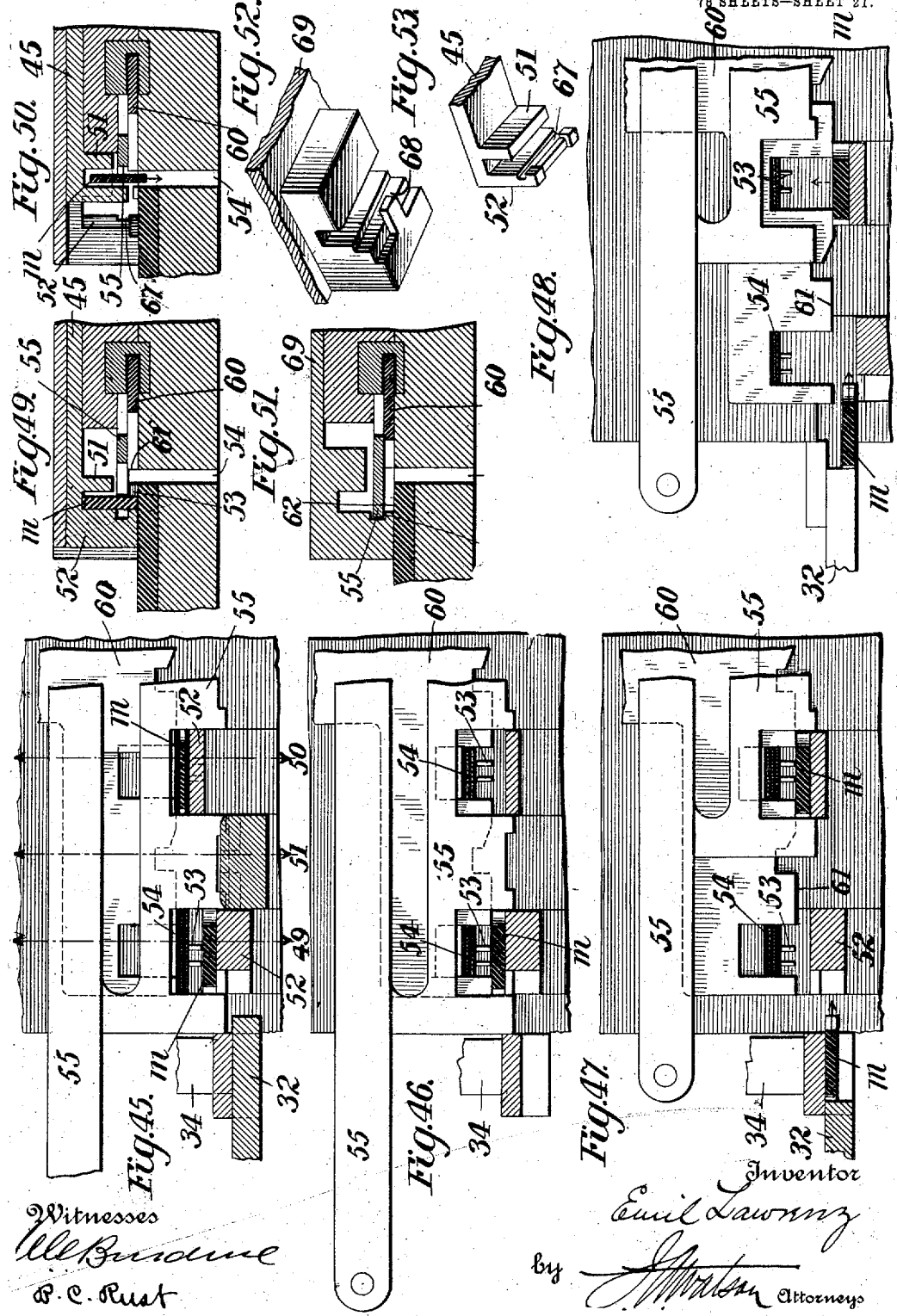

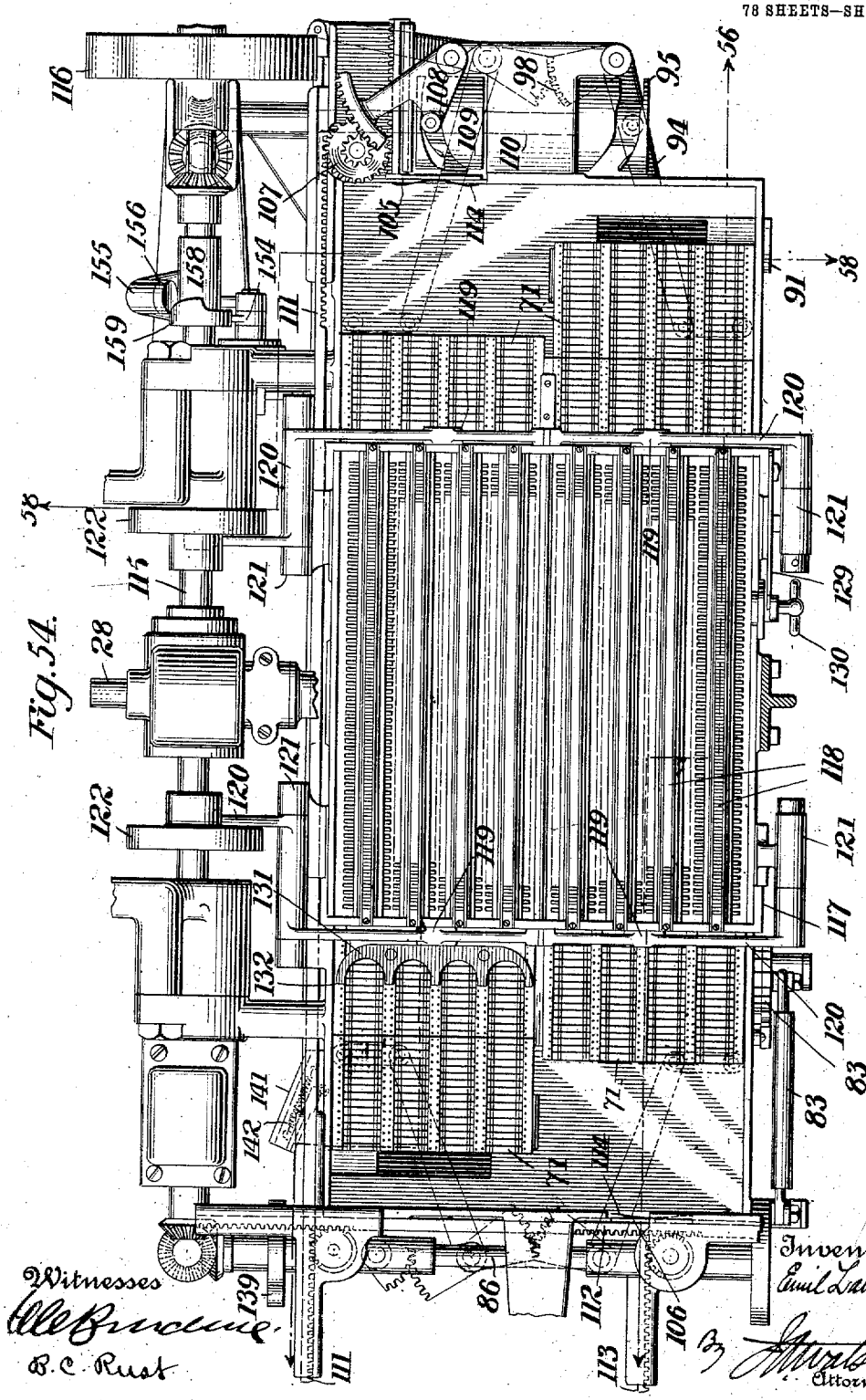

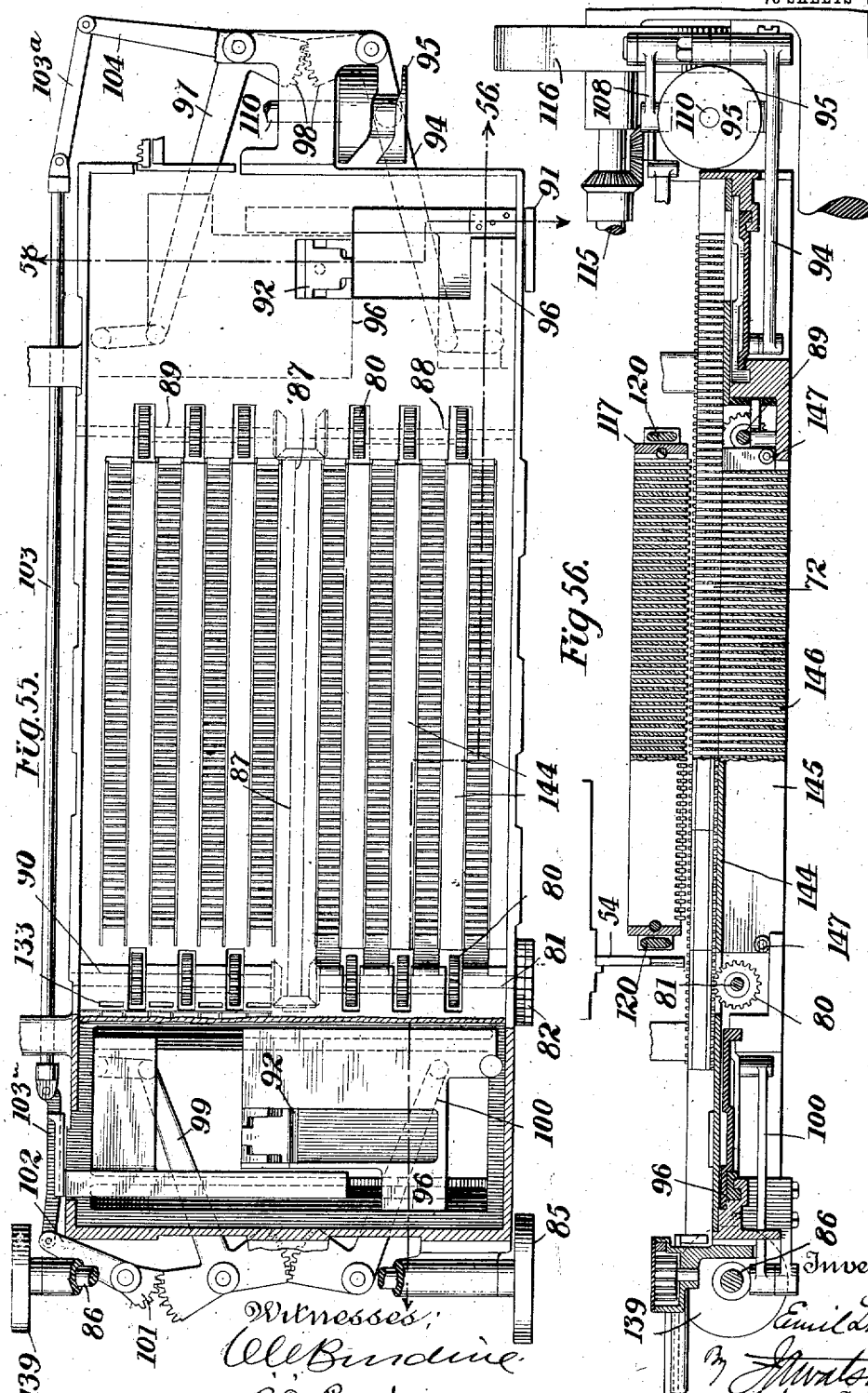

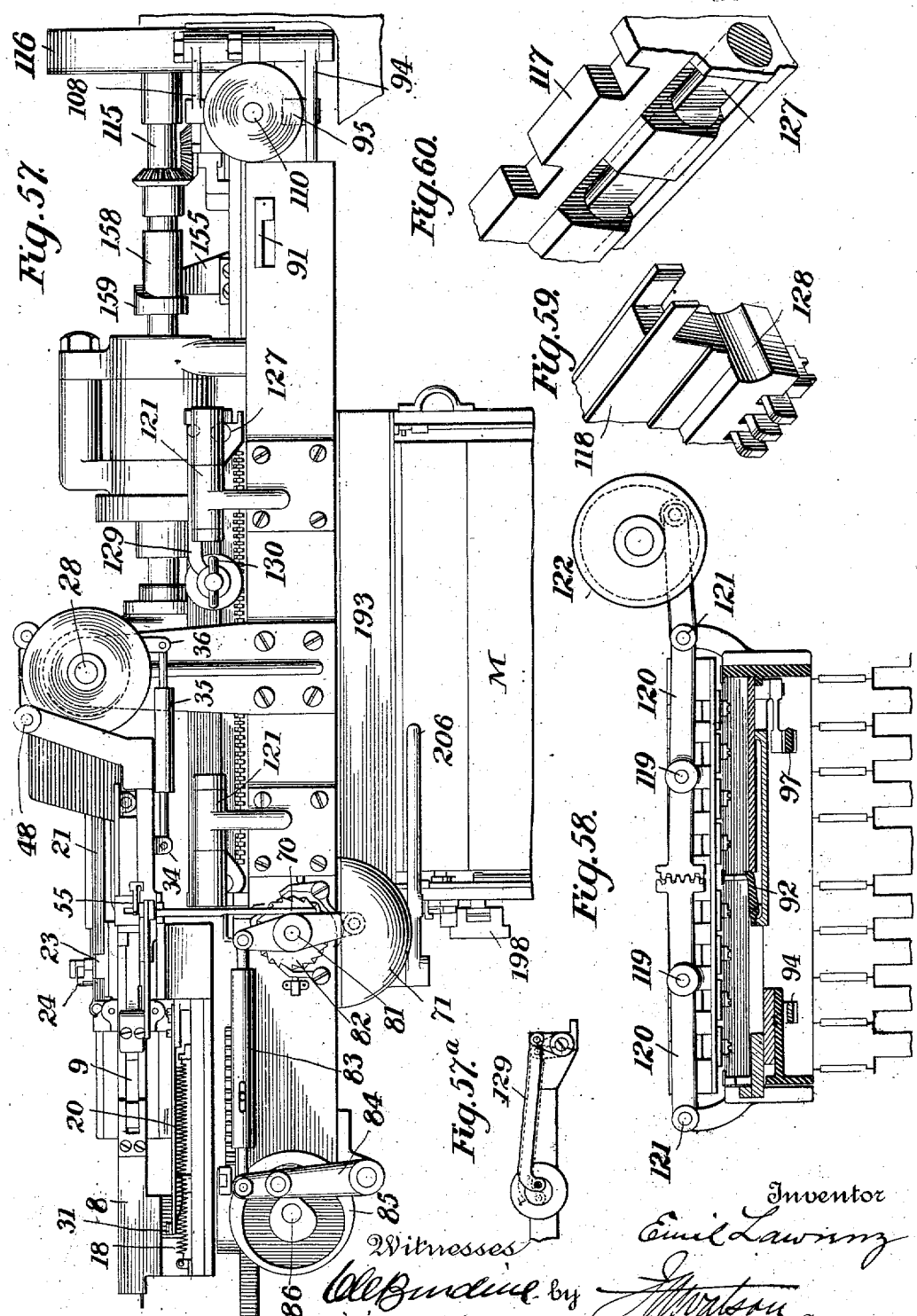

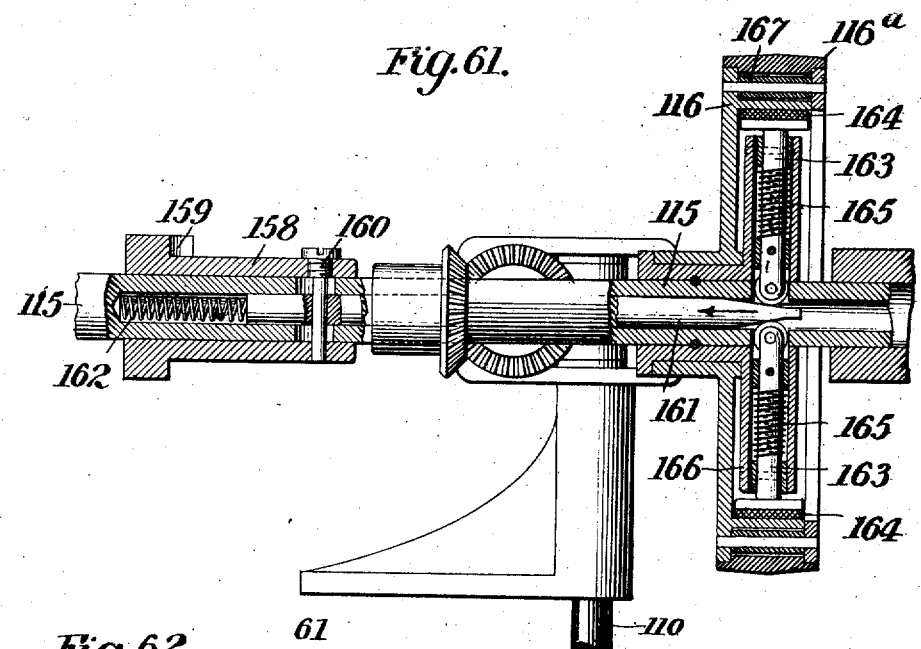
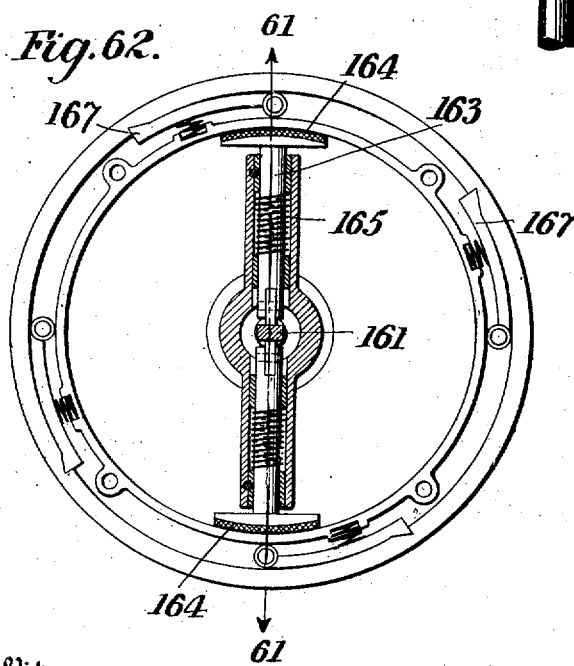
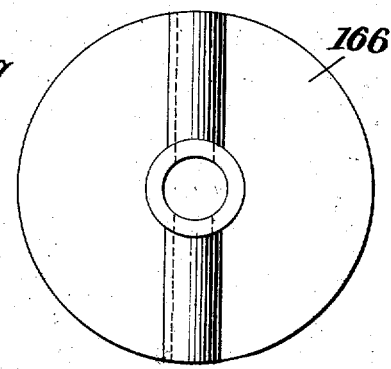

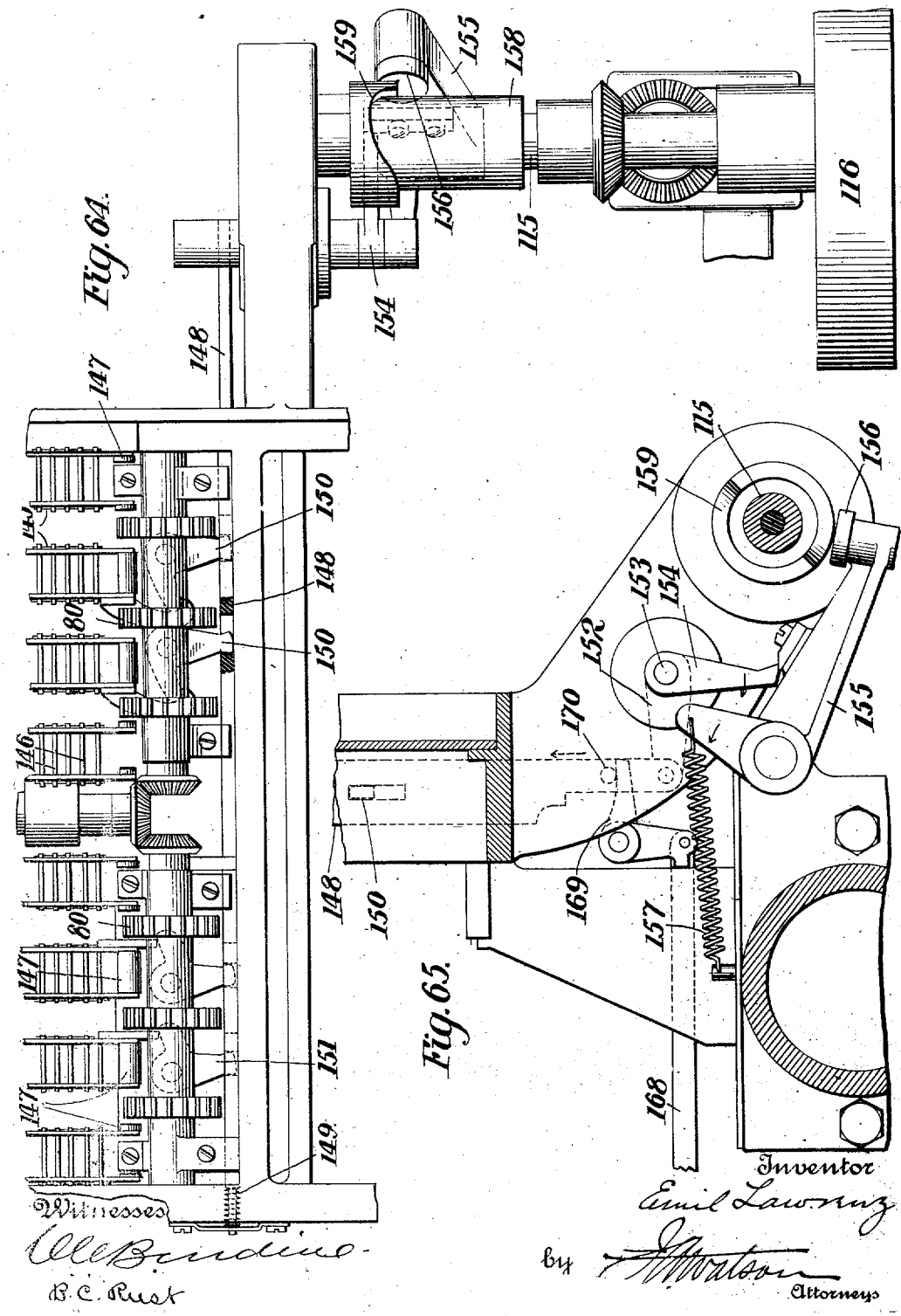

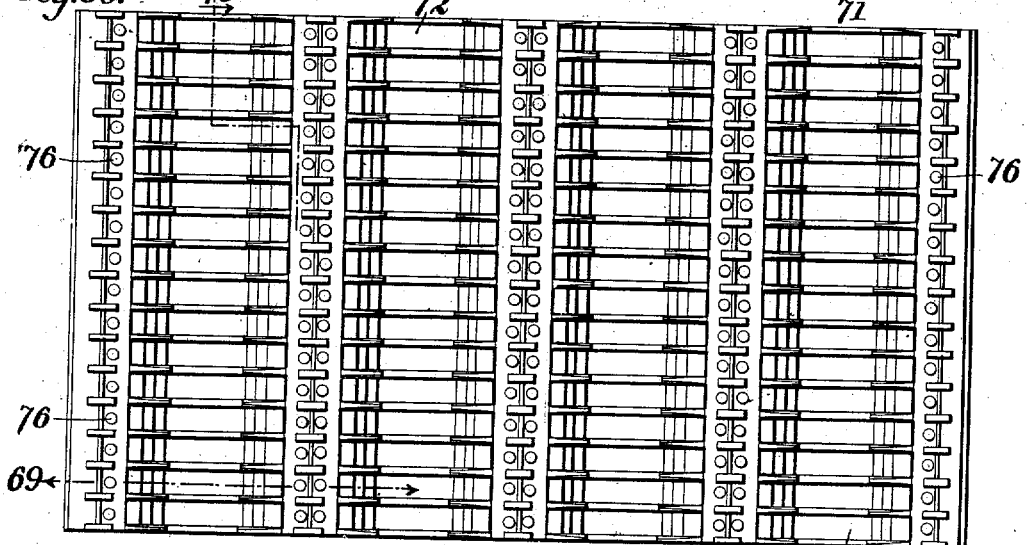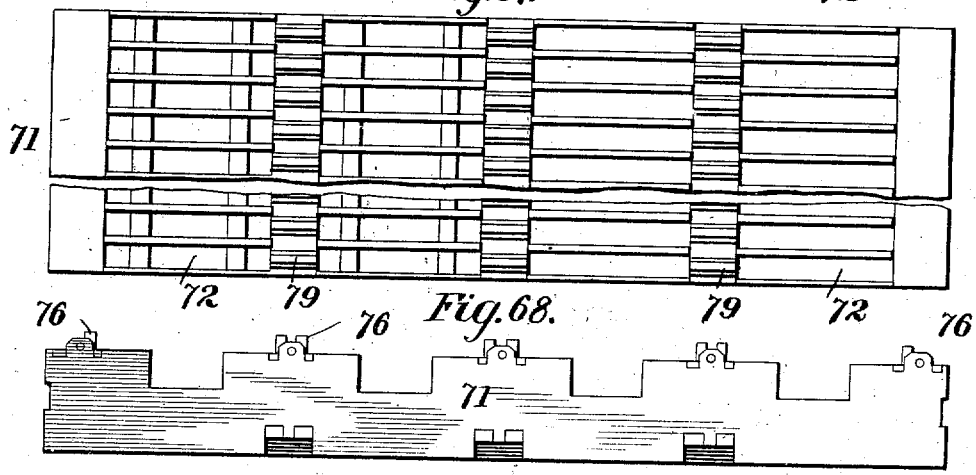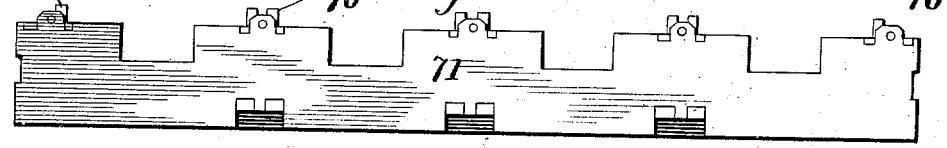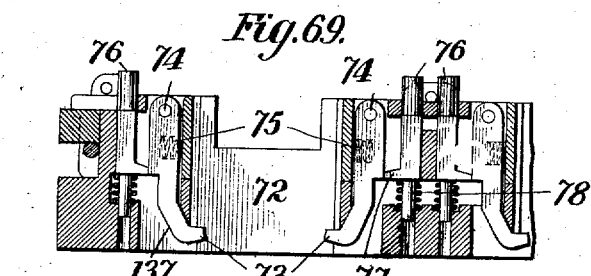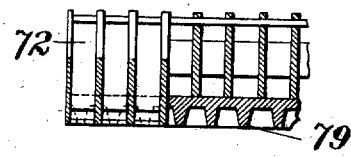

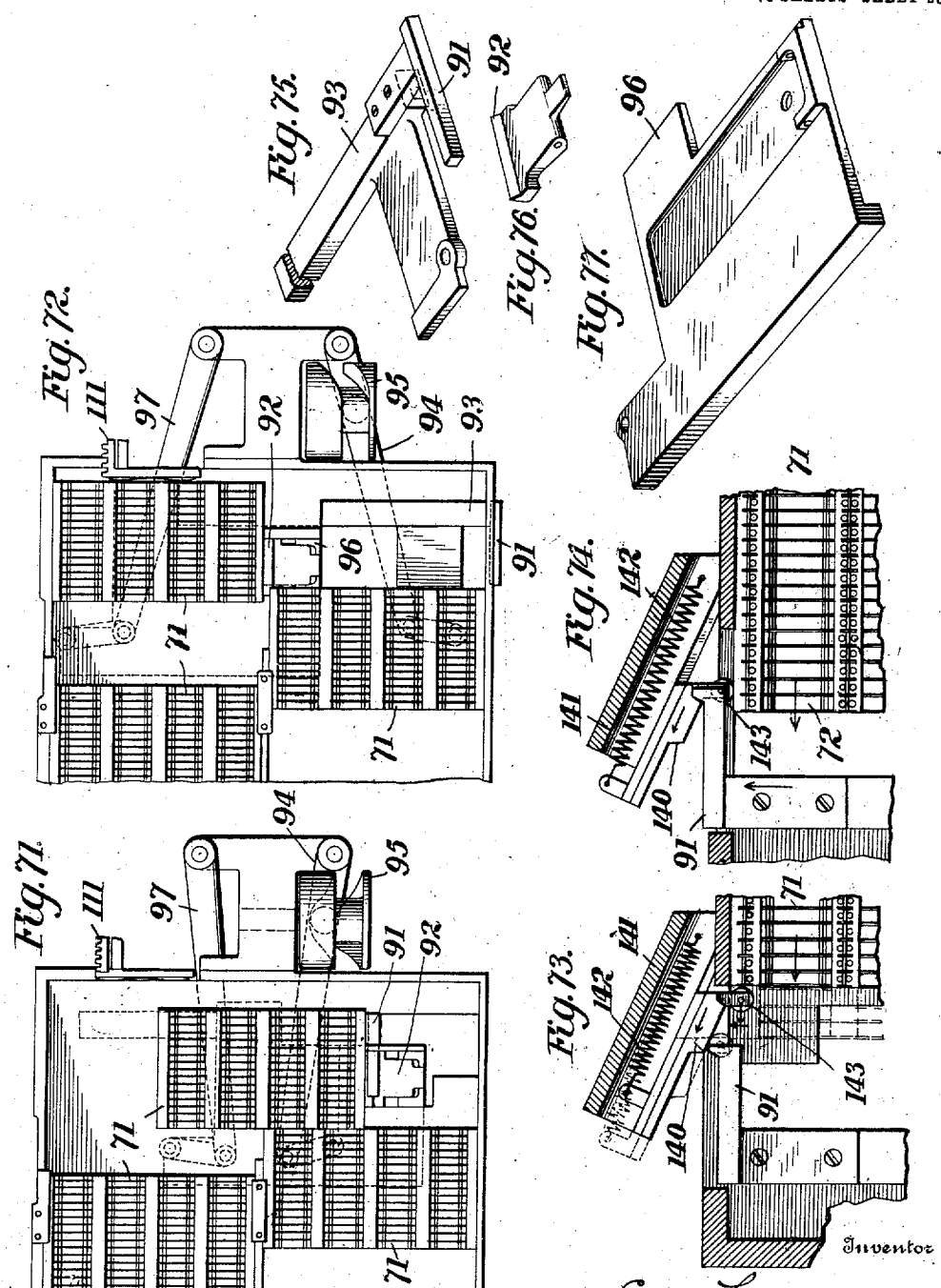

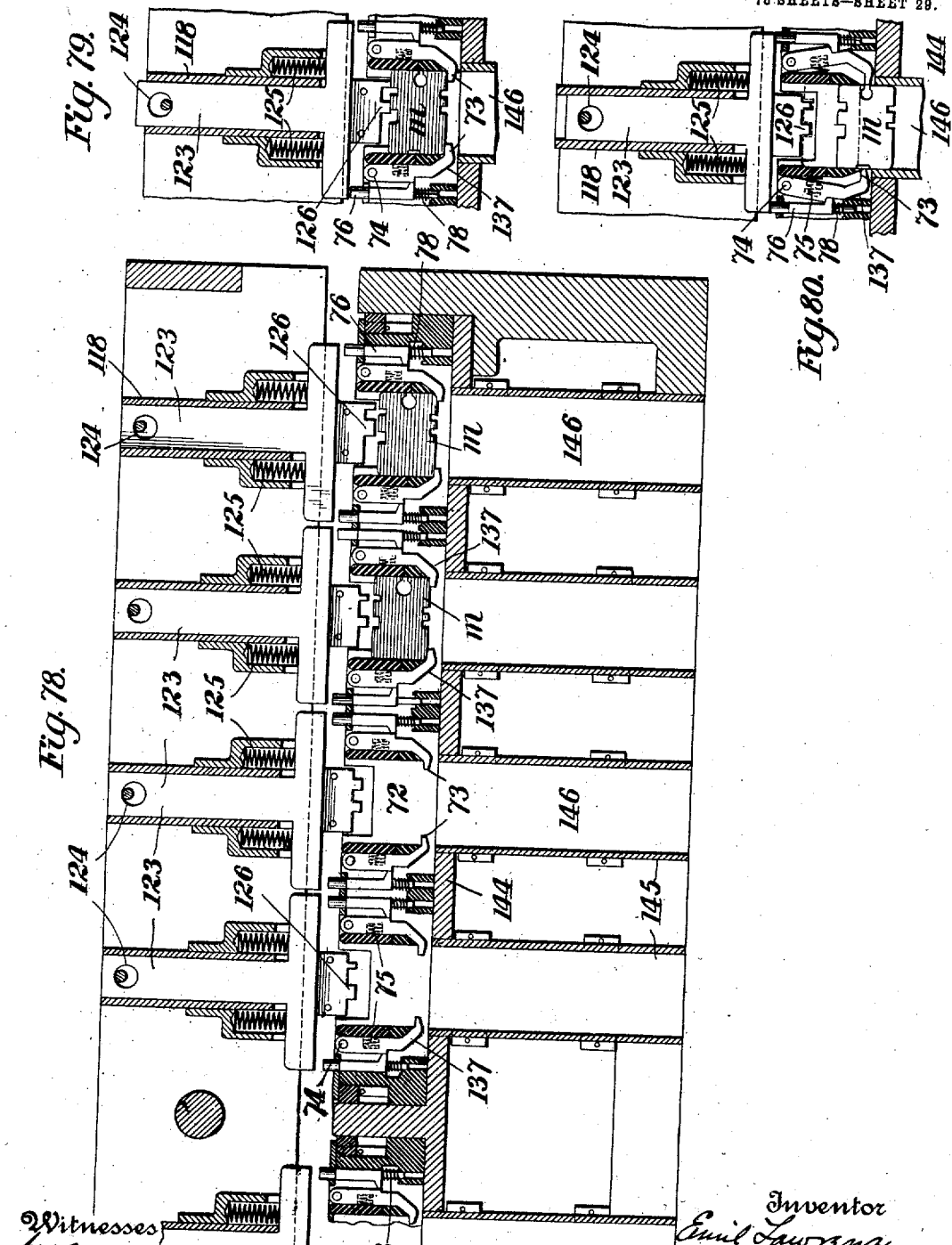

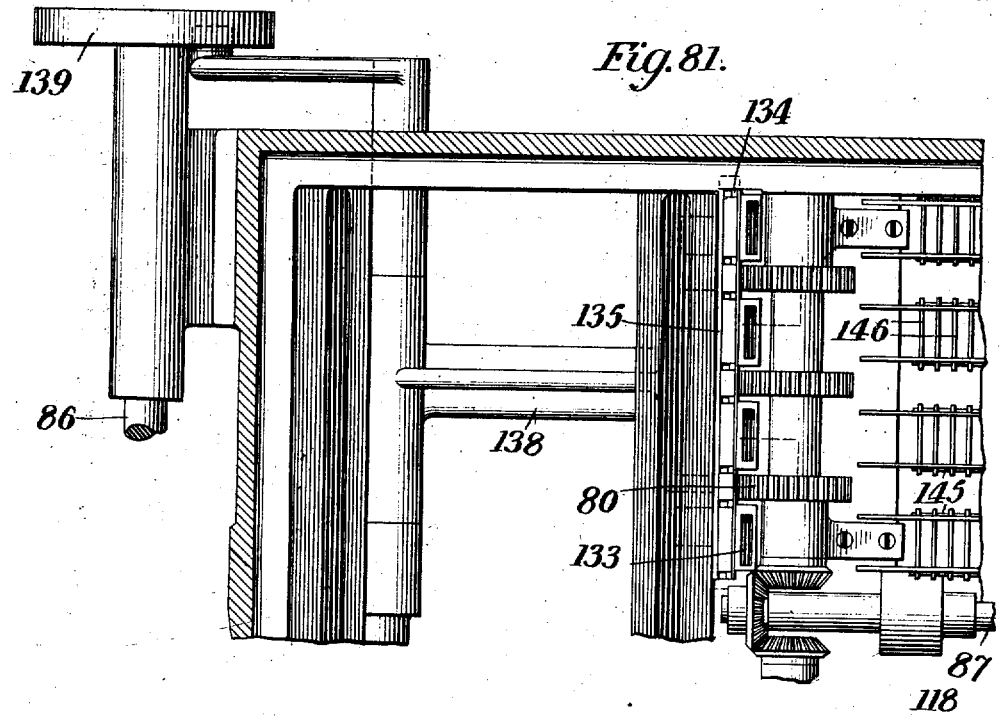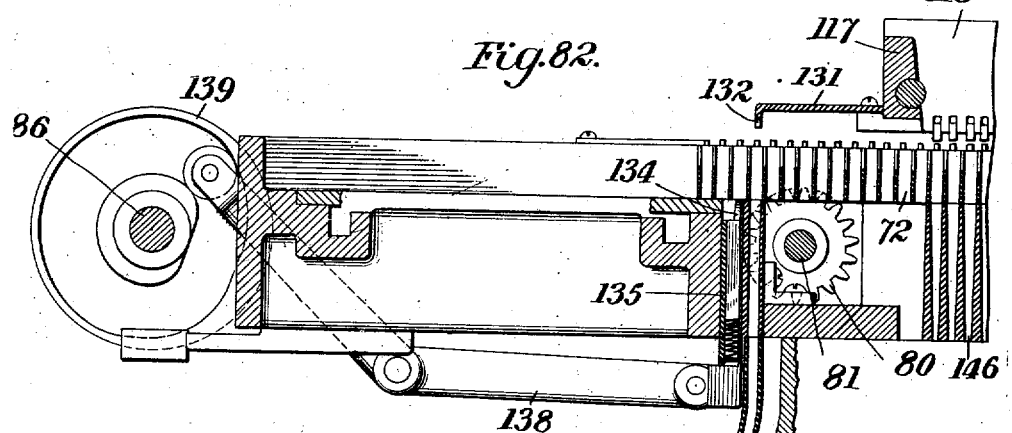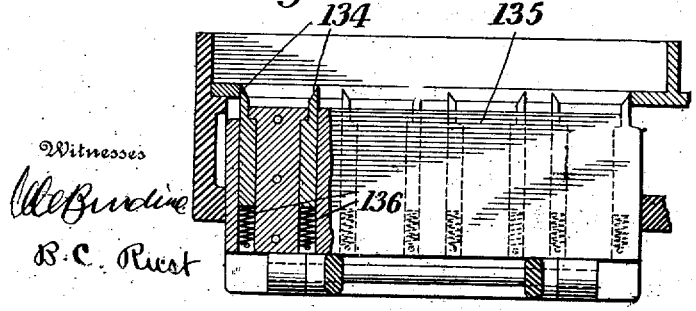

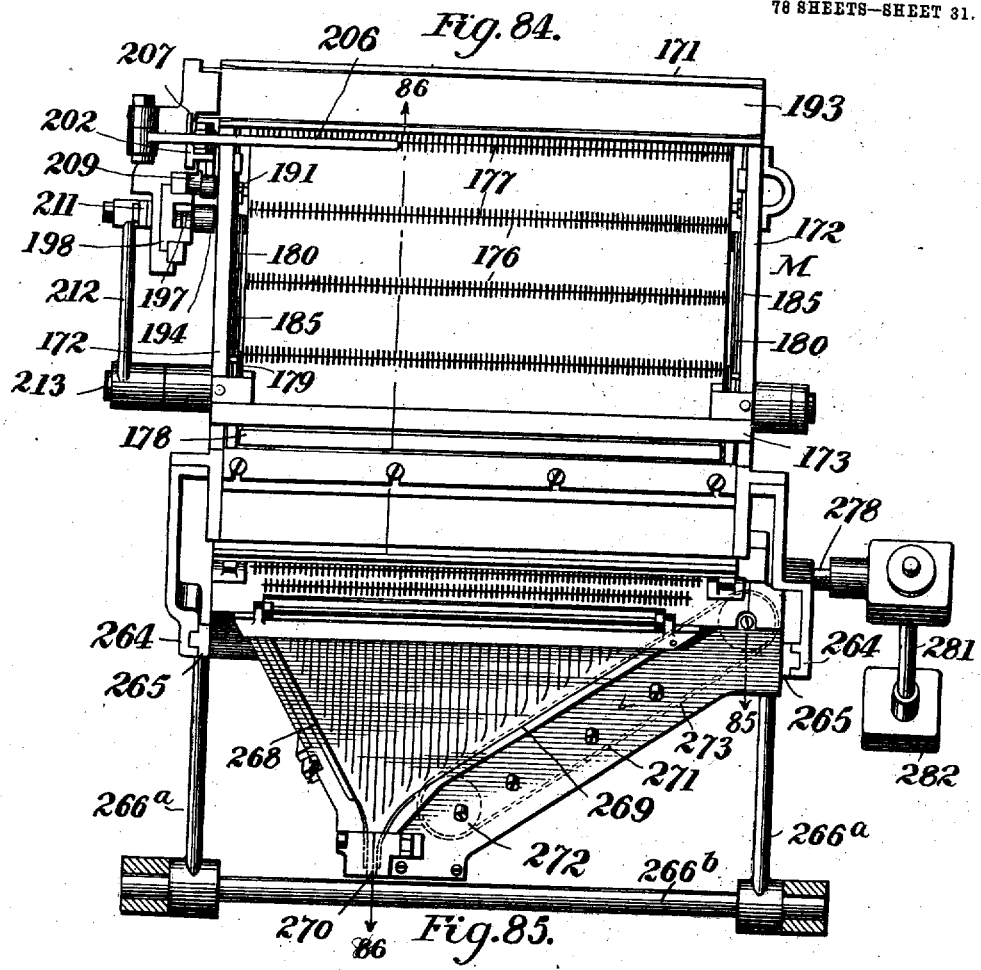
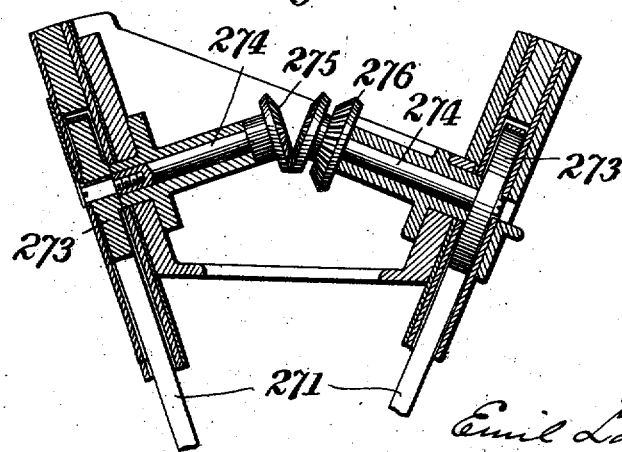

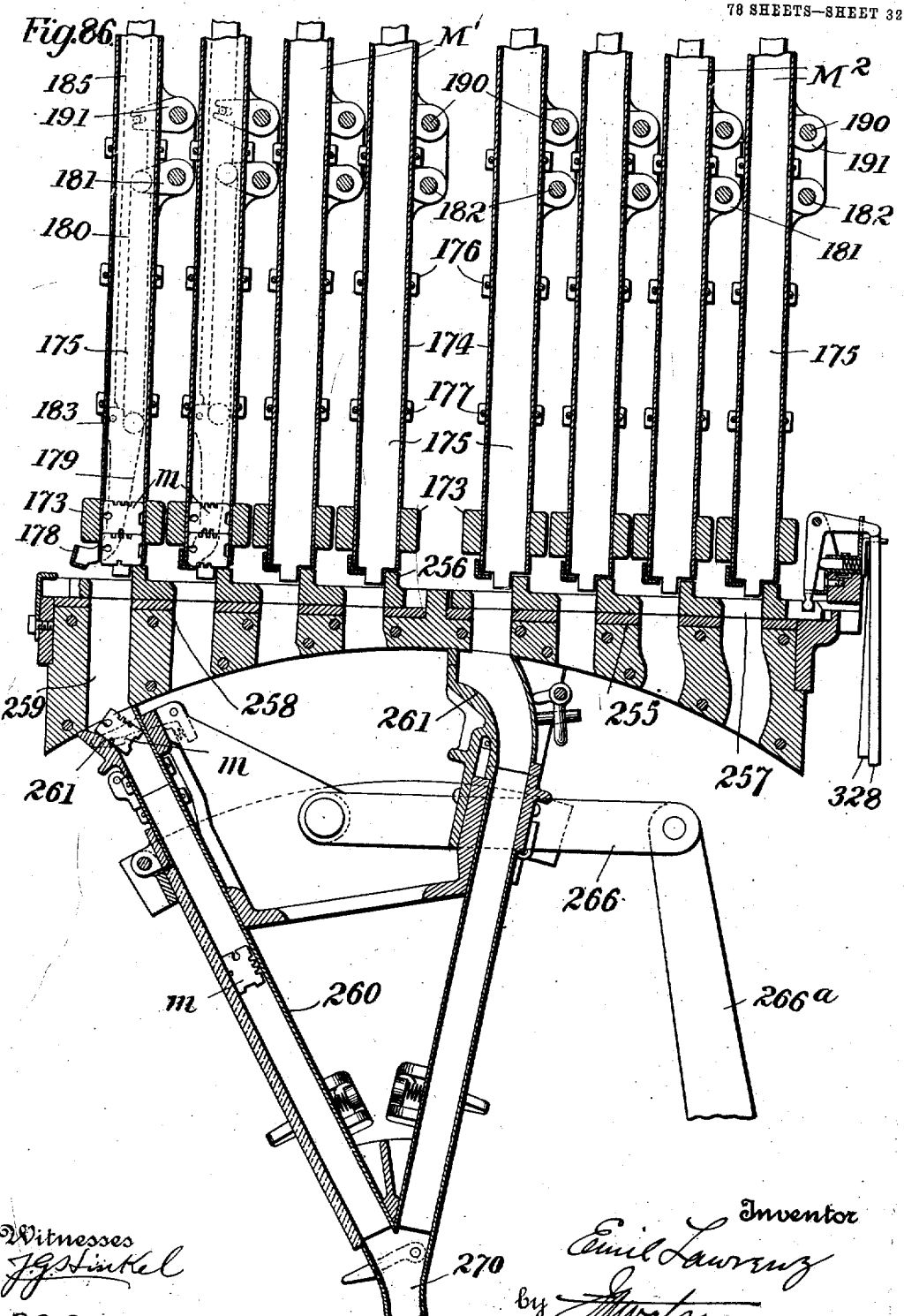

E. LAWRENZ.
TYPOGRAPHIC MACHINE.
APPLICATION FILED MAR. 28, 1906.
1,017,772.
Patented Feb. 20, 1912.
78 SHEETS—SHEET 33.
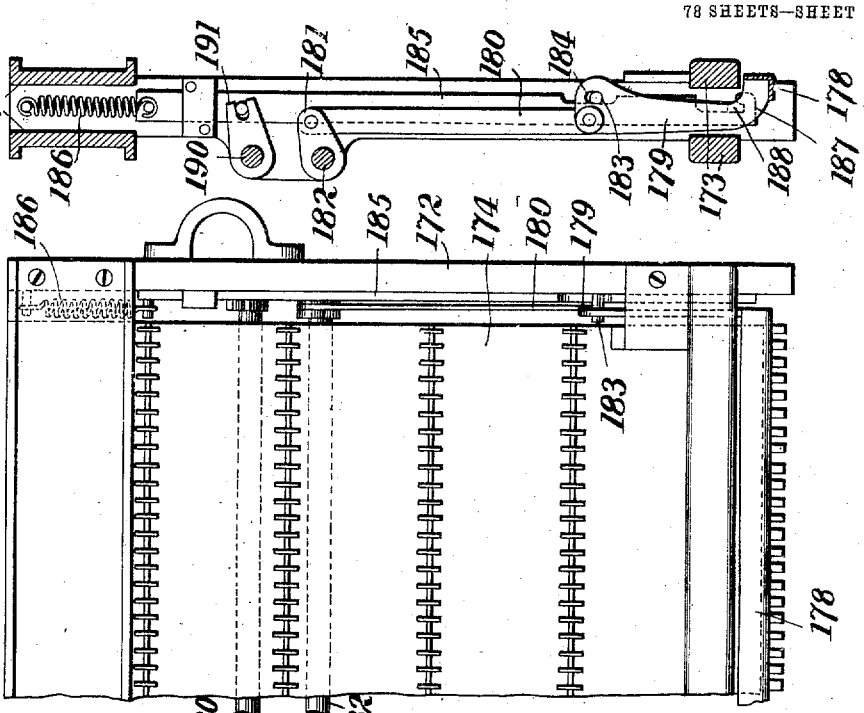
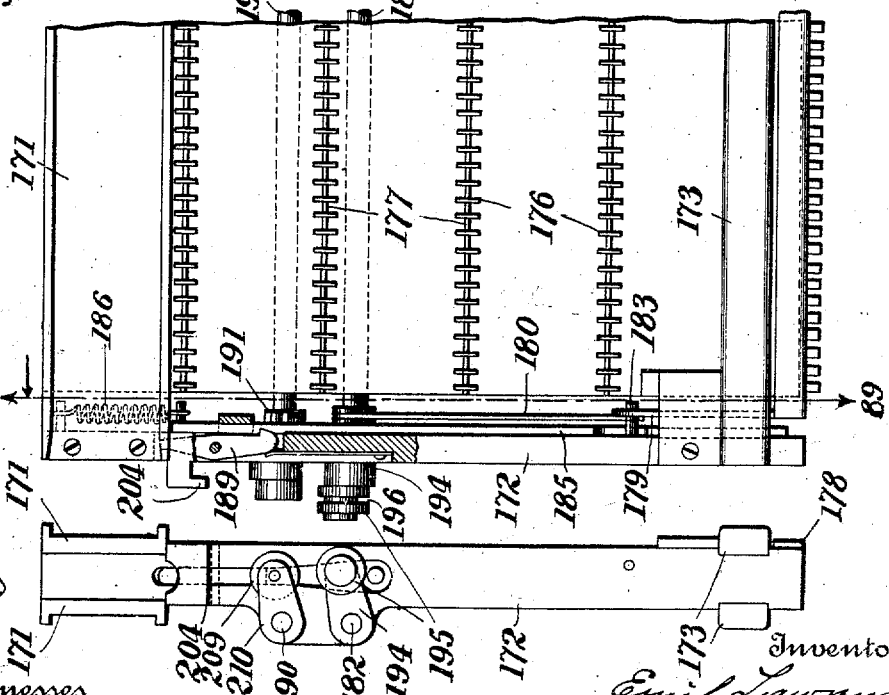

E. LAWRENZ.
TYPOGRAPHIC MACHINE.
APPLICATION FILED MAR. 28, 1906.
1,017,772.
Patented Feb. 20, 1912.
78 SHEETS—SHEET 34.
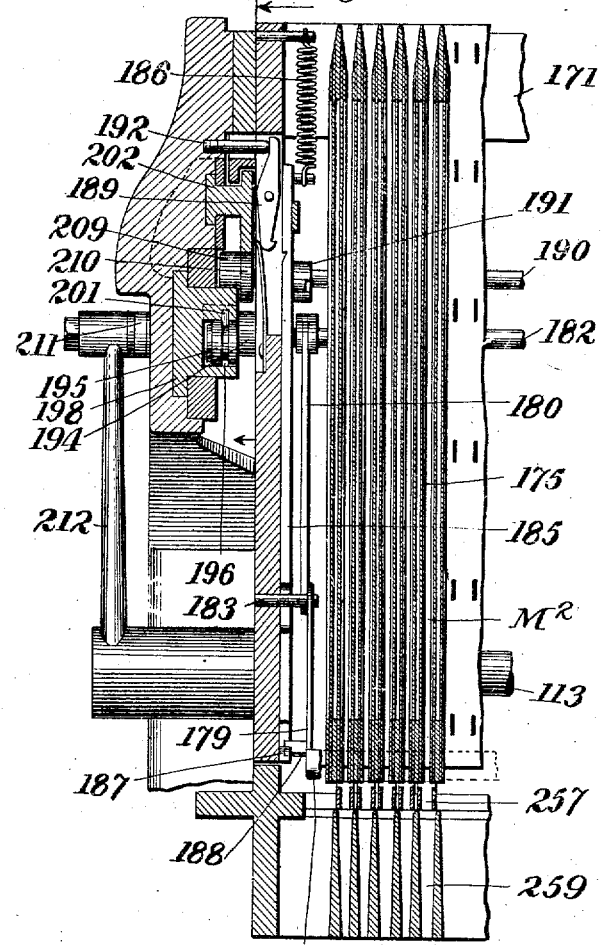
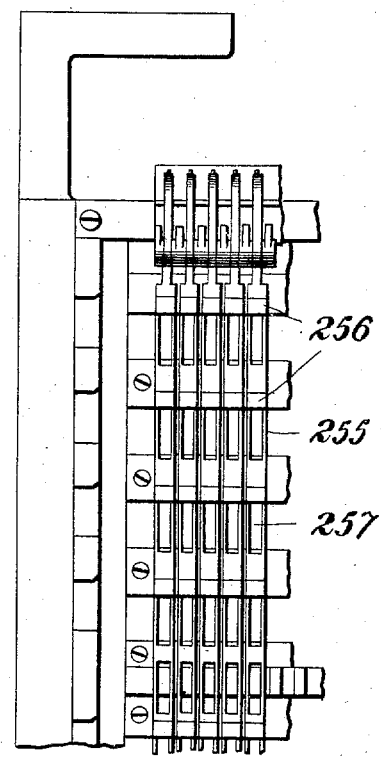
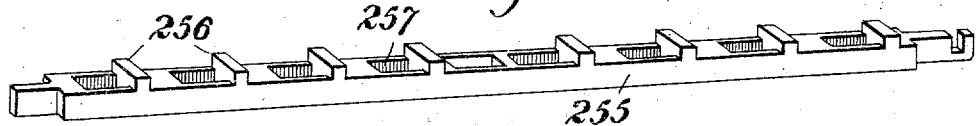

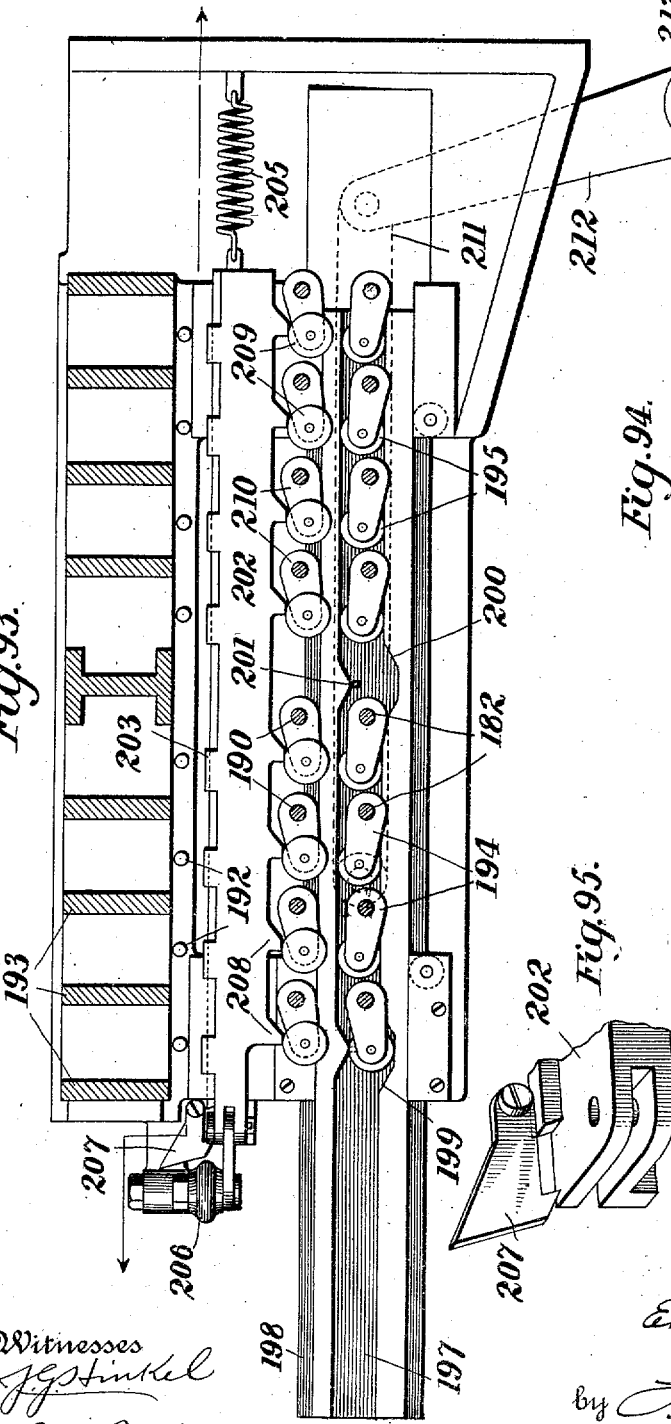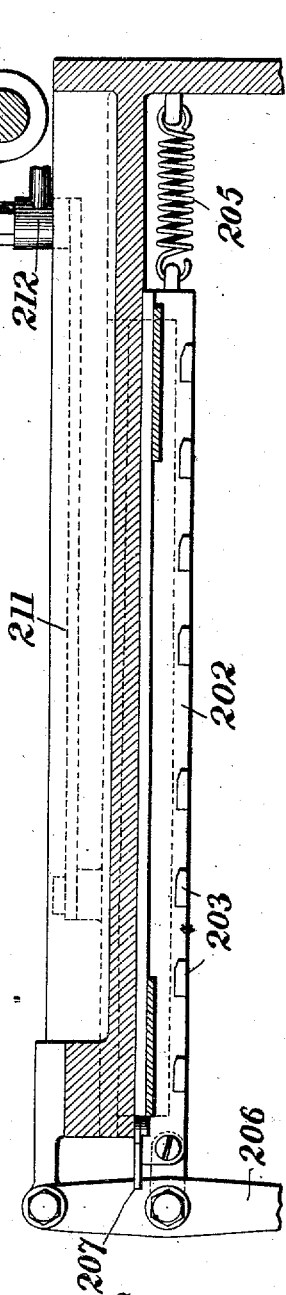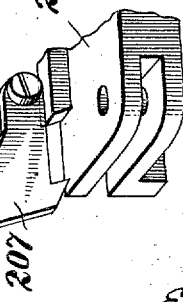

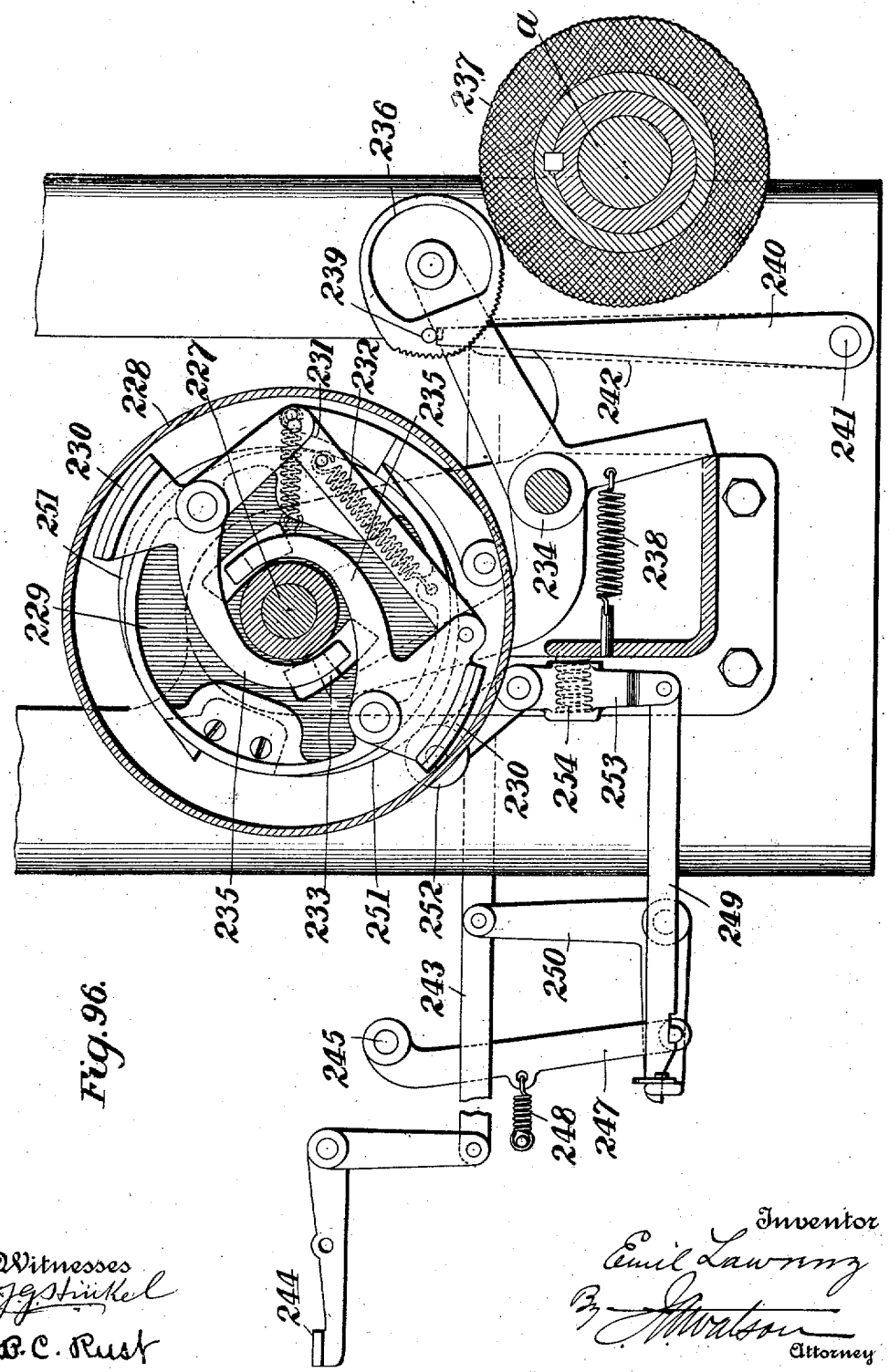

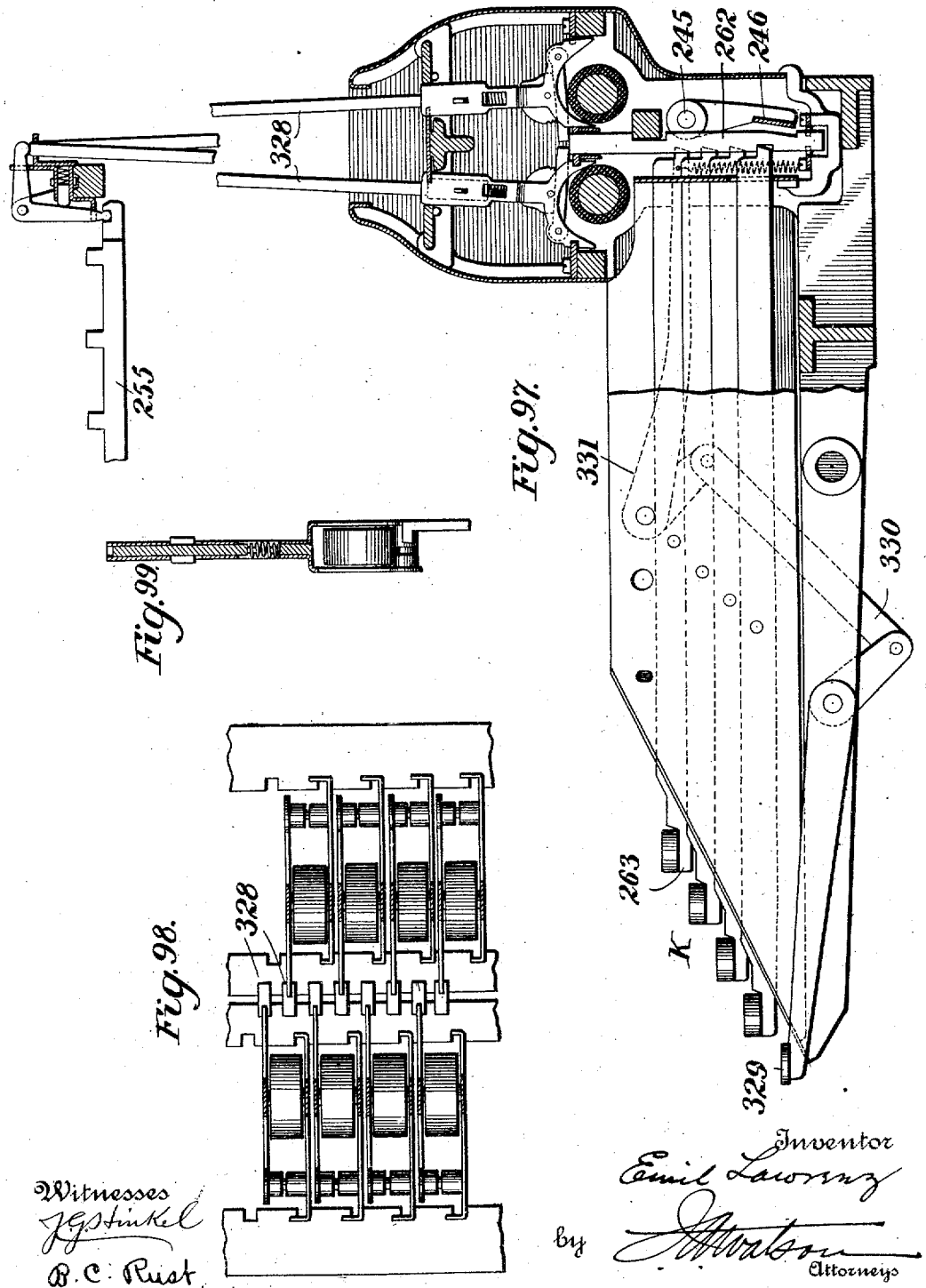

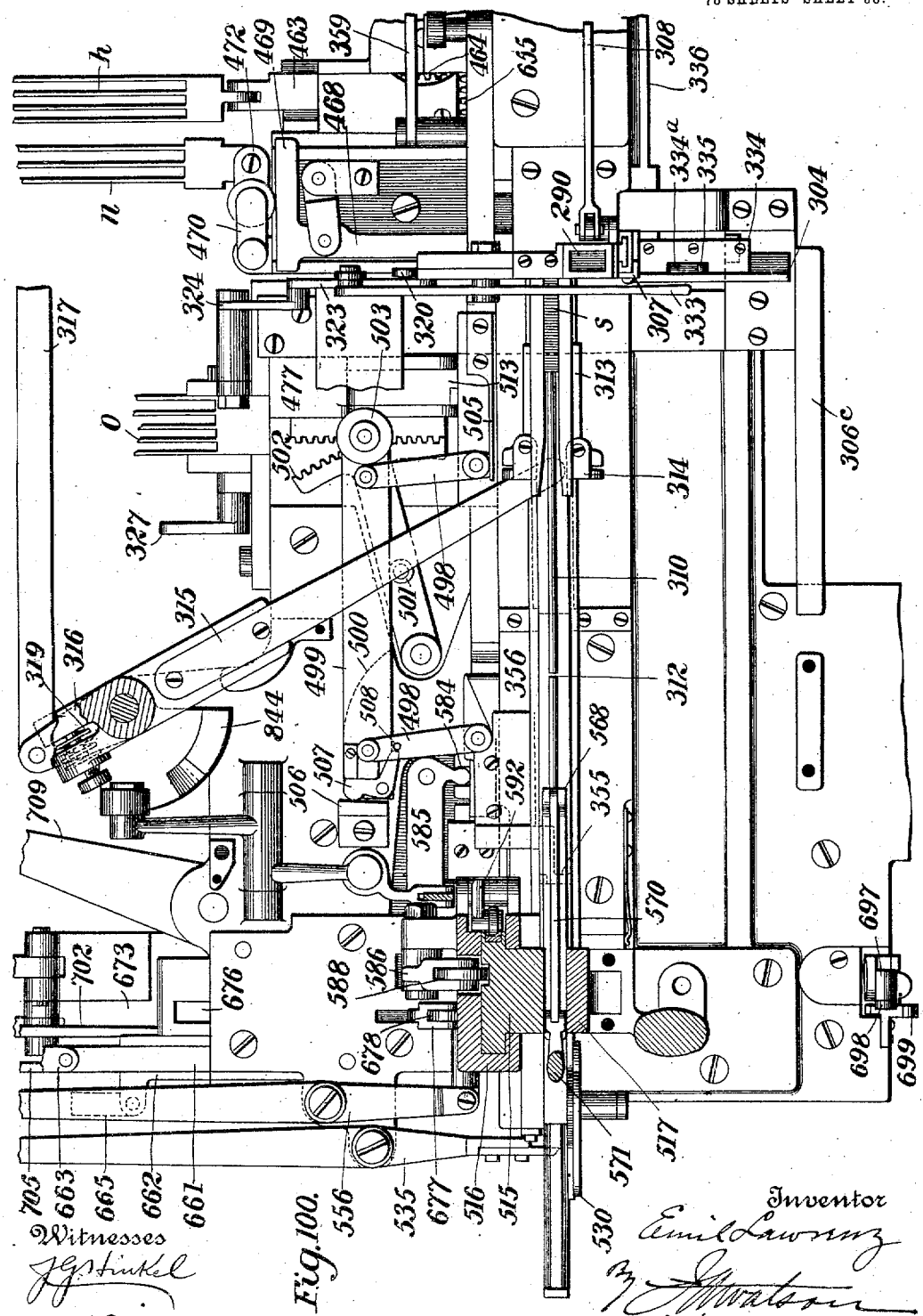

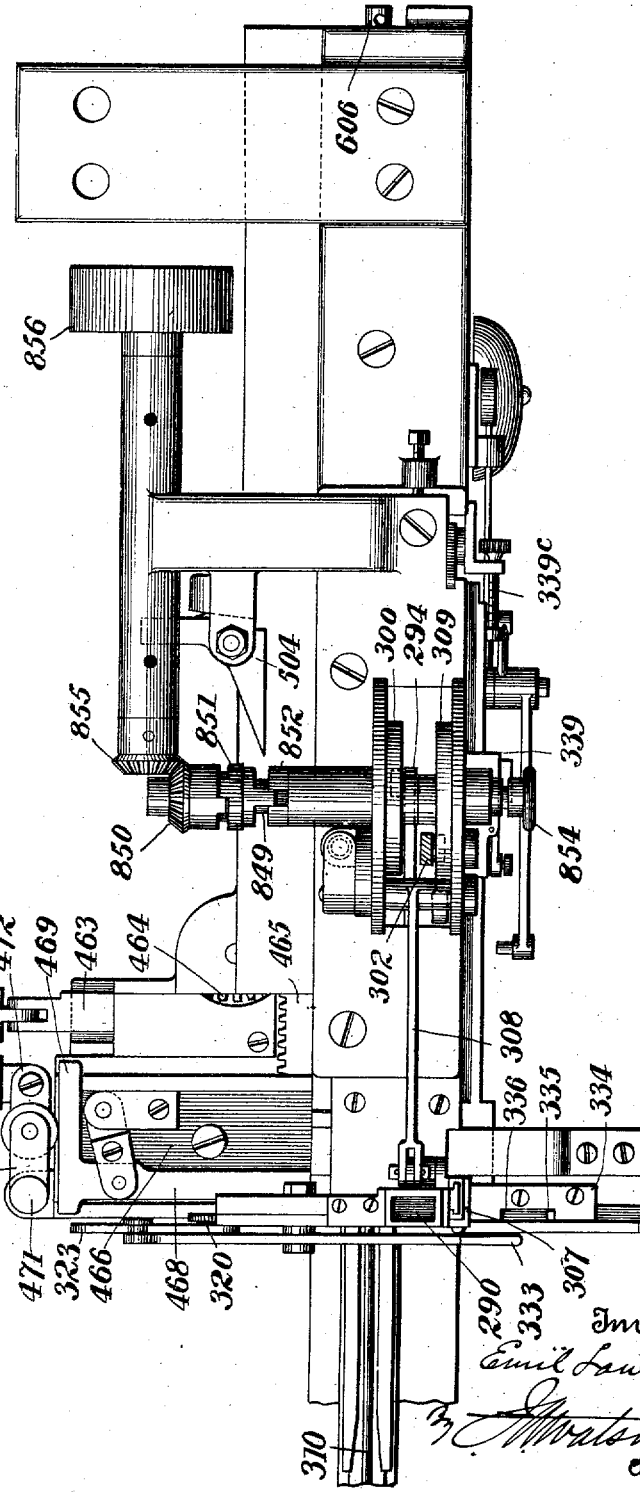

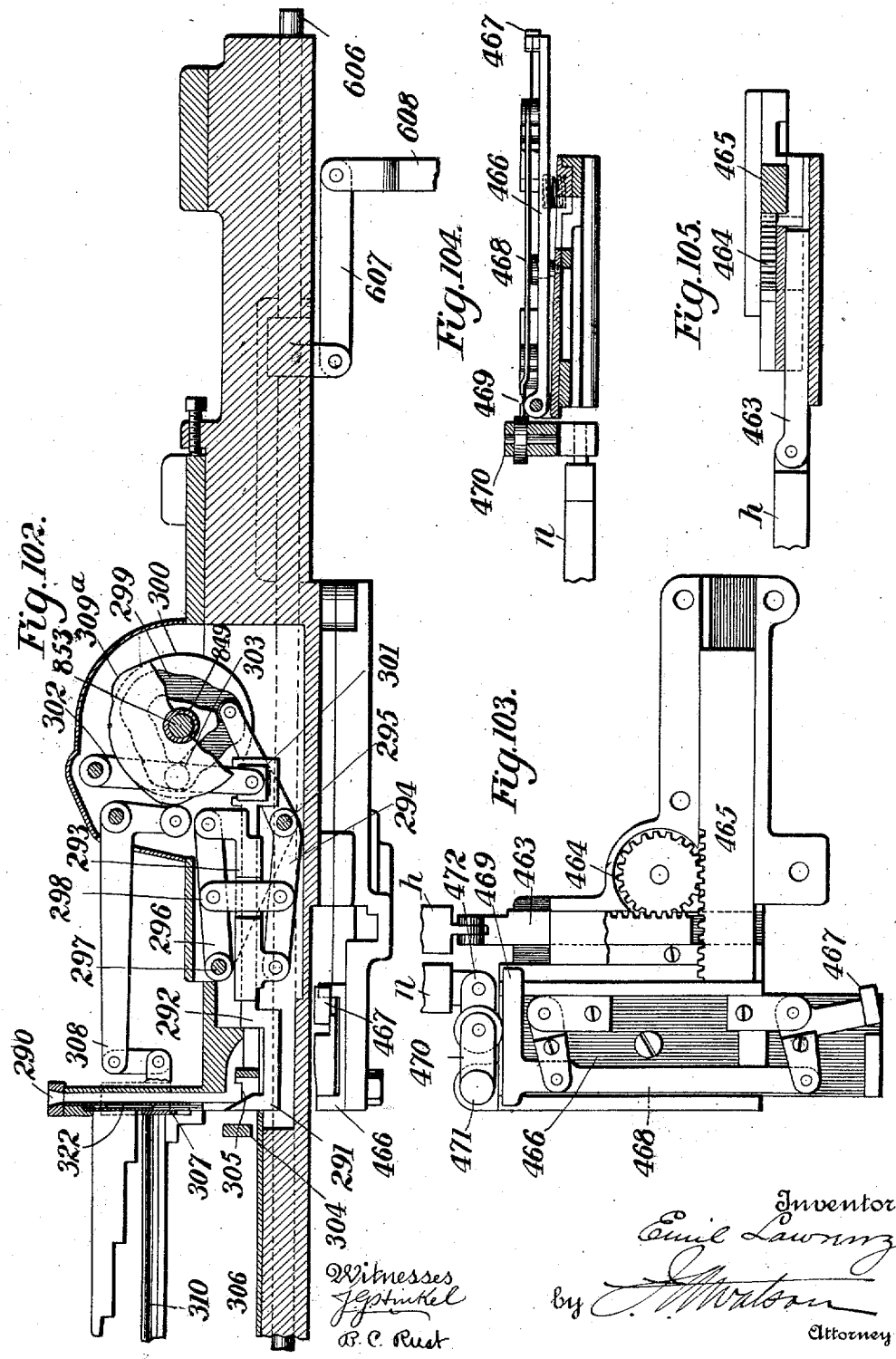

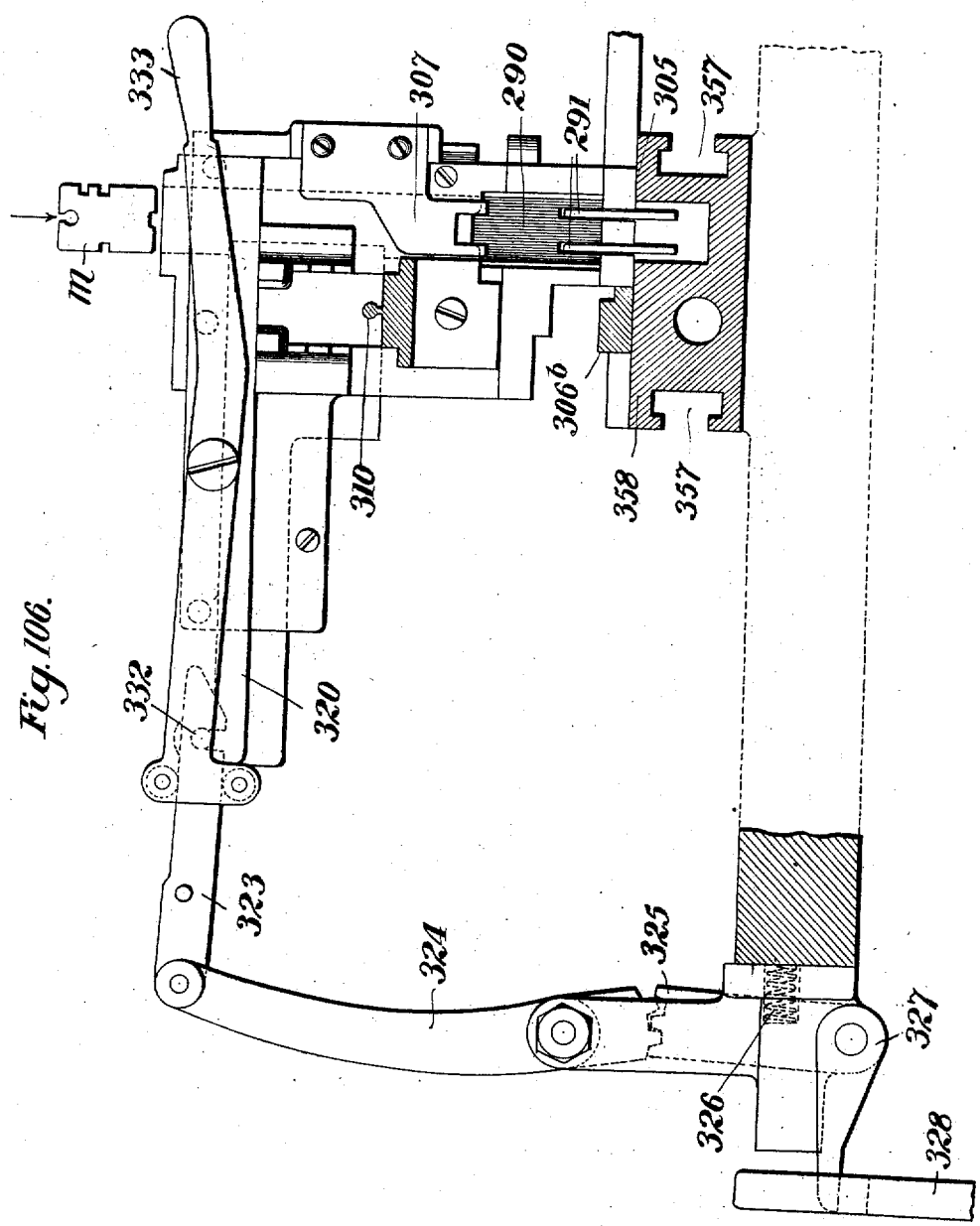

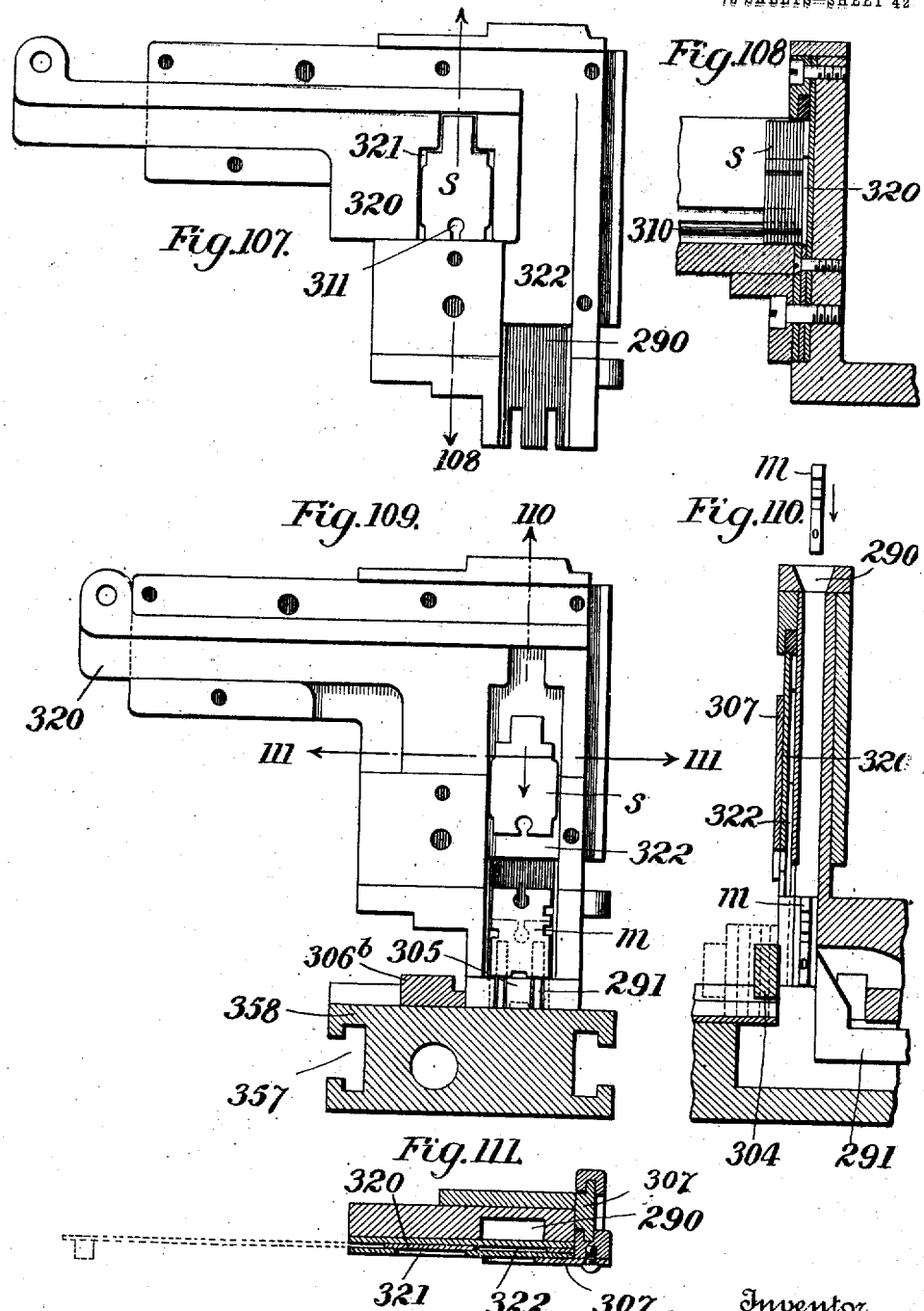

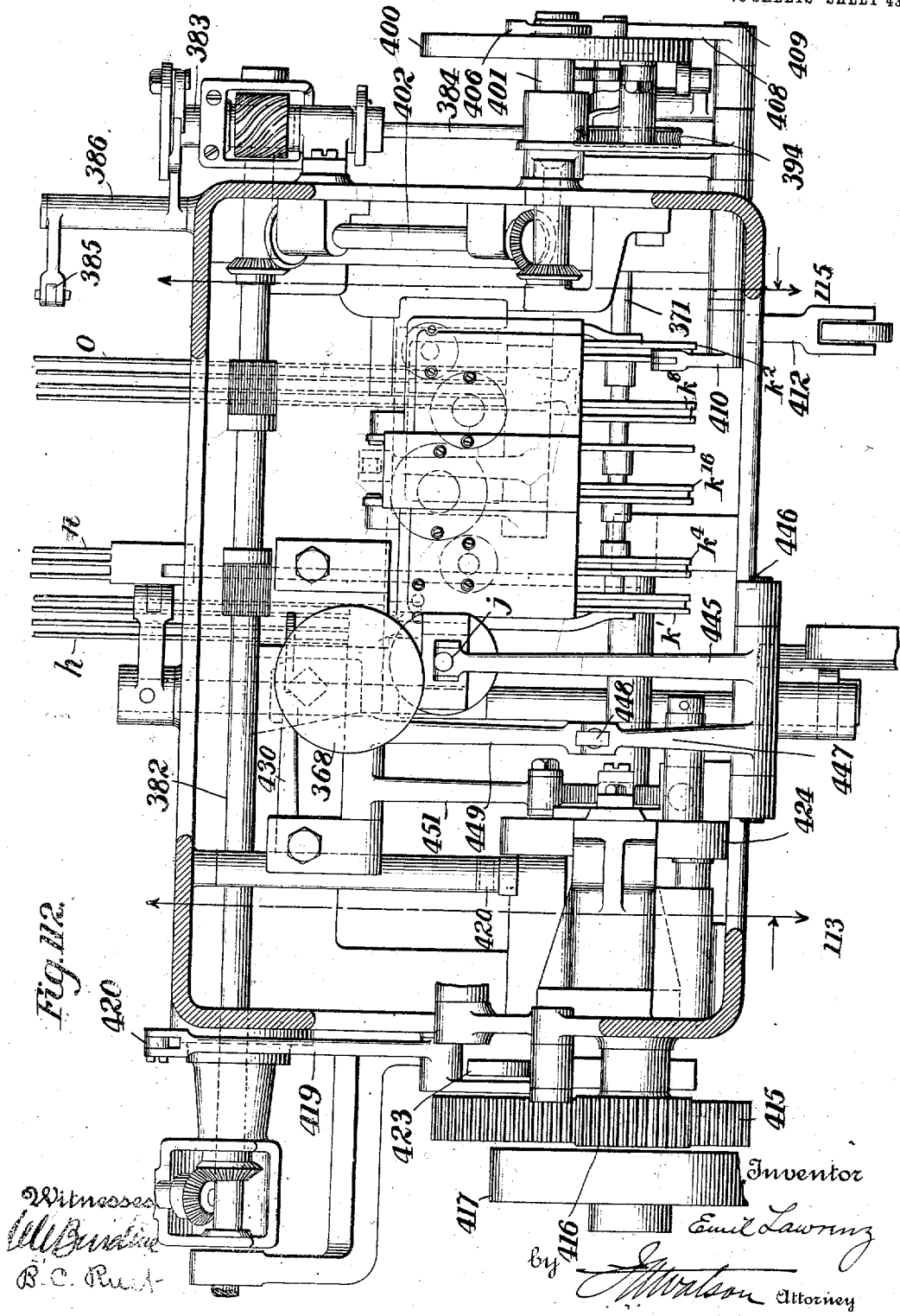

E. LAWRENZ.
TYPOGRAPHIC MACHINE.
APPLICATION FILED MAR. 28, 1906.

1,017,772.

Patented Feb. 20, 1912.
76 SHEETS—SHEET 44.

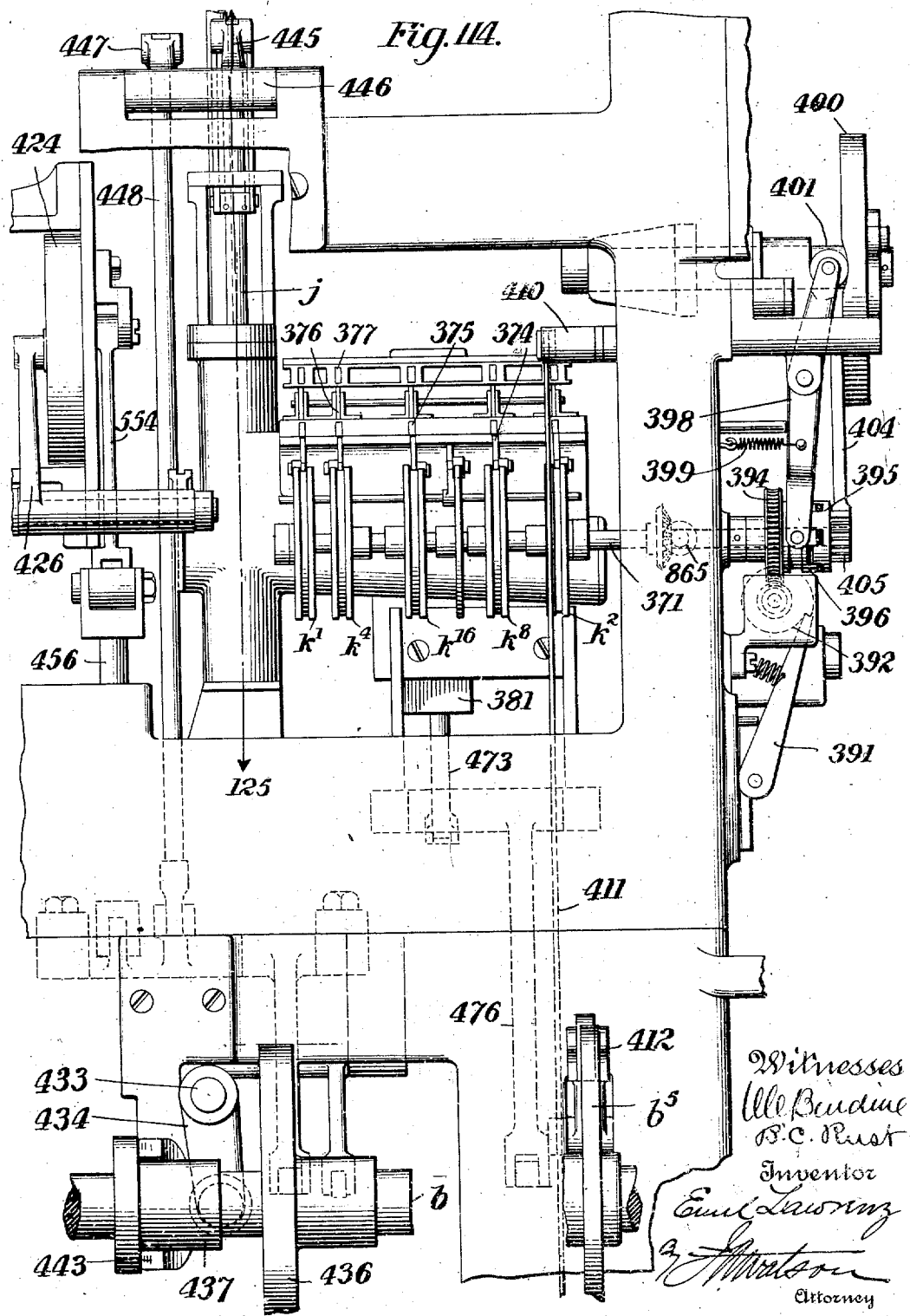

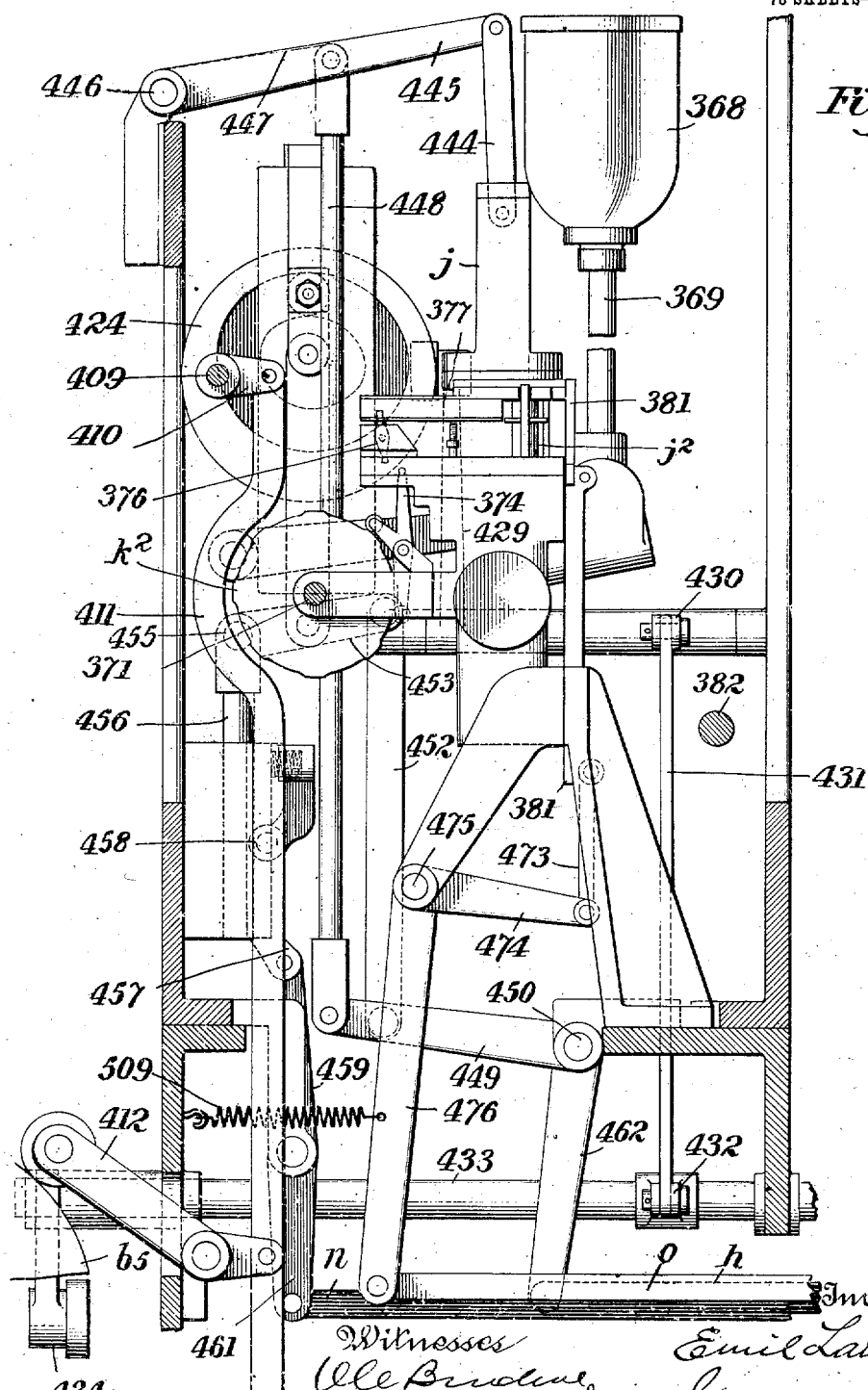

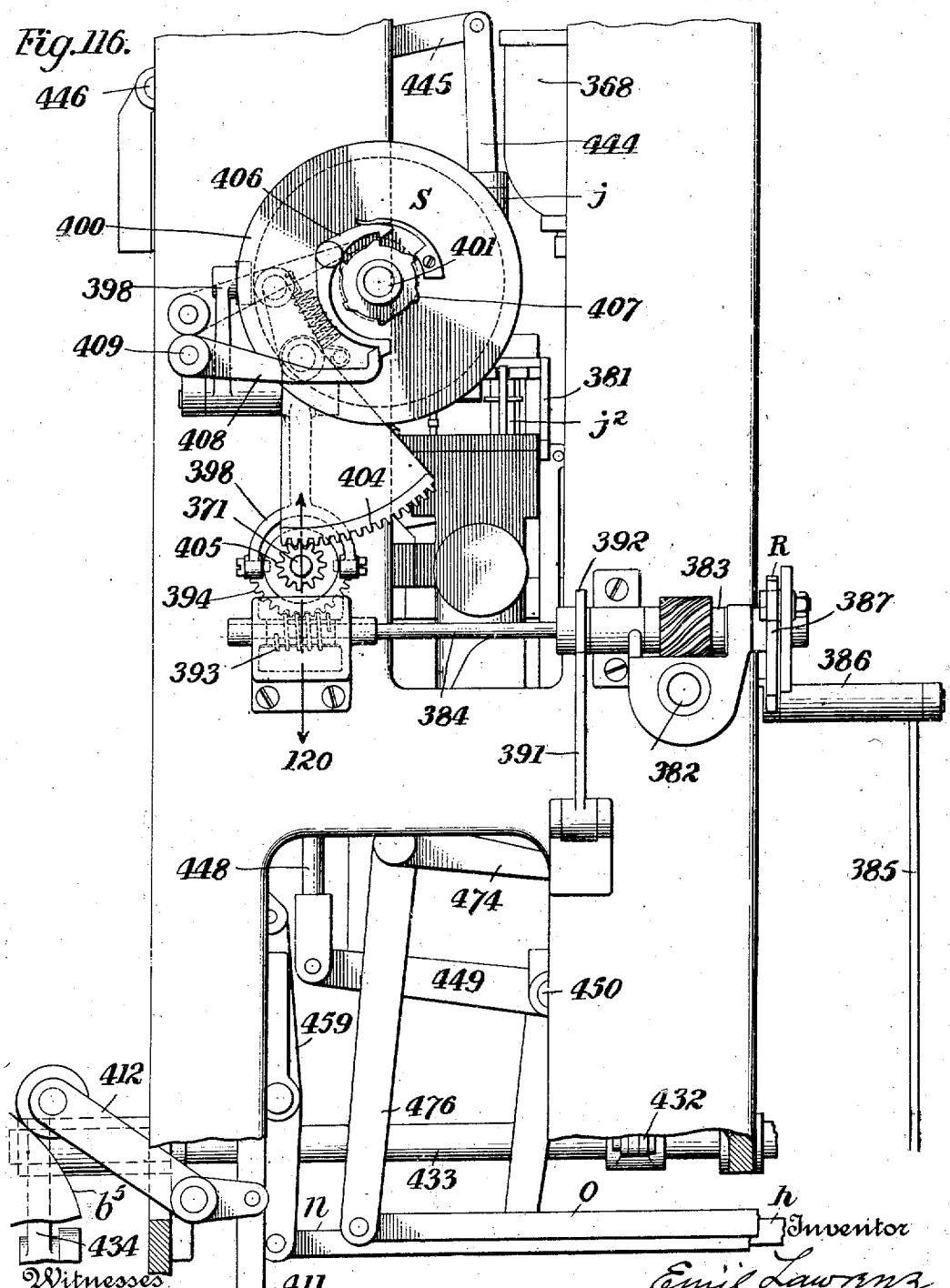

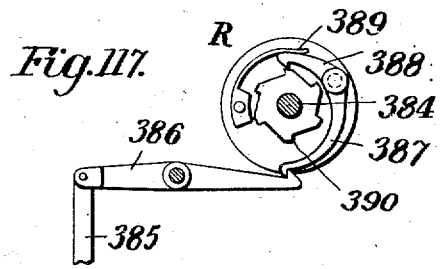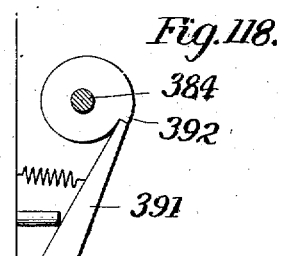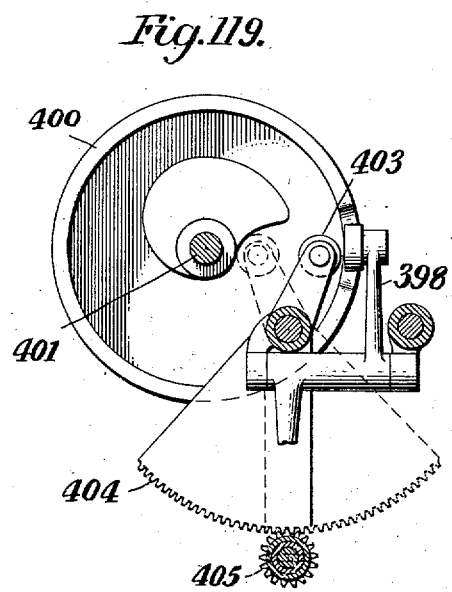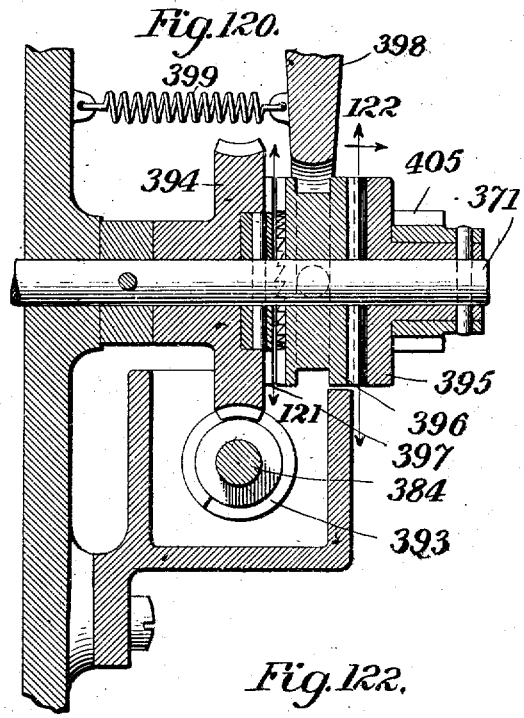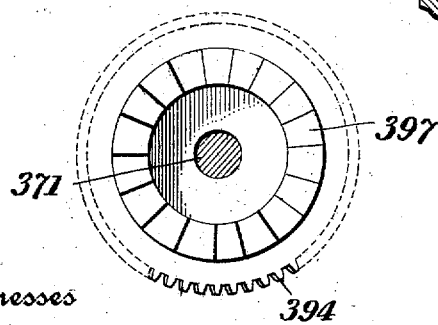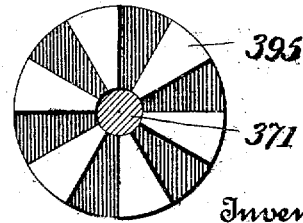

E. LAWRENZ.
TYPOGRAPHIC MACHINE.
APPLICATION FILED MAR. 28, 1906.
1,017,772.
Patented Feb. 20, 1912.
78 SHEETS—SHEET 49.
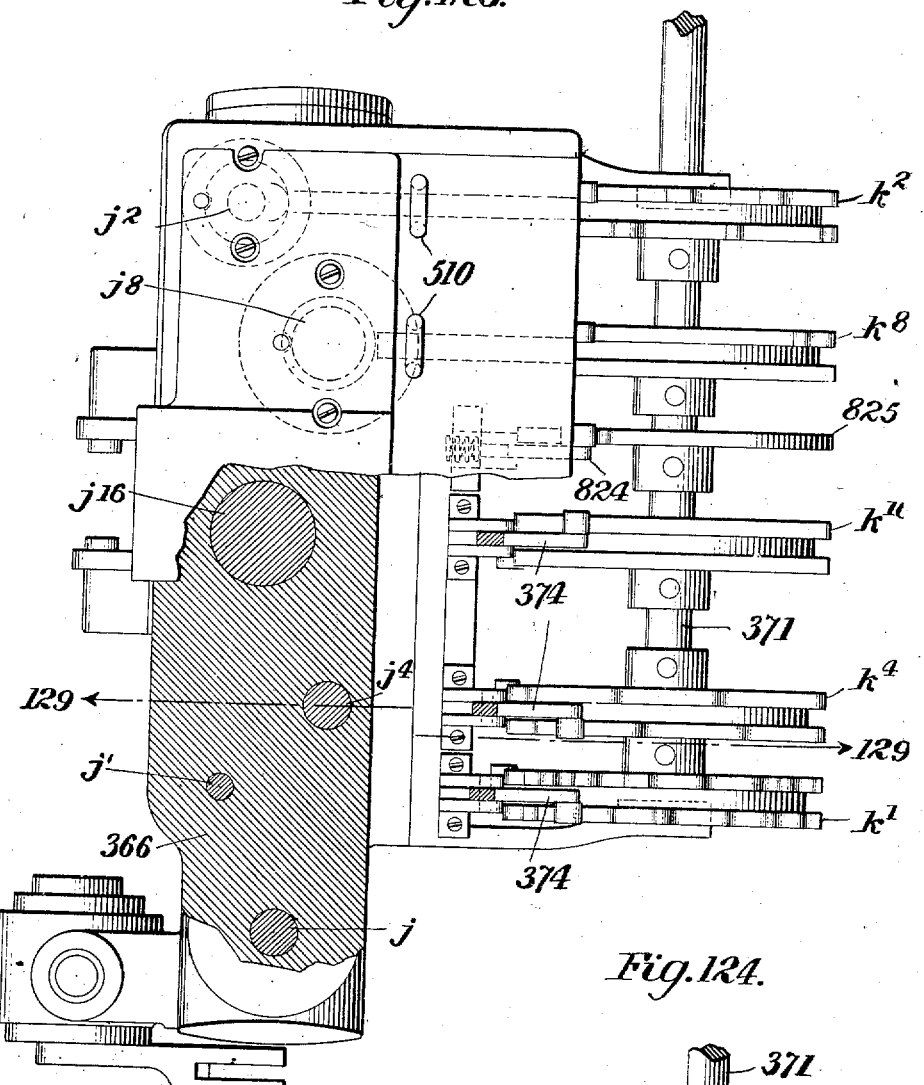
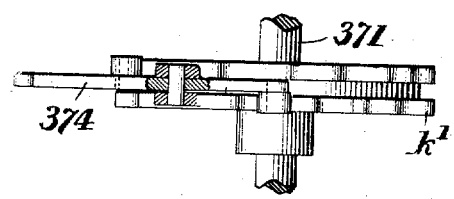

E. LAWRENZ.
TYPOGRAPHIC MACHINE.
APPLICATION FILED MAR. 28, 1906.
1,017,772.
Patented Feb. 20, 1912.
78 SHEETS—SHEET 50.
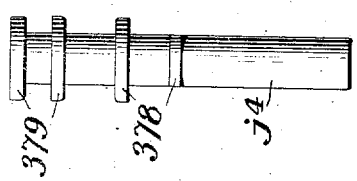
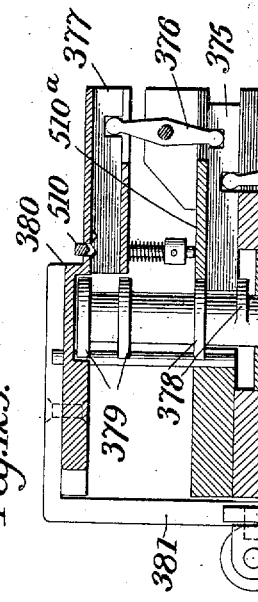
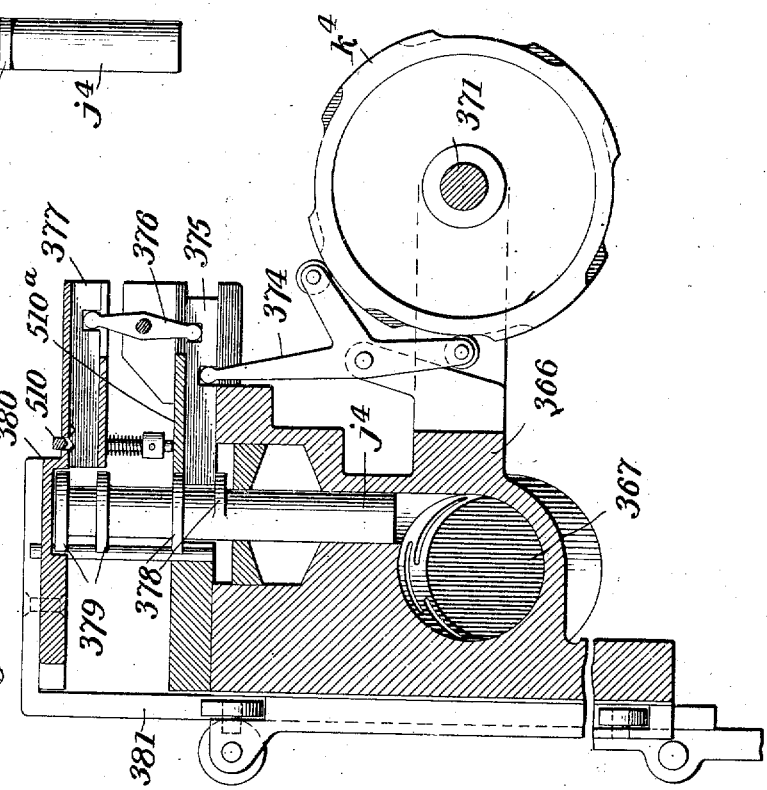
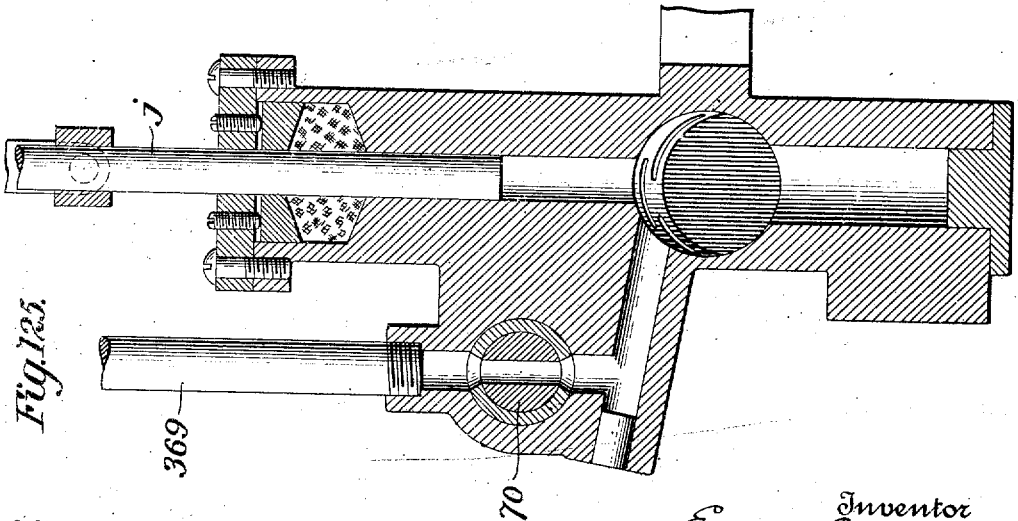

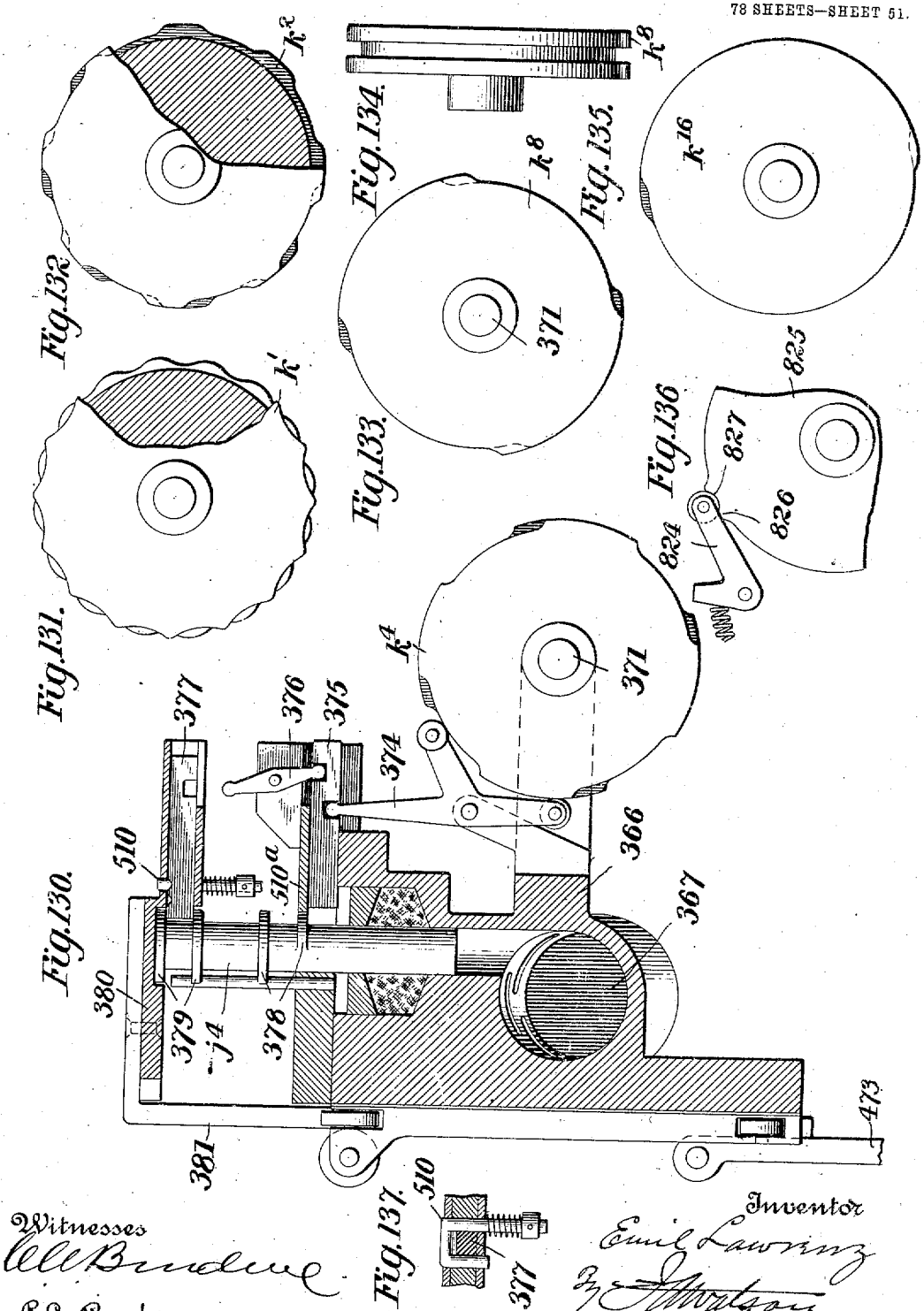

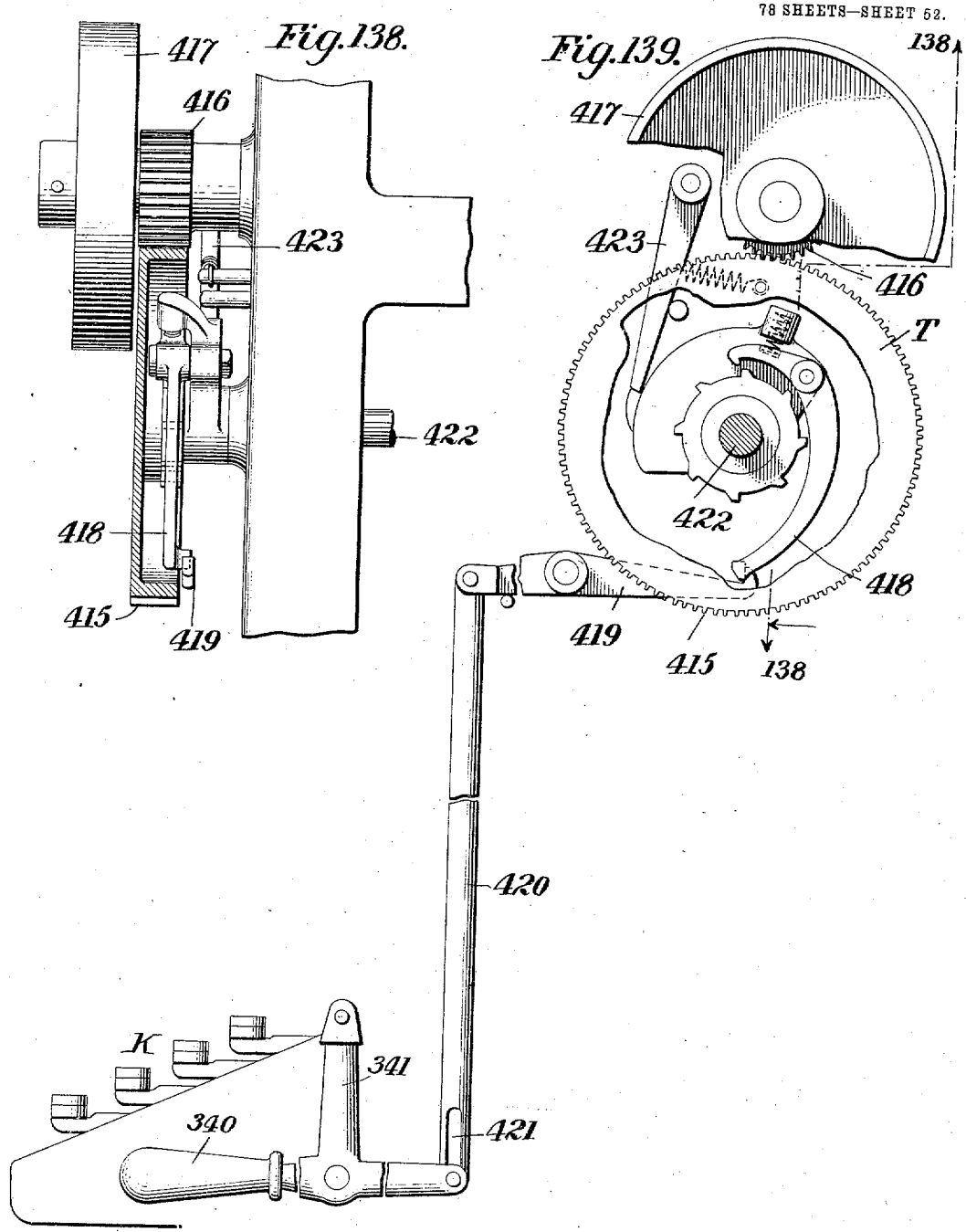

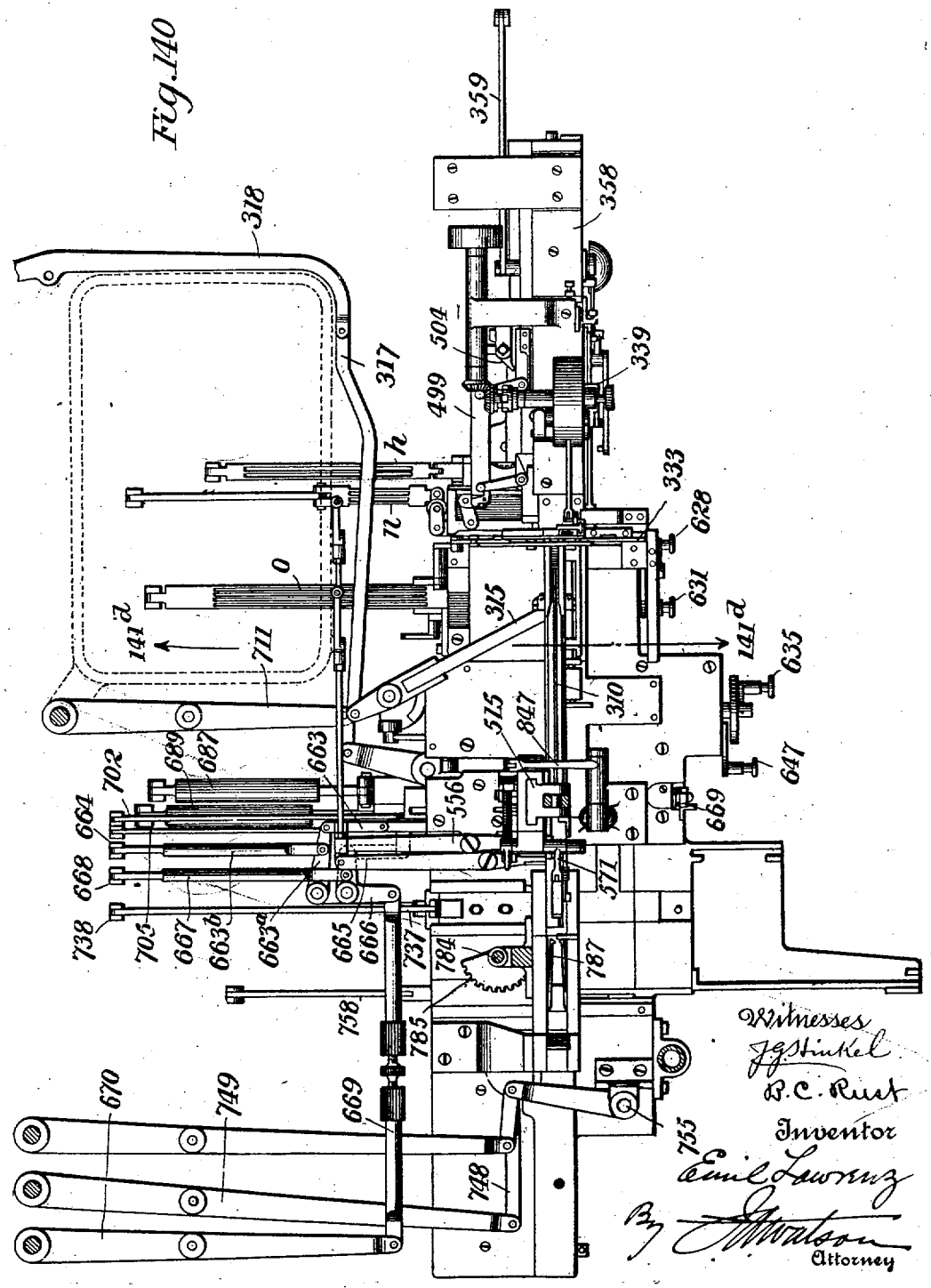

E. LAWRENZ.
TYPOGRAPHIC MACHINE.
APPLICATION FILED MAR. 28, 1906.
1,017,772.
Patented Feb. 20, 1912.
78 SHEETS—SHEET 54.
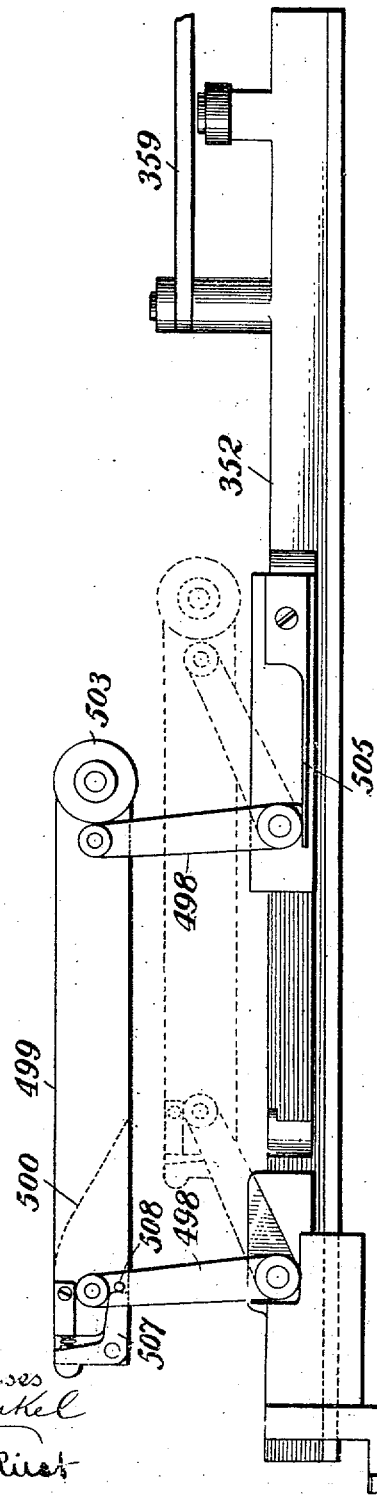
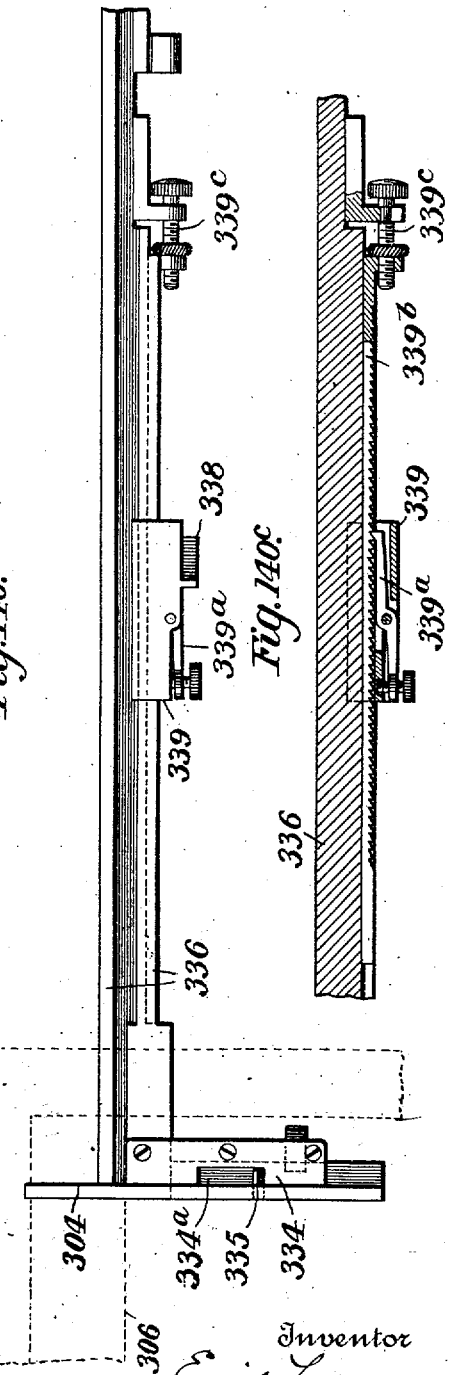

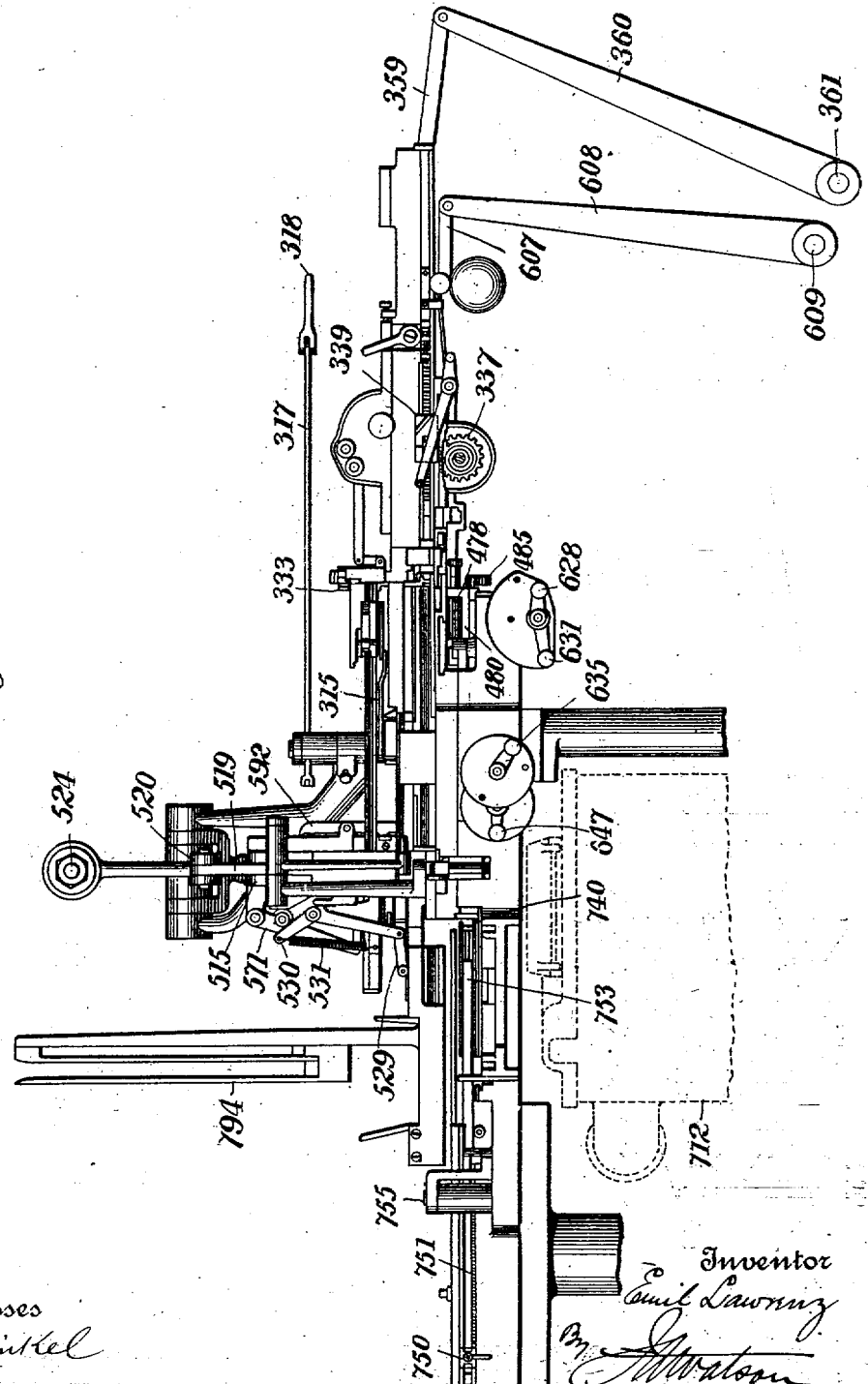

E. LAWRENZ.
TYPOGRAPHIC MACHINE.
APPLICATION FILED MAR. 28, 1906.
1,017,772.
Patented Feb. 20, 1912.
78 SHEETS—SHEET 56.
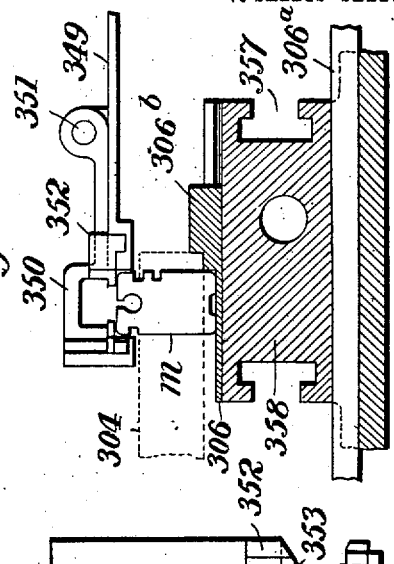
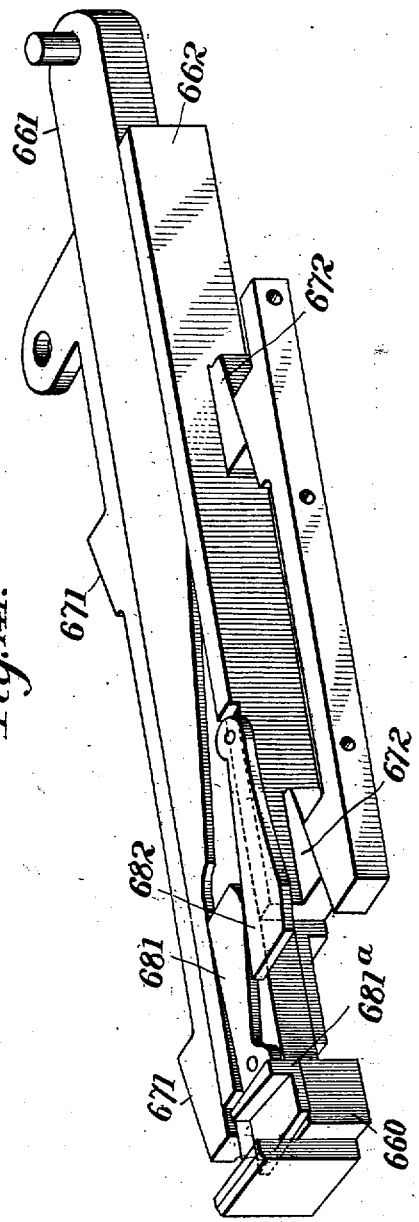
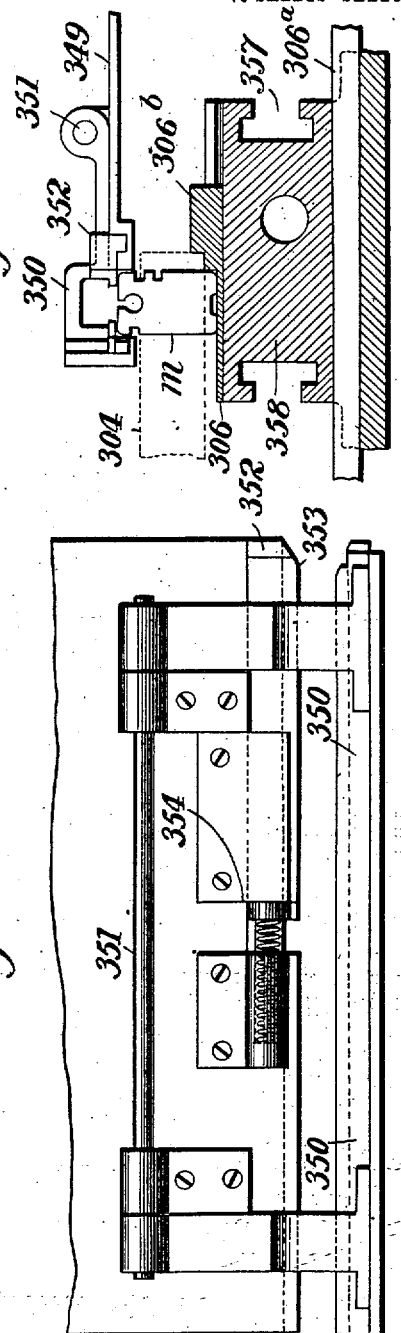
Witnesses
J. G. Stinkel
P. C. Rust
Inventor
Emil Lawrenz
by J. Watson
Attorney

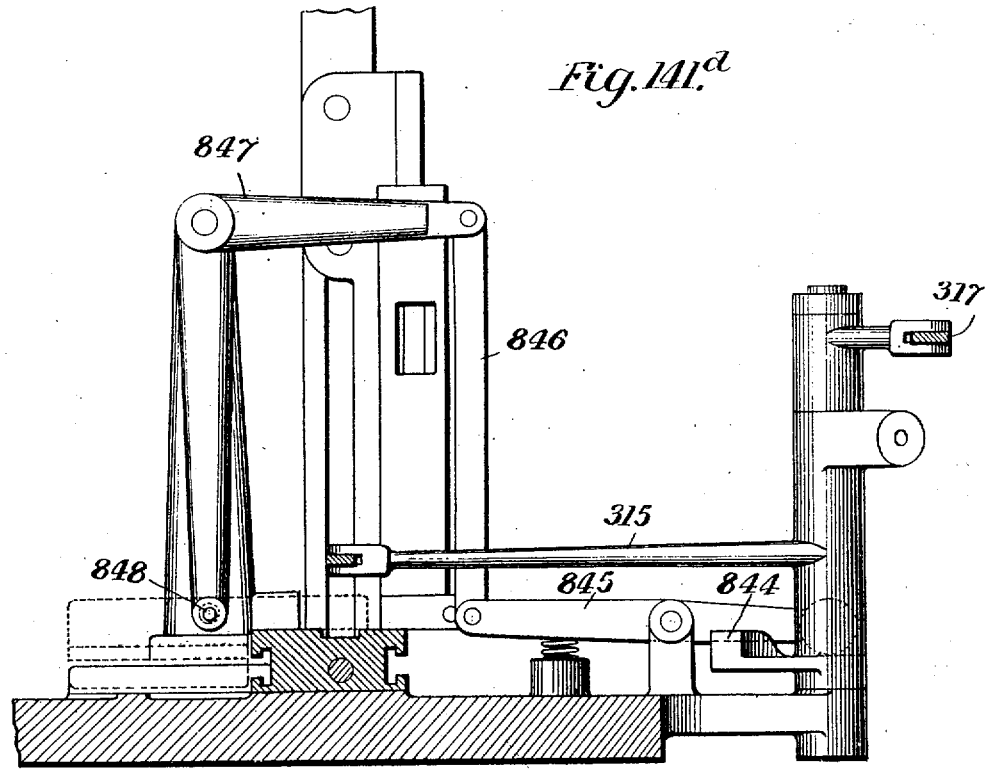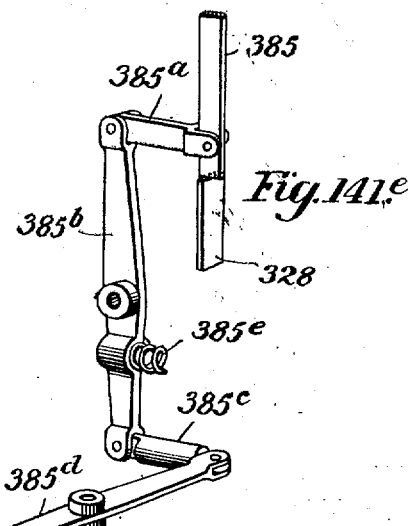

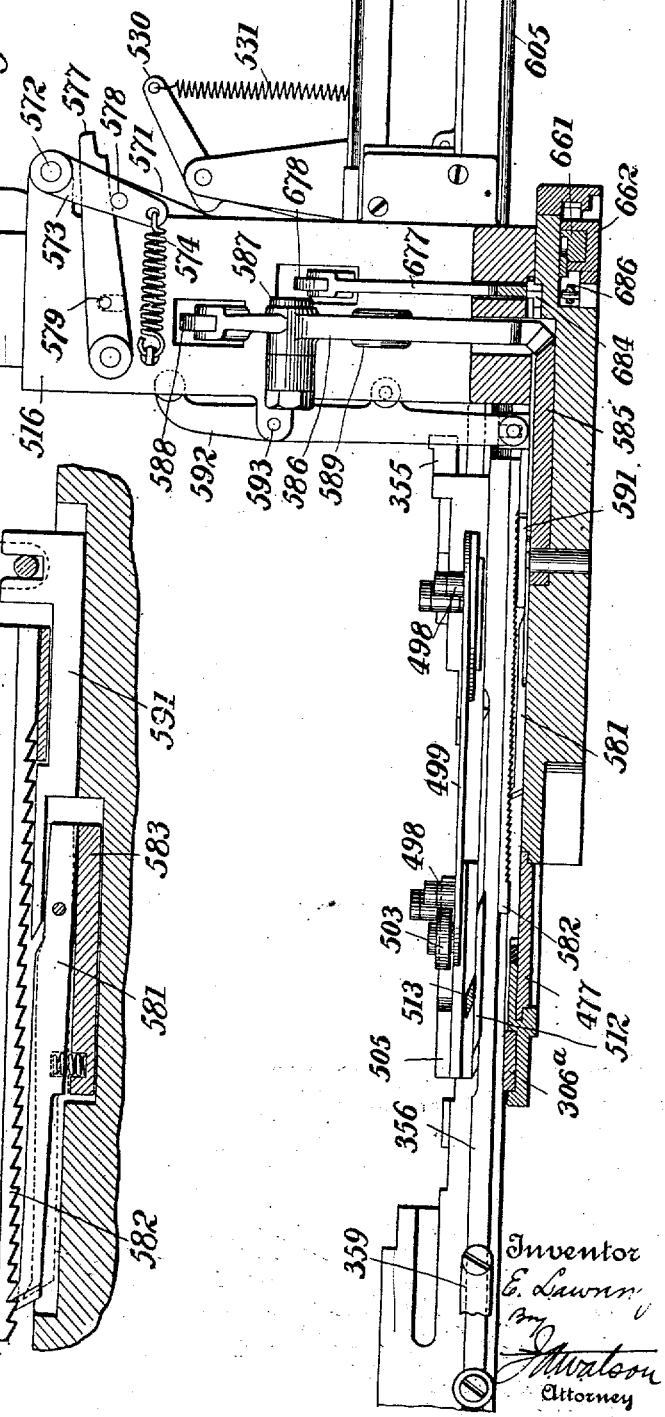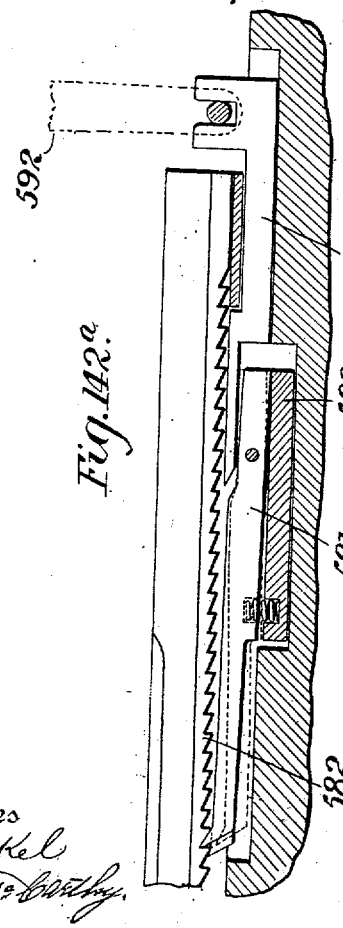

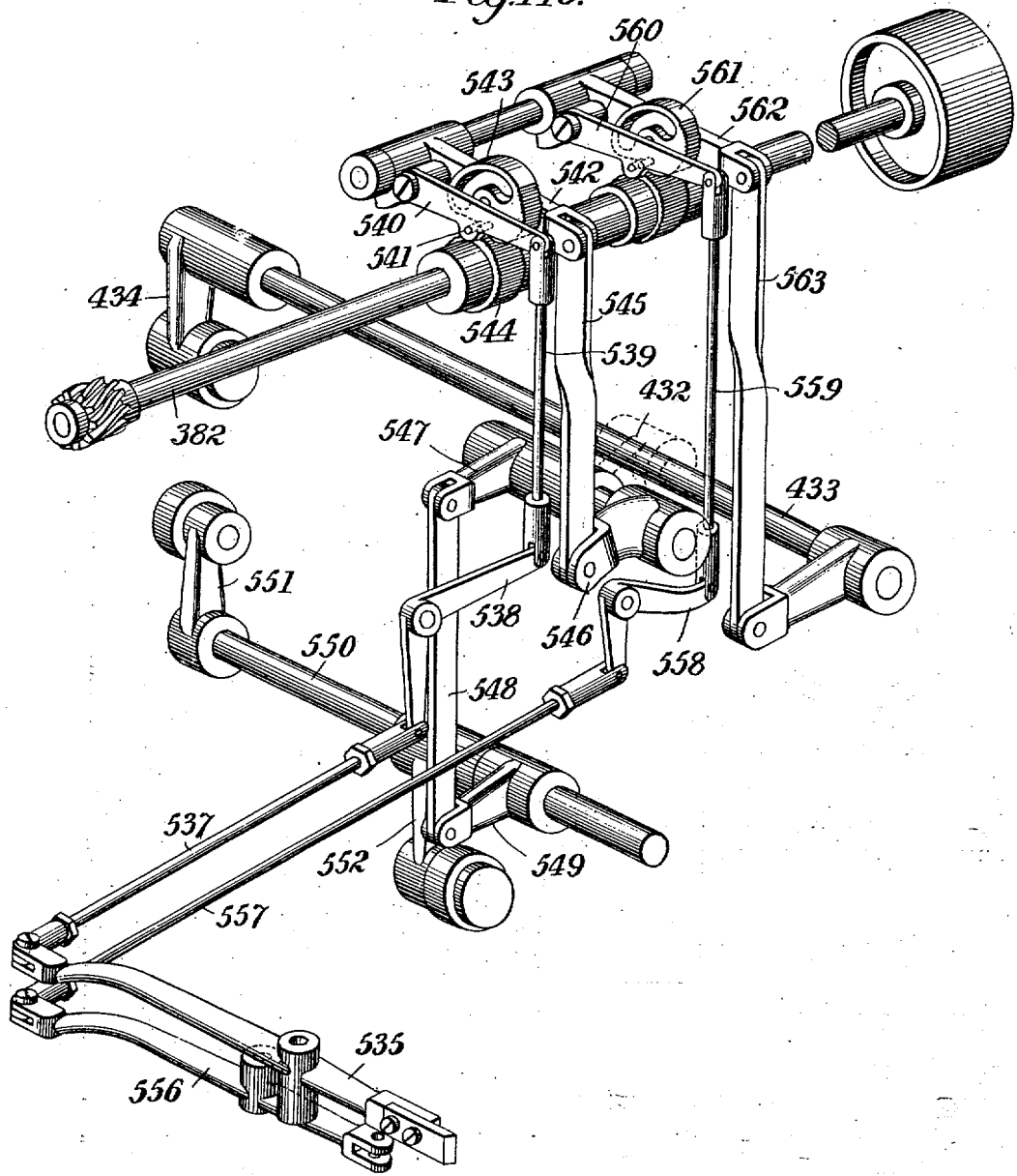

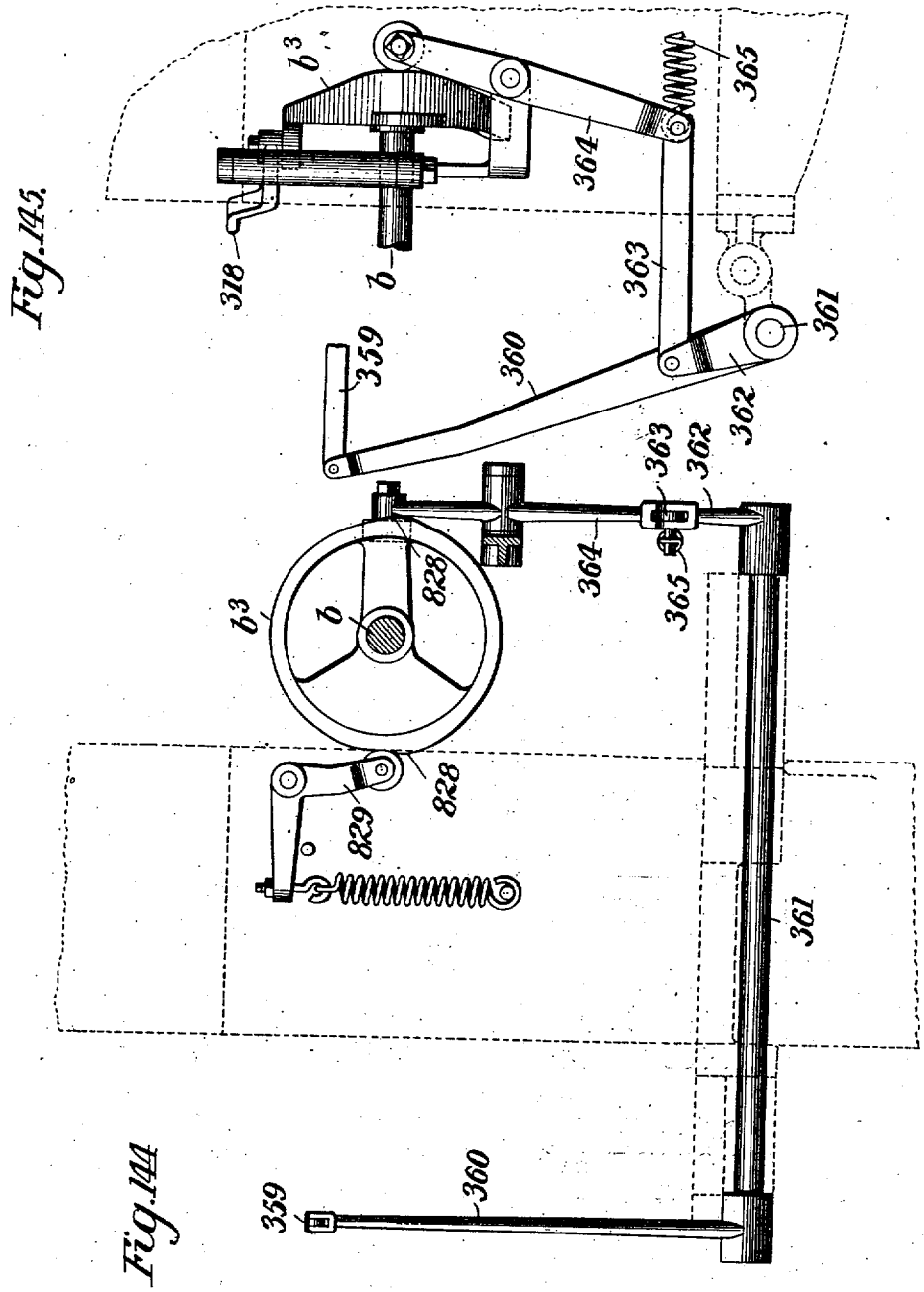

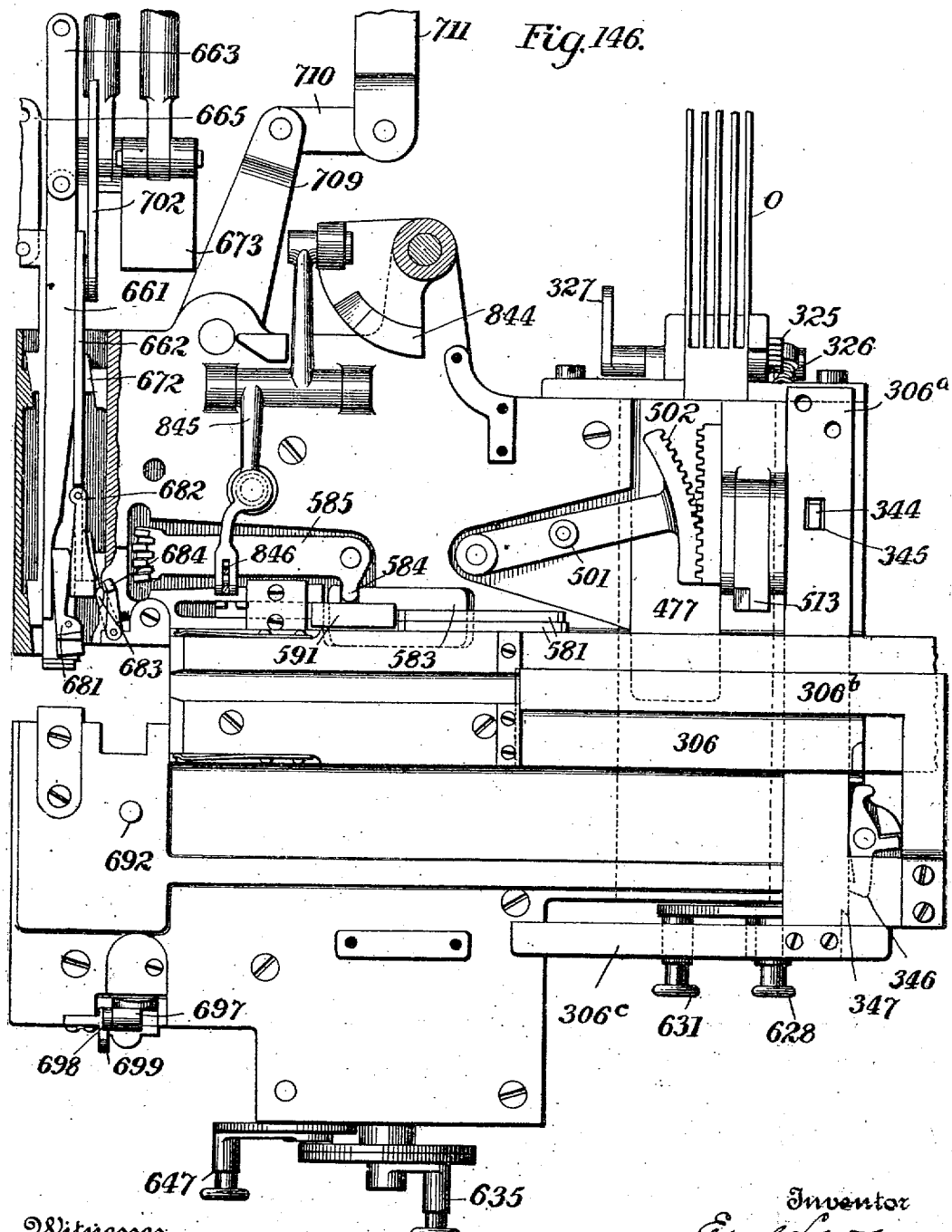

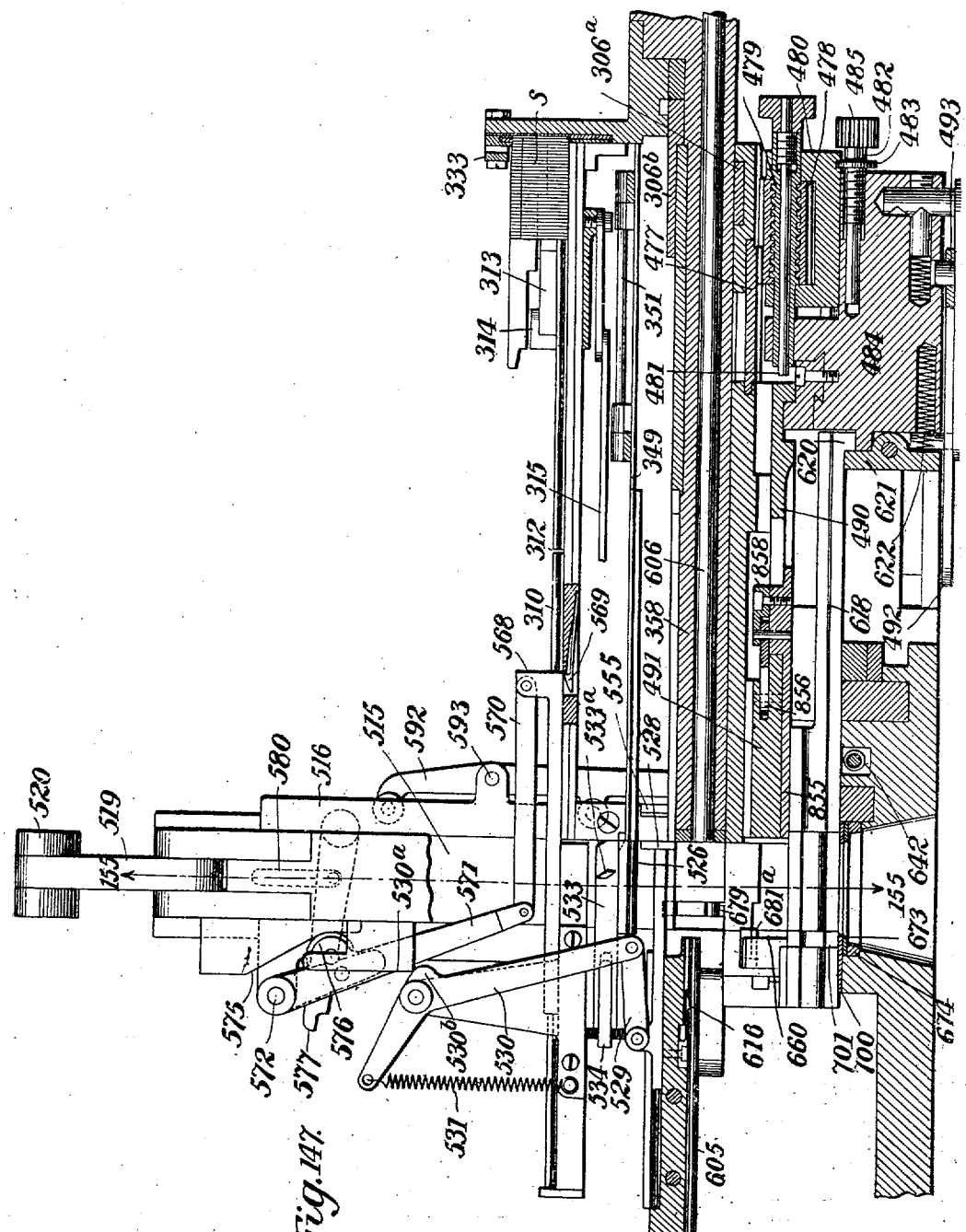

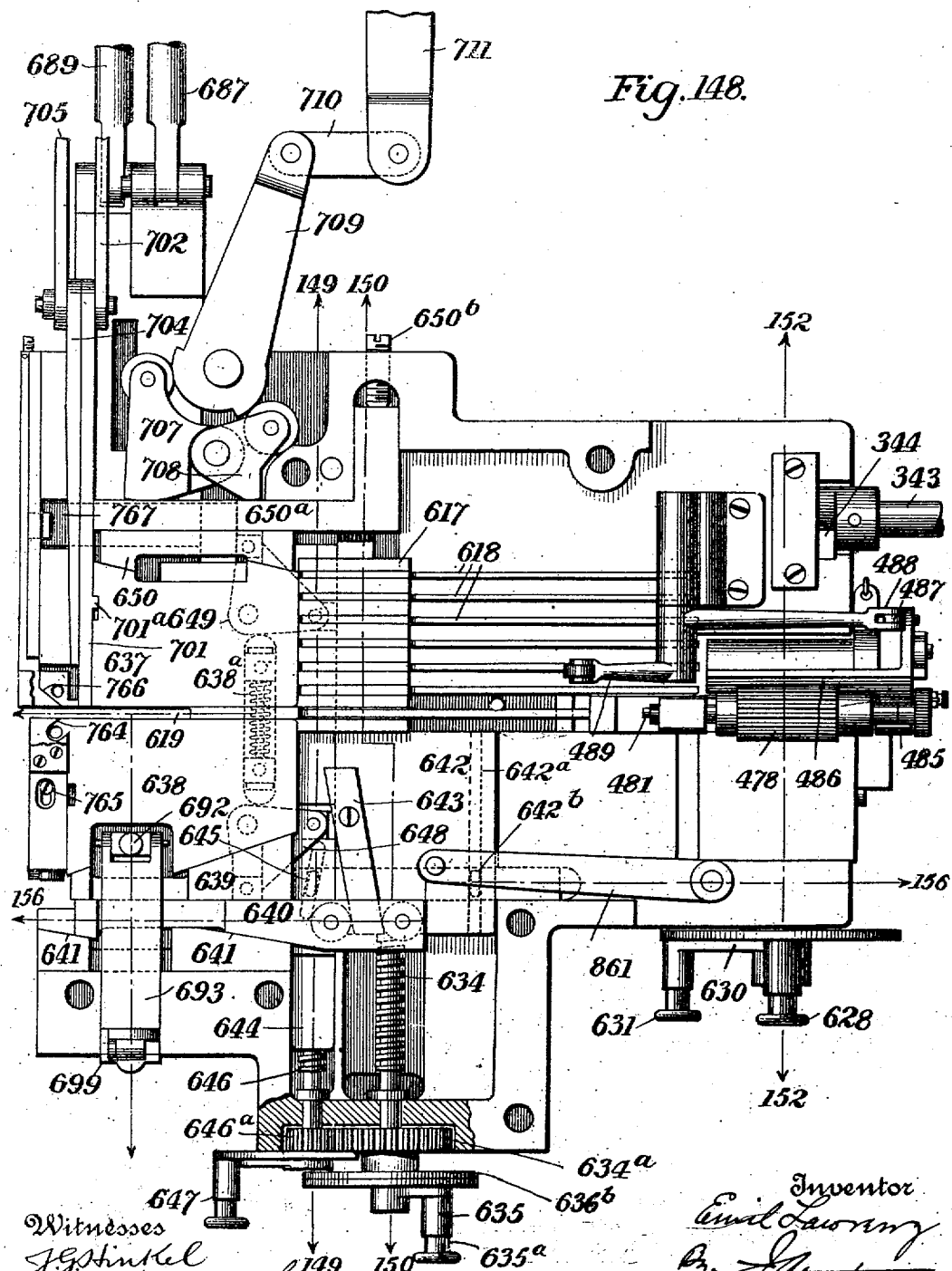

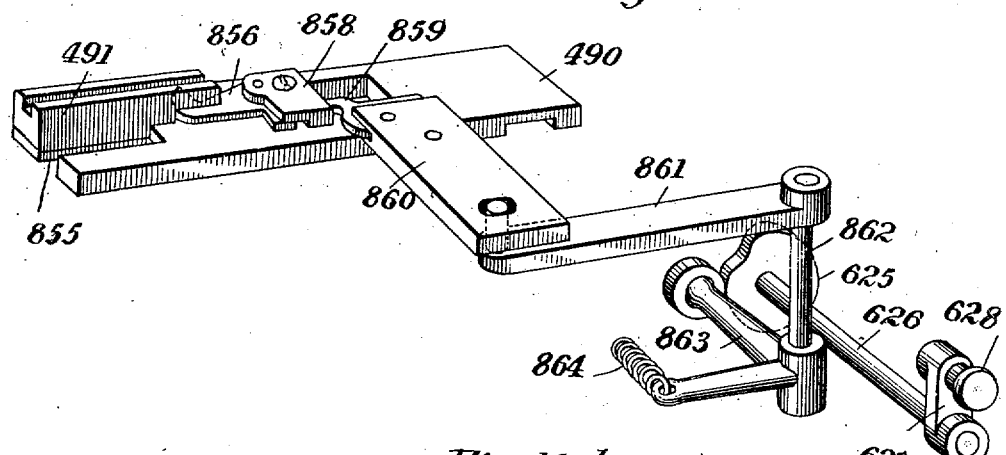
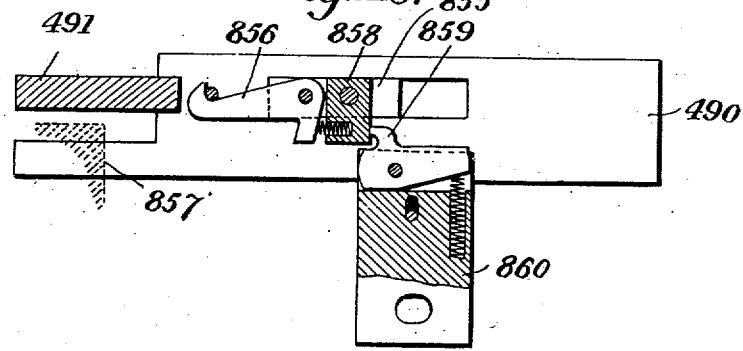

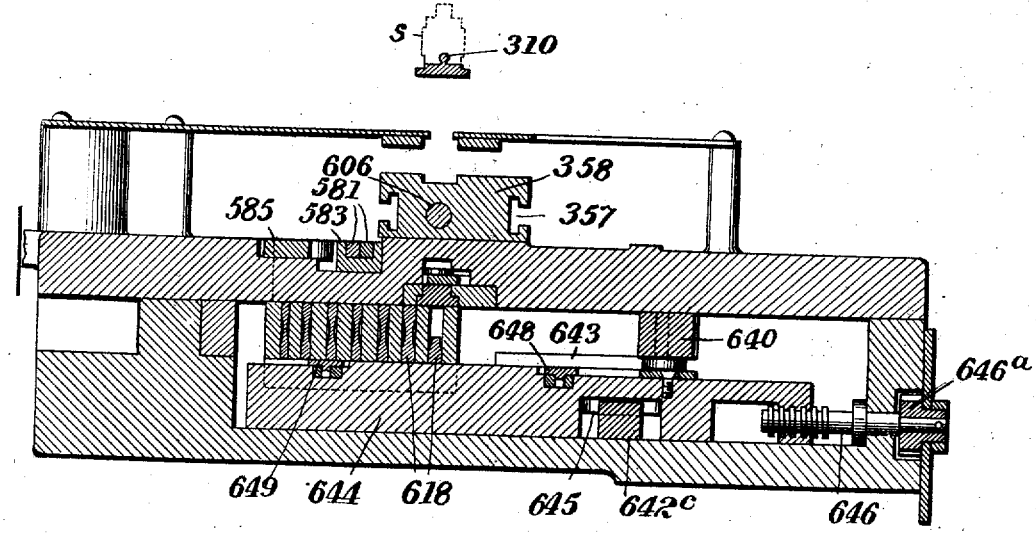
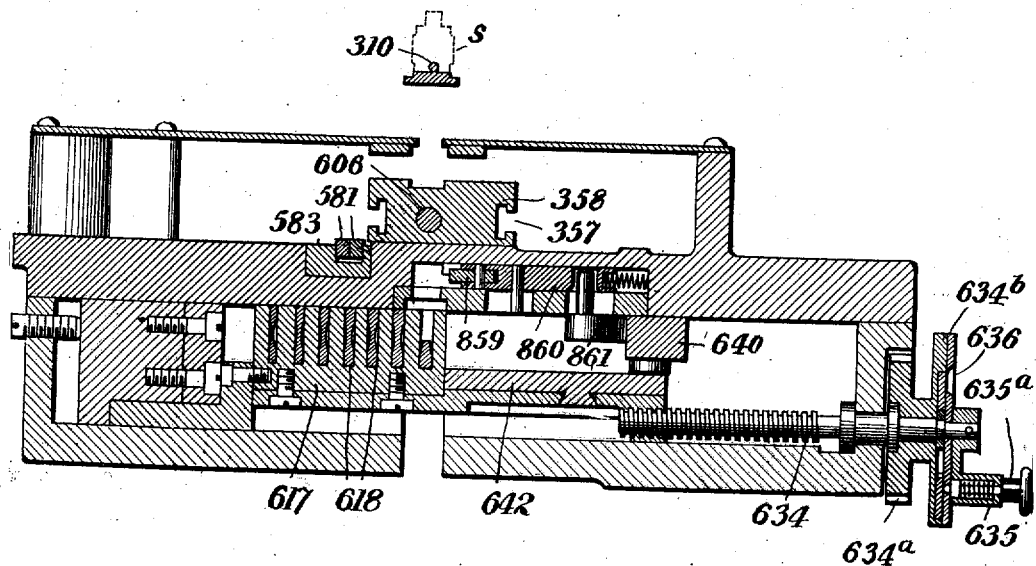

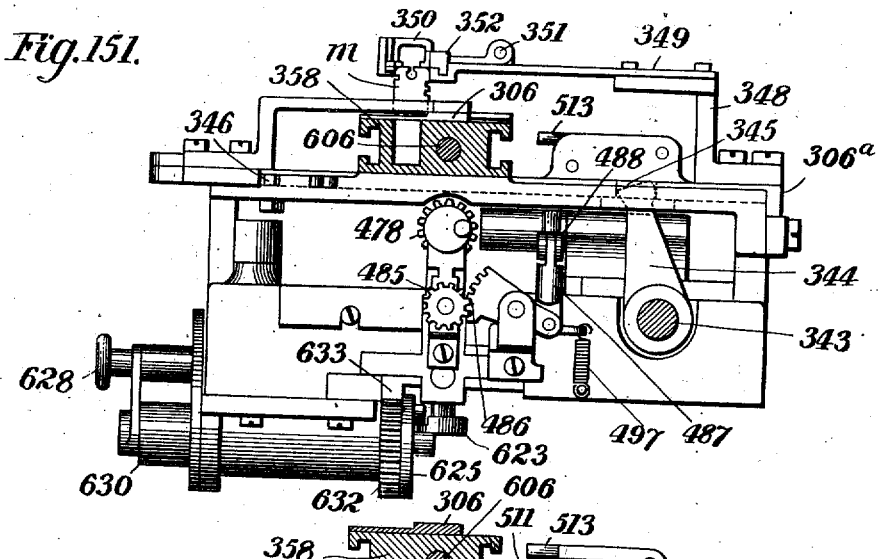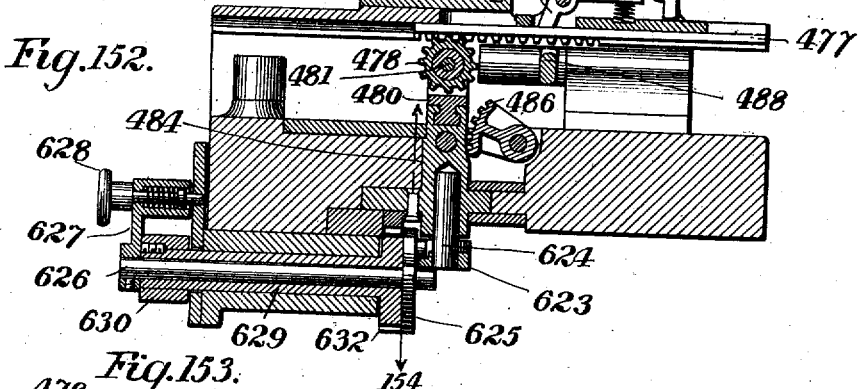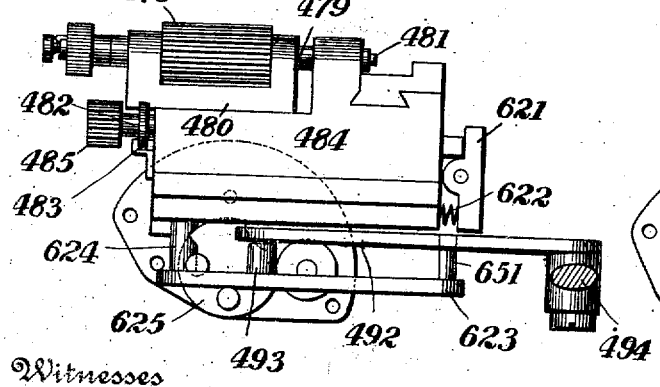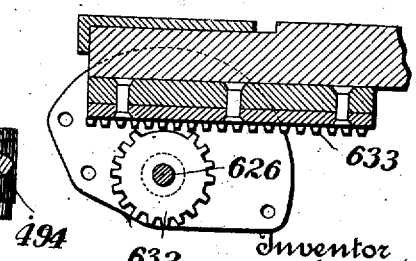

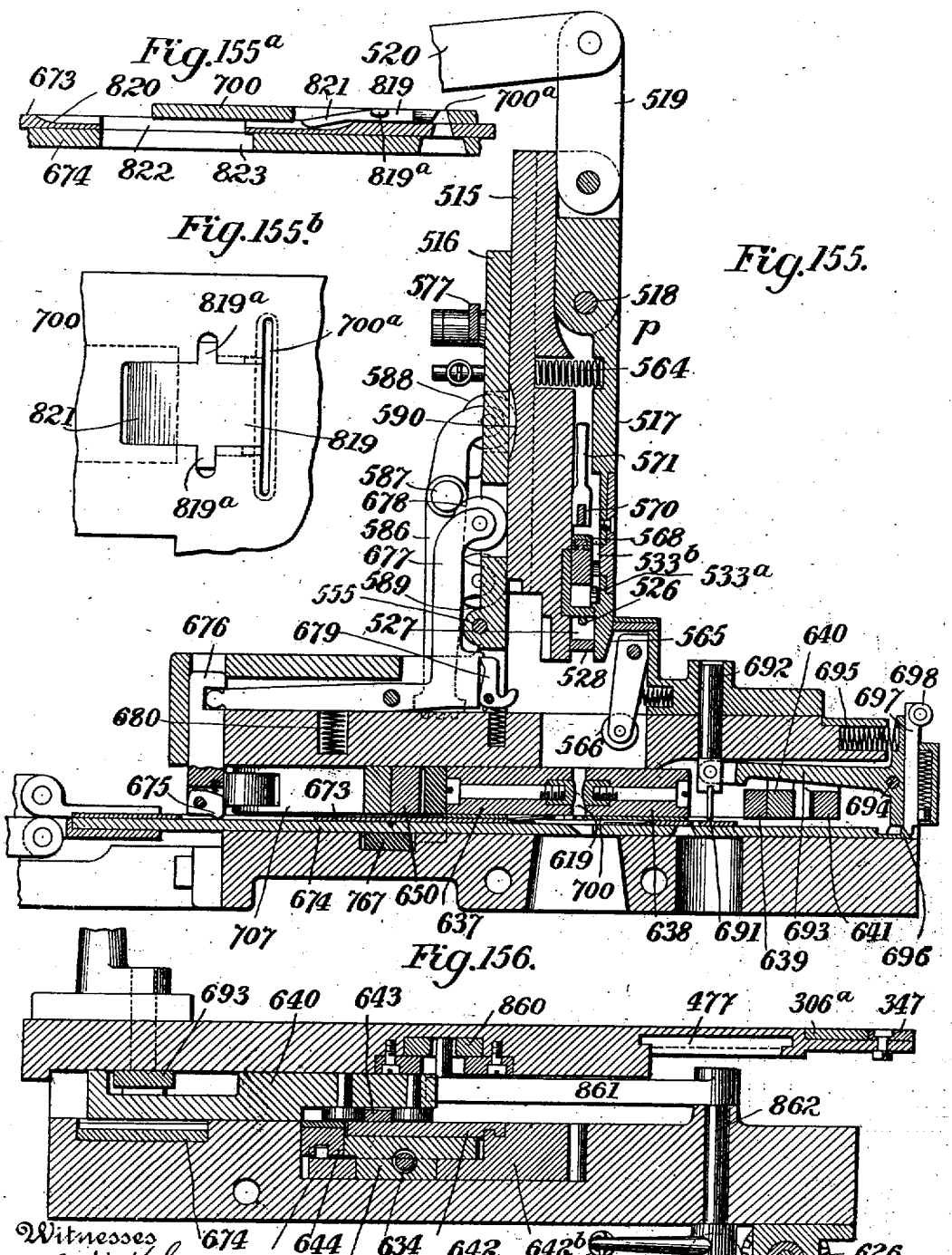

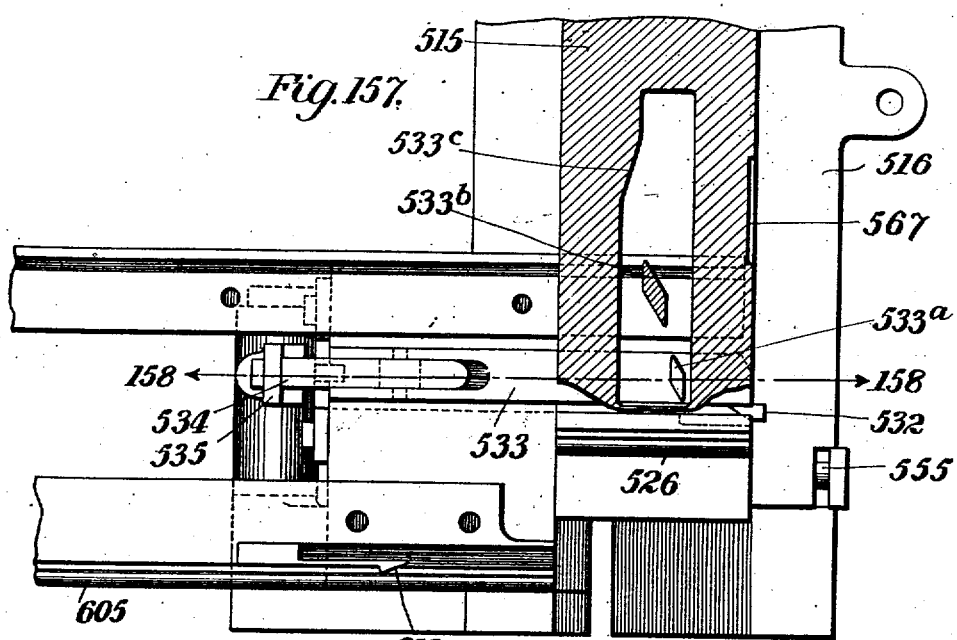
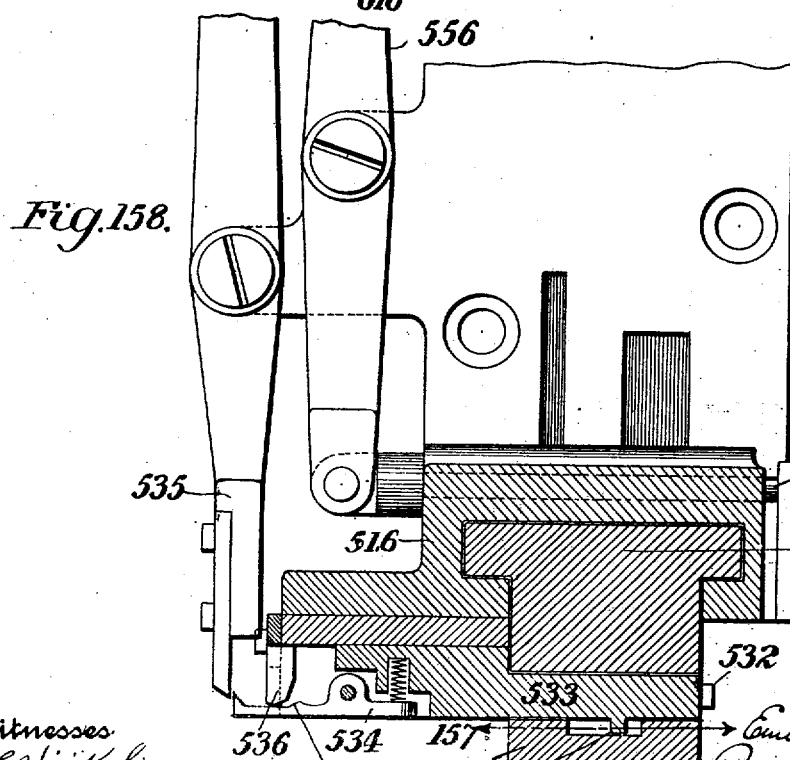

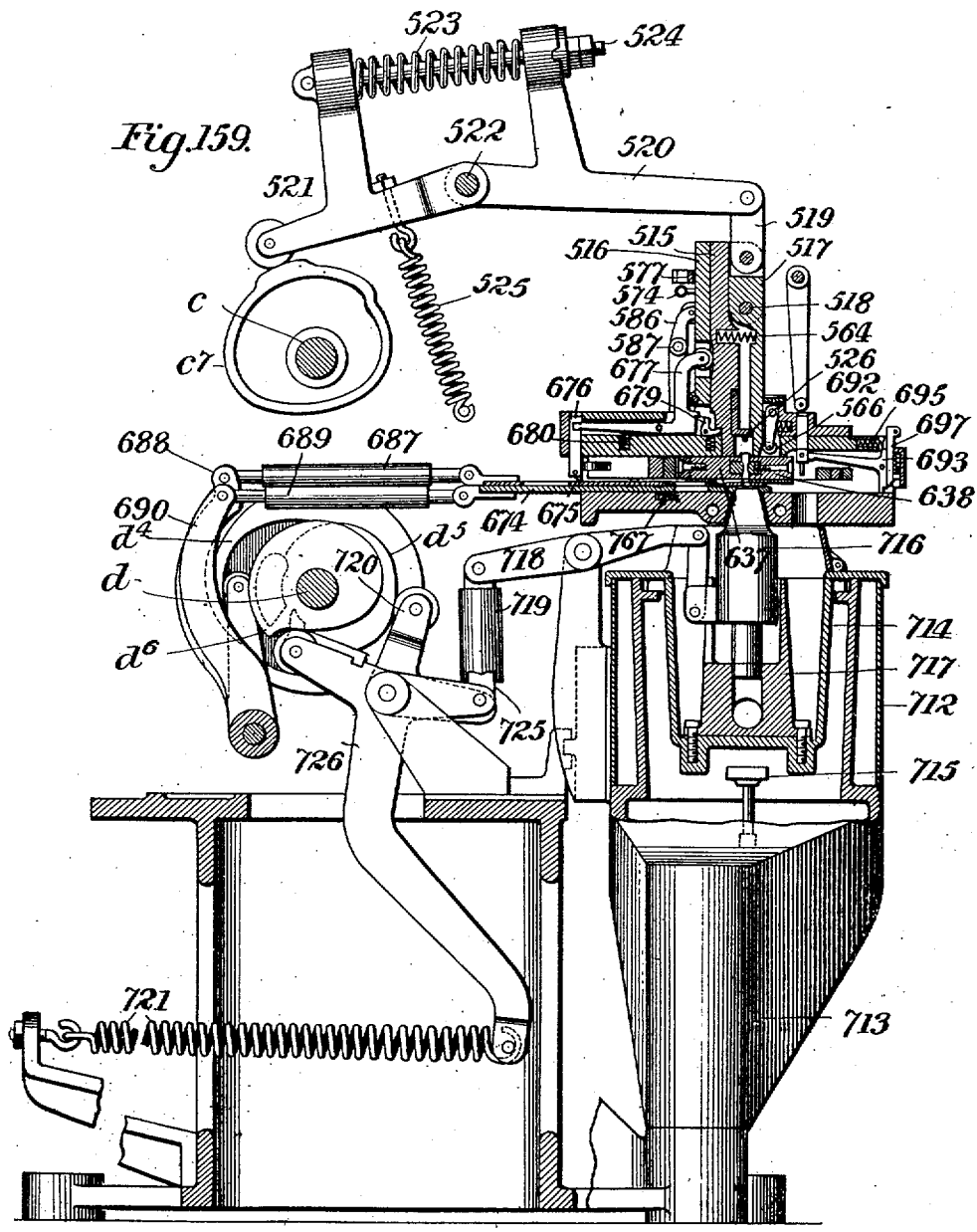

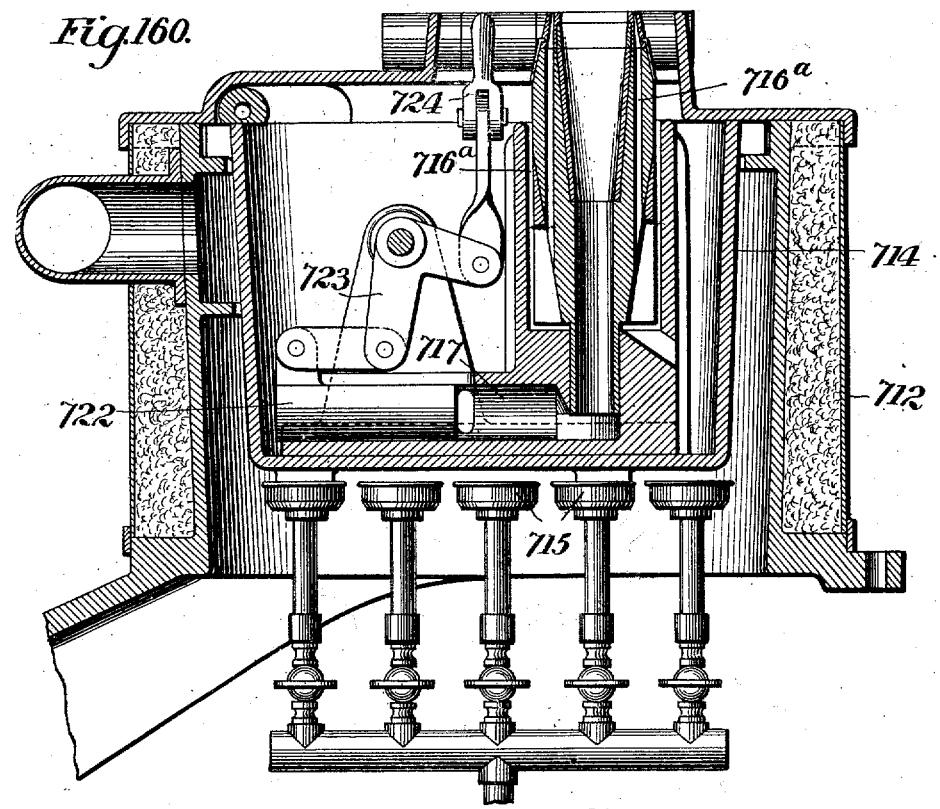
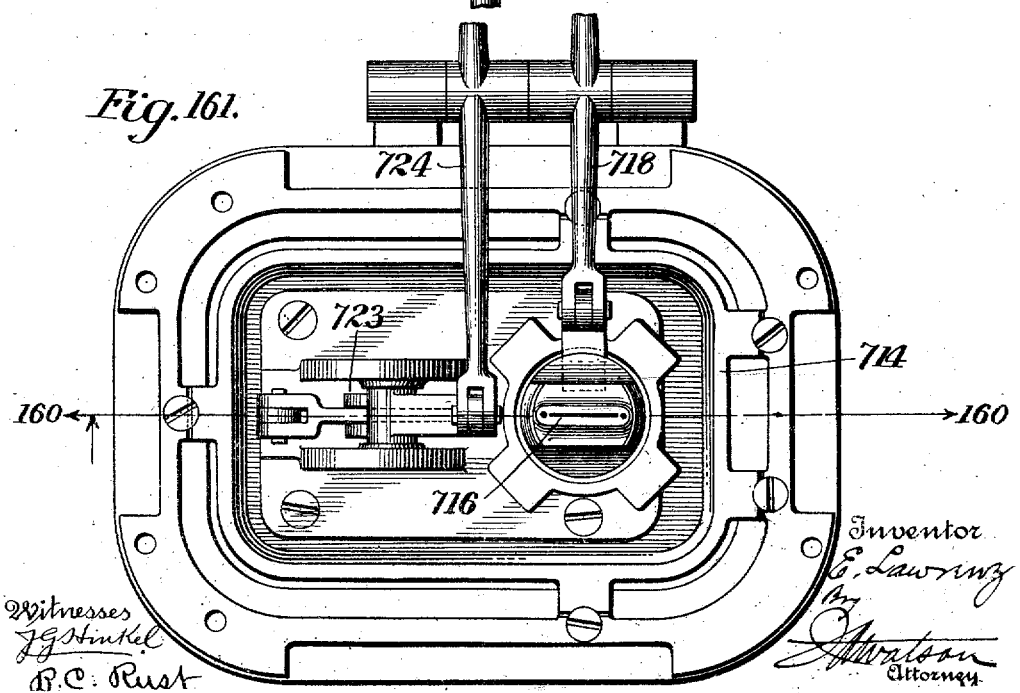

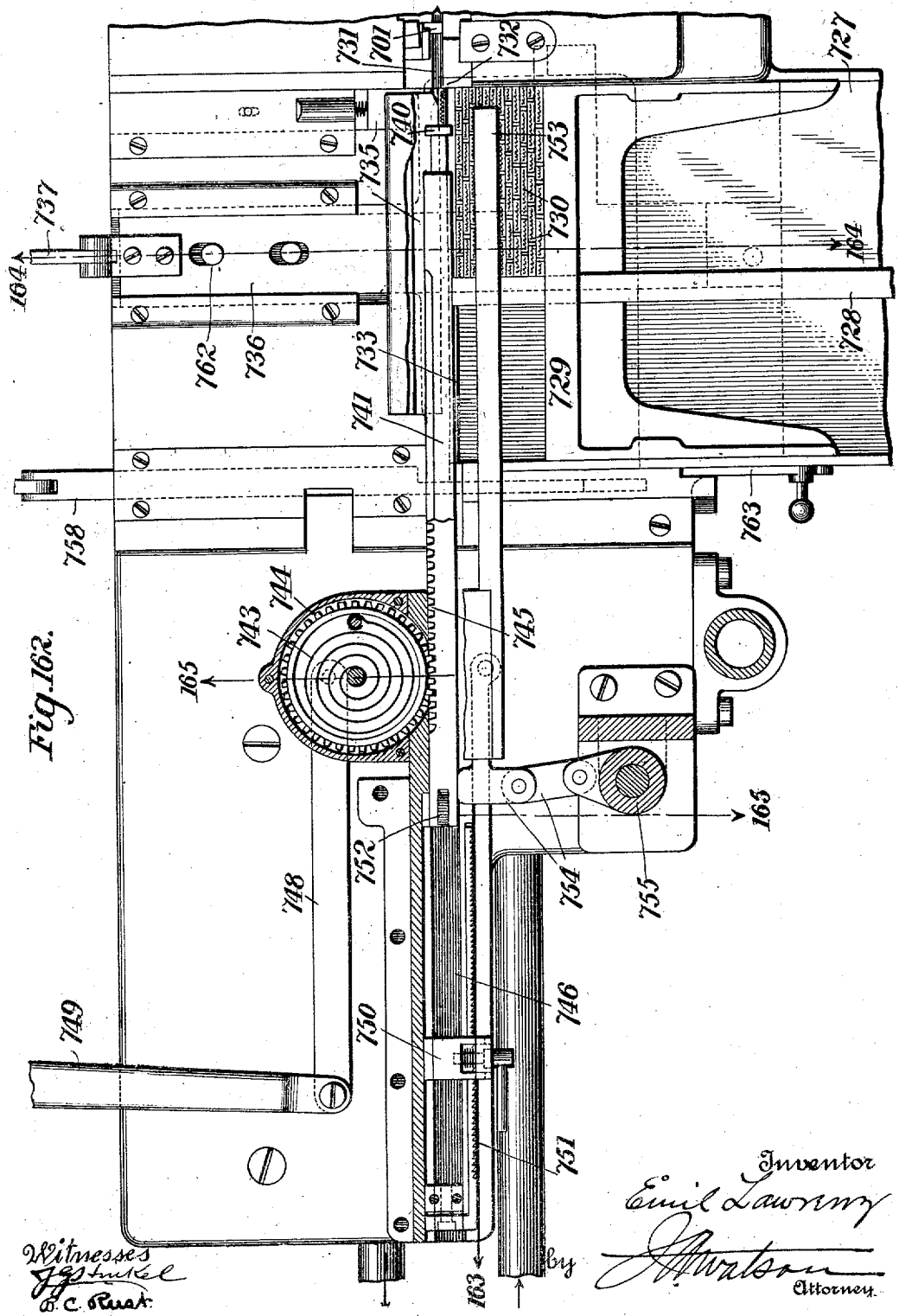

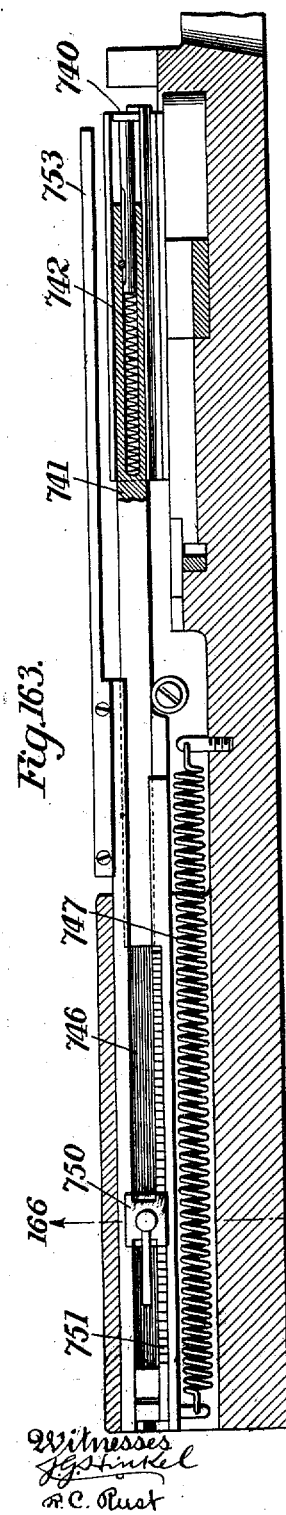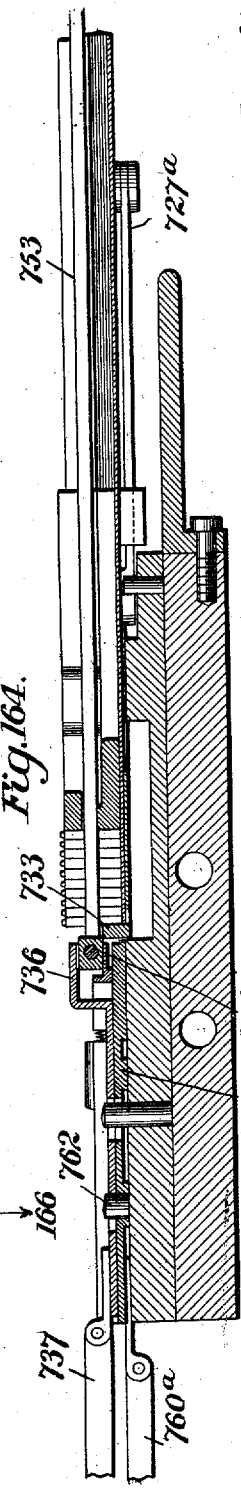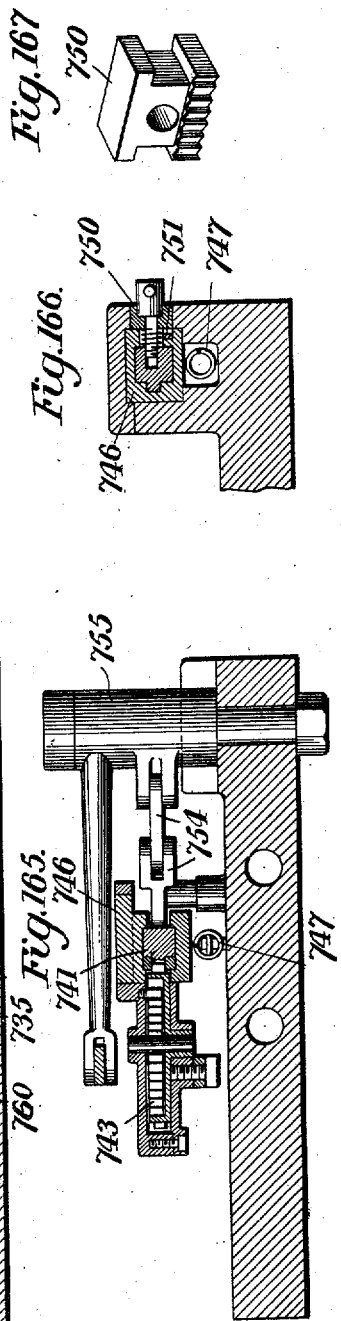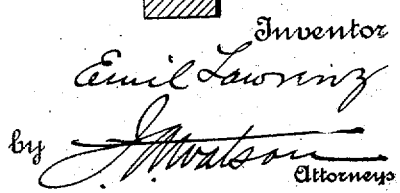

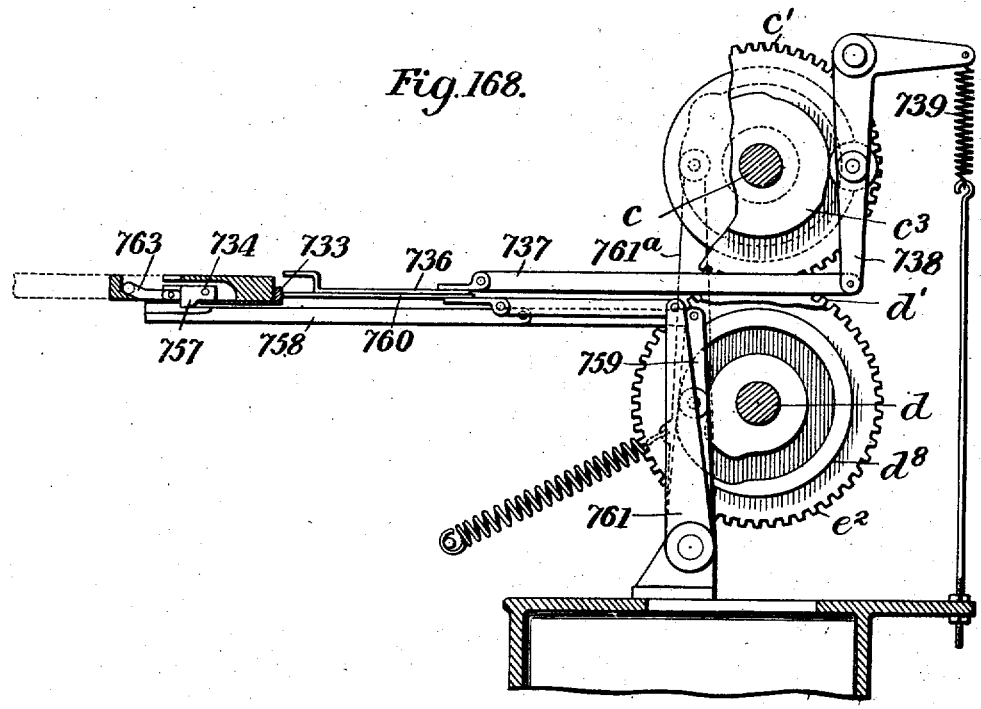
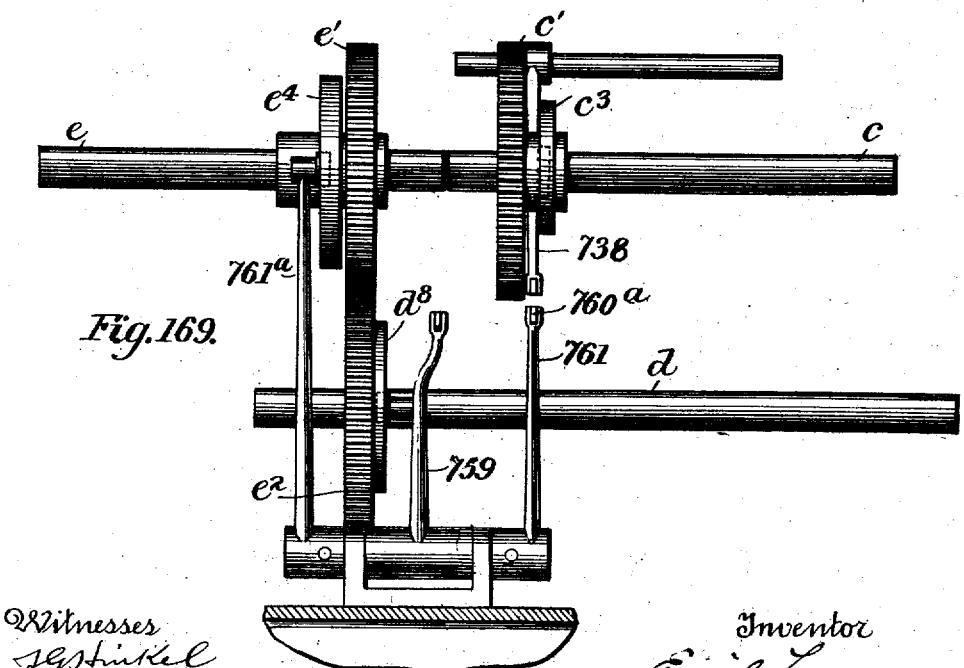

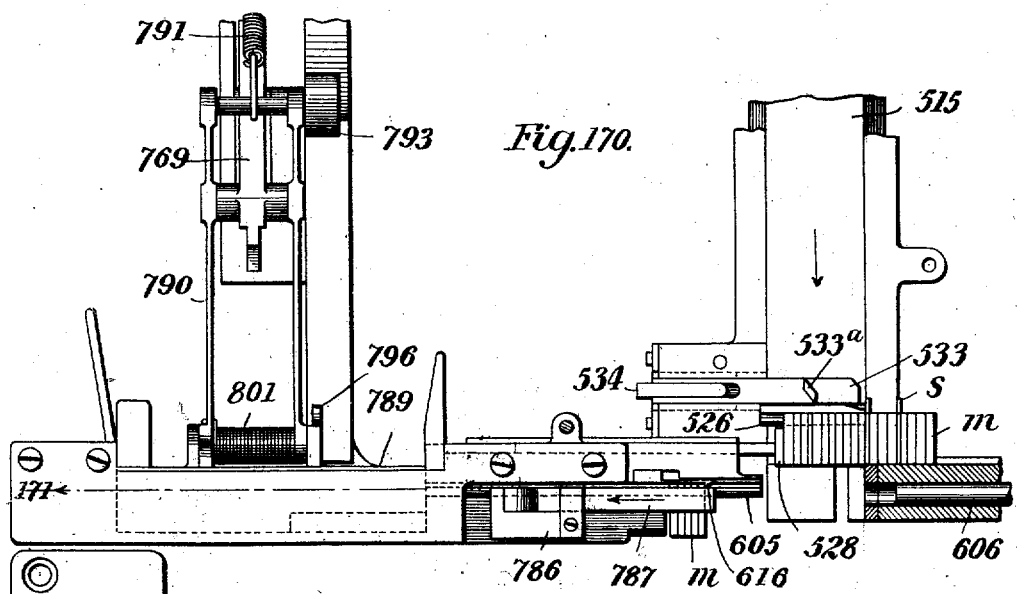
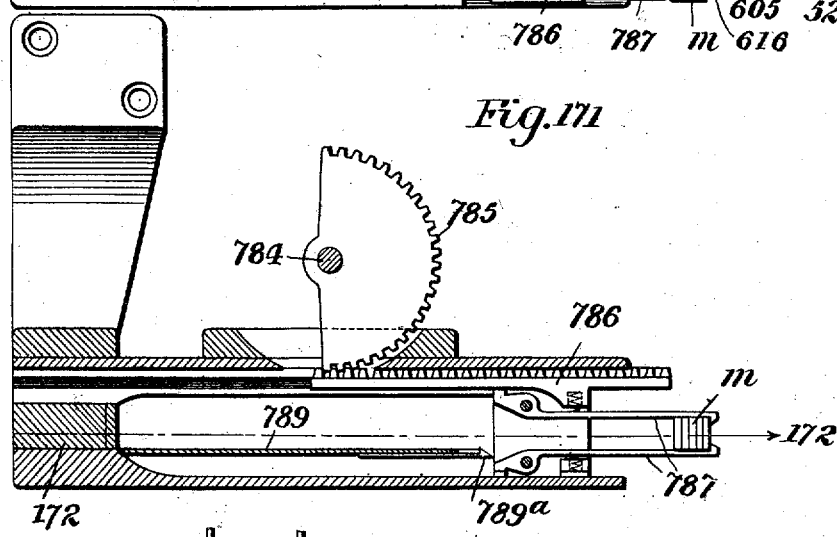
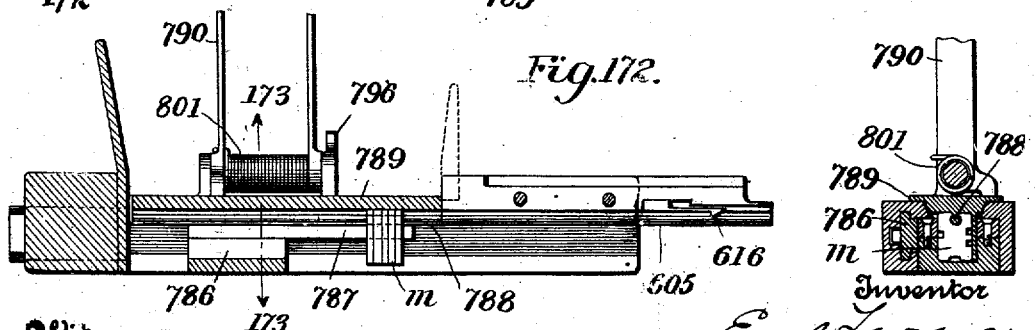
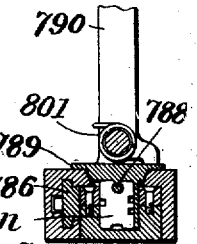

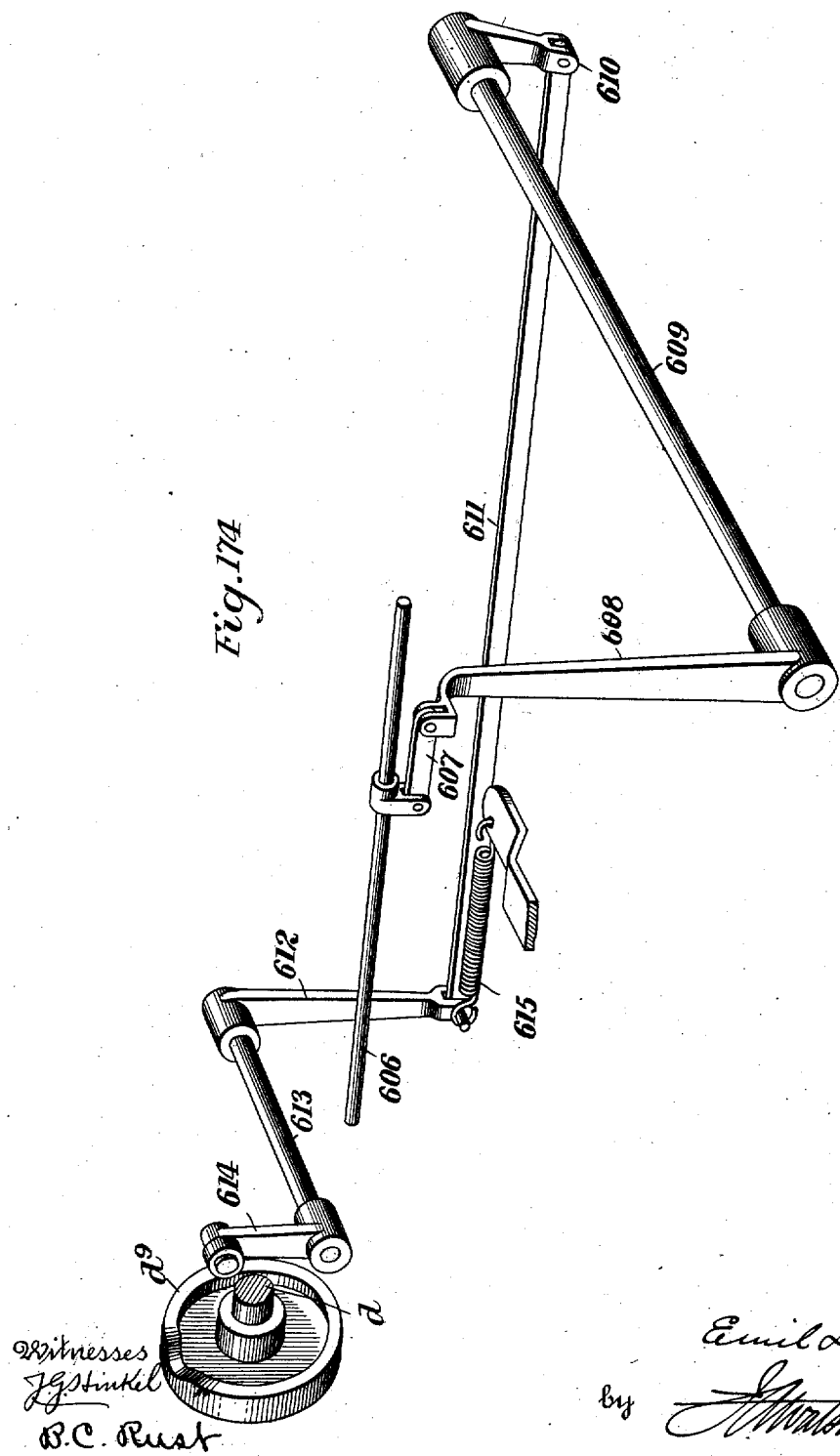

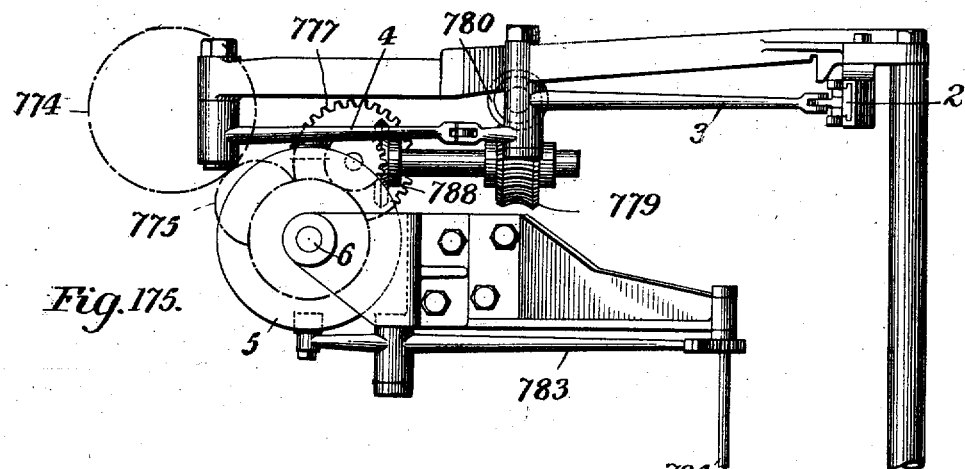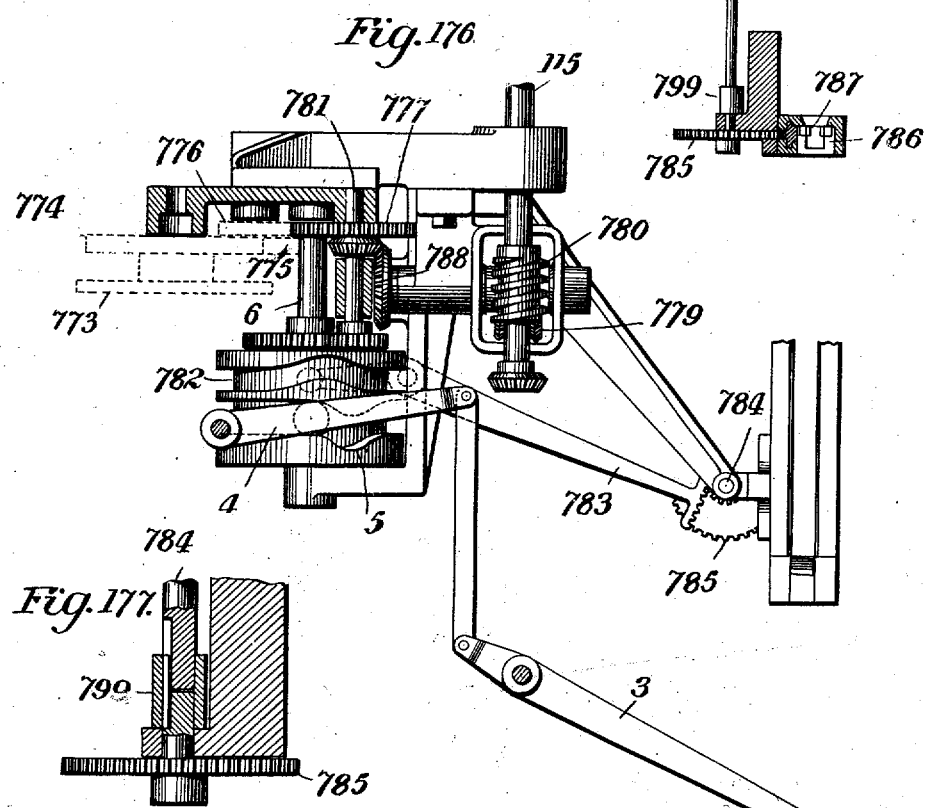

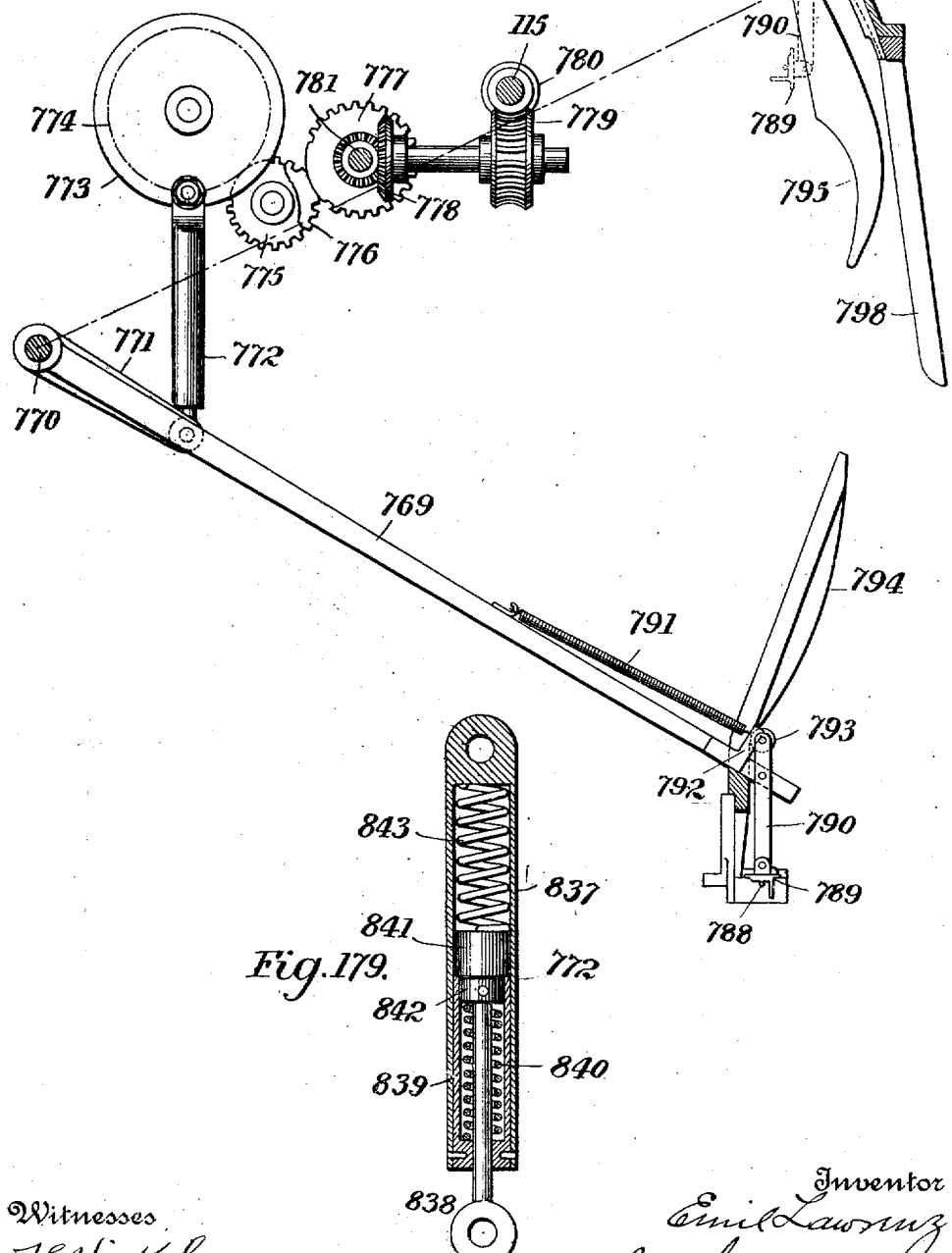

E. LAWRENZ.
TYPOGRAPHIC MACHINE.
APPLICATION FILED MAR. 28, 1906.
1,017,772.
Patented Feb. 20, 1912.
78 SHEETS—SHEET 78.
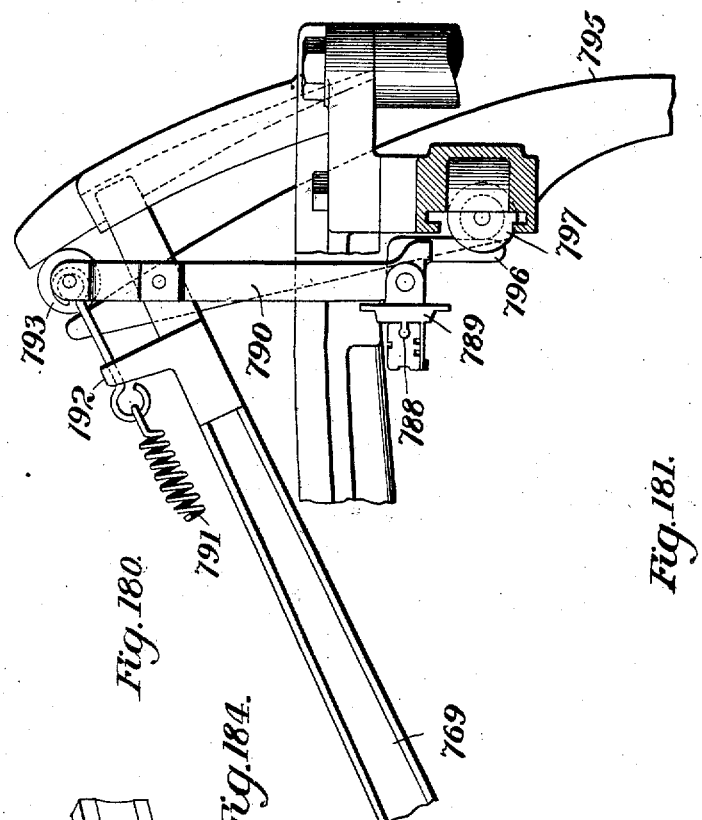

UNITED STATES PATENT OFFICE.

EMIL LAWRENZ, OF BALTIMORE, MARYLAND, ASSIGNOR TO OTT. MERGENTHALER COMPANY, OF BALTIMORE, MARYLAND, A CORPORATION OF DELAWARE.

TYPOGRAPHIC MACHINE.

1,017,772.     Specification of Letters Patent.     Patented Feb. 20, 1912.

Application filed March 28, 1906. Serial No. 308,608.

*To all whom it may concern:*

Be it known that I, EMIL LAWRENZ, a citizen of the United States, residing at Baltimore, in the State of Maryland, have invented certain new and useful Improvements in Typographic Machines, of which the following is a specification.

This invention relates to mechanism for producing a justified printing surface or form; and more particularly to improvements in machines of the type illustrated and described in United States Letters Patent No. 794,628, dated July 11, 1905.

While the product of the present machine is a justified line of logotypes, it will be understood that many of the features of the present invention are applicable to typographic machines generally, while other features are applicable to such machines as embody a casting mechanism.

Figure 7:
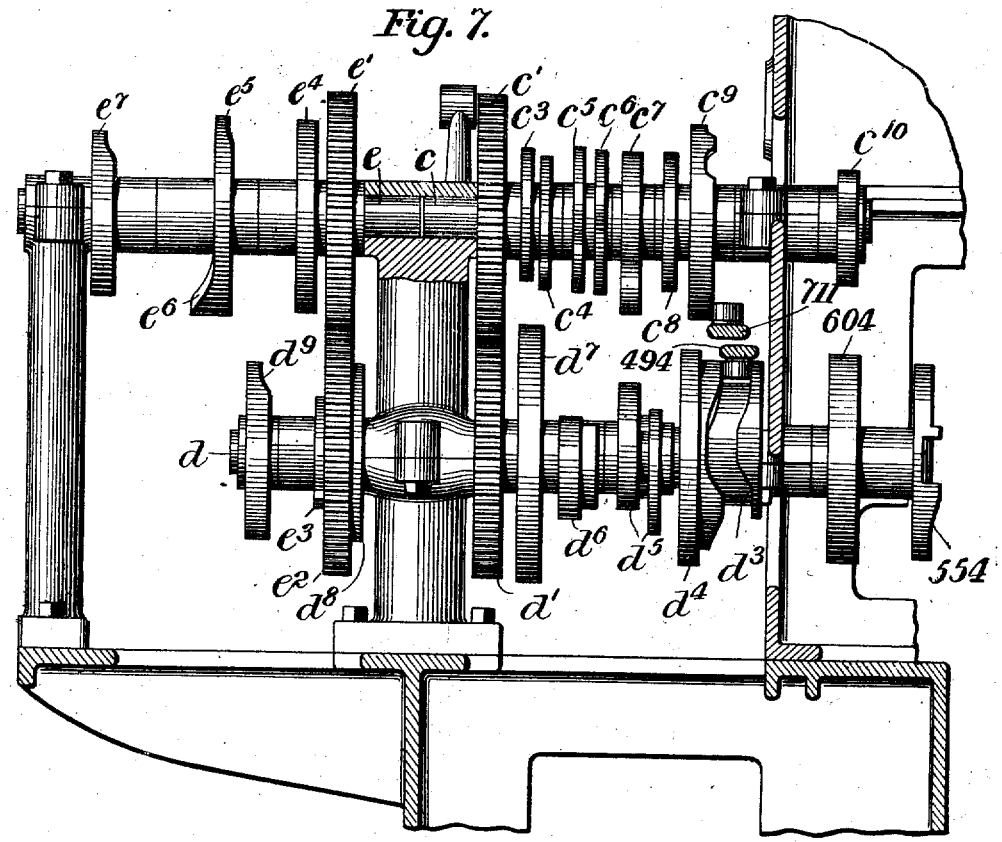
Figure 8:
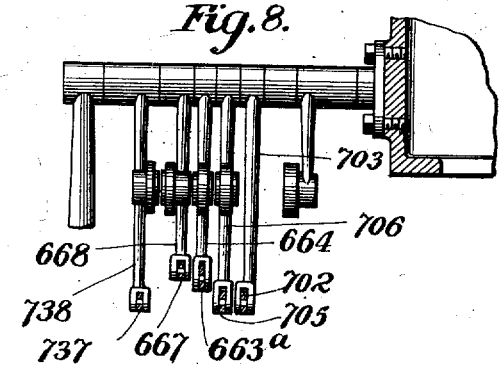
Figure 14:
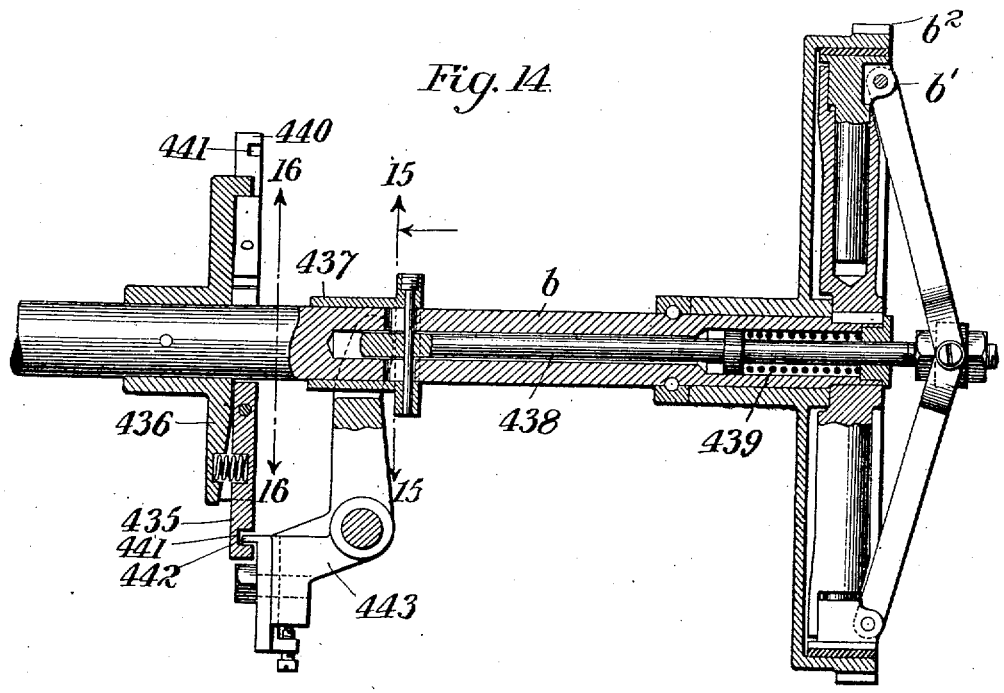
Figure 15:
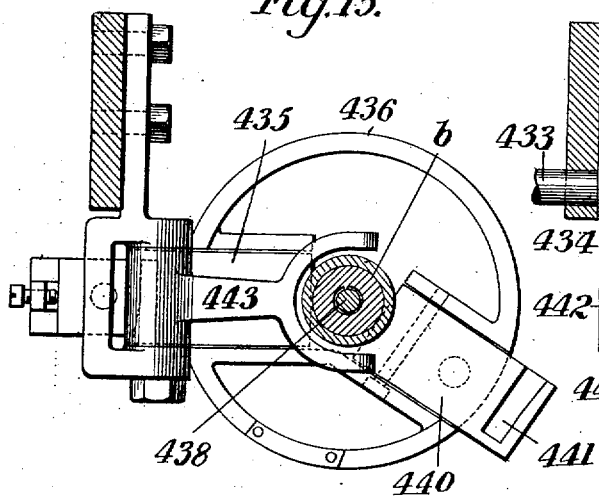
Figure 16:
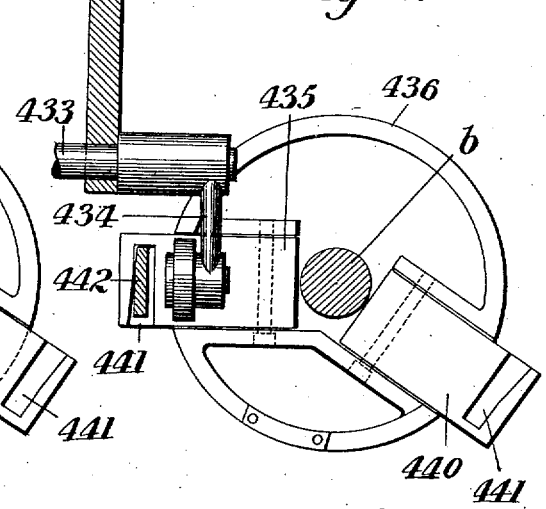
Figure 19:
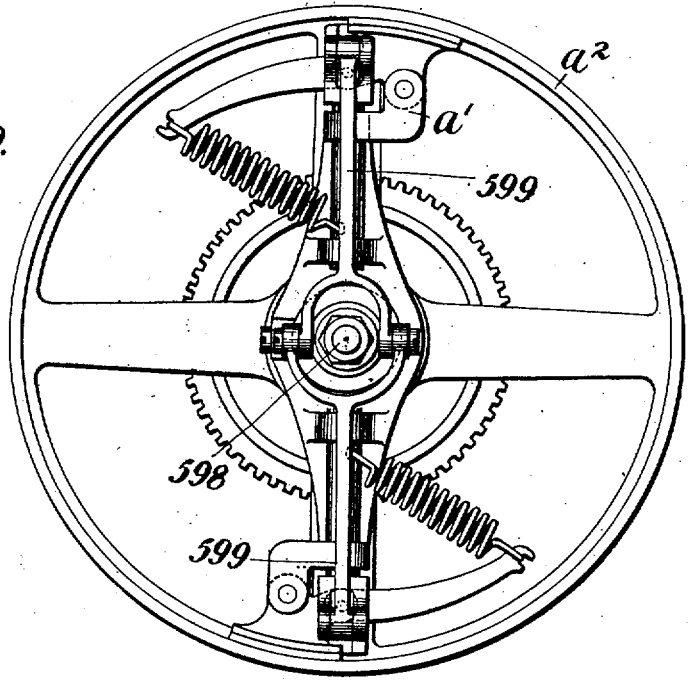
Figure 20:
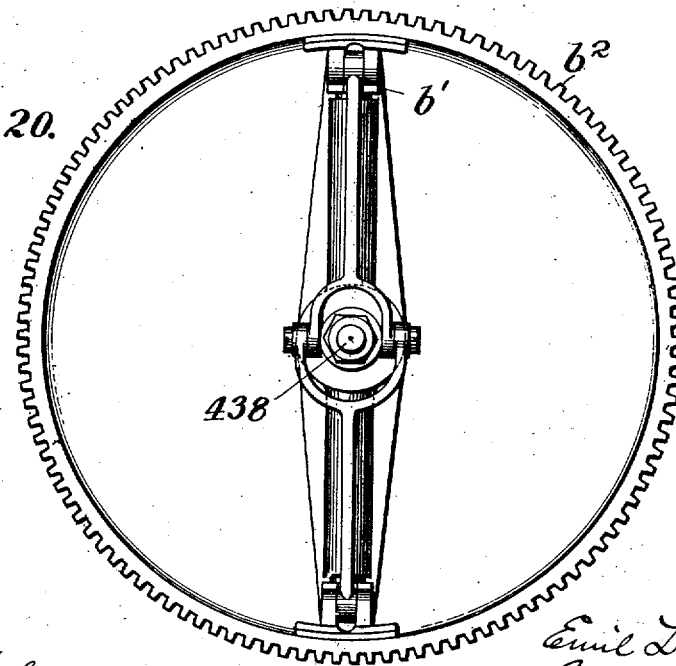
Figure 113:
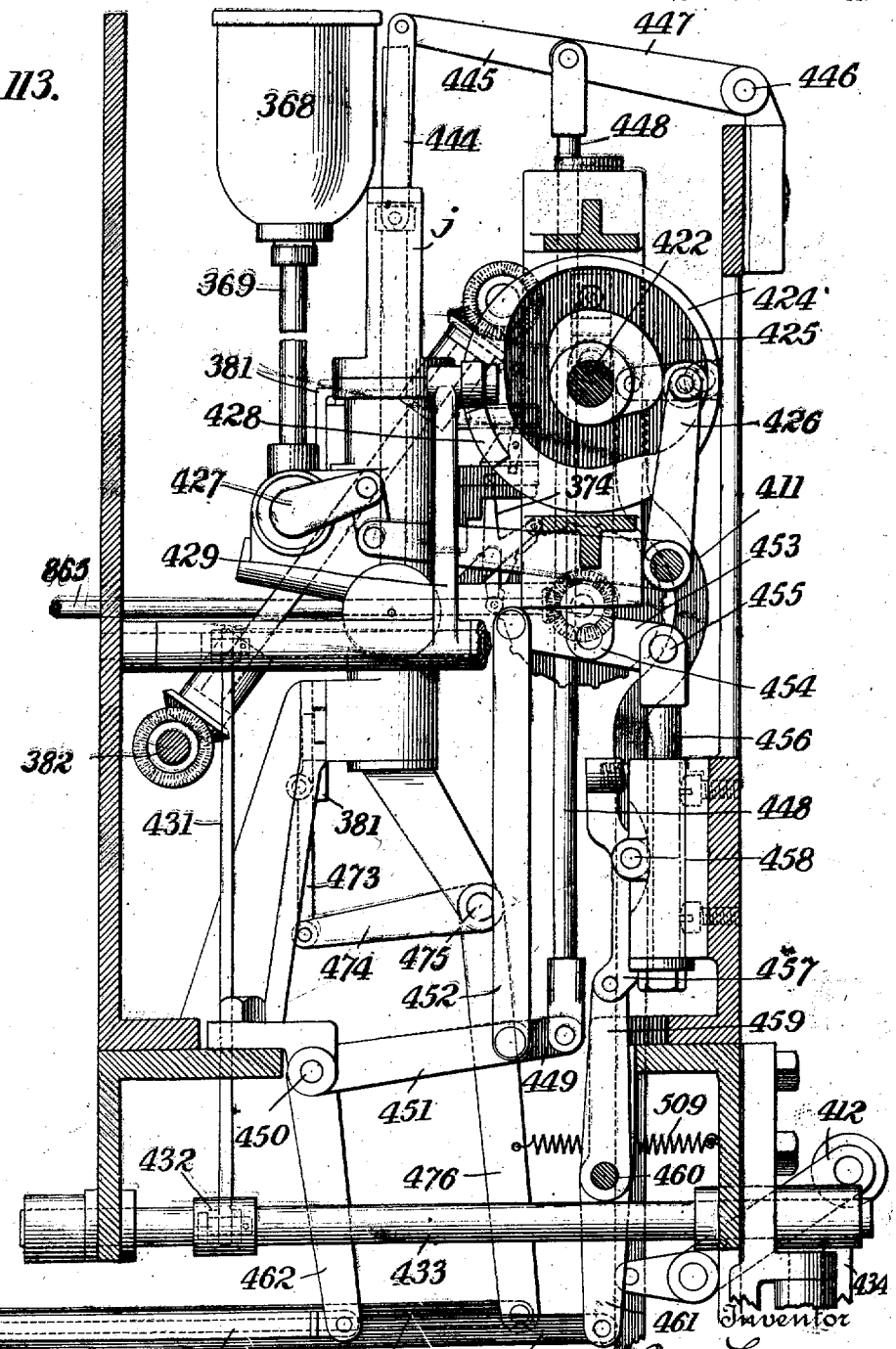

In the following specification the machine and the several parts thereof will be referred to, for convenience, as viewed from the front; the right and left ends of the machine being understood to be the ends to the right and left of an observer standing in front of and facing the machine. With this understanding the several views of the accompanying drawings may be described as follows:

Figures 1, 2, 3 and 4 are respectively front, right, rear and left elevations of the entire machine; Fig. 5 is a plan view of the upper part of the machine; Fig. 6 is a plan view of the lower part of the machine; Fig. 7 is a front elevation of three of the cam shafts; Fig. 8 is a detail of a portion of the cam levers; Fig. 9 is an end elevation of the main cam shafts; Fig. 10 is an enlarged sectional plan view of the lower right end of the machine illustrating the main driving mechanism and cam shafts; Fig. 11 is an enlargement of a portion of the right end elevation, parts being broken away; Figs. 12 and 13 are details of the mechanism for starting and stopping one of the cam shafts; Figs. 14, 15, 16 and 20, are details of the mechanism for starting and stopping another of the cam shafts; Figs. 17, 18 and 19 are details of the mechanism for starting and stopping the main shaft; Fig. 21 is a plan view of the font separating mechanism, being an enlargement of a portion of Fig. 5; Fig. 22 is a similar plan view partly in section; Fig. 23 is a front elevation of the font separating mechanism; Fig. 24 is a section on the line 24 of Fig. 21; Fig. 25 is a section on the line 25 of Fig. 21 as seen from the rear; Fig. 26 is a left end elevation of the font separating mechanism; Figs. 27 and 28 are details of the font separator; Figs. 29 and 30 illustrate the mechanism for feeding matrices to the font separator; Fig. 31 is a section on the lines 31 of Figs. 29 and 30; Figs. 32 to 36 inclusive, are details of the mechanism shown in Figs. 29 to 31 inclusive; Fig. 37 is a section on the line 37 of Fig. 21; Figs. 38 to 41 inclusive illustrate the operation of separating individual matrices from a line thereof in the font separator; Fig. 42 is a perspective view of the abutment for the line of matrices; Fig. 43 is a sectional plan view of the means for testing the matrices in the font separator; Fig. 44 is a section on the line 44 of Fig. 43; Figs. 45, 46, 47 and 48 illustrate the operation of testing the matrices to effect separation into fonts or groups; Figs. 49, 50 and 51 are sections, respectively, on the lines 49, 50 and 51 of Fig. 45; Figs. 52 and 53 are perspective views of portions of the intermediate matrix guides and the testing slides, respectively; Fig. 54 is an enlarged plan view illustrating the mechanism for circulating the matrix carriers in the matrix distributer; Fig. 55 is a similar view with the carriers and feeler bars removed; Fig. 56 is a section on the line 56 of Fig. 55; Fig. 57 is a front elevation of the distributer mechanism, showing the magazine partly broken away; Fig 57ª is a detail of the lock for the feeler bars; Fig. 58 is a section on the line 58 of Fig. 54; Figs. 59 and 60 are details of the feeler bar and its locking device in perspective; Figs. 61 to 65 inclusive, are details of the mechanism for automatically stopping the distributer when it is obstructed; Figs. 66, 67 and 68 are top, bottom and side views, respectively, of one of the matrix carriers; Figs. 69 and 70 are sections respectively on the lines 69 and 70 of Fig. 66; Figs. 71 and 72 are plan views illustrating the operation of shifting the matrix carriers from front to rear at the right end of the distributer; Figs. 73 and 74 are detail plan views illustrating in part the shifting of the matrix carriers at the left end of the distributers; Figs. 75, 76 and 77 are perspective views of parts of the carrier shifting devices illustrated in Figs. 71 and 73; Fig. 78 is a section from front to rear through one of the carriers, the feeler bars above the carriers, and the throat bars below the carriers; Figs. 79 and 80 are sections similar to a portion of Fig. 78 illustrating the operation of the distributer; Figs. 81, 82 and 83 are plan and sectional views of the means for clearing the matrix carriers of any matrices which have not been discharged in passing through the distributer and the means for resetting the matrix supports in the matrix carriers; Fig. 84 is a front elevation of the magazine and assembling funnel; Fig. 85 is a sectional view about on the line 85, Fig. 84; Fig. 86 is a sectional elevation on the line 86, Fig. 84; Fig. 87 is a front elevation of one of the magazines partly in section; Fig. 88 is a left end elevation of the same; Fig. 89 is a section on the line 89 of Fig. 87; Fig. 90 is a front elevation in section of the left end of a magazine and the adjacent frame; Fig. 91 is a plan view of a portion of the escapement bars; Fig. 92 is a perspective view of one of the escapement bars; Fig. 93 is an elevation of the magazine locking devices and the font and case shifting devices, substantially as seen from the line 93 of Fig. 90; Fig. 94 is a plan view of the magazine locking bar shown in Fig. 93; Fig. 95 is a detail of the same; Fig. 96 is a right elevation of the cam mechanism for shifting from one case to another; Fig. 97 is a right elevation of the key-board and means for operating the escapements; Figs. 98 and 99 are details of the cam mechanism for operating the escapements; Fig. 100 is a plan view partly in section of the assembling mechanism, the transferring mechanism, and the presentation slide; Fig. 101 is an enlarged plan view of the matrix assembler; Fig. 102 is a front elevation of the same, partly in section; Figs. 103, 104 and 105 are details of a portion of the justifying mechanism; Fig. 106 is a left elevation of the separator escapement or feed mechanism; Figs. 107 and 109 are views illustrating the operation of the separator feed mechanism; Fig. 108 is a section on the line 108 of Fig. 107; Figs. 110 and 111 are sections on the lines 110 and 111 of Fig. 109; Fig. 112 is a plan view of the justifying mechanism looking from the rear of the machine; Fig. 113 is a sectional elevation of the justifying mechanism as viewed from the line 113, Fig. 112; Fig. 114 is a partial rear elevation of the justifying mechanism; Fig. 115 is an elevation of the justifying mechanism as viewed from the line 115, Fig. 112; Fig. 116 is a left end elevation of the justifying mechanism; Figs. 117 to 122 inclusive, are details of the registering devices of the justifying mechanism; Fig. 123 is a plan view partly in section of the justifier pistons and their selecting cam wheels; Fig. 124 is a plan view of one of the cam levers and its cam wheel; Fig. 125 is a sectional view of the justifier pump; Figs. 126, 127 and 128 are details of the devices for connecting the justifier pistons to a common head or slide; Figs. 129 and 130 illustrate in sectional views the means for connecting and disconnecting a justifier piston with the head or slide which is common to the several pistons; Figs. 131 to 136 inclusive, are detail views of the several justifier registering cams; Fig. 137 is a detail of part of Fig. 130; Figs. 138 and 139 illustrate the means for starting the machine, including the justifier, by means of the "starting lever"; Fig. 140 is a plan view of the lower front part of the machine showing the assembler, the transferring mechanism, the presentation slide, the galley operating mechanism, etc.; Fig. 140$^a$ is a plan view of the line forwarder detached; Fig. 140$^b$ is a plan view of the line preceder detached; Fig. 140$^c$ is a sectional view of part of the line preceder; Fig. 141 is a front elevation of the parts shown in Fig. 140; Fig. 141$^a$ is a perspective view of certain parts shown in Fig. 146; Fig. 141$^b$ is a plan and 141$^c$ an end view of the upper part of the assembling channel; Fig. 141$^d$ is a section on line 141$^d$ of Fig. 140; Fig. 141$^e$ is a detail of a hand lever; Fig. 142 is a rear elevation of the presentation slide; Fig. 142$^a$ is an enlargement of a portion of Fig. 142; Fig. 143 is a perspective view of the devices for starting the movements of the presentation slide and the casting mechanism; Figs. 144 and 145 illustrate the devices for moving the line forwarder; Fig. 146 is an enlarged plan view of parts adjacent to the presentation slide and casting mechanism; Fig. 147 is a vertical right and left section through the mold and mold setting devices, the presentation slide being shown partly in front elevation and partly broken away; Fig. 148 is a plan view of the mold and its coöperating devices; Fig. 148$^a$ is a perspective view of the right matrix clamping jaw and its connections; Fig. 148$^b$ is a plan view of part of the mechanism shown in Fig. 148$^a$; Figs. 149 and 150 are sections respectively on the lines 149, 150 of Fig. 148; Fig. 151 is a right elevation of some of the parts shown in Fig. 148; Fig. 152 is a section on the line 152 of Fig. 148; Fig. 153 is a side view of the justifier slide detached; Fig. 154 is a section on the line 154 of Fig. 152; Fig. 155 is a section on the line 155 of Fig. 147; Fig. 155$^a$ is an enlargement of part of Fig. 155; Fig. 155$^b$ is a plan view of part of the fixed knife; Fig. 156 is a section on the line 156 of Fig. 148; Fig. 157 is a section on the line 157 of Fig. 158; Fig. 158 is a section on the line 158 of Fig. 157; Fig. 159 is a vertical front to rear section through the presentation slide and casting mechanism; Fig. 160 is a section on the line 160 of Fig. 161; Fig. 161 is a plan view of the melting pot and pump mechanism; Fig. 162 is a plan view of a portion of the galley and adjacent mechanism. Figs. 163, 164 and 165 are sections on the lines 163, 164 and 165, respectively, of Fig. 162; Fig. 166 is a section on the line 166 of Fig. 163; Fig. 167 is a detail of a clamp shown in Figs. 163 and 166; Figs. 168 and 169 are side and front views of the cams for operating the galley assembling slides; Fig. 170 is a front view showing the elevator at the lower elevator station; Fig. 171 is a section on the line 171 of Fig. 170; Fig. 172 is a section on the line 172 of Fig. 171; Fig. 173 is a section on the line 173 of Fig. 172; Fig. 174 is a perspective view showing the means for operating the ejecting rod which transfers the matrices from the presentation slide to the lower elevator station; Figs. 175 and 176 are left end and plan views respectively, of the mechanism for operating, loading and discharging the elevator; Fig. 177 is a sectional detail of part of Fig. 175; Fig. 178 illustrates the means for operating the elevator; Fig. 179 is a detail of the spring link for the elevator; Fig. 180 shows the elevator in position to discharge matrices at the upper station; Fig. 181 is a sectional view illustrating the operation of the means for discharging the matrices at the upper station; Fig. 182 illustrates a justified line of logotypes without a correcting space or "final" justification; Fig. 183 illustrates the method of effecting "final" justification by adding a "correcting space" to the last logotype; Fig. 184 illustrates the method of effecting final justification by decreasing or subtracting from one of the regular justifying spaces.

The machine illustrated in the accompanying drawings is one of that class in which the matrices are circulated from a magazine through the assembling and casting mechanism and back into the magazine.

The description of the construction and operation of the machine might be logically begun at any one of several points in the travel of the matrices, and in the following description we assume for a starting point the mechanism which separates the word groups or lines of matrices, that come from the mold, into individual matrices and classifies them into fonts or other suitable groups for distribution into the magazines. The description will then follow the course of the matrices from the font separator into the magazines and thence through the assembling, transferring, justifying and casting mechanisms to the elevator which carries the matrices from the casting mechanism back to the font separator.

*Font distributer.*—Referring to Figs. 5, 175, 176 and 181, 1 indicates a pusher carried by a slide 2 and operated periodically to transfer matrices from the elevator to the distributing mechanism, by means of lever 3, cam lever 4 and connecting links, the cam lever being operated by cam 5 on shaft 6. The pusher 1 has a yielding connection with the slide 2 by reason of the spring 7. The matrices are discharged from the elevator at its upper station into a channel 8 (Figs. 21, 22 and 26) and carried into said channel beyond a pair of spring pawls 9, which prevent them from returning. From this point the matrices are carried forward to the separating mechanism by a second pair of spring pawls 10, (Figs. 21 and 37) carried by a slide 11. The slide 11 is connected with the rack 12, which is driven by a sector gear 13 (Figs. 29 to 35 inclusive), and the gear 13 is connected by a spiral spring 14 with a second sector gear 15. The gear 15 carries a pin 16, which, in a certain relative position of the two gears, engages gear 13 and turns the same positively. The gear 15 is in mesh with a rack 17 which slides in guides parallel with run-way or channel 8. The rack 17 is normally drawn to the left by a spring 18.

Each time the slide 2 is operated a second pusher 19 (Fig. 181) connected with the slide engages the end of a rack 17, and moves it to the right until it is caught and retained by the pawl 20 (Fig. 29), in which position the spring 18 is under tension to move the rack to the left (Figs. 21 to 36 inclusive). This movement of the rack 17 also places the spring 14 under tension to move the rack 12 to the left, should the rack 12 be held for the moment by the fixed and movable jaws or brake, to be presently described. The rod 21 connected to slide 11 and rack 12 is alternately gripped and released between a fixed jaw 22 and a movable jaw 23, the movable jaw being operated by toggle levers 24, spring link 25, elbow lever 26, and cam 27 on cam shaft 28, Fig. 21.

If, while the spring 18 is under tension, as indicated in Fig. 29, the rod 21 be released, the slide 11 and the pawls 10 will be drawn back quickly by reason of the tension of the coiled spring 14. The pawls 10 are thus drawn to the left to engage a new line or group of matrices in the channel 8. As the slide 11 reaches the position shown in Fig. 30, the shoulder or projection 29 strikes the trip lever 30 which is connected by a link 31 with the tail of the pawl 20 and the pawl is thus thrown out of engagement with the rack 17. The spring 18 immediately comes into action and through the connections described it rotates the gear 13, moving the rack 12 and pawls 10 yieldingly to the right. The matrices are thus fed yieldingly to the separating mechanism. During the rearward movement of the pawls 10 the matrices in the channel 8 are prevented from moving rearward by the pawls 9.

Referring to Figs. 22 and 37 to 42 inclusive, 32 indicates the sliding pusher which removes the matrices one at a time from the line of matrices in the channel 8 and feeds them to the selective devices on the font separator. Opposed to the forward movement of the matrices in the channel 8 is an abutment 33 carried by a slide 34. This slide is given a slight movement by means of a spring link 35 connecting it to a cam lever 36 operated by a cam wheel 37. The spring link 35 consists of two parts having a pin-and-slot connection 38 which permits them to move relatively to a slight degree. The pusher 32 is periodically moved by means of link 39, (Fig. 21), cam lever 40 and cam 41, the cams 37 and 41 being on the shaft 28.

On the front side of the channel 8 is a pivoted finger 42 which is continually pressed toward the channel by a spring 43 (Fig. 22), the free end of the finger being substantially in line with the left face of the pusher 32. The operation of the pusher and its coöperating parts is as follows:—

The matrices m are pushed forward intermittingly as the clamps release the rod 21. As the foremost matrix reaches the end of the channel 8, it encounters the stop 33 which is in its left position as shown in Fig. 38. The stop 33 then recedes by reason of the conformation of its cam and the pusher 32 simultaneously moves forward, entering between the upper and lower faces of the stop 33, as indicated in Figs. 37 and 40. The foremost matrix is thus pushed out of the line against the spring finger 42. When the foremost matrix has moved a distance to the right corresponding to its thickness, the finger 42 snaps off of it and serves to hold the remaining matrices in line, as shown in Fig. 41. It will thus be seen that the foremost matrix takes a diagonal course in leaving the channel 8, being moved simultaneously to the right and front. As soon as a matrix has cleared the stop 33, the latter is again moved forward positively by the cam 37 until it reaches a position in line with the inner or left face of the pusher 32, as shown in Fig. 38. This completes the operation of removing a matrix from the channel. Referring to Figs. 37 and 42, it will be seen that the stop 33 has upper and lower faces between which the pusher 32 operates and that it has also a projecting lip 44 to prevent matrices from rising as they are delivered by the pusher. After the individual matrices are delivered by the pusher 32 they are successively presented to a series of testing devices which select the matrices of the several fonts or groups and deliver them at different points to the distributing mechanism.

Referring to Figs. 22 to 25 inclusive, and Figs. 43 to 53 inclusive, 45 indicates a series of testing slides, each slide being connected by a spring link 46 with an arm 47 on the rock shaft 48, which shaft is rocked by cam lever 49 and cam 50 on shaft 28. The slides 45 have at their forward ends projections 51 and 52 which embrace the matrices and hold them on edge. These slides move to the right periodically and shift the matrices which they contain against certain teeth or feelers 53. If the notches in a matrix correspond with the teeth, the matrix passes the teeth and drops into a channel 54, as indicated in Fig. 50. If, however, the matrix does not correspond with the feelers 53 its path is obstructed by the teeth, the spring link 46 permitting the matrix to rest until the return movement of the testing slides 45.

Means are provided for moving the matrix step by step to the successive testing slides. As shown, this is accomplished by means of a bar 55, (Figs. 22, 27, 45 and 48) having recesses 56 for engaging the matrices. The bar 55 has a longitudinal movement imparted to it by means of a link 57, cam lever 58 and cam 59. A matrix in passing through the testing mechanism is drawn back by the first testing slide into one of the notches 56. If it does not drop into the corresponding tube 54 it is carried forward by the slide 55 into the next testing slide. It is then moved to the left out of the notch 56 in slide 55, and said slide is then moved rearward to its initial position. In this manner the matrices are carried step by step to the successive testing slides until they reach their proper channels 54.

Fig. 45 shows a matrix stopped by the teeth 53 and another dropping into a channel 54; Fig. 46 shows a matrix after being tested and in position to be moved by the slide 55; Fig. 47 shows the position of the slide 55 after removing the matrix to the next testing slide; and Fig. 48 shows the matrix in its left hand position, the slide 55 being free to return to the position shown in Fig. 46, and a new matrix coming into the first testing slide. Beneath the slide 55 is a notched plate 60 having a lateral movement coinciding with that of the testing slides 45 or substantially so. The plate 60 is shown in detail in Fig. 28 and in operation in Figs. 45 to 51 inclusive. As the matrix enters the testing slide the forward edge 61 of the plate 60 stands substantially in line with the face of the projection 51 and prevents the matrix from tipping over. It is especially useful for preventing the tipping of thin matrices which might otherwise tilt when moved to the left on account of the space between the projection 51 and the surface 62 upon which the matrices slide. As the testing slides move to the right the slide 60 retreats also until it clears the chutes 54. The slide 60 is operated by a connection 63, spring link 64, lever 65 and cam 66, on shaft 28 Figs. 23 and 24.

The inner face of the jaw or projection 52 of each of the slides 45 is preferably provided with a groove or slot 67 in which the edge of the slide 55 travels while transferring each matrix from one testing slide to another. The edge of the transfer slide 55 also travels in a groove 68 in the depending edge of the cover 69, which is fitted over the testing slides. The object of the grooves 67 and 68 is to prevent the matrices from becoming caught or jammed between the slide 55 and the testing slides and cover.

The operation of the font separator, is, briefly, as follows: The groups of matrices which are raised by the elevator from the casting mechanism are transferred to the channel 8 and moved into said channel until they pass the pawls 9. The pawls 10 then engage them and move them forward against the abutment 33. The movement of the pawls 10 is controlled by the spring 18 and the brake 22, 23, the spring urging the pawls to the right while the brake intermittingly interrupts their movement. The pusher 32 picks off a matrix from the forward end of the line in the channel 8 at each reciprocation and transfers it to the first testing slide. During this operation of separating a matrix from the line the pressure upon the line is relieved by the brake 22, 23. The testing slide then moves to the right and presents the matrix to the first combination of teeth 53. If these teeth do not agree with the notches in the matrix, the matrix is carried by the transfer slide 55 to the next testing slide which presents it to the second combination of teeth 53. When a matrix reaches a combination of teeth corresponding to its notches, it passes over the teeth and drops in the corresponding channel 54. Matrices which do not correspond to any combination of teeth in the machine are dropped into a pi box, 71, Figs. 1 and 4.

*The distributer.*—The matrices are separated into groups or fonts by means of notches in one edge and these groups are then distributed into the individual channels of the magazine or magazines by means of notches in another edge, the two sets of notches being preferably located in opposite edges. The matrices drop through the tubes 54 into cells in matrix carriers 71, which travel over the magazines and carry the matrices to their respective magazine channels.

The construction and operation of the matrix carriers is broadly the same as described in Patent No. 794,628, but in detail the present invention comprises a number of improvements which will be presently pointed out. One of the carriers is illustrated in plan and side elevation in Figs. 66, 67 and 68, and the details of its operating parts are shown in Figs. 69, 70, 78, 79 and 80. Each carrier is rectangular and comprises a series of cells 72 into which the matrices are dropped from the tubes 54. At each end of each cell is a pawl 73 pivoted at 74, and having at its lower end an inwardly projecting toe adapted to enter the lower part of the cell to support one end of the matrix. By arranging the pawls to enter the lower parts of the cells the carriers may be made of a minimum depth and the matrices are quickly discharged therefrom, having a minimum distance to fall. The pawls are normally pressed away from the cells by springs 75 and the toes are retained in position to intercept the matrices by means of sliding pins 76, having projections 77, which abut against the rear sides of the pawls, as shown in Fig. 69. The pins 77 are normally raised by springs 78 and they project above the carriers into position to be operated upon by the feeler-bars to be hereinafter described.

The ribs or partitions between the rows of cells in the carriers are provided at their lower edges with rack teeth 79 which engage pinions 80, having step by step movements. There are four sets of these pinions, two at each end of the magazine, as illustrated in Figs. 55 and 56. The shaft 81 carrying one set of pinions is driven by a ratchet and pawl mechanism 82 similar to that shown in the prior patent and shown herein in Fig. 57. Its mechanism is driven by a spring link 83, cam lever 84 and cam 85, on shaft 86. The shaft 81 (Figs. 55 and 81) is connected by bevel gears with shaft 87, which shaft in turn drives the shafts 88, 89 and 90. The shafts 81 and 88 turn in the same direction and move the carriers to the right, while the shafts 89 and 90 move the carriers to the left.

At the right end of the magazine the carriers are transferred to the rear, and at the left end they are again transferred to the front, being thus continuously circulated. Referring to the right hand transfer mechanism, a pusher 91 engages the carrier after it is freed from gears of shaft 88 and moves it toward the rear (Figs. 55, 71 and 72). When it is moved about one-half the distance from front to rear it is engaged by a second pusher 92 which carries it to its rearmost position. Referring to Figs. 54 to 56 inclusive and 71 to 77 inclusive, it will be seen that the pusher 91 is carried by the slide 93 which is reciprocated by cam lever 94 and cam 95. The pusher 92 is pivoted to a slide 96 which is operated by an arm or lever 97 connected to the cam lever 94 by gears 98. The pusher 91 is arranged at a slightly higher elevation than the pusher 92, so as to pass over the latter.

The means for transferring the carriers from rear to front at the left of the magazine are similar to the means above described. The slides at the left of the magazine are operated by arms 99 and 100 (Fig. 55), which arms are rocked by means of gears 101, lever 102, links 103ᵃ and rod 103, connecting said lever with an arm 104 which is connected with the arm 97. It will thus be seen that all of the pushers are operated from the cam 95.

After the carriers are transferred from front to rear and vice versa, they are engaged with their driving gears by means of pushers 105 and 106 (Fig. 54). Pusher 105 is operated by gearing 107, lever 108 and cam 109 which is on the shaft 110 carrying the cam 95. The pusher 106 is operated from the gearing 107 through racks 111, 112 and 113 (Fig. 54). To facilitate the engagement of the carriers with their gears, the pushers 105 and 106 are provided with cushioned faces which are shown as springs 114. A shaft 115 in the rear of the distributer is operated by a pulley 116, and from this shaft motion is communicated through suitable gearing to the shafts 28, 86 and 110, hereinbefore mentioned.

Arranged over the magazine M and above the carriers is a feeler-frame 117 (Figs. 54 and 56) carrying a series of feeler bars 118. The frame 117 is pivotally connected at four points 119 to levers 120 which are pivoted to the frame of the machine at 121 (Figs. 54 and 58). These levers 120 are rocked slightly by cams 122 on shaft 115, giving the feeler-bars a slight vertical movement. The feeler bars and their operation are illustrated in Figs. 78, 79 and 80. Each of the feeler bars is provided with a series of T-shaped slides 123, each of said slides having a pin and slot connection 124 with a bar, which permits it to have a slight relative vertical movement. The T-slides are normally pressed down by springs 125. At its lower end each T-slide carries a combination of teeth 126 corresponding to the notches in the matrices which belong in the magazine channel directly below the slide.

It will be understood that there is a T-slide arranged above each magazine tube or channel and that the carriers move between the feeler bars and the magazine, and have a step by step movement, the steps being equal to the distance from one magazine channel to the next. As the carriers come to rest after each step, the feeler bars descend and then rise. If the feeler bar combination 126 does not correspond to the notches in the matrix, which is the case in the example shown in Fig. 79, the T-slide rests on the matrix, compressing the springs 125, and the arms of the T-slide are prevented from striking the matrix release slides or pins 76. On the other hand if the feeler combination 126 corresponds to the matrix presented, the teeth will enter the notches in the matrix, permitting the T-slide to descend upon the release pins 76 and push them down. As soon as these pins are depressed, the matrix sustaining pawls 73 fly back and release the matrix which drops into the magazine, as illustrated in Fig. 80. It will be noted that the matrices rest upon the lower ends of the pawls 73, which permits them to drop from the carriers quickly, rendering the present machine more rapid than the patented machine.

The feeler bars 118 are removably locked in the frame 117 by means of a locking rod 127, (Figs. 57, 57ᵃ, 59 and 60). The rod 127 is cut away at points opposite the ends of the feeler bars, and in one position it permits the bars to be inserted or removed, while in another position it engages shoulders 128 on the ends of the bars and locks the bars in position. As shown, the locking rod is rocked by means of a connecting link 129 and handle 130, Fig. 57.

In case any matrices are carried past their proper magazine tubes through failure of the feeler bars to operate properly, it is necessary to discharge them from the carriers before the latter reach the point at which they are supplied with fresh matrices. To accomplish this a bar 131 carrying a series of strikers 132 (Figs. 54 and 82) is connected to the left end of the feeler bar frame 117. These strikers 132 depress the release pins 76 and open the pawls 73 of every carrier pocket which has not been opened by the feeler bars, as the carriers pass bar 131. Any matrices remaining in the carriers are thus discharged through chutes 133 into a pi box.

Following the opening of the release pawls by the strikers 132, it is necessary to close them for the reception of any matrices. This is accomplished by means of a series of beveled pins 134' carried by a bar 135 (Figs. 81, 82 and 83). The pins 134 are supported on springs 136, which permit them to yield in case their path is obstructed. The pins engage the beveled faces 137 (Fig. 69) of the matrix sustaining pawls and press the pawls into the cells of the carriers, in which positions they are retained by the pins 76. The bar 135 is reciprocated vertically by means of a cam lever 138 and cam 139 on shaft 86, Fig. 82.

The strikers 132 and the resetting bar 135 operate upon the rearmost cells in the carriers after the latter are free from the gears 80. In order to insure a uniform step by step movement of the carriers after they are free from the gears and while they are subjected to the striker and the resetting devices, a restraining device is used. As shown in Figs. 54, 73 and 74, this restraining device comprises a slide 140 arranged on a guide-way 141, which is inclined to the path of the carriers. The slide 140 is drawn to the right by the spring 142 and it carries a roller 143 which stands normally in the path of the carriers. Just before the carrier is released from the gears 80 it encounters the roller 143. It is then pushed forward by the succeeding carrier and prevented from overmotion by the restraining device 140. As the carrier proceeds, the restraining device gradually moves out of its path, as illustrated in Fig. 74, and after the last set of retaining pawls in the carrier have been restored, the carrier is free from the restraining device, which has moved out of the path of the carrier, and is temporarily sustained by the left pusher 91, as shown in Fig. 74.

The carriers move on a platform comprising a series of stationary rails 144, (Figs. 55, 56 and 78). Between and below these rails are a series of throat bars 145, each of which comprises two side plates and a series of partitions dividing the space within the bars into a series of throats 146, through which the matrices pass from the carriers to the magazine. The throat bars 145 are supported on rollers 147 and are free to move to a slight extent longitudinally (Figs. 56, 64 and 65). A bar 148 extending from front to rear at the right ends of the throat bars is normally pressed to the rear by a spring 149. The throat bars are arranged in pairs and the throat bars above the rear half of the magazine are connected with bar 148 by elbow levers 150, while the throat bars above the forward half of the magazine are connected with bar 148 by elbow levers 151. The levers 150 pull the throat bars toward the bar 148, while the levers 151 push the throat bars to which they are connected away from bar 148 under the pressure of spring 149.

The object of making the matrix throat bars movable is to prevent injury to the throat bars and the carriers should a matrix stick in passing from a carrier into one of the throats; and also to provide means for stopping the distributing mechanism immediately in such a case. The stoppage of the distributing mechanism is effected as follows: The bar 148 is pulled or pushed forward whenever a matrix sticks in entering one of the throat bars. Bar 148 is connected with an arm 152 (Figs. 61 to 65 inclusive) on a rock shaft 153 which carries a stop arm 154. Adjacent to the shaft 153 is a rocker 155 carrying a roll 156 which is constantly urged toward shaft 115 by a spring 157. On shaft 115 is a sliding sleeve 158 (Figs. 61 to 65) having a cam 159, which is adapted to engage the roll 156. Sleeve 158 is connected by a pin 160 with a rod 161 adapted to slide in the central opening in the shaft 115 and normally pressed toward the end of the shaft upon which the drive pulley 116 is mounted by a spring 162. The outer end of the rod 161 is wedge shaped and it normally presses outward two radial rods 163, carrying friction shoes 164 adapted to engage a flange on the pulley 116.

Springs 165 tend to press the shoes inward but these springs are normally overcome by the spring 162. The pulley 116 is therefore normally in engagement with the shoes 164, and these shoes are mounted on a disk 166 which is fast on the shaft 115.

The operation of the mechanism for stopping the distributing mechanism automatically is as follows: When a matrix sticks in one of the throat bars the latter is carried along for a short distance with the matrix carrier. This causes a forward movement of the bar 148 rocking the shaft 153 and withdrawing the stop arm 154 which holds the roll 156 out of engagement with the cam 159. The roll immediately springs into the path of the cam 159 and the cam and its sleeve 158 are thus moved to the left along the shaft 115 withdrawing the wedge 161 from between the shoes 164. The springs 165 then withdraw the shoes from the pulley 116 and the latter runs free, the shaft 115 stopping immediately.

In order to prevent any disarrangement of the distributing mechanism, should the belt or pulley 116 be turned backward, the rim 116$^a$ of the pulley is connected with the web by means of a series of spring pawls 167, Figs. 61 and 62. When it is desired to stop the distributing mechanism by hand, the clutch is released by pulling the rod 168, Fig. 65, which rod is connected to an elbow lever 169 which engages a pin 170 on the bar 148 and moves said bar forward. The rod 168 is operated by a suitable key or lever at the key-board.

*The magazines.*—The magazines M are arranged in two series $M^1$, $M^2$, one series for the upper case characters and the other for the lower case characters. As shown, there are four upper case magazines and four lower case magazines (Figs. 2, 4, and 84 to 94 inclusive). Each magazine comprises a frame consisting of two upper guide bars 171, two end pieces 172, and two lower bars 173. The magazine proper, which is removably inserted in the frame, comprises side plates 174 and partition plates 175, the partitions having lugs 176 which project through the side plates and are perforated to receive locking rods or wires 177. The magazines when in operative position are under the throat bars 145, the magazine channels being vertically in line with the throats 146.

Referring to Figs. 86, 87 and 89, a longitudinally arranged retaining bar 178 is provided for each magazine to normally retain the matrices in the magazine. As shown, the retaining bar is angular in section and is carried by two arms 179, which are pivotally connected to links 180 depending from cranks 181 upon the ends of a rock shaft 182. A fixed pin 183 extends through a slot 184 in each arm 179. In operation, when the links 180 are moved down, the bars 178 move down until stopped by the pins 183 and they then swing outward, pivoting on said pins. When links 180 are raised, the bars 178 first move inward under the matrices and then upward.

On the inner faces of the two end bars 172 are slides 185, which are normally held in their upper positions by springs 186. At the lower ends these slides are provided with hooks 187 which engage projections 188 upon the retaining bar arms 179. The hooks 187 therefore tend to normally engage and hold the retaining bars in their upper or matrix-retaining position. To positively lock the retaining bars in this position a pawl 189 is provided at one end of the magazine, which engages a notch in the bar 185. The bars 185 at opposite ends of the magazine are connected by means of a rock-shaft 190 and arms 191. When the magazine is placed in position in the machine, the pawl 189 is unlocked by means of a stationary pin 192, Fig. 90, which engages the tail of the pawl and throws the pawl out at the moment the magazine reaches its operative position. It will be understood that each of the magazines is removable in an endwise direction and is sustained in the magazine by rails 193, Figs. 2 and 93, with which the guide bars 171 engage.

On the inner or left end of each rock shaft 182 is a crank arm 194 carrying a roller 195, having a peripheral groove 196, Figs. 87 and 88. The rollers 195 engage a cam groove 197 in a sliding bar 198. This groove is straight with the exception of two depressions 199 and 200, one of these depressions being adapted to operate upon the rock shafts of the upper case magazines and the other upon the rock shafts of the lower case magazines. These cam depressions are spaced apart slightly less than the distance between corresponding upper and lower case magazines, and by shifting the slide 198 a slight distance, the upper case magazine is thrown out of operation and the corresponding lower case magazine is brought into operation, or vice versa. This operation is performed automatically under control of a "case key," which will be hereinafter described. The slide 198 also has an independent movement to bring the cams 199 and 200 into operation upon any desired pair of magazines, which will also be hereinafter described. Projecting from the slide 198 into each of the cam grooves 199 and 200 is a pin 201 adapted to enter the groove 196 in the roll 195 of the operative magazine to prevent the magazine from being withdrawn when unlocked. All of the magazines are normally locked in the machine by a locking bar 202, Figs. 90 to 95 inclusive, which has a series of projections 203 adapted to interlock with hooks 204 on the inner ends of the magazines. The bar 202 is normally held in position to lock the magazine by the spring 205, and it is pulled out when desired by means of a hand lever 206. The forward or outward movement of the bar is limited by means of a stop 207. (Figs. 93, 94 and 95.)

As previously explained the matrices in each magazine are normally locked within the magazine by means of the retaining bar 178 and the pawl 189, that is, they are so locked when the magazine is removed from the machine. When the magazine is placed in the machine the pawl 189 is withdrawn and the slides 185 are depressed to release the projections 188 on the retaining bar arms. The lowering of the slides 185 is accomplished by means of teeth or cams 208, Fig. 93, on the slide bar 202, which teeth engage rolls 209 on arms 210 of the shafts 190.

It is necessary that each of the magazines, excepting the one from which matrices are being withdrawn, should be locked to prevent matrices from being withdrawn when the escapement devices are operated, and it is also necessary that the matrices should be locked within the magazine when the latter is removed from the machine. By the means heretofore described, the magazines are necessarily locked to prevent the escape of matrices when they are in the machine as well as when they are withdrawn, with the exception of the single magazine from which matrices are being assembled. Thus when the magazines are out of the machine, the retaining bars are locked by the hooked slides 185 and the pawl 189, and when they are in the machine they are locked by means of the straight portion of the cam groove 197, with the exception of the magazine which is rendered operative by one of the cams 199, 200. To withdraw a magazine from the machine it is first necesasry to pull the locking slide 202 forward. Any magazine, excepting the operative magazine, may then be withdrawn, and the instant it is withdrawn its pawl 189 locks the retaining bar. The operative magazine cannot be withdrawn until its roll 195 is brought into the straight portion of the groove 197 on account of the pin 201 which engages the groove in the roll 195, as illustrated in Fig. 93. To remove an operative magazine the slide 198 must be shifted to bring its roll into the straight portion of the cam groove.

Referring to Figs. 11 and 93, the slide 198 is shifted to change from one pair of magazines to another by means of a link 211, arm 212, rock shaft 213, arm 214, link 215, elbow lever 216, link 217, elbow lever 218, link 219, arm 220 and hand-lever 221, the hand-lever being provided with a spring latch which engages the notched segment 222. The shifting lever 221 is arranged conveniently adjacent to the key-board. The bar 198 is given a slight independent movement to shift from upper to lower case by the following automatic means: On the rear end of link 215 is a cam 223 which engages a roll on one arm of lever 216. When the lever 216 is locked for any particular pair of magazines the bar 198 may be shifted to change from upper to lower case, or vice versa, by raising or lowering the cam 223. This is accomplished automatically from the "case key" by following means: The link 215 is connected by link 224, Figs. 11 and 96, with a link 225, which is connected to a small crank 226 on a shaft 227. The upper end of link 225 is steadied and guided by an arm 225ª loose on shaft 213. Referring particularly to Fig. 96, 228 indicates the rim of a pulley which is loose on shaft 227 and which is constantly rotated by gears connecting it with shaft $a$. Fixed upon the shaft 227 is a disk 229 to which are pivoted two clutch shoes 230 which are connected by a link 231, so that they move to and from the rim 228 simultaneously. The spring 232 tends constantly to throw the shoes into engagement with the rim, and they are normally withheld from the rim by a latch 233 on an arm of a three armed lever 234. Each of the pivoted shoes 230 is provided with a tail 235 having a hook which is adapted to be engaged by the latch 233. A second arm of the lever 234 carries a cam roll 236, which is adapted to engage a frictional surface 237 on the main shaft $a$. A spring 238 normally holds the latch 233 in position to engage the hooks 235, and the cam 236 has sufficient eccentricity to throw the latch out of engagement with hook 235 when the cam rotates. Cam 236 is normally held free from roll 237 by its pin 239 resting upon an arm 240, Figs. 11 and 96. Arm 240 is mounted on a shaft 241 carrying a second arm 242 which is connected by a link 243 with the "case key" 244. When the "case key" is depressed, the arm 240 is rocked rearward releasing the pin 239, and permitting the cam 236, which is unbalanced, to drop into engagement with the roll 237. The cam is thus quickly rotated, and the moment the latch 233 is withdrawn the shoes 230 spring out and engage the rim or pulley 228. The shaft 227 is thereby rotated and after making a half revolution the opposite hooked arm 235 is engaged with the latch, which, in the meantime, has been restored to its normal position by the spring 238. This half revolution of shaft 227, by means of the crank 226, shifts the cam 223, Fig. 11, and the bar 198, rendering one magazine inoperative and the corresponding magazine of the other case operative by reason of the cams 199 and 200. After each rotation of the cam 236 it comes to rest in the position shown in Fig. 96 upon the arm 240.

While shifting from one case to another it is desirable to have the levers of the key board locked so that a matrix cannot be released from the magazine. Referring to Figs. 96 and 97, 245 indicates a rock shaft carrying a universal bar 246, which is adapted for locking the key levers. Whenever the "case key" 244 is depressed, this universal bar is thrown into position to lock the key levers, and as soon as the shift from one case to another is accomplished, the key levers are automatically unlocked, as follows: On the rock shaft 245 is an arm 247. A spring 248 connected to arm 247 tends to move the locking bar 246 into position to lock the key rods 262 and hence the key levers. Arm 247 is normally latched against the tension of spring 248 by a latch 249. An elbow lever 250 has one arm connected with the link 243 and its other arm standing under the latch 249. When the "case key" 244 is depressed, latch 249 is raised and the spring 248 throws the bar 246 into position to lock the keys. As the shaft 227 rotates one of the cams 251 operating on roll 252 rocks a lever 253 to which the latch 249 is connected, and the latch is first moved forward by the spring 254 to reëngage the arm 247, and then moved rearward positively by cam 251 to restore the arm 247 and the locking bar 246 to their normal positions in which the keys are unlocked.

*Assembling mechanism.*—Referring to Figs. 86, 90, 91 and 92, 255 indicates one of the escapement bars having a series of matrix sustaining and releasing projections 256, and a series of openings 257 through which matrices are dropped when released from the magazine. Each escapement bar is common to all of the magazines and is adapted to release matrices from the corresponding channels of the several magazines. As shown in Fig. 86, the matrices are free from the retaining bar in the forward magazine and rest upon the forward projection 256, and the matrices in the other magazines are raised free of the projections 256 by their retaining bars so that the escapement bar is free to move. Each time the escapement bar is moved to the rear sufficiently to release a matrix, the matrix drops into the opening 256 and rests upon a stationary shelf 258, this operation being the same as described in Patent 794,628. When the escapement bar is moved forward, the matrix drops through a channel 259 into one of the branches of the funnel 260. The matrices rest upon their sides in the magazine, and it is preferable to have them delivered upon their ends to the assembling mechanism. It is therefore necessary to turn them a quarter revolution and to accomplish this a round shoulder 261 is provided in each branch of the funnel 260. The mechanism for reciprocating the escapement bars 255 in response to the operation of the keys of the key-board K is illustrated in Figs. 97, 98 and 99. This mechanism is substantially the same as shown in Patent 794,628 and a detailed description may therefore be omitted. An essential difference, however, is that the locking rod 246 engages the key-bars 262, with which the key levers 263 are interlocked, thus locking the key levers when shifting from one case to another, as heretofore described.

The funnel 260, instead of rocking about the axis at its lower end as in the former patent, is supported upon arc-shaped rails 264, Figs. 2, 4 and 84, the funnel having curved ribs 265, which travel in grooves in the inner faces of said rails. The funnel is shifted simultaneously with the operation of the font changing mechanism, and for this purpose it is connected by two links 266, (Figs. 11 and 86), with arms 266$^a$ upon rock shaft 266$^b$, one of which arms is connected by link 266$^c$ and elbow lever 267 with the link 217. This construction prevents canting or cramping of the funnel when moved on its guides. The funnel, therefore, always coöperates with the operative magazine which, as shown in Fig. 86, is the front magazine. The funnel does not move when shifting from upper to lower case, but is simply shifted in adjusting the machine from font to font.

Referring to Figs. 11, 84 and 85, it will be seen that the matrices drop upon inclined guides 268, 269 forming part of the funnel and leading to the funnel outlet 270. The guide 268 is steeper than the guide 269, and the matrices would, therefore, travel more rapidly on guide 268 if both guides were stationary, and they might become transposed in the line. To obviate this, belts 271 are provided for carrying the matrices more rapidly down the guide ways 269. The belts 271 run over idle pulleys 272 near the outlet 270, and they are driven by pulleys 273 at the upper right corners of the funnels. As shown in Fig. 85, the pulleys 273 are on shafts 274, connected by bevel gears 275 and driven by a gear 276. Gear 276 is driven by a gear on a shaft 278 which is driven by gear 279. In mesh with the gear 279 is a beveled gear 280 which slides upon and turns with a shaft 281. The shaft 278 is mounted in a box which is carried by the funnel and the gear 280 slides on shaft 281 and is always in mesh with gear 279. Shaft 281 has a bearing in a box 282 which is mounted on shaft 283 and it is driven by beveled gears 284, Fig. 11.

Referring to Fig. 11, a case indicator 285 is connected by link 286, lever 287 and link 288 with the crank 226 which is operated from the case key. The indicator 285 is arranged to show the words "Upper" and "Lower" through a sight opening in a small case 289.

From the funnel outlet 270 the matrices drop into an assembling chute 290, Figs. 101 and 102. At the lower end of chute 290 is a pusher 291 which has a four-motion movement imparted to it by the following mechanism: The pusher is connected with a slide 292 reciprocating in a guide sleeve 293. One end of the sleeve is carried by a lever 294 pivoted at 295 and the other end by lever 296 pivoted at 297. These levers are connected by a link 298. One arm of lever 294 engages a triangular cam groove 299 in cam wheel 300. The effect of this cam groove is to rock the lever 294 up and down three times during each rotation of the cam wheel and by the connections mentioned the sleeve 293 is moved bodily up and down but always maintained horizontal. The pusher slide 292 has a vertical sliding engagement with a block 301 carried by a lever 302 which has a roll 303 engaging the cam groove 299$^a$ in cam 309. The reciprocation of the pusher 291 horizontally is therefore timed with its movement vertically. The pusher is shown in its foremost and highest position in Fig. 102. From this point it moves down, then rearward, then upward and then forward, thus passing under and in behind any matrix which may have dropped through the tube 290 and moving the same forward against the line preceder 304.

The matrices drop upon a platform 305 which is slotted vertically, the slots forming the guides for the prongs of the pusher 291. As each matrix is pushed off of the platform 305 against the preceder, or the preceding matrix, it is moved down on to the assembling slide 306 by a packer 307 consisting of a slide which is moved vertically by a cam lever 308 operated on by cam projections 309$^a$ on the cam wheel 309. (Figs. 100 to 102 inclusive).

Referring to Figs. 101 and 102 the assembler cam 300 is fast on a shaft 849. A bevel gear 850 which is mounted to rotate freely on this shaft is provided with a clutch member adapted to engage with the sliding clutch member 851. The said sliding member is always in engagement with a collar 852 which is fixed on the shaft while it may be engaged or disengaged with the gear 850 by longitudinal movement on the shaft. The clutch member 851 is connected by means of a rod 853 sliding centrally in the shaft with a suitable handle 854. By means of this handle the assembling mechanism may be started and stopped. The gear 850 is driven by a gear 855 and a pulley 856.

Referring to Figs. 100 to 110 inclusive, the separators "s" which are used to separate the word groups of matrices in the assembled lines are stored upon a guide rail 310 which interlocks with the undercut notches 311 in the separators. This guide rail extends from the casting mechanism back to the assembling chute 290 and the separators are returned from the casting mechanism to the assembling point automatically, as will be hereinafter explained. To permit of inserting or removing separators by hand a gap 312 in rail 310, Fig. 100, is provided. The separators are moved to the right periodically by a pair of pawls 313 carried by a slide 314 which runs upon the separator supporting rail. Slide 314 is operated by a lever 315 which has a spring connection with an arm 316, said arm being connected by link 317 with a cam lever 318 which is operated by cam $b^3$ on cam-shaft $b$, Figs. 2, 6 and 10. Lever 315 and arm 316 have interposed between them a spring 319, Fig. 100 which presses the pawls 313 lightly to the right for the purpose of feeding the separators to the separator inserting mechanism. Spring 319 is normally placed under tension by the cam lever 318. The cam lever also periodically moves the arm 315 to the left to pick up the separators as they come from the casting mechanism and return them to the assembling point. The separator rail 310 may be termed the "separator magazine."

At the right end of the separator magazine is a slide 320 against which the separators abut, Figs. 106 to 111 inclusive. This slide has a recess 321 which is adapted to receive a separator but which stands normally out of line with the separator magazine and in line with the separator assembling chute 322, as shown in Fig. 109. When the space key of the key-board is operated, the slide 320 is drawn rearward to the position shown in Fig. 107, the foremost separator in the magazine then enters the recess 321 and the slide is then moved forward to the position shown in Fig. 109, the separator being discharged into the chute 322 and dropping down in front of the pusher 291. The object of using the slide 320 instead of discharging the separators directly into the chute 322 is to delay the arrival of the separators at the assembling point, as otherwise they might become transposed with the matrices, which have farther to drop and are less prompt in responding to the keys. The slide 320 is connected by a link 323 with a lever 324 which is geared to an arm 325, Fig. 106. Arm 325 is normally pressed rearward by a spring 326, holding the slide 320 in its forward position, as shown in Fig. 109. Connected with arm 325 is an arm 327 which engages a power-operated escapement rod 328, Figs. 97 and 106, said rod being operated in response to the space key 329. The space key is connected to one of the key bars 262 by link 330 and lever 331. The link 323, Fig. 106, is in the form of a hook which engages a pin 332 upon the separator feed slide 320. This hook is controlled by a hand lever 333 which permits of throwing the separator assembling mechanism out of operation. This permits of operating the space key without setting separators in the line, in order, for instance, to adjust or re-set the justifier, which is also set from the space key as will be hereinafter explained.

*Cam shafts.*—Referring to Figs. 2, 3, 7, 10, 14 and 17, there is a main driving pulley $a^1$ loose upon the main shaft $a$ and which may be connected to said shaft by a clutch $a^2$. The pinion on the shaft $a$ drives a gear $b^2$ loose upon shaft $b$ and which may be connected to the shaft $b$ by a clutch $b^1$. On the shaft $b$ are several cams which will be referred to hereinafter. A second cam shaft $d$ is driven by a pinion on the shaft $a$ which meshes with the gear $d^1$. A third cam shaft $c$ is driven by the gear $c^1$ in mesh with the gear $d^1$. A fourth cam shaft $e$ in line with shaft $c$ is driven by gear $e^1$ in mesh with gear $e^2$ which is loose on shaft $d$ and which is adapted to be connected with shaft $d$ by a clutch $e^3$, Fig. 12. These are the main cam shafts although there are several smaller cam shafts which are referred to elsewhere herein in connection with their related mechanisms.

*Line preceder.*—By the means just described, the matrices and separators may be assembled and formed into compact line upon the assembling slide 306 against the yielding pressure of the line preceder 304. Referring to Figs. 100 and 140-146 inclusive, the line preceder 304 is mounted to slide rearward and forward in a block 334, its movement being limited by a pin 335 which travels in a groove 334ᵃ in said block. The block 334 is carried by a slide 336 traveling in a longitudinal groove in the front face of a stationary rail 358. This slide has on its lower edge a rack in mesh with a spring operated pinion 337 which constantly tends to move the slide to the right. The preceder is moved to the left during the assembling of a line of matrices by the pressure of the matrices as they are assembled by the pusher 291, as shown by dotted lines in Fig. 110. The line gage 339, upon which the bell-ringing device 338 is mounted, co-operates with the justifier to determine the proper justification for each particular line, as will be hereinafter explained. This gage is adjustable upon the preceder slide by means of pawl 339ᵃ and rack 339ᵇ, Fig. 140ᶜ, to determine the length of line to be produced. To facilitate exact adjustment of the gage the rack 339ᵇ may be adjusted by means of screw 339ᶜ.

The assembling slide 306 upon which the lines of matrices are assembled is movable from front to rear slightly to carry the line into the path of the line follower and into register with the channel leading to the presentation slide. This rearward movement of the assembling slide is communicated from the starting lever 340, Fig. 2, which lever has an arm 341 connected by a link with an arm 342 on rock shaft 343, Figs. 2 and 151. The shaft 343 has an upwardly projecting arm 344 which engages an opening 345 in a rearward extension 306$^a$ of the assembling slide, Figs. 146 and 151. When the line is assembled the starting lever 340 is moved down and the assembling slide moved to the rear until it is caught and retained by a spring pawl 346 which engages a shoulder 347 in the slide, Fig. 146. On a bracket 348, Fig. 151, supported on the rear end of the slide 306 is a plate or cover 349, and on the forward edge of this plate is a pivotally mounted rail 350, Figs. 141$^b$, 141$^c$ and 151, which overlies and forms part of an assembling channel. The rail 350 is pivoted at 351 and may be raised to inspect or make corrections in the assembled line. At the rear of the rail 350 is a small slide 352 which is beveled at its forward right corner 353. This slide is spring pressed to the right against a stop 354. As each matrix is pushed forward by the assembling pusher 291, it forces the slide 352 to the left. The packer then pushes the matrix down on to the assembling slide and below slide 352, which springs to the right and prevents the matrix from rising. The forward edge of slide 352 projects over the matrix assembling channel and serves to hold the line of matrices down upon the assembling slide 306. A rib 306$^b$ on the slide 306 forms a guide for the rear lower corners of the matrices.

Referring to Figs. 100, 140, 141$^d$ and 146, 844 indicates a cam connected with the arm 315, previously referred to. Cam 844 operates a rocker 845 which is connected by a link 846 with a second rocker 847 having a depending arm carrying a pin 848. Pin 848 stands normally in line with an opening in the line preceder 304 and as the preceder reaches its left hand position, adjacent to the presentation slide, the pin 848 enters this opening. Immediately afterward the cam 844 operates, and through the connections mentioned, the pin 848 is moved forward freeing the line preceder from the line of matrices and permitting it to be returned to its right hand position by the spring pinion 337. The line preceder is thus returned into position to coöperate with the succeeding lines of matrices as they are assembled. The assembling slide 306 has an arm 306$^c$ (Figs. 100 and 146) which carries the line preceder to the rear along with the assembled line of matrices when the starting lever is operated.

*The line forwarder.*—The device which moves the assembled line of matrices from the assembler to the casting mechanism is termed the "Line forwarder". The line forwarder 355, Figs. 100 and 140$^a$, is carried on a slide 352 which travels in a slot 357 in the rear of the rail 358, Figs. 140$^a$ and 141$^c$. The line forwarder slide is moved to the right by link 359, lever 360, rock shaft 361, arm 362, link 363, cam lever 364 and cam $b^5$ on shaft $b$, Figs. 2, 3, 100, 140, 144 and 145, and to the left yieldingly by a spring 365 connected with the lever 364, Fig. 3.

*The justifier.*—The justifier in the present machine comprises a series of hydraulic cylinders and pistons whose areas may be made to represent the number of separators in the line, and a pump having a piston arranged to force fluid into the justifier cylinders. The amount of movement of the pump is made to depend upon the shortage of the line, and the resultant movement of the justifier pistons is in proportion to the shortage of the line divided by the number of separators, that is, in proportion to the justifying spaces required for the line.

Referring to Figs. 112–139 inclusive, $j^1$, $j^2$, $j^4$, $j^8$, $j^{16}$, indicate pistons having areas which are in the respective proportions of 1, 2, 4, 8, and 16. It will be seen that by combining $j^1$ with $j^2$ we have an area of 3, by combining $j^1$ with $j^4$ we have an area of 5, etc. The piston $j^1$ represents in the operation of the justifier a single separator in a line. If there are three separators the pistons $j^1$ and $j^2$ are used in combination, etc. In addition to the above pistons there is a working or pump piston $j$. The several pistons referred to are mounted in a block 366, Figs. 123, 130. The cylinders of the several justifier pistons and of the pump piston are connected by a passage 367, and this passage is also connected with a receptacle 368 by means of a passage 369 provided with a valve 370. The valve 370 is periodically operated to permit fluid to enter the justifier cylinders to compensate for expansion and contraction of the fluid and leakage.

The different combinations of justifier pistons for justifying different lines are effected by the following means: On a shaft 371 are a series of cam wheels $k^1$, $k^2$, $k^4$, $k^8$ and $k^{16}$, one for each of the justifier pistons. Each cam wheel has two sets of cam surfaces which serve to rock a three-armed lever 374, Figs. 129 to 136 inclusive. One arm of each lever 374 is connected with a bolt 375, which connects by means of a rocker 376 with a second bolt 377, the rocker being adapted to engage notches in the bolts. Each of the pistons is provided with two pairs of flanges 378 and 379, the lower flanges 378 being adapted to coöperate with bolt 375 to hold the piston in its lowest or inoperative position, and the bolt 377 coöperating with the flanges 379. The bolts 377 are mounted in guides in a head 380 connected to a vertically moving slide 381. When the shaft 371 is operated one step, the cam wheel $k^1$ locks the piston $j^1$ to the head 380. When the cam wheel operates a second step, corresponding to two separators, the cam wheel $k^1$ withdraws the bolt 377 from its piston and the cam wheel $k^2$ connects its bolt 377 with piston $j^2$. When the line is assembled one or more pistons whose combined areas represent the number of separators in the line are bolted to the head of slide 381, while the remaining pistons are locked by means of the bolts 375 to the stationary block 366. The pump piston $j$ is then operated for a distance proportional to the shortage of the line, and the justifier pistons which are locked to the slide 381 are forced upward carrying with them said slide. The slide 381 is connected to the mold, as will be hereinafter described.

The means for rotating the justifier shaft 371 will now be described.

Referring to Figs. 112, 114 to 122 inclusive 382 indicates a constantly rotating shaft which, by means of spiral gears, rotates a sleeve 383 which is loose on shaft 384. Suspended from a rocker 386 is a rod 385 which engages the space key. One arm of the rocker 386 is normally engaged with a clutch hook 387 of a single rotation clutch R which is pivoted upon a disk fixed on shaft 384, Fig. 117. Several similar clutches are referred to hereinafter as "single rotation clutches" without detailed description. When the space key is operated the hook 387 is released and its opposite hooked end 388 is pressed by a spring 389 into engagement with teeth 390 carried by the sleeve 383. The shaft 384 is thus carried around through a single revolution being stopped by the engagement of the hook 387 with the rocker 386. Any rebound of the shaft 384 is prevented by a spring pawl 391, Fig. 118, which engages a tooth 392 carried on a cam shaped disk fast on said shaft.

Upon the shaft 384 is a worm 393 which is in mesh with a worm gear 394 loose on shaft 371, Figs. 114, 116 and 120. Fast on the end of shaft 371 is a clutch member 395. A sliding clutch block 396 has teeth on one side which always intermesh with teeth on the clutch member 395 and smaller teeth on its opposite side which intermesh with teeth 397 on the worm gear 394, but may be withdrawn from said teeth. A cam lever 398 engages a groove in the periphery of the clutch block 396, and a spring 399 normally holds the clutch block in engagement with the worm gear. The upper end of cam lever 398 engages a cam 400 which will be referred to hereinafter. By means of the connections just described, the shaft 371 is rotated one step each time the space key is operated, and the cams $k^1$, etc. are thus rotated step by step. The cam 400 effects the restoration of the justifying apparatus to normal or initial position after the justification of each line is effected. This cam is loose on a shaft 401 which is rotated by a shaft 402 connecting with the shaft 382, Figs. 112 to 120 inclusive. One part of cam wheel 400 coöperates with the cam lever 398, as shown in Figs. 114 and 119, while a second portion of the cam wheel coöperates with a roll 403 carried by an arm of a sector gear 404 which is in mesh with a pinion 405 fast on the end of shaft 371. As the shaft 371 is rotated step by step the sector gear is moved by the pinion. When it is desired to restore the justifier to initial position, the cam wheel 400 is connected with shaft 401 by means of a single rotation clutch S having hook 406, as shown in Fig. 116, the said hook connecting the cam wheel with a toothed wheel 407. After the cam has made a revolution, the clutch is disconnected by a stop arm 408 on rock shaft 409. The rotation of the cam 400 first withdraws the clutch block from engagement with the worm wheel and then rocks the sector gear 404, rotating the shaft 371 to its initial position.

Referring to Figs. 123 and 136, a spring-pressed arm 824 carries a roll which coöperates with a stop cam 825 to bring shaft 371 to rest at its initial position, the roll riding over a projection 826 to slow down the shaft and then dropping into a recess 827 to hold it yieldingly. These operations are repeated each time the stop arm is withdrawn from the clutch device. The rock shaft 409 is connected by an arm 410, Figs. 114 and 115, and link 411, with a cam lever 412 coöperating with the justifier restoring cam $b^5$ on shaft $b$, Figs. 3 and 10. The cam lever 412 may also be operated by hand by means of a connecting rod 413 running through to the front of the machine and provided with a knob 414, Fig. 10.

Referring to Figs. 1, 113 and 114, 865 indicates a shaft which is connected by beveled gears with the cam shaft 371. This shaft, is therefore, moved step by step as the separators are inserted in the line. It extends to the front of the machine and is connected to operate an indicator 866 which indicates the number of separators in the line during the progress of assembling a line of matrices.

In some instances it is necessary to insert in a line a number of separators without having the justifier correspondingly adjusted. This is effected by the means shown most clearly in Fig. 139$^a$. Referring to this figure, the rod 385 is connected near its lower end by a link 385$^a$ with a vertical lever 385$^b$ the lower end of which is connected by a link 385$^c$ with the inner end of a horizontal hand lever 385$^d$. The hand lever 385$^d$ extends below and to the front of the key board within convenient reach of the operator. A spring 385$^e$ connected with the lever 385$^b$ acts to normally hold said lever in position to maintain the rod 385 over the rod 328 of the space key and therefore during the normal operation of the machine whenever the space key is depressed the rod 385 will be lifted, the link 385$^a$ during this movement rocking about its pivotal connection with the upper end of the lever 385$^b$. When, however, the hand lever 385$^d$ is moved to the left the rod 385 will be moved to the left and out of the path of the rod 328 and in this position the operation of the space key will not affect the rod 385.

Referring to Figs. 3, 113, 138 and 139, 415 indicates a gear which is operated by pinion 416 and pulley 417. The gear is loose on its shaft and is adapted to be connected with the shaft by a single rotation clutch T having a hook 418 which is controlled by a latch 419 connected with the starting lever by a link 420. A pin in the starting lever operates in the slot 421 in the link whereby the clutch T is tripped as the starting lever reaches the end of its movement. The clutch T connects the gear 415 with a shaft 422, and a stop lever 423 prevents the shaft from rebounding after it has made a complete revolution. Fast on shaft 422 is the pump operating cam wheel 424. On the left face of this cam is a groove 425 which operates a cam lever 426 which is connected with the arm 427 for opening and closing the valve 370, Figs. 113 and 125. On the same face of cam 424 is a cam projection 428 which operates through cam lever 429, arm 430, link 431, arm 432, rock shaft 433, Figs. 14, 15, 16, 113 and 115, and arm 434 to throw back a spring latch 435 carried by a disk 436 on shaft $b$. The clutch $b^1$, Fig. 14, which connects shaft $b$ with the gear $b^2$ is operated by a sliding collar 437 connected with the toggle levers of the clutch by a rod 438. A spring 439 tends to throw the clutch into operation, and it is normally held inoperative by the two latches 435 and 440. Each of these latches has a cam groove 441 adapted to engage a lip 442 on a lever 443 connected with the sleeve 437. The groove 441, which is closed at one end, rocks the lever 443 and throws the clutch out of operation. It also serves to stop the rotation of the shaft $b$ at the proper point. The arm 434 rocks the latch 435, releasing the lip 442 from the cam groove 441, freeing the lever 443 and permitting the spring 439 to throw in the clutch. The shaft $b$ then rotates through a partial revolution until the lip 442 is caught by the cam groove of the latch 440. The latch 440 is operated to again free the shaft $b$ by a means which will be hereinafter described. In this manner shaft $b$ is stopped and started twice in a single rotation.

Referring again to Figs. 112 to 116 inclusive, the pump piston $j$ is operated by a link 444, arm 445, rock shaft 446, arm 447, link 448, arm 449, rock shaft 450, arm 451, link 452, lever 453 and link 454, the link 454 being reciprocated vertically by a groove in cam wheel 424. The lever 453 has a fulcrum 455 upon a vertically sliding rod 456. The rod 456 is normally supported by a spring pawl 457 pivoted at 458. This pawl is controlled by an arm 459 upon a rock shaft 460 having a depending arm 461, Fig. 113.

It is essential that the movement of the pump $j$ should be in proportion to the shortage of the line to be justified, and means are therefore provided for governing the movement of the pump by the shortage of the line. This is effected by connecting the pump piston with a part which moves into conjunction with the line gage and by throwing the pump piston out of operation at the moment when said part reaches the line gage, or a part connected with it. This object is effected by the following means: Referring to Figs. 100 to 103 inclusive and Figs. 112 and 113, $h$ indicates a link which is connected at its rear end with an arm 462 carried by the rock shaft 450 which rock shaft is in connection with the piston of the pump $j$. The link $h$ is connected by means of rack 463, pinion 464 and rack 465 with a slide 466. As the link $h$ moves forward the slide 466 moves to the right carrying an arm 467 which is pivoted on the slide into engagement with the line gage 339. Arm 467 is thereby rocked to the left moving a link 468 to the rear. Link 468 carries a rail 469 which operates on a roller carried by an arm 470 of rock shaft 471. A second arm 472 of said rock shaft is connected by a link $n$ with the arm 461, Figs. 113 and 115, which controls the latch 457 supporting the fulcrum 455. When the arm 467 moves a given distance to the left the support of the fulcrum 455 is withdrawn and the movement of the pump piston $j$ instantly stops, as the resistance of the pump is greater than the resistance of the fulcrum, the fulcrum being entirely free.

The pump having been moved a distance proportionate to the shortage of the line and the area of the pistons connected with the head 380 being proportionate to the number of word spaces in the line, it follows that the movement of the slide 381 carrying said head will be proportionate to the quotient of the shortage divided by the number of word spaces, that is, in proportion to the justifying spaces required to exactly justify the line. To effect justification the movement of the head 380 and its slide 381 is communicated to the mold through the medium of link 473, arm 474, rock shaft 475, arm 476 and link "$o$", Figs. 100, 113 and 146 to 154 inclusive. The link $o$ abuts against a slide 477 and moves the same forward a distance proportionate to the justification required. On the under surface of slide 477 is a rack engaging an elongated pinion 478, which pinion is internally threaded and is mounted on a screw threaded plunger 479. The plunger is mounted to move longitudinally without turning in a slide 480, and the pinion is mounted between jaws in said slide, whereby the rotation of the pinion moves the plunger. Within the plunger is an adjustable pin, 481, the left end of which forms the working face of the plunger and operates to adjust the mold. The connections between the justifier and the plunger 479 are such that the movement of the plunger is exactly equal to the thickness of the justifying space required for the line to be cast, minus the thickness of one of the separators in the line. As the separators are measured with the line the shortage of the line which affects the justifier is in fact the total shortage minus the combined thickness of the separators. If the separators were removed before measurement of the line. the justifier would move the plunger 479 an amount equal to the total justifying space to be cast on each logotype. As the separators are required to remain in the line to facilitate separation of the word groups of matrices in the casting mechanism it becomes necessary to effect an additional adjustment of the mold equal to the thickness of a separator. This additional or constant adjustment is effected by means of a screw 482 which has a collar 483 engaging the slide 480. The screw 482 is threaded in a slide 484, and it is turned by means of a pinion 485, segment 486, link 487, rocker arm 488 and a connected rocker arm 489, Figs. 148 and 151, the latter carrying a roll which is pressed down by the line forwarder as the latter approaches the presentation slide.

The double adjustment described sets the working end 481 of the plunger 479 in position to adjust the mold to cast a correct justifying space on each logotype produced from the line of matrices assembled. Referring to Figs. 147 to 153, the slide 484 is then moved forward, the plunger face 481 contacting with and carrying forward a slide 490 with which the matrix clamp 491 of the mold is rigidly connected. The mold setting slide 484 is operated by means of a link 492 which is detachably connected with the slide by a bolt 493. Link 492 is connected to an arm 494, which arm extends rearward and is carried by a vertical pivot 495, Figs. 6 and 7. Arm 494 is rocked by a spring 496 and a cam-roll coöperating with cam $d^3$ on shaft $d$.

Beneath the matrix clamp 491 is a sliding plate 855 which normally registers with the forward end of the clamp. Referring to Figs. 147, 148ª and 148ᵇ, the plate 855 has a projection or arm 858 extending upward through a slot in the slide 490 and upon this arm is a spring pressed hook 856 which is adapted to engage a pin connected with the clamp 491. When the slide 490 is moved forward the plate 855 will be carried with it by means of the hook 856. When the slide 484 is moved to the extreme left to eject a slug from the mold, the matrix clamp 491 travels with it. As the trimming knives project above the slug slightly, the plate 855 would encounter the knives if it traveled with the clamp 491. To prevent this a stop 857 is arranged in the path of an arm of the spring hook 856 causing the hook to be thrown out of engagement with the clamp during the travel of the clamp to the left. This permits the clamp together with the liner to travel to the left, while the plate 855 remains stationary. On the return movement of the matrix clamp, the plate 855 will be carried with the clamp frictionally until the arm 858 of plate 855 encounters a stop 859. The continued rearward movement of the matrix clamp will bring the plate 855 again into register with the clamp and permit the hook 856 to reëngage the clamp. To avoid shock and a nicety of adjustment, the stop 859 is provided with a spring which permits it to yield, as shown in Fig. 148ᵇ.

*Justifier restoring means.*—The mold adjusting devices are restored to normal position after each adjustment of the mold, as follows: As the line forwarder returns to its initial or right-hand position it relieves the arm 489, Fig. 148, and a spring 497, Fig. 151, returns the slide 480 to initial position. On the line forwarder slide 352 are a pair of parallel arms 498, Figs. 100 and 140ª, carrying a plate 499. This plate has on its under side a cam face 500 which is adapted, when the plate 499 is in its forward position, shown dotted in Fig. 140ª, to contact with a roll 501 on a sector gear 502 which is in mesh with a rack on the slide 477. As the line forwarder moves to the right, the cam face 500 rocks the sector 502 and restores the slide 477 and its connections which extend through to the plunger 479 to their initial position, the link $o$ having previously been moved rearward to its starting point by means to be presently described. As the line forwarder approaches the right extreme of its movement the roll 503 engages a fixed stop 504, Fig. 140, and the plate 499 is thus moved rearward from the slide into the position shown in Fig. 100. The spring 505 operating on the end of one of the arms 498 serves to move the plate 499 quickly to open and closed position. While in the position shown in Fig. 100, the plate 499 passes the roll 501 during its movement to the left without affecting the position of the sector 502. As the line forwarder approaches its left extreme position the plate 499 engages a fixed stop 506 and the cam plate 499 is moved inward toward the line forwarder and into position to operate upon the roll 501. A pawl 507 pivoted on the plate 499 coöperates with a pin 508 on arm 498 to lock the plate in open position, as shown in Figs. 100 and 140ª. This lock is released at the left extreme of the movement of the line forwarder by contact of the pawl 507 with the stop 506.

It will be understood that the justifier shaft 422 makes a complete revolution for each line of composition. The first half of the revolution closes the valve 370 and then operates the pump. During the latter half of the revolution the valve is first opened to permit fluid to enter from the reservoir, and the pump piston is then raised. A spring 509, Figs. 113 and 115, retracts the link o and draws the slide 381 down, restoring the pistons $j^1$, $j^2$, etc. to their normal position, as shown in Fig. 129. This brings the bolts 377 into engagement with the lever 376. Each revolution of the shaft $b$· is divided into two movements. During the first movement the cam $b^5$ rocks the lever 412, withdrawing the stop 408 from clutch S, and during the rotation of the shaft 401 which follows the sector gear 404, rotates the shaft 371 to initial position, withdrawing all of the bolts 377 and locking all of the pistons by means of the bolts 375. The bolts 377 are latched in both their open and closed positions during the movement of the head 380 by means of spring latches 510, Figs. 130 and 137. While the head 380 is in its lowest or normal position the bolts 377 are released from the latches 510 by contact of the latches with a fixed part 510ª Fig. 129, thus permitting the latches to work freely. All of these operations take place immediately after the assemblage of the line of matrices and the manipulation of the starting lever. The justifier is thus restored to its initial position so that it may be reset for another line while the preceding line is being cast. The keyboard may therefore be operated practically continuously. The rack 477 is retained in position by a spring clamp 511. After the last group of matrices have been transferred to the presentation slide, the line forwarder is returned to the right, and during its return movement a cam projection 512 on the line forwarder engages a lever 513 which rocks the clamp 511 and releases the rack 477 which is returned to rear by cam 500, as previously described, Figs. 142, 151 and 152.

*The presentation slide.*—The presentation slide $p$ and its connecting mechanism are shown particularly in Figs. 100, 142, 143, 147, and 155 to 159 inclusive. The slide comprises a main portion, 515, movable vertically in a stationary guide 516, and a hinged portion 517 which is pivoted at 518 to the part 515. The slide is operated vertically to carry the matrices to and from the mold by means of link 519 and a pair of levers 520 and 521 which are mounted on a fixed pivot 522 and connected by a spring 523. The lever 521 is operated by a cam $c^7$ on shaft $c$, and the upward movement imparted to lever 521 is transmitted through the spring to the lever 520 giving the presentation slide a yielding downward movement. The levers 520 and 521 are positively connected by the rod 524 and the lever 521 is held to its cam by a spring 525. Figs. 4 and 159.

The presentation slide stands normally in its uppermost or "home" position in which the rail 526 is in register with the undercut notches in the matrices in the transfer channel. As the line of matrices is moved to the left by the line forwarder 355, the first word group of matrices enters the space 527 between the lower ends of the two parts of the slide $p$, which lower ends constitute jaws for alining and gripping the matrices during the casting operation. To prevent the matrices from separating as they enter the presentation slide, a spring stop 528, Figs. 147 and 155, is provided. This stop is connected by means of link 529 and lever 530 with a spring 531 which normally presses the stop to the right. This pressure is overcome by the force of the forwarder and the first word group of matrices passes entirely into the presentation slide, the first separator, which is larger than the matrices, being intercepted by the slide. During the first part of the downward movement of the slide, the stop 528 is withdrawn from the slide by means of an arm 530ª which engages a cam projection 530ᵇ on the lever 530. When a word-group of matrices enters the presentation slide the following separator $s$ engages and moves to the left a trip pin 532 upon a slide 533, Figs. 157 and 158. On slide 533 is a pawl 534 which normally engages a tripping lever 535. As the slide 533 moves to the left it rocks the lever 535 a slight amount sufficient to start shaft $d$, as hereinafter described. As the shaft rotates the presentation slide moves down and a diamond-shaped projection 533ᵇ on the slide contacts with a similar projection 533ª on slide 533 moving the latter to the left until a cam 534ª on pawl 534 engages a fixed projection 536 and disengages the pawl from lever 535 permitting shaft $d$ to stop at the end of one rotation. During the further downward movement of the presentation slide a cam or incline 533ᶜ contacts with projection 533ª and moves it to the right into the path of projection 533ᵇ. On the reverse movement of the presentation slide the projection 533ᵇ cams the projection 533ª to the right to its initial position, as shown in Figs. 157 and 158. The lever 535, Fig. 143, is connected by link 537, lever 538 and link 539, with an arm 540 which carries a stop pin 541. On an adjacent arm 542 is an eccentric starting cam 543 which has a pin normally in contact with the pin 541. The cam 543 tends to drop into contact with a friction roll 544 on the constantly rotating shaft 382. When the lever 535 is rocked by a separator, approaching the presentation slide, the arm 540 is raised releasing the cam 543, which thereupon turns by gravity into contact with friction roll 544. The cam is thereupon rotated through a complete revolution until again intercepted by the pin 541. During this revolution the arm 542 is raised by the cam and through link 545, arm 546, connected arm 547, link 548, arm 549 and rock shaft 550, the arms 551 and 552 are rocked. The arm 552 of shaft 550, Figs. 7, 9, 18, and 143, operates a latch 553 on clutch disk 554, starting the shaft $d$ which makes a revolution and operates the presentation slide and casting mechanism to cast a logotype from the matrices which have been delivered to the presentation slide.

As there is no separator following the last word group of matrices in the line, arrangement is made for the line forwarder to start the casting cam shaft $d$ to cast the last word as follows: As the last matrix word passes into the presentation slide the line forwarder engages the head of a trip pin 555, Fig. 158 which is connected with a lever 556, Figs. 100, 143, 157 and 158. Pin 555 is thus moved to the left and through the lever 556, link 557, elbow lever 558 and link 559, a stop arm 560 is raised releasing a cam roll 561 similar to the cam roll 543 and operating in a similar manner. The arm 562 which carries the cam roll 561 is thus rocked, and by means of the link 563 it rocks the shaft 433, previously referred to. The arm 434 on this shaft operates the latch 440 on shaft $b$, Figs. 14, 15 and 16, permitting said shaft to complete its revolution. It will be remembered that the shaft $b$ was released by the starting lever when the line was assembled, and that it made a partial revolution, moving the line forwarder to the left. The completion of the revolution which now takes effect moves the line forwarder to the right to its initial position, this movement being initiated by the line forwarder itself as it completes its work of moving the matrices into the presentation slide. On cam $b^3$ are two cam surfaces 828 which coöperate with a spring-pressed lever 829 to effect a braking or slowing down of the shaft $b$ and to avoid shock at each stop of said shaft.

A cam $b^4$ on shaft $b$ operating on arm 551 (Fig. 143), rocks the shaft 550 and operates the latch 553, starting the casting cam shaft $d$ which operates the presentation slide and casting mechanism for the last word in the line. The means whereby the shaft $d$ is started when the latch 553 is operated, and the means for stopping said shaft are as follows: When the latch 553 is moved by the arm 552 it releases arm 594 on rock shaft 595, Figs. 10, 17 and 18. The rock shaft 595 carries an arm 596 which bears on a sliding collar 597 on shaft $a$. This collar is connected with a clutch rod 598 within shaft $a$, the opposite end of which is connected to the toggle levers 599 which operate the clutch shoes of clutch $a^2$ which coöperates with the main pulley $a^1$. A spring 600 tends to throw the clutch into engagement with the pulley, and this spring is released when the arm 594 is released from latch 553. The shaft $a$ is connected with the shaft $d$ by means of pinion 601 and gear $d^1$ on shaft $d$, Figs. 3 and 7. The shaft $d$ is thus rotated through a single revolution, or until the latch 553 engages the arm 594 and turns it inward toward shaft $d$ thus rocking shaft 595 in the reverse direction and throwing out the main clutch $a^2$. The shaft $c$ has a gear $c^1$ in mesh with gear $d^1$ on shaft $d$ and of the same diameter, and hence the shaft $c$ is always rotated synchronously with the shaft $d$ but in the reverse direction. On the shaft $c$ is a cam $c^{10}$, Figs. 7 and 9, which operates a lever 602 connected with a brake band 603 surrounding a brake disk 604 on shaft $d$. This brake is automatically applied to stop shafts $d$ and $c$ at the moment the latch 553 engages the arm 594, thus preventing straining of the parts and undue noise.

Referring to Figs. 10 and 17, the main clutch $a^2$ is also controlled by a starting and stopping lever 830 at the front of the machine. The lever 830 has two arms, the forward arm being arranged to bear against a stop pin 831 when the machine is operating, while the rear arm bears against the pin when the clutch $a^2$ is thrown out and the machine is stopped. The lever 830 has a toggle connection by means of a link 832 with an elbow lever 833, one arm of which is connected with a rearwardly extending rod 834. Rod 834 has a pin and slot connection 835 with an arm 836 of the rock shaft 595. When the clutch $a^2$ is thrown out of operation by the lever 830 the toggle joint between the starting lever 830 and the link 832 passes beyond the dead center and holds the clutch out against the tension of its spring 600. Upon throwing the starting lever 830 in the opposite direction the spring 600 is permitted to throw the clutch into operation and start the machine.

The movable jaw 517 of the presentation slide is normally pressed away from the other jaw by a spring 564. As the slide descends, an inclined surface 565 on the movable jaw engages a spring-pressed roller 566 which clamps the jaw upon the matrices and accurately alines them as they reach the mold, as illustrated in Fig. 159, which shows the parts in casting position.

As the presentation slide reaches its lowest position, as shown in Fig. 159, the separator which has been stopped by the slide moves into a recess 567 in the slide, Fig. 157, which is shaped to receive it and of a depth equal to the thickness of the separator. When the slide again moves to its uppermost or home position, as shown in Figs. 147 and 155, a pusher 568 is moved to the right ejecting the separator onto the separator magazine rail 310. The separators are carried onto this rail until they pass a retaining pawl 569. The pusher 568 is operated by link 570, lever 571, rock shaft 572, arm 573 and spring 574, Figs. 142, 147 and 155. The pusher 568 is withdrawn to the left by a cam 575 operating on cam roll 576 as the presentation slide descends. It is held in its retracted position by a pawl 577 engaging a pin 578 on arm 573. As the presentation slide reaches its uppermost position the pusher 568 is released by means of the engagement of the presentation slide with a pin 579 on pawl 577. This pin extends into a slot 580 in the slide, Fig. 147, and the bottom of the slot serves to raise the pin and pawl.

It is desirable to release the pressure of the matrices on the presentation slide during the movement of the slide to and from casting position. For this purpose a pair of pawls 581 Figs. 142, 142ª and 146, are arranged to coöperate with a rack 582 connected with the line forwarder. These pawls are connected to a slide 583 which has a reciprocating movement imparted to it. The slide 583 is operated by means of arm 584 of a horizontal elbow lever 585 having teeth in mesh with a vertical lever 586, Figs. 142 and 155, which is pivoted at 587 adjacent to the presentation slide. Lever 586 has rolls 588 and 589 which engage cam surfaces 590 in the back of the presentation slide. The lever is thus positively rocked back and forth and made to retract the line forwarder at proper intervals.

The pawls 581 tend to spring into engagement with the rack 582 and they are moved to disengage the rack periodically to permit of the forward movement of the line forwarder by means of a slide 591, Figs. 142 and 142ª, which engages inclines on the backs of the pawls. The slide 591 is operated by a lever 592 which has rolls on each side of its fulcrum 593, coöperating with cam surfaces on the presentation slide.

Referring to Figs. 141, 142 and 147, 605 indicates what may be termed the lower elevator station, being an undercut rail on to which the matrices are discharged from the presentation slide. For this purpose the slide is stopped at an intermediate point as it rises from the mold to its initial position with the notches in the matrices opposite the rail 605. At this instant the matrices are ejected from the presentation slide onto the rail 605 by an ejecting rod 606, Figs. 2, 3, 10, 147 and 174, connected by link 607, arm 608, rock shaft 609, arm 610, link 611, arm 612 and rock shaft 613 with a cam lever 614 bearing on the cam $d^9$ of the shaft $d$. The ejecting rod 606 is moved to the left to eject the matrices by a spring 615 and restored to its initial position by the cam $d^9$. The matrices are retained on the rail 605 by spring pawl 616. They are periodically transferred from the rail 605 to the elevator by a mechanism which will be hereinafter described.

*Mold adjustments.*—The present invention comprises a mold having its four sides movable and having various adjustments which permit of casting logotypes having different bodies and of casting the type faces in different relations to the bodies, and which also permit of the use of matrices having the faces of different fonts stamped on a common base line, so that all characters aline when assembled. To accomplish these adjustments a plurality or magazine of interchangeable liners or body pieces is provided and means are provided for shifting the liners so that any selected liner may be made to coöperate with the mold, means being also provided to adjust the mold to the liner.

Referring particularly to Figs. 148, 149 and 150, 617 indicates a liner carriage in which a plurality of liners 618 of different thicknesses are carried. These liners are identical in shape except as to their thicknesses, one of the liners being shown in side elevation in Fig. 147. The cross-section of the forward or left end of each liner is identical with the cross-section of the mold opening 619, shown in Figs. 150 and 155. The right or rear ends of the liners are provided with hooks 620 which are adapted to engage a pivoted part 621 on the slide 484, said part being normally held in position, shown in Fig. 147, by spring 622. In the operation of the machine one of the liners always stands between the mold jaws. Before a change can be made in the liners the operative liner must be withdrawn and to accomplish this the slide 484 must be moved to the right beyond its normal position. The slide 484 must first be freed from its connection with its operating link, 492. This is accomplished by withdrawing the pin 493, Fig. 153. The pin 493 is carried by the plate 623, Figs. 151 to 153 inclusive, which plate is carried by a pin 624 sliding in a socket in the lower part of slide 484. The plate 623 is moved by means of two eccentric pins on a cam disk 625 carried by shaft 626. When the shaft is rocked in one direction, one of the pins carries the plate 623 downward while the rocking of the shaft in the opposite direction raises the plate and the pivot pin 493 is thus withdrawn from and reconnected with the link 492. The shaft 626 is operated by an arm 627 which may be locked in different positions by a spring pin 628. Concentric with the shaft 626 is a hollow shaft 629 which is adapted to be turned by a crank 630, which is also provided with a spring locking pin 631. On the inner or rear end of the shaft 629 is a mutilated gear 632, Figs. 151 and 154, which is adapted to engage a rack 633 connected with slide 484. The gear 632 normally stands, as shown in Fig. 154, with its teeth disengaged from the rack. When, however, a liner is to be changed, the shaft 626 is first rotated to disconnect link 492 from pin 493 and the gear 632 is then rotated to move the slide 484 to the right, bringing the operative liner into line with the remaining liners 618 in the liner carriage. The liner carriage is then adjusted forward or backward to bring the proper liner into registration with the mold by means of a screw 634, Figs. 148 and 150, which screw is operated by a handle 635. A suitable indicator which is visible through a sight opening 636 discloses to the operator the position of the liner carriage and shows when each liner is in registration with the mold.

In the normal operation of the machine the stop 859, Figs. 148, 148ª and 148ᵇ would prevent the operative liner from being withdrawn sufficiently to permit of the movement of the liner carriage. Means are therefore provided for withdrawing the stop 859 when it is desired to change liners as follows: The stop 859 is carried by a slide 860 which moves transversely of the slide 490. The slide 860 is operated by an arm 861, rock shaft 862, and arm 863, the latter having a roll which bears on cam disk 625, previously referred to. A spring 864 holds the roll in contact with the cam. When the shaft 626 is turned to disconnect the link 623 from the slide 484, the slide 860 is simultaneously moved forward carrying the stop 859 out of the path of the arm 858. The slide or carriage 484 may thereupon be moved sufficiently to the right to withdraw the liner from the mold and permit of a change of liners. When the shaft 626 is rocked to reëngage the link 623 with the slide 484 the spring 864 returns the stop 859 into the path of the arm 858.

Means are provided for adjusting the mold opening automatically as the liner is shifted as follows: The main mold sections 637, 638, are shown in plan in Fig. 148. The forward side of section 638 has two inclines which coöperate with similar inclines on a double wedge 639. Back to back with the wedge 639 is a double wedge 640 which coöperates with stationary inclines 641. Upon the upper face of the liner carriage, and having a dove-tailed connection therewith, is a transversely movable slide 642 upon which is an inclined rail 643, Figs. 148 and 150. On the under surface of the wedge 640 are rollers which engage the opposite edges of the inclined rail 643. The slide 642 has a rib-and-slot connection 642ª with a slide 642ᵇ which extends under the liner carriage 617 and engages an inclined rib 645 on slide 644, Fig. 149. It will be seen that as the liner carriage is moved, the inclined rail 643 will move the wedge 640 to the right or left and adjust the mold opening 619, the opening being made wider as the wedge moves to the right and narrower as it moves to the left. When the liner is located in proper position to coöperate with the mold, the mold opening will be automatically adjusted to receive the liner. A spring 638ª constantly presses the mold sections 638, 637 apart and, respectively, against the wedge 639 and a wedge 650 to be hereinafter referred to. The wedge 650 is backed by a piece 650ª which is adjustable by means of a screw 650ᵇ for the purpose of taking up wear of the mold faces caused by the working of the liner and the ejection of the castings or slugs.

In changing from one font of type to another it becomes necessary to adjust the mold bodily with respect to the position of the matrices at the casting point, in order that the type faces may be properly positioned on the slug. This bodily adjustment of the mold is effected by means of the slide 644, Figs. 148 and 149, the slide being operated by a screw 646, which is provided with a handle 647. The slide 644 has two transverse slots or notches in which are blocks which are pivotally carried by bell cranks 648, 649. One of these bell cranks is connected with a block sliding in a slot in the double wedge 639, while the other has a similar connection with the double wedge 650. As the slide 644 is moved, the bell cranks are rocked, moving the double wedges 639 and 650 in opposite directions, the effect being to move the mold sections 637, 638 equally in the same direction. By manipulating the handle 647 the mold may be moved bodily forward or rearward as may be desired without changing its body adjustment. It will be understood that the matrices always occupy the same location when in casting position and hence the bodily adjustment of the mold results in shifting the type faces on the slugs which are cast from the matrices.

Means are provided for automatically moving the liner as the mold is moved bodily with relation to the matrices, as above described, to preserve the alinement of the mold and liner. On the shaft of screw 634 is a gear 634ᵃ which is connected to the dial plate 634ᵇ but otherwise loose on the shaft. The handle 635 is rigidly connected with the screw 634 and when the spring pin 635ᵃ carried by said handle is in normal position, the gear 634ᵃ is locked to the shaft. During the primary adjustment of the liner carriage, the spring pin 635ᵃ is withdrawn from the dial plate so that the gear 634ᵃ remains stationary. During the bodily adjustment of the mold, however, gear 634ᵃ is locked to screw 634 and they are turned slightly by a pinion 646ᵃ on screw 646. The liner carriage is moved with the mold during the bodily adjustment of the latter, the alinement of the selected liner with the mold, being preserved by means which will now be described.

To prevent the inclined rail 643 from altering the mold opening during the bodily adjustment of the mold above described, movement is imparted to the slide 642 which carries the rail by the engagement of the connected slide 642ᵇ with the inclined rib 645 on the under surface of the slide bar 644. By this means the slide 642 and its rail 643 are given a lateral movement during their movement forward or rearward which prevents any movement of the double wedge 640. In other words, the effect of the forward or rearward movement of the inclined rail 643 upon the wedge 640 is neutralized by a simultaneous movement of the rib to the right or left, as may be necessary. It will be noted that the sliding engagement of the slides 642 and 642ᵇ permits the former to move from front to rear while the latter moves only to the right or left. The liner which is brought into operative position is engaged with the spring pawl or hook 621 on slide 484 and this hook is preferably rendered rigid when the slide is reconnected with its operative means by a pin 651, Fig. 153, which enters between the lower end of pawl 621 and the slide.

*Matrix clamping and casting mechanism.*— Referring to Figs. 140, 141ᵃ, 146 and 148, the left hand matrix clamping jaw 660 is connected to a slide 661 which is longitudinally movable in a second slide 662. Slide 661 is operated by link 663, arm 663ᵃ, link 663ᵇ, cam lever 664 and cam $c^5$ on shaft $c$. The slide 662 is operated by link 665, elbow lever 666, link 667, cam lever 668 and cam $c^4$ on shaft $c$. The elbow lever 666 is also connected by means of link 669 with cam lever 670 which coöperates with the cam $e^7$ on shaft $e$. The shaft $c$ operates at each casting while the shaft $e$ operates only when the last logotype is cast for each line. The clamp slide 662 is therefore moved to a certain extent by the shaft $c$ for each logotype cast, and it is given an independent movement by shaft $e$ for clamping the matrices for the last logotype to effect the "final justification" as will be hereafter explained. The slide 662 has opposite inclines 671 and 672 which coöperate with fixed inclines to move the slide to the right and left as it moves forward and rearward. The movement given to slide 662 before the casting of each logotype excepting the last brings the jaw 660 into its normal position in register with the mold gate and the left end of the opening of the jet slide.

Means are provided for preventing the molten metal from entering the mold unless the matrices are fully down upon the mold and are clamped against the left matrix jaw 660. Referring to Fig. 155, 673 indicates the jet slide which has an opening near its forward end through which the metal is injected into the mold, and 674 indicates the nozzle slide which is located between the jet slide and the pump and which is provided with an opening to receive the nozzle. It will be evident that the casting cannot take place unless the opening in the jet slide registers with the mold and means are provided for preventing the jet opening from registering with the mold until the matrices are properly clamped upon the upper face of the mold. A spring pawl 675 normally passes through a slot in the jet slide and rests upon the mold slide, as shown in Fig. 155. Pawl 675 is connected to a vertical slide 676 which engages an elbow lever 677 having a roll 678 coöperating with one of the cam faces on the presentation slide. The elbow lever 677 is normally latched in position to effect the locking of the jet slide by a pawl 679 having an arm which projects into the path of the presentation slide. When the presentation slide is at the lowest limit of its movement, it trips the pawl 679 and at the same moment roll 678 is opposite the recess 590 in the presentation slide, as shown in Fig. 159. The spring 680 is thus permitted to raise the slide 676 and withdraw the pawl 675 from the opening in the jet slide. It will thus be seen that unless the matrices are fully down upon the mold, casting cannot take place.

Referring again to Figs. 141ᵃ and 146, 681 indicates a lever pivoted on the slide 661 and having a face 681ᵃ which normally overlaps the clamping jaw 660, although it may be pressed back into registration with the mold jaw. Lever 681 operates by means of arm 682 and arm 683 to move a spring stop pawl 684 which is rigidly connected with arm 683. The pawl 684 stands normally under the forward lower edge of the elbow lever 677, Fig. 142, adjacent to the pawl 679, and it prevents the withdrawal of the stop 675 from the jet slide until the matrices are moved over against the left clamping jaw 660. As the matrices reach the left clamping jaw the lever 681 is rocked and through the connection 682, 683, the pawl 684 is withdrawn from under the lever 677, Figs. 146 and 155.

The jet slide 673 is operated by means of a spring link 687, cam lever 688 and cam $d^4$ on shaft $d$, Figs. 7, 140 and 159. The nozzle slide is similarly operated by a spring link 689, cam lever 690 and cam $d^7$ on shaft $d$. After each casting operation the jet slide and the nozzle slide are moved forward to register with a jet ejecting plate 691, Fig. 155, which is carried upon a plunger 692 and operated by a lever 693. Lever 693 is pivoted at 694, and it has a downwardly extending arm with which the end of the nozzle slide engages to rock the lever at the proper moment and force the ejecting plate through the openings in the jet slide and nozzle slide. The plate 691 is normally raised by a spring 695 but it is also moved positively upward by means of the engagement of a hook 696 upon the end of the nozzle slide with a spring bolt 697 which is vertically movable in the lever 693. As the nozzle slide moves forward, the hook 696 passes under the bolt, and as the nozzle slide moves rearward it engages the bolt and rocks the lever 693 positively. As the plate 691 is withdrawn from the jet slide a roll 698 on the bolt 697 engages a fixed cam 699, Figs. 100 and 146, and the bolt is raised, thus freeing the lever 693 from the hook 696.

To protect the lower face of the mold from wear by the jet slide, and also to provide means for trimming the bottoms of the logotypes a fixed knife plate 700 is located between the jet slide and the mold. This knife plate has an opening through which the metal enters the mold, and one end wall of this opening serves as a knife to trim the bottom face of the logotype. There is a jet formed at each casting operation in the opening in the knife plate 700 and if the said plate were made in a single part this jet would sometimes fail to drop out, and would obstruct the casting of the succeeding logotype or slug. To prevent this the knife plate is made with a movable section 819. As shown in Figs. 155$^a$ and 155$^b$ the movable section 819 is located at one side of the knife opening 700$^a$ and forms a part of the wall of said opening. This section is provided with two pintles 819$^a$ which rest in bearings in the plate 700. The section 819 is rocked upon its pintles by a cam surface 820 in the jet slide 673 which cam operates upon a depending arm 821 of the movable part 819 as the jet slide reaches the extreme right of its movement, thus rocking the part 819 and throwing the jet out of the opening 700$^a$. This jet falls through openings 822 and 823 in the jet slide and nozzle slide respectively.

During the casting operation the right end of the mold is closed by the body piece or liner 618, as previously described. The left end of the mold is closed by a gate 701, Figs. 140, 147 and 148, which gate reciprocates from front to rear under the slide 662. The gate 701 is operated by link 702 cushioned cam lever 703, and cam $c^8$ on shaft $c$. The mold gate 701 is clamped and supported by a wedge 704 operated by link 705, cam lever 706 and cam $c^6$ on shaft $c$. Gate 701 has a projection 701$^a$ which coöperates with a stop or shoulder on the mold section 637 to cause the forward end of the gate to register with the wall of the mold opening, when the gate is in its rear position. This prevents the logotypes from turning or sticking as they are ejected from the mold. The mold sections 637, 638, are clamped upon the liner during the casting operation by means of a pair of levers 707, 708, operated by a cam lever 709, link 710, and cam lever 711 operated by a suitable spring and cam $c^9$ on shaft $c$, Figs. 7 and 148.

Referring to Figs. 1, 159, 160, 161, 712 indicates a casing supported on a pivoted bracket 713. Within the casing 712 is supported the melting pot 714, below which are the burners 715. A vertically moving nozzle 716 has a telescopic connection with the pump barrel 717 which is located within the melting pot. The nozzle is operated by means of lever 718, spring link 719, cam lever 720 having two cam arms coöperating with two cams $d^5$ on shaft $d$, the lever 720 being operated in both directions by said cams. The spring link 719 presses the nozzle yieldingly up into the opening in the nozzle slide to a position slightly below the jet slide. The pump has a horizontal piston 722 operated by elbow lever 723, lever 724, link 725, cam lever 726, spring 721 and cam $d^6$ on shaft $d$. The pump and nozzle operating connections may be disconnected to permit of swinging the melting pot away from the mold to give access to the mold and the adjacent mechanism. The nozzle is provided with return passages or vents 716$^a$ for surplus metal.

*Galley mechanism and final justification.*—The justifying mechanism heretofore described is so constructed that it will produce justifying spaces upon the several logotypes, excepting the last one, which will exactly justify the line. On account of wear in the connections and dirt, etc., which may affect the accuracy of the justifying mechanism, means are provided to measure all of the logotypes except the last one in a line and to set the mold independently of the justifying mechanism, to cast the last logotype of the length necessary to exactly fill the line. If the logotypes having justifying spaces are short of what they should be, the last logotype will be cast with a "correcting space", and if the justified logotypes are too long the last logotype will be cast with the body shorter than its face and having a letter or letters adapted to overhang the space on the next to the last logotype; in other words the lines of logotypes will always be perfectly justified regardless of the accuracy of the mechanism for effecting the usual justification.

Referring to Figs. 162 and 164, 727 indicates the galley which is removably connected with the machine by a hook $727^a$ provided with a laterally movable partition 728 and a sliding abutment 729 for confining the lines of logotypes 730. The logotypes are ejected from the mold by the body piece or liner through a channel 731, the liner following each logotype until it passes a shoulder 732, Fig. 162, at the corner of the galley. The shoulder 732 is slightly in the rear of a jaw 733 which extends across the galley mouth and which is connected with arms pivoted to the sides of the galley at 734 so that the jaw may be moved down to permit the logotypes to enter the galley. The jaw 733 is in front of the shoulder 732 by a fraction of the thickness of a logotype. As each logotype is ejected from the mold its rear end passes the shoulder 732, and a spring pressed blade 735 which extends across the galley mouth pushes it against the jaw 733 and in behind the shoulder 732. A second blade 736 is moved forward yieldingly after each casting operation to insure the logotype being moved behind the shoulder 732. The blade 736 is operated by link 737, Figs. 140 and 168, cam lever 738, spring 739 and cam $c^3$ on shaft $c$.

As the logotypes ejected from the mold stand partly in line with the channel 731 each logotype pushes the preceding logotypes to the left and they are held in line against the galley jaw 733 by the blade 735. The first logotype of the line strikes a buffer 740, Figs. 162 and 163, which slides in an abutment rod 741. The buffer is pressed to the right by a light spring 742 which yields until the head of the buffer is against the end of the abutment rod. The abutment rod is then moved to the left by the advancing line of logotypes against the pressure of its spring 743 which is connected to the rod by a pinion 744 and rack 745.

The abutment rod 741 is mounted in a slide 746 which is under tension of a spring 747 to move to the right. This slide is operated in the opposite direction by link 748, lever 749 and cam $e^6$ on shaft $e$. Upon the slide 746 is an adjustable gage block 750 which has a toothed surface coöperating with teeth 751 on the slide. This gage block is adjusted to correspond with the length of the line to be produced, and its adjustment is such that if a complete justified line is confined between the end of the abutment rod 741 and the shoulder 732 of the galley, the opposite end of the abutment rod which carries the roll 752 would just contact with the block 750. When all of the logotypes excepting the last are assembled between the abutment rod 741 and the shoulder 732, the distance between the left end of the abutment rod and the gage block 750 exactly equals the length of the final logotype necessary to justify the line.

After the abutment rod 741 has been moved to the left by the several logotypes of a line, excepting the last one, the slide 746 is permited to move to the right by cam $e^6$ until the gage block 750 contacts with the abutment rod 741. Both the rod and the slide are then clamped securely in position by the toggle levers 754, Figs. 6, 7, 162 and 165, rocker 755, cam lever 756 and cam $e^5$ on shaft $e$. The slide 746 carries a stop rod 753, Figs. 162 and 163, the right end of which intercepts the right matrix clamp 491. In casting the several logotypes of the line excepting the last, the right matrix clamp is moved to the left until the matrices are stopped by the left matrix clamp, but in casting the last logotype the right matrix clamp is first located by the stop rod 753 and the left matrix clamp is then moved to the right until the matrices are securely clamped. As the right matrix clamp is located according to the measurement of the incomplete line the left matrix clamp will first be moved to the left, and then to the right more or less depending upon the amount of correction or "final justification" required in the last logotype. If no justification is required, the left matrix clamp will only be moved to its normal position flush with the mold gate 701 and the logotypes will be in the form and arranged as shown in Fig. 182. If a space is to be cast on the last logotype the left matrix clamp will be located to the right of the mold gate, and the logotypes at that end of line will have the form shown in Fig. 183. If the last logotype is to have its body shorter than its face, or requires minus justification, the left matrix clamp will be at the left of the face of the mold gate, and the space in the last logotype will then be reduced as represented in Fig. 184. After the matrix clamping jaws are located as above described, the last logotype is cast and transferred through channel 731 to complete the line in front of the galley. The line is then transferred to the galley as follows:—Connected with the galley jaw 733 is a cam 757, Fig. 168. A slide 758 is moved forward by cam lever 759 and cam $d^8$ on shaft $d$ (which turns with shaft $e$). This slide 758 operating on cam 757 moves the galley gate 733 down until its upper edge is flush with the bottom of the galley. A slide 760, Figs. 164 and 168, is then moved forward by rocker arms 761, 761ª and cam e⁴ on shaft e. The slide 760 by means of a pin and slot connection 762 with slide 736 carries the slide 736 with it, and the forward edges of the two slides move the line of logotypes into the galley. The slide 760 is then withdrawn and the galley gate 733 permitted to spring up into its normal position while slide 736 supports the upper edges of the logotypes. Slide 736 is then withdrawn. The parts are now in position to receive a new line of logotypes. For the purpose of rocking the galley gate 733 by hand, a hand lever 763 is provided.

Referring to Figs. 1, 3, 12 and 13, 802 indicates a rock shaft which is adapted to be turned slightly by a crank 803 at the front of the machine. At the rear of the machine is a rock shaft 804 upon which is splined a sliding clutch member 805 which is adapted to coöperate with a second clutch member 806 which is free to turn on the shaft 804. Clutch member 806 has an arm 807 carrying a cam roll which coöperates with cam $b^6$ on shaft $b$. Arm 807 is held in contact with cam $b^6$ by spring 808. It will be seen that when the clutch members are in engagement the shaft 804 will be rocked by the cam $b^6$ once for each revolution of the shaft $b$. If the clutch members be disengaged the arm 807 only will be rocked by cam $b^6$, the shaft 804 remaining stationary. The clutch is controlled by an arm 809 on shaft 802 and a link 810 connecting said arm with the clutch member 805.

The clutch $e^3$ heretofore referred to is controlled by the cam $b^6$ through the rock shaft 804 as follows: A spring 811 tends to throw the tooth on the clutch lever 812 into engagement with a notch in a disk 813 fastened to shaft $d$. The tooth is normally disengaged from the disk 813 being so held by a hook 814 which engages one arm of the lever 812, as shown in Fig. 12. The hook 814 is fast on shaft 804 and when said shaft is rocked by cam $b^6$ the clutch $e$ is thrown in and the gear $e^2$ is carried through a single rotation by the disk 813, the clutch lever 812 being mounted on the gear $e^2$. A spring 815 connected with an arm 816 on shaft 804 throws the hook 814 normally into position to intercept the clutch lever 812 after it has made a single rotation. The gear $e'$ is in mesh with the gear $e^2$ and hence the shaft $e$ is rotated each time the clutch $e^3$ is operated. To prevent rebound of the gears $e'$, $e^2$ at the end of a rotation, a spring pawl 817 is provided, as shown in Fig. 12, which pawl engages with a tooth 818 on gear $e'$.

It is sometimes desirable to cast two or more lines of logotypes in succession without transferring the lines to the galley and this is effected by preventing the operation of the shaft $e$ at the end of each line by opening the clutch 805, 806. In the normal operation of the machine this clutch is closed but when it is desired to stop the galley mechanism, which is operated by the shaft $e$, the clutch is opened by means of the crank 803. By opening the clutch for each alternate line, for instance, two lines at a time may be transferred to the galley. In the same manner three or four lines could be transferred at a time to the galley, a sufficiently wide galley being provided.

Referring to Fig. 148, a trimming knife 764 is adjustably connected with the mold section 638 so that it may be adjusted relatively to the mold section, and means such as the screw 765, are provided for clamping the knife to the mold section so that they will move together during the adjustment of the mold. A second knife 766 is connected in a somewhat similar manner with an arm 767 which is rigidly connected with the mold section 637 so that the knife and mold section move together, although they are made relatively adjustable. It will be obvious that when the knives are once adjusted to their respective mold sections, they will need no further adjustment when the liners are changed for different fonts, as heretofore described.

*The elevator.*—The elevator comprises a vertically rocking arm 769, Figs. 3, 4 and 170 to 180 inclusive, which arm is mounted on a rock shaft 770 carrying an arm 771 which is connected by a spring link or pitman 772 with a crank pin on a disk 773. The disk 773 stops twice during each revolution, once when the elevator is at its lower station, and again when the elevator is at its upper station, these stops being of sufficient length to permit of the loading and the unloading of the elevator. The crank disk 773 is driven by gears 774, 775, Figs. 3, 175, 176 and 178, the former having twice as many teeth as the latter. Gear 775 is connected with a gear 776 which is mutilated, as shown in Fig. 178 and which coöperates with the mutilated gear 777 which is constantly driven by means of beveled gears 778, worm gear 779 and worm 780 upon the constantly rotating shaft 115. The gear 777 has as many teeth as the gear 776 and hence the gear 774 makes a half revolution and a stop for each complete revolution of the gear 777.

Referring to Fig. 179, it will be seen that the spring link 772 comprises a casing 837 which is connected with the disk 773 and a piston rod 838 which is connected with the arm 771. Within the casing is a sleeve 839 the lower closed end of which affords a bearing for a spring 840, while the upper end affords a bearing for a plunger 841. The piston 838 works within the spring 840 and has a head 842 against which the upper end of spring 840 bears. Between the plunger 841 and the upper end of the casing is a stronger spring 843. The parts are shown in normal position in Fig. 179. When the elevator is at the lower station, as shown in full lines in Fig. 178, the link is shortened and the elevator is pressed to its seat by the spring 843 acting through the plunger 841 and the head 842 upon the rod 838. When the elevator is at its upper station the link is under tension and lengthened, the plunger 841 resting upon the upper end or shoulder of the sleeve 839, while the lower spring 840 is under compression, the head 842 being pulled down by the rod 838. It will be seen that the link 772 exerts spring pressure upon the arm 771 at both extremes of the movement of the elevator, causing the elevator to be spring seated at both stations to bring it into accurate position for loading and unloading.

On the shaft 781 which carries the gear 777 is a gear which operates the elevator loading cam 782 and the elevator discharging cam 5, these cams being timed with the movements of the elevator. The cam 782 operates a lever 783 which, by means of a sector gear and pinion, rocks a vertical shaft 784, Figs. 4, 171, 175 and 176. On the lower end of shaft 784 is a gear segment 785 which meshes with a rack on a slide 786. Slide 786 carries a pair of spring pawls 787 which periodically engage the matrices on the rail 605 at the lower elevator station and move them to the left onto the rail 788 of the elevator proper 789. A spring pawl 789ª holds the matrices in the elevator while the latter is raising them to the upper station. The pawls are shown in normal position in Figs. 170 and 171 and in their left position in Fig. 172.

Referring to Figs. 170 and 178 to 181, it will be seen that the elevator 789 is carried by a lever 790 which is pivoted upon the end of the elevator arm 769. A spring 791 connected with the upper end of lever 790 normally holds said end against a stop 792. As the elevator approaches the lower station, a roll 793 travels over a fixed cam 794 which guides the elevator properly to its seat in the lower station, and as the elevator approaches the upper station, the roll 793 is guided by a cam 795. The elevator is pivotally connected with the lever 790 and as it approaches its upper station an arm 796 on the elevator engages a roll 797 causing the elevator to assume a position at right angles to the position assumed by the elevator at the lower station. This is for the purpose of turning the matrices through a quarter revolution to deliver them on their sides to the separating mechanism. A spring 801 on the elevator, Figs. 172 and 173, normally holds the elevator in line with the lever 790. Fixed guides 798 are preferably provided to steady the elevator arm during its movements. The shaft 784 is preferably provided at its lower end with a clutch sleeve 799, Figs. 175 and 177, which permits of conveniently disconnecting the elevator loading mechanism. At the upper elevator station the retaining spring pawl 789ª comes in contact with a stop 800 and is thrown out of the path of the matrices, leaving the matrices free to be moved into the channel 8 of the font separating mechanism by the pusher 1, Figs. 21 and 181, as described at the beginning of the specification.

The various parts of the machine and their operation, have been described as nearly as possible in the order in which the operations of the machine take place. As the machine is capable of several independent operations at the same time, it is not practicable to describe them strictly in sequence. For instance, while the logotypes of one line are being cast the matrices used for the preceding line may still be in the distributer, while the matrices for the succeeding line are being assembled. The full operation of the machine is best understood by following the course of the matrices through the machine and for this reason we have described the various mechanisms and their function as nearly as possible in the order in which they operate in producing a line of composition.

While the present invention has been described as embodied in a machine adapted to circulate matrices and to cast logotypes, it will be evident that various features of the invention are applicable to typographic machines generally, including, for instance, linotype machines, typesetting machines, type-casting machines. In some of these machines type are used instead of matrices and the product is a form of individual type.

It is to be understood that the claims hereinafter made are intended to cover the subject-matter specified for any and all uses to which it may be applicable and that the term "matrices" as used in the claims is intended to include type in cases where type and matrices may be treated as equivalents, as for instance in the claims relating to the distributing and assembling mechanisms.

It will also be evident that various changes in the details of construction and arrangement of the mechanism may be made without departing from the spirit and scope of the invention.

Having described my invention what I claim and desire to secure by Letters Patent is, 1. In a typographic machine, means for separating individual matrices from a line thereof comprising a pusher for the line of matrices, means for urging the pusher forward, a frictional clamp for stopping the pusher at any point in its travel, and means for periodically operating the clamp.

2. In a typographic machine, means for separating individual matrices from a line thereof comprising a pusher for the line of matrices, means for urging the pusher forward, a bar connected with the pusher, a frictional clamp coöperating with said bar to hold the pusher, and means for periodically operating said clamp.

3. In a typographic machine, means for separating individual matrices from a line thereof comprising a channel or guide-way, means for moving a line of matrices therein, a movable abutment for sustaining the end matrices, a pusher movable transversely of the channel for separating the end matrices from the line, and means for simultaneously advancing the pusher and retreating the abutment whereby the end matrix is made to take a diagonal course in moving from the line.

4. In a typographic machine, means for separating individual matrices from a line thereof comprising a channel or guide-way, means for moving a line of matrices therein, a pusher operating transversely of the channel for removing the end matrices, a movable abutment for sustaining the end matrices, a spring finger normally opposing the removal of the end matrices, and means for simultaneously advancing the pusher and retreating the abutment, the movements of the parts being so related that the end matrix is removed from the line in a diagonal direction and thereby released from the spring finger.

5. In a typographic machine, a font separator comprising a series of feelers, a series of testing slides arranged to carry the matrices into contact with the feelers, and means for operating the testing slides, said means including a cam, a rock shaft operated by the cam, a series of arms on the shaft, and spring links connecting the arms respectively with the slides.

6. In a typographic machine, a font separator comprising a series of feelers, a series of testing slides, a cam for operating the testing slides, and connections including spring links between the cam and the slides for operating the slides in both directions.

7. In a typographic machine, a font separator comprising a series of feelers, a series of testing slides, a transfer slide arranged to transfer the matrices intermittently to the successive testing slides, and a movable plate coöperating with the testing slides to maintain the matrices upright.

8. In a typographic machine, a font separator comprising a series of feelers, a series of movable testing slides, a transfer slide movable transversely of the testing slides to transfer the matrices to the successive testing slides, and a plate adjacent to the transfer slide and movable toward and from the matrices, said plate being adapted to sustain the matrices in upright position during their transfer.

9. In a typographic machine, a distributing mechanism comprising a series of matrix carriers provided with racks, gears engaging the racks to move the carriers, means for imparting a step by step movement to the gears, and a restraining device operating on the carriers after they are free from the gears to prevent over-motion of said carriers.

10. In a typographic machine, a distributer comprising a series of matrix carriers, means for imparting a positive step by step movement to said carriers, and a restraining device for preventing over-motion of the carriers after they are free from the moving means.

11. In a distributer of a typographic machine, the combination of a series of matrix carriers, means for moving said carriers step by step over the magazine, and a restraining device for said carriers, consisting of a spring pressed slide movable in a path inclined to the path of the carriers, whereby the restraining device is moved simultaneously forward and out of the path of the carriers.

12. In a distributer of a typographic machine, a series of carriers each provided with a plurality of pairs of matrix sustaining pawls, means for moving the carriers step by step over a magazine, means for operating the sustaining pawls to discharge matrices into their magazine channels, and a striker common to all of the sustaining pawls of each carrier adapted to operate the pawls and release any matrices which have passed the distributer.

13. In a distributer of a typographic machine, a series of carriers each provided with a plurality of pairs of sustaining pawls, means for moving the carriers step by step over a magazine, means for operating the sustaining pawls to discharge matrices into their magazine channels, a striker common to all of the sustaining pawls of each carrier adapted to operate the pawls and release any matrices which have passed the distributer, and means for restoring the sustaining pawls to normal position.

14. In a distributing mechanism of a typographic machine, the combination with a carrier having a series of pairs of matrix sustaining pawls, of feeler bars adapted to open said pawls to discharge matrices into their magazines, restoring means for closing the pawls comprising a reciprocating bar, and pins yieldingly seated in said bar and adapted to engage the pawls.

15. In a distributing mechanism of a typographic machine, a carrier having a plurality of matrix sustaining pawls, means for releasing the pawls to discharge the matrices from the carrier, and means for restoring the pawls to normal position comprising a vertically movable bar and a series of pairs of beveled spring-seated pins carried by said bar.

16. In a distributer of a typographic machine, a circulating matrix carrier having a series of cells to receive the matrices, and a pawl coöperating with each cell and having its free end arranged to enter the lower portion of the cell, whereby the matrices normally rest in the lower part of the carrier.

17. In a distributer of a typographic machine, a circulating matrix carrier having a series of cells extending vertically through the carrier, and a pawl vertically arranged at each end of each cell, each pawl being pivoted at its upper end and having its lower end arranged to project into the bottom of the cell to sustain the matrix.

18. In a distributer of a typographic machine, a circulating matrix carrier having a series of cells extending vertically through the carrier, a pair of pawls for each cell having their free ends normally projecting into the cell, stops for holding the pawls in normal position, and springs for moving the pawls when released from the stops.

19. In a distributer of a typographic machine, a circulating matrix carrier having a series of cells extending vertically through the carrier, and a pair of pawls for each cell, said pawls being vertically arranged, pivoted at their upper ends, provided with laterally projecting free ends adapted to extend into the cell at the lower end thereof, and having their backs beveled to coöperate with restoring means.

20. In a distributer of a typographic machine, a matrix carrier having a plurality of cells, a pair of pivoted pawls for each cell having their free ends extending normally into the cell, movable pins for holding said pawls in normal position, springs arranged to throw the pawls out of the cell when released from the pins, and means for releasing the pawls to discharge the matrices into their respective magazine channels.

21. In a typographic machine, the combination with a circulating series of matrix carriers, of a vertically movable feeler frame, a series of detachable feeler bars in said frame, and means for removably locking the feeler bars in the frame.

22. In a typographic machine, the combination with a circulating series of matrix carriers, of a vertically movable feeler frame, a series of feeler bars in said frame, means for removably locking the feeler bars in the frame, comprising a rod common to all of the feeler bars and adapted to engage and lock the ends of said bars.

23. In a typographic machine, the combination with a circulating series of matrix carriers, of a vertically movable feeler frame, a series of feeler bars in said frame, means for removably locking the feeler bars in the frame, comprising a rod mounted in the feeler frame and having a rocking movement therein, said rod being cut away opposite the ends of the feeler bars and adapted when turned to interlock with grooves or notches in the ends of said bars.

24. In a distributer of a typographic machine, the combination with a series of circulating movable matrix carriers of a magazine, a movable throat-bar between the carriers and the magazine, means for moving the carriers over the throat-bar, and means controlled by movement of the throat-bar for automatically stopping the carrier moving means.

25. In a distributer of a typographic machine, means for imparting a substantially rectangular circulating movement to a series of carriers, a series of throat-bars arranged beneath the carriers and into which the carriers discharge, means for moving the carriers, and means connected with the several throat-bars for stopping the movement of the carriers should a matrix stick in its passage from a carrier to a throat-bar.

26. In a distributer of a typographic machine, the combination with a circulating series of carriers, feeler bars above the carriers and a clutch and connections for operating said carriers and feeler bars, of a series of movably mounted throat-bars beneath the carriers, and connections between said throat-bars and said clutch, whereby the clutch is disconnected upon movement of any one of the throat-bars, for the purpose set forth.

27. In a typographic machine, the combination with a removable magazine, of means for locking the magazine in the machine, means for normally locking the matrices in the magazine, means for unlocking the matrices to render the magazine operative, and means for preventing withdrawal of the magazine while it is operative.

28. In a typographic machine, a plurality of independently removable magazines, in combination with means for locking and unlocking said magazines in the machine, means for locking and unlocking the matrices in the magazines, and means for preventing the removal of any magazine from the machine until the matrices are locked therein.

29. In a typographic machine, the combination with a plurality of removable magazines, of a matrix locking device for each magazine adapted to engage the lower matrices therein, a cam device for operating said matrix locking devices and arranged to open but one magazine at a time, and means for preventing the withdrawal of an open or operative magazine.

30. In a typographic machine, the combination with a plurality of magazines, of a matrix retaining device for each magazine adapted to engage the lowest matrices therein, a locking device for the matrix retaining device of each magazine, and means for simultaneously operating the said locking devices of the several magazines.

31. In a typographic machine, the combination with a plurality of magazines, of a matrix retaining device for each magazine adapted to engage the lowest matrices therein, a locking device for the matrix retaining device of each magazine, and means for normally maintaining the locking devices of the several magazines unlocked while the magazines are in the machine, the said locking devices being automatically locked when the magazines are removed from the machines.

32. In a typographic machine, the combination with a plurality of magazines each provided with a matrix retaining device adapted to engage and sustain the lowest matrices in the magazine, of means on each magazine for locking its matrix retaining device, and a common means on the machine for unlocking the said retaining devices of the several magazines.

33. In a typographic machine, the combination of a plurality of magazines each provided with a matrix retaining device and means including a rock shaft for locking said retaining devices, of a bar movably mounted in the machine and adapted to operate the said rock shafts of the several magazines simultaneously to unlock the matrix retainers, for the purpose set forth.

34. In a typographic machine, the combination with a magazine, of a laterally removable matrix retaining bar, a rock shaft having connections with said bar at both ends of the machine, a second rock shaft, and locking devices arranged at opposite ends of the machine and controlled by said second rock shaft for locking the matrix retaining bar in its operative position.

35. In a typographic machine, the combination with a plurality of magazines each having a matrix retainer locking device, of a part movably mounted on the machine and adapted to coöperate with the magazines and with the matrix retainer locking devices thereof, whereby in one position of said part the magazines are locked to the machine and the matrix locking devices are withdrawn, while in another position of said part the magazines are freed from the machine and the matrices are locked within the magazines.

36. In a typographic machine, the combination with a magazine having a locking part such as the hook 204 and having a matrix retainer device and a lock therefor, of a slidable bar in the machine having teeth adapted to engage with the said locking parts on the magazines and having projections adapted to simultaneously engage with the matrix retainer locking devices to unlock the matrices.

37. In a typographic machine, having a plurality of magazines carrying different fonts of types, means for rendering the magazines containing any desired font operative, in combination with independent means for rendering either upper or lower case matrices of the selected font available.

38. In a typographic machine having a plurality of magazines carrying different fonts of types, means for rendering the magazines containing any desired font operative, in combination with independent automatic key controlled mechanism for rendering either upper or lower case matrices of the selected font available.

39. In a typographic machine, the combination with a plurality of upper case magazines and a corresponding plurality of lower case magazines, of means for rendering operative any desired pair of magazines, means whereby the matrices are normally locked in said magazines, and means for alternately rendering available matrices in the upper and lower case magazines comprising a sliding bar having cams thereon, a link connected to said bar and having a cam slot, a pin or roller in said slot, and means for moving the link to shift the bar.

40. In a typographic machine, the combination of a plurality of upper case magazines, a corresponding plurality of lower case magazines, means for rendering any desired pair of magazines operative, said means including a hand lever having a fixed bearing, and means for shifting from upper to lower case comprising a cam, a clutch, a key, means controlled by the key for releasing the clutch, and connections between the clutch and said cam.

41. In a typographic machine, the combination of a key board, a case or shift key, mechanism for locking the keys of the key board when the case key is operated, and automatic mechanism independent of the case or shift key for unlocking the keys of the key board after shifting from one case to another.

42. In a typographic machine, the combination of a key board, a case or shift key, magazines for upper and lower case characters, means for connecting the key board with the upper or lower case magazines as desired, means for locking the keyboard while shifting from upper to lower case and automatic means independent of the case or shift key for unlocking the key board after said shifting movement.

43. In a typographic machine, the combination with the case or shift key and the key board, of a universal bar adapted to lock the keys of the key board, means governed by said case key for throwing the universal bar into locking position, and a clutch and connections adapted to first shift from one case to another and then withdraw the universal bar from locking position.

44. In a typographic machine, the combination with a plurality of magazines, of an assembling funnel adapted to coöperate with either of said magazines, said funnel having downwardly converging ways for directing the type of matrices to a common point, a belt coöperating with one of said ways to increase the speed of the type or matrices thereon, and means for driving said belt in any position of said funnel.

45. In a typographic machine, the combination with a plurality of magazines, of an assembling funnel arranged beneath said magazines, arc-shaped guides upon which said funnel is mounted, and means for moving the funnel on said guides into position to coöperate with any desired magazine.

46. In a typographic machine, the combination with a plurality of lower case magazines, and a plurality of upper case magazines, of two funnels coöperating respectively with the lower and upper case magazines and adapted to deliver type or matrices at a common point, and arc-shaped guides adapted to support said funnels and upon which said funnels are shiftable to bring them into coöperation with different magazines.

47. In a typographic machine, the combination with upper and lower case magazines, of a pair of funnels having a common point of delivery and having downwardly converging ways for directing the type or matrices to said point of delivery, belts coöperating with said ways for increasing the speed of the type or matrices, and a common driving mechanism for said belts.

48. In a typographic machine, means for assembling type or matrices in line comprising a pusher, a guide in which the pusher reciprocates, and means for moving the guide at right angles to the direction of movement of the pusher, whereby a "four-motion" movement is imparted to the pusher.

49. In a typographic machine, means for assembling type or matrices in line comprising a pusher, a guide, means for maintaining said guide in a horizontal position, means for moving said guide vertically, a pusher movably mounted in said guide, and means for reciprocating the pusher, for the purpose set forth.

50. In a typographic machine, the combination of a guide, means for reciprocating said guide laterally, a pusher mounted in said guide, and means for reciprocating said pusher comprising a cam, a cam lever and a sliding connection between said cam lever and said pusher.

51. In a typographic machine, the combination with a matrix magazine and means for assembling matrices in lines, of a separator magazine, a separator assembling chute out of line with said separator magazine, and means controlled by the space key for positively transferring a separator from said magazine to said chute.

52. In a typographic machine, the combination with a matrix magazine and means for assembling matrices in lines, of a separator magazine, a separator assembling chute out of line with said separator magazine, means controlled by the space key for positively transferring a separator from said magazine to said chute comprising a slide adapted to engage the end separator in the magazine and means for reciprocating said slide to carry said matrix from the magazine to the assembling chute.

53. In a typographic machine, the combination with a matrix magazine and means for assembling matrices in lines, of a separator magazine, a separator assembling chute out of line with said separator magazine, means controlled by the space key for positively transferring a separator from said magazine to said chute comprising an assembling slide having a recess to receive a separator, means for normally holding said slide with its recess in register with the separator magazine, means for normally moving the separators successively into said recess, and means controlled by the space key for reciprocating the slide.

54. In a typographic machine, the combination with assembling mechanism, of an assembling slide upon which the line is assembled by said mechanism, a starting lever, and means for moving the assembling slide rearward upon the operation of the starting lever, for the purpose set forth.

55. In a typographic machine, the combination with assembling mechanism, of a line preceder against which the matrices are assembled, a slide upon which the matrices are assembled, and means for moving said slide and preceder rearward after the assemblage of a line, for the purpose set forth.

56. In a typographic machine, the combination with assembling mechanism, of a line preceder, a line forwarder, a slide upon which matrices are assembled into lines against the line preceder, and means for moving said slide to bring the lines of matrices into the path of the line forwarder.

57. In a typographic machine, the combination with the assembling mechanism, casting mechanism, and a way leading from the assembling mechanism to the casting mechanism, of a transverse slide upon which the lines of matrices are assembled, a rail carried by said slide and adapted to engage the upper ends of the matrices, a line forwarder for shifting the line to the casting mechanism, and means for moving said slide to transfer the matrices into the path of the line forwarder.

58. In a typographic machine, the combination with assembling mechanism, a part upon which the line of matrices is assembled, and a pivotally mounted rail normally engaging the upper ends of the matrices as they are assembled and adapted to be thrown back to permit of correcting or readjusting the matrices.

59. In a typographic machine, the combination with assembling mechanism including a pusher and a packer for moving the matrices into line, of an over-hanging rail for guiding the upper ends of the matrices, for the purpose set forth.

60. In a typographic machine, the combination with assembling mechanism including a pusher and a packer for moving the matrices into line, of an overhanging rail for guiding the upper ends of the matrices comprising a pivoted portion coöperating with the upper front portions of the matrices, and a non-pivoted portion coöperating with the upper rear portions of the matrices.

61. In a typographic machine, the combination with assembling mechanism including a pusher and a packer for moving the matrices into line, of an over-hanging rail for guiding the upper ends of the matrices comprising a part arranged to yield lengthwise of the line to permit matrices to be forwarded by the pusher before they are seated by the packer.

62. In a typographic machine, the combination with assembling mechanism, casting mechanism and a rail leading from the casting mechanism to the assembling mechanism upon which the separators are returned to the assembling mechanism of a slide movable along said rail and carrying a pawl adapted to engage and move the separators to the assembling mechanism, an arm connected with the slide, a cam and connections for moving said arm, and a spring in said connections whereby the pawl is yieldingly pressed against the separators and adapted to feed said separators to the assembling mechanism.

63. In a typographic machine, a justifier comprising a series of pistons of different diameters and having areas which are multiples of a given unit whereby said pistons are adapted to be combined to represent any desired number of word spaces in a line of composition.

64. In a typographic machine, a justifier comprising a movable part or head, a series of pistons of different diameters, and means for automatically connecting and disconnecting said pistons with said head during the composition of a line, as and for the purpose set forth.

65. In a typographic machine, a justifier comprising a series of pistons of different diameters, a movable head, means for connecting one or more of said pistons to said head to represent the number of word spaces in the line, a pump piston in communication with the aforesaid pistons, and means for operating the pump piston in proportion to the shortage of the line, for the purpose set forth.

66. In a typographic machine, a justifier comprising a series of pistons of different diameters, a movable head, a cam shaft having a series of cams corresponding to the said pistons, means interposed between the cams and their respective pistons for connecting and disconnecting the pistons to the said head, a space key, and connections between said space key and said cam shaft for moving the latter.

67. In a typographic machine, a justifier comprising a series of pistons, a movable head, means controlled by the space key for connecting one or more of the pistons with said head, a pump in communication with the aforesaid pistons, power operated means for moving said pump including a lever, and means controlled by the shortage of the line for rendering said lever inoperative and thereby stopping the movement of the pump.

68. In a typographic machine, a justifier comprising a pump, a series of pistons in communication with the pump, a movable head, a cam shaft, cams on said shaft, means operated by the cams for positively connecting and disconnecting the several pistons with the head, a power shaft, a space key and means controlled by the space key for driving the cam shaft from the power shaft.

69. In a typographic machine, a justifier comprising a plurality of pistons, a pump arranged to act on said pistons, a part connected with the pump and movable to gage the line to be justified, and means controlled by said part for stopping the pump whereby the stroke of the pump is caused to be proportional to the shortage of the line to be justified.

70. In a typographic machine, a justifier comprising a plurality of pistons, a pump in operative communication with said pistons, means for selecting pistons to represent the number of separators in a line; means for operating the pump, a connection from said justifier arranged to gage the shortage of the line to be justified, a connection controlled by the shortage of the line for stopping the pump when its movement has reached a limit determined by the said shortage, and a connection from said pistons for governing the width of the justifying spaces as determined by the justifying mechanism.

71. In a typographic machine, the combination with casting means, of means for assembling a group of matrices, means for presenting the matrices to the mold of the casting mechanism, a movable clamping jaw adapted to clamp the matrices during the casting operation and a connected body-piece arranged to discharge the slug from the mold after the clamping operation, said clamping jaw comprising two relatively movable parts, and means for connecting and disconnecting said parts, for the purpose set forth.

72. In a typographic machine, the combination with casting means, of means for assembling a group of matrices, means for presenting the matrices to the mold of the casting mechanism, a movable clamping jaw adapted to clamp the matrices during the casting operation and a connected body-piece arranged to discharge the slug from the mold after the clamping operation, said clamping jaw comprising two relatively movable parts, and means for disconnecting the part adjacent to the mold from the other part during the ejecting movement of said body-piece.

73. In a typographic machine, the combination with casting means, of means for assembling a group of matrices, means for presenting the matrices to the mold of the casting mechanism, a movable clamping jaw adapted to clamp the matrices during the casting operation and a connected body-piece arranged to discharge the slug from the mold after the clamping operation, said clamping jaw comprising two relatively movable parts, means for moving said parts to clamp the matrices during the casting operation, and to eject the slug after the casting operation, means for automatically disconnecting the part adjacent to the mold during the ejecting movement, and means for reconnecting said part to the other part after the ejecting movement.

74. In a typographic machine, the combination with the line forwarder, of the cam 500 movably connected with said line forwarder, restoring means for a portion of the mechanism adapted to be operated by said cam during the reverse movement of the line forwarder, and means for moving said cam relatively to the line forwarder prior to the direct movement of the line forwarder.

75. In a typographic machine, the combination with a reciprocating line forwarder, of a part carried thereby upon parallel arms, means for swinging said arms at each extreme of the movement of the line forwarder, and a cam carried by said part and operative during the movement of the line forwarder in one direction only, for the purpose set forth.

76. In a typographic machine, the combination with the casting mechanism of a presentation slide, means for engaging matrices with said slide, means for starting the slide to move the matrices to the mold, and means controlled by the slide for stopping the slide moving means.

77. In a typographic machine of the class described, the combination with the presentation slide and means for moving the same to and from the mold, of a slide 533 for starting the moving means, and a cam on the presentation slide adapted to coöperate with said slide 533 to stop the said moving means.

78. In a typographic machine of the class described, the combination with the presentation slide, of a transversely moving starting slide 533, and a cam carried by the presentation slide and adapted to move said slide 533 first to one extreme position and then to the other extreme position, for the purpose set forth.

79. In a typographic machine of the class described, the combination with the presentation slide movable to and from the mold, of moving means for the presentation slide, a transversely moving slide controlling said moving means, means for moving said transverse slide to start the presentation slide, and means on the presentation slide adapted to move said transverse slide and effect a stoppage of the presentation slide.

80. In a typographic machine of the class described, the combination with the presentation slide movable to and from the mold, of a transversely moving slide for starting and stopping the presentation slide, and diamond-shaped cams on said slides adapted to coöperate to move the starting slide in opposite directions during the corresponding movements of the presentation slide.

81. In a typographic machine of the class described, the combination with a mold, of the presentation slide movable to and from the mold, a movable matrix clamping jaw on said slide, means for normally pressing said jaw away from its opposing jaw to admit the matrices, and means for engaging said movable jaw as it approaches the mold to clamp the matrices between said jaws.

82. In a typographic machine of the class described, the combination with a mold, of the presentation slide movable to and from the mold, a movable matrix clamping jaw on said slide, means for normally pressing said jaw away from its opposing jaw to admit the matrices, said movable jaw having an inclined or cam surface, and means for engaging said surface to effect the clamping of the matrices between said jaws while the presentation slide is in its casting position.

83. In a typographic machine, the combination with the presentation slide, of a line forwarder and means for moving said line forwarder intermittently toward the presentation slide to engage successive parts of a line with said slide.

84. In a typographic machine, the combination with the presentation slide, of a line forwarder, means for urging said line forwarder toward the presentation slide to engage successive parts of a line of matrices with the presentation slide, and means for retracting the line forwarder slightly during the movements of the presentation slide to relieve the pressure upon the slide of the adjacent matrix in the line.

85. In a typographic machine, the combination with a line forwarder, of means for urging the said forwarder in a forward direction, a rack and pawl for stopping the forward movement of the forwarder, and means for periodically disengaging the pawl from the rack.

86. In a typographic machine, the combination with a line forwarder and means for urging said forwarder in a forward direction, of a rack and pawl, one member of which is connected with the line forwarder and another member connected with a movable support, means for moving said support to slightly retract the line forwarder periodically, and means for releasing the pawl from the rack periodically to permit of forward movement of the forwarder.

87. In a typographic machine, the combination with a movable presentation slide, of a line forwarder adapted to move matrices into engagement with said slide, and means operated by the presentation slide for retracting the line forwarder during the movement of the slide.

88. In a typographic machine, the combination with a movable presentation slide, of a line forwarder adapted to move matrices into engagement with said slide, means operated by the presentation slide for retracting the forwarder during the movements of the presentation slide, and means also operated by the presentation slide for releasing the line forwarder as the slide comes to rest in position to receive additional matrices.

89. In a typographic machine, the combination with the presentation slide having a reciprocating movement, of a line forwarder and means for urging the same in a forward direction toward said slide, a rack connected with the line forwarder, a pair of pawls coöperating with said rack and having a movable support, means operated by the presentation slide for moving said support, and additional means operated by the presentation slide for periodically disengaging the pawls from the rack, for the purpose set forth.

90. In a typographic machine having a casting mechanism, the combination with the mold, of a movable liner, means for reciprocating the liner to eject a slug from the mold, and devices for disconnecting the liner from its reciprocating means and withdrawing the liner from the mold.

91. In a typographic machine having a casting mechanism, the combination with the mold, of a liner, means for reciprocating the liner to eject a slug or cast from the mold, means for disconnecting the liner from its reciprocating means at will, and means for withdrawing the liner from the mold, for the purpose set forth.

92. In a typographic machine having a casting mechanism, the combination with a mold, of a movable liner, a slide 484 to which said liner is connected, means for moving said slide to eject a slug or cast from the mold, a rack connected with said slide, a mutilated pinion normally disconnected from said rack but adapted to coöperate therewith, and a common means for disconnecting the slide from its operating means and rotating the mutilated pinion to withdraw the liner from the mold.

93. In a typographic machine having a casting mechanism, the combination with the mold and with a plurality of liners carried by the machine, of means for bringing any desired liner into coöperation with the mold.

94. In a typographic machine having a casting mechanism, the combination with the mold and with a plurality of liners carried by the machine, of means for adjusting the mold, and means for bringing any desired liner into coöperation with the mold.

95. In a typographic machine having a casting mechanism, the combination with the mold and with a plurality of liners carried by the machine, of means for adjusting the mold and simultaneously adjusting the liners relatively to the mold.

96. In a typographic machine having a casting mechanism, the combination with the mold and with a plurality of liners of different sizes carried by the machine, of means for adjusting the mold to vary its body width, and means for moving the liners to bring the liner of corresponding body width into coöperation with the mold.

97. In a typographic machine having a casting mechanism, the combination with the mold, of a relatively movable carriage or support provided with a plurality of liners adapted to coöperate with the mold.

98. In a typographic machine having a casting mechanism, the combination with an adjustable mold, of a liner carriage or support provided with a plurality of liners of different sizes.

99. In a typographic machine having a casting mechanism, the combination with the mold and means for adjusting the mold to vary its body width, of a movable carriage provided with a plurality of liners, and means for adjusting the said carriage relatively to the mold.

100. In a typographic machine having a casting mechanism, the combination with the mold and means for adjusting the mold to vary its body width, of a movable carriage provided with a plurality of liners, and a common means for simultaneously adjusting the mold opening and moving the liner carriage to bring the desired liner into register with the mold opening.

101. In a typographic machine having a casting mechanism, the combination with the mold, of means for adjusting the mold sections relatively to vary the mold opening, and means for adjusting the said mold sections simultaneously to shift the mold bodily, for the purpose set forth.

102. In a typographic machine having a casting mechanism, including a mold, a liner carriage or support, and a plurality of liners therein.

103. In a typographic machine having a casting mechanism including a mold, a liner carriage or support, and a plurality of liners therein varying progressively in thickness.

104. In a typographic machine having a casting mechanism, the combination with the mold, of a plurality of liners mounted in the machine, means for reciprocating a liner in the mold, and means for bringing any one of said liners into operative relation with the mold and said reciprocating means.

105. In a typographic machine having a casting mechanism, a mold having two movable sections, a common means connected to said sections and adapted to move them toward and from each other to vary the body width of the mold opening, and means to close the sides of the mold in different adjustments of the same.

106. In a typographic machine having a casting mechanism, a mold comprising two movable sections, inclines on said sections, two movable parts having corresponding inclines coöperating with the mold sections, and a common means for moving said parts simultaneously to vary the mold opening.

107. In a typographic machine, the combination with means for presenting successive matrices or groups of matrices at a fixed line, of a mold having two movable sections, and means for simultaneously adjusting said sections relatively to said line to vary the position of the type faces upon the cast or slug without varying the mold opening.

108. In a typographic machine, the combination with means for presenting successive matrices or groups of matrices at a fixed line, of a mold having two movable sections, means for adjusting said sections relatively to vary the mold opening, and means for adjusting said sections simultaneously to vary the position of the type faces upon the cast or slug.

109. In a typographic machine, the combination with means for presenting successive matrices or groups of matrices at a fixed line, of a mold having two movable sections, means for adjusting said sections to vary the mold opening, a series of liners, and means for bringing any liner of the series into coöperation with the mold.

110. In a typographic machine having a casting mechanism, the combination with the mold, of a jet slide having an opening adapted to register with the mold, a detent arranged to normally prevent the jet opening from registering with the mold, a part movable toward and from the mold and adapted to carry matrices to the mold, and means controlled by said part and adapted to release the jet slide at the moment the matrices reach the mold, for the purpose set forth.

111. In a typographic machine having a casting mechanism, the combination with the mold, of a jet slide movable relatively to the mold and having a jet opening adapted to register with the mold during the casting operation, a detent normally tending to prevent the jet opening from registering with the mold, a presentation slide, means for reciprocating the same toward and from the mold, and means controlled by said presentation slide for withdrawing the detent from the jet slide at the moment the matrices reach the mold.

112. In a typographic machine having a casting mechanism, the combination with the mold, of a jet slide, a presentation slide adapted to carry matrices to and from the mold, a matrix clamping jaw for holding the matrices during the casting operation, and means coöperating with the jet slide for preventing casting from taking place unless the matrices are pressed against said jaw.

113. In a typographic machine having a casting mechanism, the combination with the mold, of a jet slide having an opening adapted to register with the mold, a detent for normally holding said slide with its opening out of register with the mold, clamping jaws for holding matrices securely together at the mold, and means connected with one of said jaws for preventing the release of the jet slide from its detent until the matrices are clamped between said jaws.

114. In a typographic machine having a casting mechanism, the combination with the mold, of a relatively immovable plate having an opening in register with the mold opening and a knife edge adapted to trim the base of the slug as the latter is ejected from the mold.

115. In a typographic machine having a casting mechanism, the combination with a mold, of a relatively immovable knife plate having an opening in register with the mold opening and adapted to trim the base of the slug as it is ejected from the mold, one of the walls of said knife plate opening having a movable part to eject the jet from said opening.

116. In a typographic machine having a casting mechanism, the combination with a mold, of a relatively immovable knife plate having an opening in register with the mold opening and adapted to trim the base of the slug as it is ejected from the mold, one of the walls of said knife plate opening having a movable part to eject the jet from said opening, and means for moving said part after each casting operation.

117. In a typographic machine having a casting mechanism, the combination with a mold, of a relatively immovable knife plate having an opening in register with the mold opening and adapted to trim the base of the slug as it is ejected from the mold, one of the walls of said knife plate opening having a movable part to eject the jet from said opening, and means for moving said part comprising a jet slide having a cam surface and means for moving said slide.

118. In a typographic machine having a casting mechanism, the combination with the mold, of a jet slide movable relatively to the mold, and a plate intermediate the jet slide and the mold, said plate having an opening registering with the mold and forming a knife to trim the base of the slug as it is ejected from the mold.

119. In a typographic machine having a casting mechanism, the combination with a mold having a movable section, of a mold gate adapted to close one end of the mold opening, and a stop on the said movable section coöperating with the mold gate to cause the forward end of the mold gate to register with the said movable section when the gate is opened.

120. In a typographic machine, a mold comprising two opposite mold sections having an intermediate mold opening, a body piece closing one end of said mold opening, and a movable gate adapted to close the other end of said opening, the said gate being so related to one of the mold sections that its forward end will register with the mold opening when the gate is fully retracted.

121. In a typographic machine for producing a justified line of logotypes, means for casting each logotype of a line excepting the last with an integral justifying space, in combination with means for casting the last logotype body either longer or shorter than the face thereof, whereby either plus or minus errors in the justifying spaces are corrected in the last logotype and accurate justification insured.

122. In a typographic machine having a casting mechanism, the combination with the mold and the galley, of means for ejecting slugs from the mold, and a yielding abutment against which said slugs are ejected, said abutment comprising a slide under tension of a spring and an abutment head mounted in said slide and under tension of a secondary spring, for the purpose set forth.

123. In a typographic machine, means for assembling lines of type and transferring them to a galley, comprising in combination with the galley a movable galley gate and a spring pressed blade between which the type are assembled into lines.

124. In a typographic machine, means for assembling lines of type and transferring them to a galley, comprising in combination with the galley a movable galley gate, a spring pressed blade coöperating with the galley gate, means for withdrawing the galley gate, and a pusher for moving the line beyond said gate into the galley.

125. In a typographic machine, means for assembling lines of type and transferring them to a galley, comprising in combination with the galley a movable galley gate, a spring pressed blade coöperating with said galley gate to sustain the line during assemblage, a pusher arranged to operate after the transfer of each unit into the line, and a second pusher arranged to coöperate with the first named pusher to transfer the line to the galley when completed.

126. In a typographic machine, the combination with means for assembling successive lines, of a galley, means for transferring the lines of type to the galley, and means for controlling said transferring means to bring the same into operation at will, whereby two or more lines may be consecutively assembled and simultaneously transfered to the galley.

127. In a typographic machine including a circulating series of matrices, an elevator for transferring the matrices from a lower station to an upper station comprising an arm, a matrix carrier on the arm, a spring link connected to the arm, and means for reciprocating said link, the said link being adapted to press the carrier yieldingly to its seat both at the upper station and the lower station.

128. In a typographic machine, the combination with an elevator arm, of a spring link connected to said arm, and means for reciprocating said link, the said link comprising a casing, a pair of springs, two movable pistons between said springs upon which they bear respectively, and a stop for one of said pistons.

129. In a typographic machine, an elevator arm, a pair of mutilated gears adapted to vibrate said arm and permit the same to dwell at each extreme of its movement, and a spring link in the connections between said gears and said arm, for the purpose set forth.

130. In a typographic machine comprising a circulating series of matrices, the combination of a casting mechanism, a distributing mechanism, and an elevator having its movements synchronous with those of the distributing mechanism.

131. In a typographic machine comprising a circulating series of matrices, the combination of a casting mechanism, a distributing mechanism, an elevator arranged to raise the matrices from the casting mechanism to the distributing mechanism, and a common driving mechanism for the elevator and the distributing mechanism whereby their movements are synchronous.

In testimony whereof I affix my signature in presence of two witnesses.

EMIL LAWRENZ.

Witnesses:
FREDK. W. FELDNER,
SAMUEL K. DENNIS.

Copies of this patent may be obtained for five cents each, by addressing the "Commissioner of Patents, Washington, D. C."